(12) United States Patent
Havoc Pennington et al.

(10) Patent No.: US 11,687,212 B2
(45) Date of Patent: *Jun. 27, 2023

(54) METHOD AND APPARATUS FOR MANAGING DIGITAL MEDIA CONTENT

(71) Applicant: LiTL LLC, Boston, MA (US)

(72) Inventors: Robert Sanford Havoc Pennington, Asheville, NC (US); Matthew David Day, San Francisco, CA (US); Noah Bruce Guyot, Mill Valley, CA (US); Daniel Kuo, San Francisco, CA (US); Jenea Boshart Hayes, Castro Valley, CA (US); Aaron Tang, Boston, MA (US); David Livingstone Fore, Oakland, CA (US); John Chuang, Brookline, MA (US); Chris Bambacus, Framingham, MA (US); Yves Behar, Oakland, CA (US); Joshua Morenstein, San Francisco, CA (US); Christopher Hibmacronan, Oakland, CA (US); Naoya Edahiro, San Francisco, CA (US); Donald Francis Fischer, Charlestown, MA (US); Christian Marc Schmidt, Brooklyn, NY (US); Lisa Strausfeld, New York, NY (US); Marc Gallucci, Boston, MA (US); Eric Sutton, Roslindale, MA (US); Samuel Wallace Webber, Roxbury, MA (US); Christine Meahan, Charlestown, MA (US); Phillip Henson, Boston, MA (US)

(73) Assignee: LiTL LLC, Boston, MA (US)

(*) Notice: Subject to any disclaimer, the term of this patent is extended or adjusted under 35 U.S.C. 154(b) by 287 days.

This patent is subject to a terminal disclaimer.

(21) Appl. No.: 16/865,893

(22) Filed: May 4, 2020

(65) Prior Publication Data

US 2020/0319759 A1    Oct. 8, 2020

Related U.S. Application Data

(63) Continuation of application No. 15/280,928, filed on Sep. 29, 2016, now Pat. No. 10,684,743, which is a (Continued)

(51) Int. Cl.
*G06F 3/0482* (2013.01)
*G06F 3/04817* (2022.01)
(Continued)

(52) U.S. Cl.
CPC .......... *G06F 3/0482* (2013.01); *G06F 1/1616* (2013.01); *G06F 3/0484* (2013.01);
(Continued)

(58) Field of Classification Search
CPC .. G06F 3/0482; G06F 3/04817; G06F 3/0484; G06F 3/04842; G06F 3/0485;
(Continued)

(56) References Cited

U.S. PATENT DOCUMENTS 3,468,576 A    9/1969 Beyer et al.
4,939,514 A    7/1990 Miyazaki
(Continued)

FOREIGN PATENT DOCUMENTS

CN    1292112 A    4/2001
CN    2627170 Y    7/2004
(Continued)

OTHER PUBLICATIONS

European Communication dated Sep. 13, 2021 in connection with European Application No. 19190053.9.
(Continued)

*Primary Examiner* — Ting Z Lee
(74) *Attorney, Agent, or Firm* — Wolf, Greenfield & Sacks, P.C.

(57) ABSTRACT

Various aspects and embodiments are directed to a streamlined computer device and a graphical user interface that organizes interface elements into views of computer content for presentation to a user. Various views of digital media
(Continued)

content permits users to easily and efficiently access various digital media content. Different views are used to provide an interface that is responsive to configurations of the device and responsive to activity being performed by the user. Aspects include permitting the user to maintain and manage digital media content libraries. According to some embodiments, the libraries comprise user digital media content and references digital media content. Functionality provided to a user can be tailored to the type of content displayed, accessed and/or managed. According to various aspects, methods and systems are provided for accessing and managing digital media libraries on a streamlined computing device with a plurality selectable I/O profiles.

42 Claims, 54 Drawing Sheets

Related U.S. Application Data continuation of application No. 14/108,576, filed on Dec. 17, 2013, now Pat. No. 9,495,070, which is a continuation of application No. 12/611,282, filed on Nov. 3, 2009, now Pat. No. 8,612,888, which is a continuation-in-part of application No. 12/416,479, filed on Apr. 1, 2009, now abandoned, which is a continuation-in-part of application No. 12/170,939, filed on Jul. 10, 2008, now Pat. No. 8,289,688, and a continuation-in-part of application No. 12/170,951, filed on Jul. 10, 2008, now Pat. No. 8,624,844, said application No. 12/611,282 is a continuation-in-part of application No. 12/170,939, filed on Jul. 10, 2008, and a continuation-in-part of application No. 12/170,951, filed on Jul. 10, 2008, now Pat. No. 8,624,844.

(60) Provisional application No. 61/041,365, filed on Apr. 1, 2008, provisional application No. 61/041,365, filed on Apr. 1, 2008, provisional application No. 61/041,365, filed on Apr. 1, 2008.

(51) Int. Cl.
*G06F 3/0484* (2022.01)
*G06F 3/04842* (2022.01)
*G06F 3/0485* (2022.01)
*G06F 3/04855* (2022.01)
*G06F 16/44* (2019.01)
*G06F 1/16* (2006.01)
*G06F 3/0338* (2013.01)

(52) U.S. Cl.
CPC ........ *G06F 3/0485* (2013.01); *G06F 3/04817* (2013.01); *G06F 3/04842* (2013.01); *G06F 3/04855* (2013.01); *G06F 16/44* (2019.01); *G06F 1/162* (2013.01); *G06F 1/1637* (2013.01); *G06F 1/1677* (2013.01); *G06F 1/1684* (2013.01); *G06F 3/0338* (2013.01); *G06F 16/447* (2019.01)

(58) Field of Classification Search
CPC .... G06F 3/04855; G06F 16/44; G06F 1/1616; G06F 1/1677
See application file for complete search history.

(56) References Cited

U.S. PATENT DOCUMENTS

| | | |
|---|---|---|
| D333,636 S | 3/1993 | Issa |
| 5,200,913 A | 4/1993 | Hawkins et al. |
| 5,268,817 A | 12/1993 | Miyagawa et al. |
| 5,436,954 A | 7/1995 | Nishiyama et al. |
| 5,515,345 A | 5/1996 | Barreira et al. |
| 5,547,698 A | 8/1996 | Lansbergen et al. |
| 5,559,670 A | 9/1996 | Flint et al. |
| 5,610,992 A | 3/1997 | Hickman |
| 5,644,516 A | 7/1997 | Podwalny et al. |
| 5,646,820 A | 7/1997 | Honda et al. |
| 5,661,632 A | 8/1997 | Register |
| 5,682,290 A | 10/1997 | Markow et al. |
| 5,708,561 A | 1/1998 | Huilgol et al. |
| 5,712,760 A | 1/1998 | Coulon et al. |
| D391,927 S | 3/1998 | Faranda et al. |
| D392,944 S | 3/1998 | Issa |
| D395,868 S | 7/1998 | Lino |
| 5,790,371 A | 8/1998 | Latocha et al. |
| 5,793,355 A | 8/1998 | Youens |
| 5,796,575 A | 8/1998 | Podwalny et al. |
| D399,526 S | 10/1998 | Brady |
| 5,825,352 A | 10/1998 | Bisset et al. |
| 5,841,631 A | 11/1998 | Shin et al. |
| 5,847,698 A | 12/1998 | Reavey et al. |
| 5,900,848 A | 5/1999 | Haneda et al. |
| 5,903,723 A | 5/1999 | Beck et al. |
| 5,926,364 A | 7/1999 | Karidis |
| 5,949,643 A | 9/1999 | Batio |
| D416,003 S | 11/1999 | Schiefer et al. |
| 5,987,704 A | 11/1999 | Tang |
| 6,005,767 A | 12/1999 | Ku et al. |
| 6,067,224 A | 5/2000 | Nobuchi |
| 6,094,191 A | 7/2000 | Watanabe et al. |
| 6,097,389 A | 8/2000 | Morris et al. |
| 6,137,468 A | 10/2000 | Martinez |
| 6,144,358 A | 11/2000 | Narayanaswamy et al. |
| 6,154,359 A | 11/2000 | Kamikakai et al. |
| 6,222,507 B1 | 4/2001 | Gouko |
| 6,223,393 B1 | 5/2001 | Knopf |
| 6,243,258 B1 | 6/2001 | Paratore |
| 6,262,885 B1 | 7/2001 | Emma et al. |
| 6,266,236 B1 | 7/2001 | Ku et al. |
| 6,275,376 B1 | 8/2001 | Moon |
| 6,295,038 B1 | 9/2001 | Rebeske |
| 6,302,612 B1 | 10/2001 | Fowler et al. |
| 6,323,846 B1 | 11/2001 | Westerman et al. |
| D452,238 S | 12/2001 | Sugano et al. |
| 6,327,482 B1 | 12/2001 | Miyashita |
| 6,341,061 B1 | 1/2002 | Eisbach et al. |
| 6,343,006 B1 | 1/2002 | Moscovitch et al. |
| 6,377,444 B1 | 4/2002 | Price et al. |
| 6,396,419 B1 | 5/2002 | Yeh |
| D462,069 S | 8/2002 | Gatto |
| 6,437,974 B1 | 8/2002 | Liu |
| 6,449,146 B1 | 9/2002 | Ryuuzaki |
| D463,797 S | 10/2002 | Andre et al. |
| 6,464,195 B1 | 10/2002 | Hildebrandt |
| 6,492,974 B1 | 12/2002 | Nobuchi et al. |
| 6,493,216 B1 | 12/2002 | Lin |
| 6,510,049 B2 | 1/2003 | Rosen |
| D476,326 S | 6/2003 | Taniumura |
| 6,597,384 B1 | 7/2003 | Harrison |
| D479,708 S | 9/2003 | Hwang et al. |
| 6,628,267 B2 | 9/2003 | Karidis et al. |
| 6,642,909 B1 | 11/2003 | Oliva |
| 6,659,516 B2 | 12/2003 | Wang et al. |
| 6,661,426 B1 | 12/2003 | Jetha et al. |
| 6,665,175 B1 | 12/2003 | DeBoer et al. |
| 6,693,652 B1 | 2/2004 | Barrus et al. |
| 6,697,055 B1 | 2/2004 | Bullister |
| 6,704,007 B1 | 3/2004 | Clapper |
| 6,724,365 B1 | 4/2004 | Escamilla et al. |
| D491,177 S | 6/2004 | Andre et al. |
| D491,936 S | 6/2004 | Jao |
| 6,760,721 B1 | 7/2004 | Chasen et al. |
| D494,162 S | 8/2004 | Kondo |
| 6,771,494 B2 | 8/2004 | Shimano |
| D495,674 S | 9/2004 | Yoo et al. |
| D495,694 S | 9/2004 | Chase et al. |
| 6,788,527 B2 | 9/2004 | Doczy et al. |
| 6,807,053 B2 | 10/2004 | An et al. |

(56) References Cited

U.S. PATENT DOCUMENTS

| | | |
|---|---|---|
| 6,819,304 B2 | 11/2004 | Branson |
| 6,829,140 B2 | 12/2004 | Shimano et al. |
| 6,859,219 B1 | 2/2005 | Sall |
| D504,128 S | 4/2005 | Maskatia |
| 6,882,335 B2 | 4/2005 | Saarinen |
| 6,918,159 B2 | 7/2005 | Choi |
| 6,944,012 B2 | 9/2005 | Doczy et al. |
| 6,963,485 B2 | 11/2005 | Hong |
| D512,997 S | 12/2005 | Lee et al. |
| 6,972,752 B2 | 12/2005 | Nako et al. |
| D513,509 S | 1/2006 | Kawa |
| D516,552 S | 3/2006 | Iseki |
| D517,541 S | 3/2006 | Maskatia |
| D518,042 S | 3/2006 | Kanayama |
| 7,035,665 B2 | 4/2006 | Kido et al. |
| D523,429 S | 6/2006 | Lin |
| 7,058,902 B2 | 6/2006 | Iwema et al. |
| 7,061,472 B1 | 6/2006 | Schweizer et al. |
| 7,072,179 B1 | 7/2006 | Curran et al. |
| D528,541 S | 9/2006 | Maskatia |
| D528,993 S | 9/2006 | Wilson |
| 7,138,962 B2 | 11/2006 | Koenig |
| 7,148,877 B2 | 12/2006 | Chang et al. |
| D534,531 S | 1/2007 | Ogasawara |
| D535,292 S | 1/2007 | Shi et al. |
| 7,164,432 B1 | 1/2007 | Amemiya |
| 7,187,364 B2 | 3/2007 | Duarte et al. |
| D544,846 S | 6/2007 | Kindle et al. |
| 7,239,508 B2 | 7/2007 | Ferrucei |
| 7,243,079 B1 | 7/2007 | Manolis et al. |
| 7,250,207 B1 | 7/2007 | Heal et al. |
| 7,366,994 B2 | 4/2008 | Loui |
| 7,382,607 B2 | 6/2008 | Skillman |
| 7,428,142 B1 | 9/2008 | Ligtenberg et al. |
| 7,433,179 B2 | 10/2008 | Hisano et al. |
| D581,371 S | 11/2008 | Richmond |
| 7,467,356 B2 | 12/2008 | Gettman et al. |
| 7,522,946 B2 | 4/2009 | Im |
| D593,085 S | 5/2009 | Behar et al. |
| D593,086 S | 5/2009 | Behar et al. |
| D593,091 S | 5/2009 | Behar et al. |
| D605,635 S | 12/2009 | Edahiro et al. |
| 7,698,407 B2 | 4/2010 | Mattox, Jr. et al. |
| 7,756,928 B1 | 7/2010 | Meenan et al. |
| 7,778,973 B2 | 8/2010 | Choi et al. |
| 7,814,425 B1 | 10/2010 | O'Shaugnessy et al. |
| 7,869,834 B2 | 1/2011 | Seol et al. |
| 7,970,240 B1 | 6/2011 | Chao et al. |
| 7,978,182 B2 | 7/2011 | Orging et al. |
| 8,145,222 B2 | 3/2012 | Wormald et al. |
| 8,151,105 B2 | 4/2012 | Park et al. |
| 8,284,714 B2 | 10/2012 | Ray |
| 8,289,688 B2 | 10/2012 | Behar et al. |
| 8,300,022 B2 | 10/2012 | Brenneman |
| 8,385,950 B1 | 2/2013 | Wagner et al. |
| 8,464,161 B2 | 6/2013 | Giles et al. |
| 8,577,957 B2 | 11/2013 | Behar et al. |
| 8,612,888 B2 | 12/2013 | Pennington et al. |
| 8,624,844 B2 | 1/2014 | Behar et al. |
| 9,003,315 B2 | 4/2015 | Behar et al. |
| 9,495,070 B2 | 11/2016 | Pennington et al. |
| 9,563,229 B2 | 2/2017 | Behar et al. |
| 9,880,715 B2 | 1/2018 | Behar et al. |
| 9,927,835 B2 | 3/2018 | Behar et al. |
| 10,289,154 B2 | 5/2019 | Behar et al. |
| 10,564,818 B2 | 2/2020 | Behar et al. |
| 10,684,743 B2 | 6/2020 | Havoc Pennington et al. |
| 10,782,733 B2 | 9/2020 | Behar et al. |
| 2001/0032320 A1 | 10/2001 | Abdelnur et al. |
| 2002/0005818 A1 | 1/2002 | Bruzzone |
| 2002/0010707 A1 | 1/2002 | Chang et al. |
| 2002/0021258 A1 | 2/2002 | Koenig |
| 2002/0190947 A1 | 12/2002 | Feinstein |
| 2003/0048595 A1 | 3/2003 | Hsieh et al. |
| 2003/0080995 A1 | 5/2003 | Tenenbaum et al. |
| 2003/0107603 A1 | 6/2003 | Clapper |
| 2003/0109232 A1 | 6/2003 | Park et al. |
| 2003/0203747 A1 | 10/2003 | Nagamine |
| 2004/0001049 A1 | 1/2004 | Oakley |
| 2004/0025993 A1 | 2/2004 | Russell |
| 2004/0150635 A1 | 8/2004 | Clapper |
| 2004/0172451 A1 | 9/2004 | Biggs et al. |
| 2004/0185920 A1 | 9/2004 | Choi et al. |
| 2004/0189694 A1 | 9/2004 | Kurtz et al. |
| 2004/0203535 A1 | 10/2004 | Kim et al. |
| 2004/0207568 A1 | 10/2004 | Ooshima et al. |
| 2004/0212602 A1 | 10/2004 | Nako et al. |
| 2004/0228076 A1 | 11/2004 | Clapper |
| 2004/0230663 A1 | 11/2004 | Ackerman |
| 2005/0005241 A1 | 1/2005 | Hunleth et al. |
| 2005/0010860 A1 | 1/2005 | Weiss et al. |
| 2005/0018396 A1 | 1/2005 | Nakajima et al. |
| 2005/0041378 A1 | 2/2005 | Hamada et al. |
| 2005/0055632 A1* | 3/2005 | Schwartz .............. G06F 40/103 |
| | | 725/135 |
| 2005/0060655 A1 | 3/2005 | Gray et al. |
| 2005/0062715 A1* | 3/2005 | Tsuji .................... G06F 1/1677 |
| | | 345/158 |
| 2005/0063145 A1 | 3/2005 | Homer et al. |
| 2005/0065932 A1 | 3/2005 | Rocha |
| 2005/0071782 A1 | 3/2005 | Barrett et al. |
| 2005/0083642 A1 | 4/2005 | Senpuku et al. |
| 2005/0091343 A1 | 4/2005 | Murray, Jr. |
| 2005/0091596 A1 | 4/2005 | Anthony et al. |
| 2005/0093868 A1 | 5/2005 | Hinckley |
| 2005/0110880 A1 | 5/2005 | Parulski et al. |
| 2005/0120082 A1 | 6/2005 | Hesselink et al. |
| 2005/0122318 A1* | 6/2005 | Tonouchi ................ G06F 1/162 |
| | | 345/179 |
| 2005/0128695 A1 | 6/2005 | Han |
| 2005/0134717 A1 | 6/2005 | Misawa |
| 2005/0146845 A1 | 7/2005 | Moscovitch |
| 2005/0177798 A1* | 8/2005 | Thomson ................ G09G 5/14 |
| | | 715/788 |
| 2005/0210399 A1 | 9/2005 | Filner et al. |
| 2005/0221865 A1 | 10/2005 | Nishiyama et al. |
| 2005/0257400 A1 | 11/2005 | Sommerer et al. |
| 2005/0282596 A1 | 12/2005 | Park et al. |
| 2006/0007503 A1 | 1/2006 | Nakamura |
| 2006/0015823 A1 | 1/2006 | Chao et al. |
| 2006/0017692 A1 | 1/2006 | Wehrenberg et al. |
| 2006/0034042 A1 | 2/2006 | Hisano et al. |
| 2006/0082554 A1 | 4/2006 | Caine et al. |
| 2006/0101064 A1* | 5/2006 | Strong ................ G06F 16/2365 |
| | | 707/999.102 |
| 2006/0123353 A1 | 6/2006 | Matthews et al. |
| 2006/0126284 A1 | 6/2006 | Moscovitch |
| 2006/0209016 A1 | 9/2006 | Fox et al. |
| 2006/0238439 A1 | 10/2006 | Fuller et al. |
| 2006/0264243 A1* | 11/2006 | Aarras .................. G06F 3/0483 |
| | | 455/566 |
| 2006/0265390 A1 | 11/2006 | Aldrich et al. |
| 2006/0268500 A1 | 11/2006 | Kuhn |
| 2006/0271644 A1 | 11/2006 | Yamaizumi et al. |
| 2006/0277167 A1 | 12/2006 | Gross et al. |
| 2007/0013674 A1 | 1/2007 | Woolley |
| 2007/0013682 A1 | 1/2007 | Lin et al. |
| 2007/0024722 A1* | 2/2007 | Eura ...................... G11B 27/34 |
| | | 707/E17.026 |
| 2007/0035616 A1 | 2/2007 | Lee |
| 2007/0038549 A1* | 2/2007 | Janowski ............... G06Q 40/04 |
| | | 705/37 |
| 2007/0058329 A1 | 3/2007 | Ledbetter et al. |
| 2007/0073833 A1 | 3/2007 | Roy et al. |
| 2007/0118525 A1 | 5/2007 | Svendsen |
| 2007/0120762 A1 | 5/2007 | O'Gorman |
| 2007/0138806 A1 | 6/2007 | Ligtenberg et al. |
| 2007/0178952 A1 | 8/2007 | Ehara et al. |
| 2007/0182663 A1 | 8/2007 | Biech |
| 2007/0198674 A1 | 8/2007 | Li et al. |
| 2007/0240076 A1 | 10/2007 | Astala et al. |
| 2007/0242421 A1 | 10/2007 | Goschin et al. |
| 2007/0247446 A1 | 10/2007 | Orsley et al. |

(56) References Cited

U.S. PATENT DOCUMENTS

| | | |
|---|---|---|
| 2007/0268202 A1 | 11/2007 | Lim et al. |
| 2007/0296820 A1 | 12/2007 | Lonn |
| 2008/0024388 A1 | 1/2008 | Bruce |
| 2008/0024465 A1 | 1/2008 | Hawkins et al. |
| 2008/0042987 A1 | 2/2008 | Westerman et al. |
| 2008/0059888 A1 | 3/2008 | Dunko |
| 2008/0062625 A1 | 3/2008 | Batio |
| 2008/0074831 A1 | 3/2008 | Lee et al. |
| 2008/0088602 A1 | 4/2008 | Hotelling |
| 2008/0092039 A1 | 4/2008 | Brockway et al. |
| 2008/0122796 A1 | 5/2008 | Jobs et al. |
| 2008/0134093 A1 | 6/2008 | Dharmarajan et al. |
| 2008/0158795 A1 | 7/2008 | Aoki et al. |
| 2008/0174570 A1 | 7/2008 | Jobs et al. |
| 2008/0195664 A1 | 8/2008 | Maharajh et al. |
| 2008/0209493 A1 | 8/2008 | Choi et al. |
| 2008/0211778 A1 | 9/2008 | Ording et al. |
| 2008/0235594 A1 | 9/2008 | Bhumkar et al. |
| 2008/0284738 A1 | 11/2008 | Hovden et al. |
| 2009/0007001 A1 | 1/2009 | Morin et al. |
| 2009/0019383 A1* | 1/2009 | Riley ............... G06Q 10/10 715/764 |
| 2009/0019479 A1 | 1/2009 | Kwak et al. |
| 2009/0150784 A1 | 6/2009 | Denney et al. |
| 2009/0150826 A1 | 6/2009 | Lyndersay et al. |
| 2009/0160811 A1 | 6/2009 | Motoe et al. |
| 2009/0190295 A1 | 7/2009 | Chin et al. |
| 2009/0193364 A1 | 7/2009 | Jarrett et al. |
| 2009/0244012 A1 | 10/2009 | Behar et al. |
| 2009/0244016 A1* | 10/2009 | Casparian ............ G06F 1/1692 345/173 |
| 2009/0244832 A1 | 10/2009 | Behar et al. |
| 2009/0249244 A1 | 10/2009 | Robinson et al. |
| 2009/0275366 A1 | 11/2009 | Schilling |
| 2009/0300511 A1 | 12/2009 | Behar et al. |
| 2009/0303205 A1 | 12/2009 | Seibert |
| 2009/0303676 A1 | 12/2009 | Behar et al. |
| 2009/0322790 A1 | 12/2009 | Behar et al. |
| 2010/0016018 A1 | 1/2010 | Okuda et al. |
| 2010/0174993 A1 | 7/2010 | Pennington et al. |
| 2010/0255889 A1 | 10/2010 | Tsutsui et al. |
| 2011/0279376 A1 | 11/2011 | Tang et al. |
| 2013/0141854 A1 | 6/2013 | Behar et al. |
| 2014/0282263 A1 | 9/2014 | Pennington et al. |
| 2015/0277688 A1 | 10/2015 | Behar et al. |
| 2017/0090699 A1 | 3/2017 | Havoc Pennington et al. |
| 2017/0205849 A1 | 7/2017 | Behar et al. |
| 2018/0181271 A1 | 6/2018 | Behar et al. |
| 2018/0307271 A1 | 10/2018 | Behar et al. |
| 2019/0361491 A1 | 11/2019 | Behar et al. |
| 2020/0249807 A1 | 8/2020 | Behar et al. |
| 2021/0034104 A1 | 2/2021 | Behar et al. |

FOREIGN PATENT DOCUMENTS

| | | | | |
|---|---|---|---|---|
| CN | 1926496 A | | 3/2007 | |
| DE | 19952486 A1 | | 5/2001 | |
| DE | 10314554 A1 * | | 10/2004 | ............ G06F 1/162 |
| DE | 10314554 A1 | | 10/2004 | |
| EP | 0 588 210 A1 | | 3/1994 | |
| EP | 1 316 877 A1 | | 6/2003 | |
| EP | 2 283 407 A1 | | 2/2011 | |
| GB | 2 321 982 A | | 8/1998 | |
| GB | 2449632 A | | 12/2008 | |
| JP | 5-197507 A | | 8/1993 | |
| JP | 6-90200 A | | 3/1994 | |
| JP | 6-242853 A | | 9/1994 | |
| JP | 6-259166 A | | 9/1994 | |
| JP | 1994-242853 A | | 9/1994 | |
| JP | 242853 | * | 9/1994 | ............ G06F 1/16 |
| JP | H6-242853 | | 9/1994 | |
| JP | 8-179851 A | | 7/1996 | |
| JP | H08-179851 | | 7/1996 | |
| JP | 10-111658 A | | 4/1998 | |
| JP | 11-296259 | | 10/1999 | |
| JP | 2001-167211 A | | 6/2001 | |
| JP | 2001-298514 A | | 10/2001 | |
| JP | 2002-258982 A | | 9/2002 | |
| JP | 2004-302179 A | | 10/2004 | |
| JP | 2005-159741 A | | 6/2005 | |
| JP | 2005-168036 A | | 6/2005 | |
| JP | 2005-242436 A | | 9/2005 | |
| JP | 2005-71297 A | | 10/2005 | |
| JP | 2006-227409 A | | 8/2006 | |
| KR | 1020000036647 | | 6/2002 | |
| WO | WO 95/24007 A1 | | 9/1995 | |

OTHER PUBLICATIONS

Petition for Inter Partes Review. *Lenovo* vs. *LITL LLC*. IPR Case No. IPR2021-00681. U.S. Pat. No. 8,289,688. Dated Mar. 18, 2021.

Patent Owner's Preliminary Response. *Lenovo v. Litl LLC*. IPR Case No. IPR2021-00681. U.S. Pat. No. 8,289,688. Jun. 25, 2021.

Petition for Inter Partes Review. *Lenovo (United States) Inc. v. Litl LLC*. IPR Case No. IPR2021-00821/ U.S. Pat. No. 8,612,888. Apr. 27, 2021.

Petition for Inter Partes Review. *Lenovo (United States) Inc. v. Litl LLC*. IPR Case No. IPR2021-00786/ U.S. Pat. No. 9,880,715. May 4, 2021.

Petition for Inter Partes Review. *Lenovo (United States) Inc. v. Litl LLC*. IPR Case No. IPR2021-00800/ U.S. Pat. No. 10,289,154. May 4, 2021.

Petition for Inter Partes Review. *Lenovo (United States) Inc. v. Litl LLC*. IPR Case No. IPR2021-00822/ U.S. Pat. No. 8,624,844. May 4, 2021.

Petition for Inter Partes Review. *Microsoft Corporation v. Litl LLC*. PTAB Case No. IPR2021-01011. U.S. Pat. No. 8,577,957. May 25, 2021.

[No Author Listed] Dell Latitude XT Tablet. Dell. Dec. 2007, 17 pages.

[No Author Listed] Environment Variable. Wikipedia. https://en.wikipedia.org/w/index.php?title=Environment_variable&oldid=160448946. Last accessed Mar. 19, 2021, 6 pages.

[No Author Listed] HP Compaq Tablet PC TC1100 QuickSpecs. Hewlett-Packard. Aug. 5, 2005, 24 pages.

[No Author Listed] Is Your "Show Desktop Icon" in XP Missing? WaybackMachine Archive of https://www.windows-help-central.com/show-desktop-icon-in-xp-missing.html. Captured Mar. 2, 2007, 1 page.

[No Author Listed] Lenovo ThinkPad X61 Tablet Service and Troubleshooting Guide. Lenovo. Apr. 2007, 80 pages.

[No Author Listed] Microsoft Digital Image Suite User's Manual. Microsoft Corporation. 2005.

[No Author Listed] Motion Computing M1400 Tablet PC Addendum. Motion Computing, Inc. Jul. 2004; 5 pages.

[No Author Listed] Motion Computing M1400 Tablet PC User Guide. Motion Computing, Inc. Mar. 2004, 89 pages.

[No Author Listed] Panasonic CF-19 Operating Instructions. Panasonic. 2006, 40 pages.

[No Author Listed] Panasonic CF-T8 Operating Instructions. Panasonic. 2008, 40 pages.

[No Author Listed] Sony Vaio VGN-UX280P (UX Series MicroPC) Spec Sheet. Sony Corporation. Aug. 23, 2006, 2 pages.

[No Author Listed] Windows Special Folder. Wikipedia. https://en.wikipedia.org/w/index.php?title=Special_folder&oldid=77102597. Last accessed Mar. 17, 2021, 4 pages.

[No Author Listed], All-New Litl Webbook Debuts at 2010 CES. Cision. Jan. 5, 2010. URL:https://www.prnewswire.com/news-releases/all-new-litl-webbook-debuts-at-2010-ces-80716797.html [last accessed Jun. 25, 2021].

[No Author Listed], Dell Latitude XT Quick Reference Guide. Dec. 2007; 234 pages.

[No Author Listed], Dell Latitude XT User's Guide. May 2008; 248 pages.

[No Author Listed], Designing for Direct Manipulation. Microsoft Corporation. Mar. 3, 2008; 4 pages.

(56) References Cited

OTHER PUBLICATIONS

[No Author Listed], Litl Webbook Beats ChromeOS, Becomes First Cloud Computer. CoolThings. Nov. 16, 2009. URL:https://www.coolthings.com/litl-webbook-beats-chromeos-becomes-first-cloud-computer/ [last accessed Jun. 25, 2021].
[No Author Listed], Microsoft Computer Dictionary Fifth Edition. Microsoft Press. 2002; 648 pages.
[No Author Listed], The Litl webbook. European Consumers Choice. URL=https://www.europeanconsumerschoice.org/hi-tech/litl-webbook-computer-test-and-reviews/ [last accessed Jun. 25, 2021].
[No Author Listed], The Windows Interface Guidelines for Software Design. Microsoft Press. 1995.
[No Author Listed], The Windows Interface Guidelines—A Guide for Designing Software. Microsoft Windows. Microsoft Corporation. Feb. 1995.
[No Author Listed], Toshiba Satellite A300/A300D Satellite Pro A300/A300D Portable Person Computer User's Manual. Toshiba Corporation. 2008; 226 pages.
Bartlett, Rock 'n' Scroll is Here to Stay. Compaq. Western Research Laboratory. 2000; 9 pages.
Clifford et al., Measuring Tilt with Low-g Accelerometers. Sensors. Freescale Semiconductor. Application Note. AN3107. May 2005; 8 pages.
Franks et al., HTTP Authentication: Basic and Digest Access Authentication. The Internet Society. 1999.
Hardy, Lenovo ThinkPad X61 Tablet PC Review. Jun. 12, 2007; 12 pages. tabletpcreview.com/tabletreview/lenovo-thinkpad-x61-tablet-pc-review.
Hinckley et al., Sensing Techniques for Mobile Interaction. ACM UIST 2000. Symposium on User Interface Software and Technology. CHI Letters. 2000; 2(2): 91-100.
Karp et al., Excerpts of Windows XP in a Nutshell Second Edition. O'Reilly Media, Inc. Feb. 2005, 14 pages.
Leonhard, Excerpts of Windows XP Hacks & Mods: For Dummies. Wiley Publishing, Inc. 2005, 46 pages.
McDonald, LiTL Webbook Review. Little Tech Girl. Aug. 31, 2010. URL:https://littletechgirl.com/2010/08/31/litl-webbook-review/ [last accessed Jun. 25, 2021].
Noe, The Litl Webbook: A more social computing device. Nov. 5, 2009. Core77. URL:https://www.core77.com/posts/15122/The-Litl-Webbook-A-more-social-computing-device [last accessed Jun. 25, 2021].
Pogue, Windows XP Home Edition: The Missing Manual, Second Edition. O'Reilly Media, Inc. Dec. 2004.
Ride, MIT's $100 Laptop. TechPowerUp. Sep. 29, 2005; 4 pages. https://www.techpowerup.com/5512/mits-uds-100-laptop.
Russinovich et al., Microsoft Windows Internals 4th Edition. Microsoft Press. 2005.
Saxena, CES 2010: All New Litl Webbook Makes Its Debut Appearance. Elite Choice. URL:https://elitechoice.org/luxury/ces-2010-all-new-litl-webbook-makes-its-debut-appearance [last accessed Jun. 25, 2021].
Schwartz, Organizing and Editing Your Photos with Picasa. Visual QuickProject Guide. 2005.
Scinto, Introducing the Litl WebBook. The Gadgeteer. Nov. 19, 2009. URL:https://the-gadgeteer.com/2009/11/19/introducing-the-litl-webbook/ [last accessed Jun. 25, 2021].
Strauss, Litl Webbook Re-Defines Computing. ABC News. Dec. 14, 2009. URL:https://abcnews.go.com/Technology/GadgetGuide/litl-webbook-defines-computing/story?id=9311095 [last accessed Jun. 25, 2021].

International Search Report and Written Opinion for International Application No. PCT/US2009/038599 dated Jun. 3, 2009.
International Search Report and Written Opinion for International Application No. PCT/US2009/39117 dated Sep. 28, 2009.
International Preliminary Report on Patentability dated Oct. 14, 2010 for International Application No. PCT/US2009/039117.
European Communication dated Nov. 23, 2015 in connection to European Application No. 09727165.4.
European Examination Report dated Nov. 22, 2016 in connection with European Application No. 09727165.4.
Extended European Search Report dated Apr. 5, 2011 in connection with European Application No. 09755433.1.
European Examination Report dated Jan. 17, 2017 in connection with European Application No. 09755433.1.
Chinese Office Action dated Jul. 18, 2013 in connection with Chinese Application No. 200980117859.8.
Japanese Office Action dated Dec. 4, 2012 in connection with Japanese Application No. 2011-503058 and partial English translation thereof.
Japanese Office Action dated Apr. 16, 2013 in connection with Japanese Application No. 2011-503058.
Office Action dated Apr. 4, 2011, for U.S. Appl. No. 12/170,951.
Office Action dated Jun. 7, 2012, for U.S. Appl. No. 12/170,951.
Canadian Office Action dated Aug. 18, 2017 in connection with Canadian Application No. 2719828.A11:A17.
Extended European Search Report dated Feb. 3, 2020 in connection with European Application No. 19190053.9.
http://laptop.org/en/laptop/start/ebook.shtml accessed on Sep. 29, 2008.
Miller, Creating a Digital Home Entertainment System with Windows Media Center. 2006, Que.
U.S. Appl. No. 60/946,970, filed Jun. 28, 2007, Orging et al.
Affidavit of Nathaniel E. Frank-White signed Jan. 26, 2022. 21 pages.
Canadian Office Action dated Mar. 23, 2022 in connection with Canadian Application No. 3,028,799.
Certified English Translation of JP H6-242853 ("Shimura").
Certified English Translation of JP2005-71297A ("Kanamori").
Certified English Translation of CN 2627170Y ("CN'170") (Ruijiang).
Decision Denying Institution of Inter Partes Review of U.S. Pat. No. 8,624,844 B2, Issued Oct. 21, 2021, *Lenovo (United States) Inc.* v. *LITL LLC*, IPR2021-00822 (PTAB). 15 pages.
Declaration of Dan Fauxsmith, VP of Publishing Operations at O'Reilly Media, Inc. ("Fauxsmith"), signed Jan. 27, 2022. 5 pages.
Declaration of Christopher M. Schmandt signed Feb. 24, 2022. 156 pages.
First Amended Complaint. *LITL LLC* v. *Lenovo (United States), Inc. et al*. No. DDE-1-20-cv-00689 (U.S. Dist. Ct., Dist. Deleware). 165 pages.
File History of U.S. Pat. No. 8,624,844 issued on Jan. 7, 2014. 1439 pages.
File History Excerpts of European Application No. 09727165.4 Patented as EP 2283407 B1. 49 pages.
King, Litl Webbook price drops from $699 to $399. ZDNet.May 16, 2010 URL: https://www.zdnet.com/article/litl-webbook-price-drops-from-699-to-399.
Murph, Little Webbook plummets from $699 to $399, still can't catch an eye. May 16, 2020 URL: https://www.engadget.com/2010-05-16-litl-webbook-plummets-from-699-to399-still-cant-catch-an-ey.html.
Pogue, Windows Vista: The Missing Manual, 1st edition, 2nd printing, published Feb. 2007. Pogue Press. O'Reilly. Excerpts. 120 pages.

* cited by examiner

1025

Lorem liposum dolor alt amet, connectatur.

Stevens gives last Senate speeches staffers weep.

Lorem liposum dolor alt amet, connectatur.

Lorem liposum dolor alt amet, connectotur.itdip iacing elit. N am non literoid odoplaosriat.

Lorem liposum dolor alt amet, connectotur.itdip iacing elit. N am non literoid odoplaosriat.

Lorem liposu amet, conne

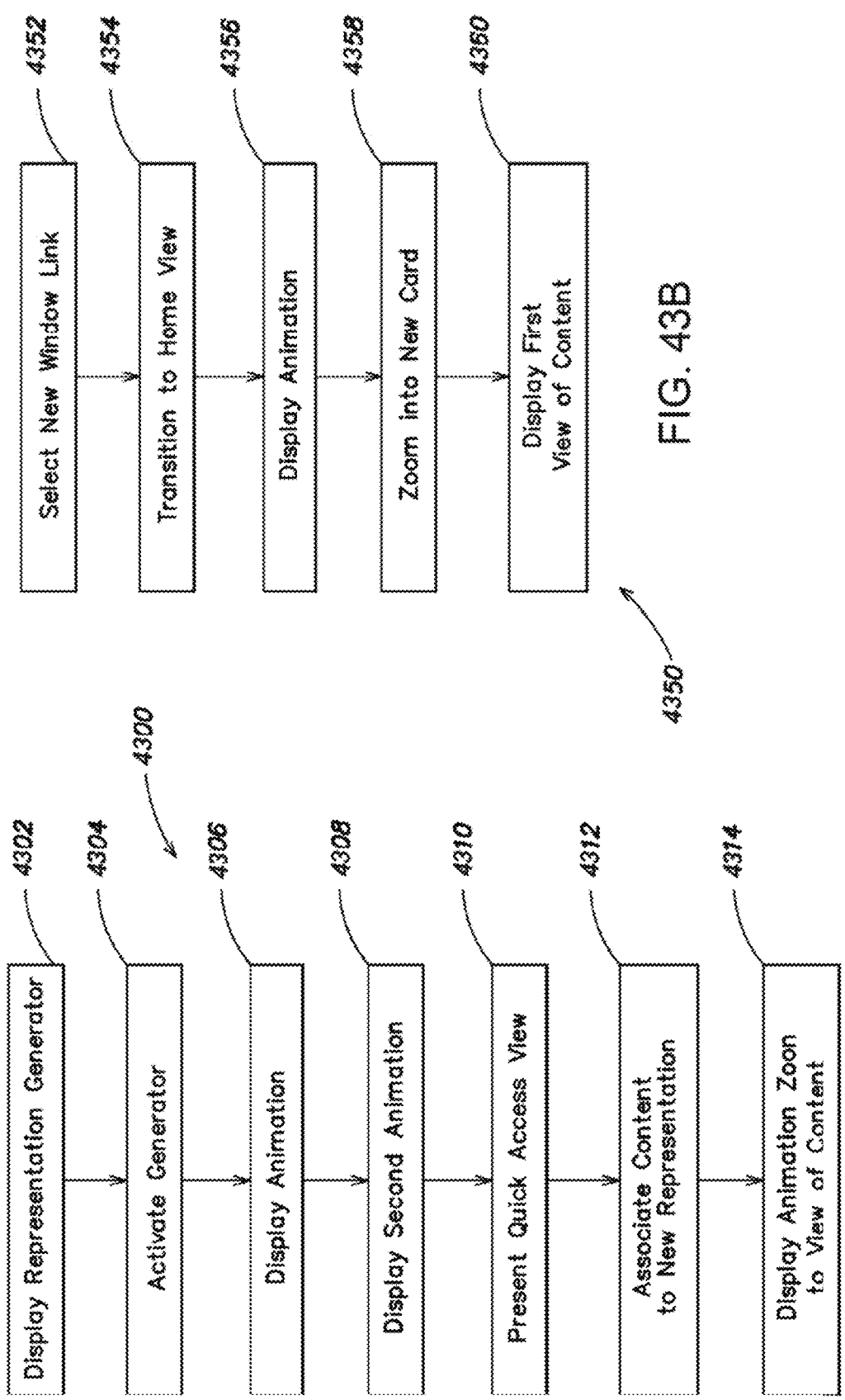

METHOD AND APPARATUS FOR MANAGING DIGITAL MEDIA CONTENT

CROSS-REFERENCE TO RELATED APPLICATIONS

This Application is a continuation of, and claims priority under 35 U.S.C. § 120 to U.S. application Ser. No. 15/280,928, filed Sep. 29, 2016, entitled "METHOD AND APPARATUS FOR MANAGING DIGITAL MEDIA CONTENT", which is a continuation of, and claims priority under 35 U.S.C. § 120 to U.S. patent application Ser. No. 14/108,576, entitled "METHOD AND APPARATUS FOR MANAGING DIGITAL MEDIA CONTENT," filed Dec. 17, 2013, which is a continuation of U.S. patent application Ser. No. 12/611,282, entitled "METHOD AND APPARATUS FOR MANAGING DIGITAL MEDIA CONTENT," filed on Nov. 3, 2009, which is a continuation-in-part of, and claims priority under 35 U.S.C. § 120 to, U.S. patent application Ser. No. 12/170,951 entitled "PORTABLE COMPUTER WITH MULTIPLE DISPLAY CONFIGURATIONS," filed on Jul. 10, 2008, which claims priority under 35 U.S.C. § 119(e) to U.S. Provisional Application Ser. No. 61/041,365, entitled "PORTABLE COMPUTER WITH MULTIPLE DISPLAY CONFIGURATIONS," filed Apr. 1, 2008, each of which is hereby incorporated herein by reference in its entirety. Furthermore, U.S. patent application Ser. No. 12/611,282 is also a continuation-in-part of, and claims priority under 35 U.S.C. § 120 to U.S. patent application Ser. No. 12/170,939, entitled "PORTABLE COMPUTER WITH MULTIPLE DISPLAY CONFIGURATIONS," filed on Jul. 10, 2008, which claims priority under 35 U.S.C. 119(e) to U.S. Provisional Application Ser. No. 61/041,365, entitled "PORTABLE COMPUTER WITH MULTIPLE DISPLAY CONFIGURATIONS," filed Apr. 1, 2008, each of which is hereby incorporated herein by reference in its entirety. Furthermore, U.S. patent application Ser. No. 12/611,282 is also a continuation-in-part of, and claims priority under 35 U.S.C. § 120 to U.S. patent application Ser. No. 12/416,479, filed on Apr. 1, 2009 and entitled "SYSTEM AND METHOD FOR STREAMLINING USER INTERACTION WITH ELECTRONIC CONTENT," which is a continuation-in-part of, and claims priority under 35 U.S.C. § 120 to U.S. patent application Ser. No. 12/170,951 entitled "PORTABLE COMPUTER WITH MULTIPLE DISPLAY CONFIGURATIONS," filed on Jul. 10, 2008, which claims priority under 35 U.S.C. § 119(e) to U.S. Provisional Application Ser. No. 61/041,365, entitled "PORTABLE COMPUTER WITH MULTIPLE DISPLAY CONFIGURATIONS," filed Apr. 1, 2008, each of which is hereby incorporated herein by reference in its entirety. Furthermore, U.S. patent application Ser. No. 12/416,479 is also a continuation-in-part of, and claims priority under 35 U.S.C. § 120 to U.S. patent application Ser. No. 12/170,939, entitled "PORTABLE COMPUTER WITH MULTIPLE DISPLAY CONFIGURATIONS," filed on Jul. 10, 2008, which claims priority under 35 U.S.C. § 119(e) to U.S. Provisional Application Ser. No. 61/041,365, entitled "PORTABLE COMPUTER WITH MULTIPLE DISPLAY CONFIGURATIONS," filed Apr. 1, 2008, each of which is hereby incorporated herein by reference in its entirety. Furthermore, U.S. patent application Ser. No. 12/416,479 also claims priority under 35 U.S.C. 119(e) to U.S. Provisional Application Ser. No. 61/041,365, entitled "PORTABLE COMPUTER WITH MULTIPLE DISPLAY CONFIGURATIONS," filed Apr. 1, 2008, each of which is hereby incorporated herein by reference in its entirety.

BACKGROUND

Field of Invention

The present invention is in the field of computer systems and, more particularly, is directed to methods and apparatus for managing computer-based digital media libraries.

Discussion of Related Art

Much of the advancement in contemporary computer systems and services stems from the significant increases in computing power. Hand in hand with those increases, enhanced features sets have developed designed to utilize that computing power. Conventional wisdom suggests that the more features that can be provided to a particular computer user, the better the user's experience will be. As computers have become more powerful and capable of providing more and more features, however, ordinary/typical computer users have not been able to keep up with availability of features and services. Users may become frustrated by the inability to navigate the myriad (sometime unending) configurations and options provided in order to achieve something useful and/or workable to their ordinary use. Many users simply don't take advantage of provided features. Some outright ignore options and features that would simplify the use of their computer system; in some instances because the user lacks experience with new features and doesn't know the feature can be useful.

User frustration is felt not only with respect to the newer more powerful computer systems being offered today, but also frustration abounds with respect to their computer's interaction with the Internet. The present movement on the Internet, often referred to as Web 2.0, also subscribes to conventional thinking in that more and more features are being packed into each and every aspect of the web experience. Often, these on-line services provide very useful opportunities for the users who know how to take advantage of them—online photo management/sharing, online financial services, online marketplaces, online exchanges, web hosting, web development, dating services, social networking to name only a few. However, computer users often simply can't take advantage of all the functionality offered, either the services and features offered by their own computer, or the services and features offered by online providers. The complexity of the interface (both hardware and software) hampers adoption, as does the volume of features offered.

With the proliferation of digital cameras, digital music players and digital video players, more and more people are turning to digital audio and video media. For example, many people have replaced, or at least greatly supplemented, printed photograph albums with digital photos stored on their computer and/or using an online photo service. Similarly, many people use digitally stored music and videos rather than, or in addition to, traditional media such as records, compact discs, video cassettes, etc. However, due to the complexity and volume of digital photography features, services, etc., many users are not taking full advantage of the capabilities and services available to them.

SUMMARY OF INVENTION

Accordingly, aspects and embodiments are directed to methods and apparatus for managing digital media content that may provide a user-friendly, streamlined user experience.

Various aspects and embodiments are directed to a streamlined computer device and a graphical user interface that organizes interface elements into views of computer content for presentation to a user. Various views of digital media content permits users to easily and efficiently access various digital media content. Different views are used to provide an interface that is responsive to configurations of the device and responsive to activity being performed by the user. Aspects include permitting the user to maintain and manage digital media content libraries. According to some embodiments, the libraries comprise user digital media content and references digital media content. Functionality provided to a user can be tailored to the type of content displayed, accessed and/or managed. According to various aspects, methods and systems are provided for accessing and managing digital media libraries on a streamlined computing device with a plurality selectable I/O profiles. According to some embodiments, the methods may include displaying a GUI on a device, wherein the GUI comprises at least a plurality of views of digital media content, providing for transition between the plurality of views in response to selection of an I/O profile and in response to activation of a view selector component by a user, executing an association with the at least one of the plurality of visual representations with digital media content in response to selection, transitioning a display on the computing device to a view of the digital media content, and providing for display of user digital media content and referenced digital media content in the view of the digital media content.

According to one aspect of the present invention, a method for accessing and managing digital media libraries on a streamlined computing device with a plurality selectable I/O profiles is provided. The method comprises displaying a graphical user interface on a computing device, wherein the graphical user interface comprises at least a plurality of views of digital media content, providing for transition between the plurality of views in response to selection of an I/O profile, providing for transition between the plurality of views in response to activation of a view selector component configured to permit a user to select one of the plurality of views, associating at least one of a plurality of visual representations with digital media content, executing the association with the at least one of the plurality of visual representations with digital media content in response to selection, transitioning a display on the computing device to a view of the digital media content in response to the act of executing the association, and providing for display of user digital media content and referenced digital media content in the view of the digital media content. According to one embodiment of the present invention, the method further comprises an act of displaying in the view user digital media content and referenced digital media content in response to the act of executing the association with the at least one of the plurality of visual representations. According to another embodiment of the invention, the act of displaying in the view user digital media content and referenced digital media content includes an act of accessing a reference to remote digital content not controlled by the user in order to display referenced digital content. According to another embodiment of the invention, the method further comprises an act of associating the at least one of the plurality of visual representations with a remote service provider. According to another embodiment of the invention, the method further comprises an act storing the association between the at least one visual representation with the remote service provider in at least one of a device profile and a user profile.

According to one embodiment of the present invention, the method further comprises acts of configuring access to a remote service, and integrating operations provided by the remote service provider into the view of the digital media content. According to another embodiment of the invention, the view comprises at least one of an album view and a timeline view. According to another embodiment of the invention, the method further comprises an act of displaying digital media content in a body portion of the view. According to another embodiment of the invention, the method further comprises an act of displaying a toggle element in a header portion of the view, wherein the toggle element transitions the computing device display between the album view and the timeline view upon selection by a user. According to another embodiment of the invention, the method further comprises acts of displaying emulation controls responsive to selection by the user, and emulating standard computer operations for referenced digital media content displayed in the view, wherein the act of emulating standard computer operations includes an act of determining if the user has authority to perform the standard computer operations, determining the user does not have the authority to perform the standard computer operation on a source of the referenced digital media content, and wherein the act of displaying the emulation controls occurs in response to the determination that the user does not have the authority. According to another embodiment of the invention, the standard computer operation includes an act of deleting digital media content, and the method further comprises an act of altering the view of the digital media content so the digital media content marked for deletion is not displayed within the view.

According to one embodiment of the present invention, the method further comprises an act of generating a state entry, associated with at least one of the view and the source of the referenced digital media content. According to another embodiment of the invention, the method further comprises acts of accessing any state entry for at least one of the view and the source of referenced digital media content, and displaying referenced digital media content according to any state entry requirement. According to another embodiment of the invention, the standard computer operation includes an act of editing referenced digital media content, and the method further comprises an act of generating a state entry reflecting any edits made to the referenced digital media content. According to another embodiment of the invention, the method further comprises acts of providing an aggregation component configured to permit the user to select a plurality of digital media content, displaying the plurality of digital media content in the body of the view, and permitting the user to perform operations on the plurality of digital media content. According to another embodiment of the invention, the act of permitting the user to perform operations on the plurality of digital media content includes at least one of a share operation, a create channel operation, and an order prints operation. According to another embodiment of the invention the at least one operation is a share operation, and the method further comprises acts of identifying any state entries for the plurality of digital media content, identifying any remote service settings for the plurality of digital media content, and transmitting a visual representation associated with the plurality of digital media content, any state settings, and any remote service settings to another streamlined device user.

According to one embodiment of the present invention, the method further comprising acts of permitting the user to share the at least one visual representation, including any associated digital media content with another user, storing shared information in response to an act of sharing by the user, and updating any associated digital media automatically for the another user, wherein the act of updating any associated digital media includes acts of identifying any changes in shared digital media content, wherein changes include at least one of addition of digital media content associated with the at least one visual representation, deletion of digital media content associated with the at least one visual representation, edits of digital media content associated with the at least one visual representation, and updates of information associated with digital media content associated with the at least one visual representation. According to another embodiment of the invention, the method further comprising acts of permitting the user to share the at least one visual representation, including any associated digital media content with another user, transmitting the at least one visual representation associated with the digital media content, any state settings, and any remote service settings to another streamlined device user. According to another embodiment of the invention, the method further comprises an act of permitting the user to update date information associated with the digital media content. According to another embodiment of the invention, the method further comprises acts of generating an offset for the updated date information associated with the digital media content, and applying the offset to similar digital media content.

According to one embodiment of the present invention, the view is a time view and the method further comprises displaying a timeline navigation control in the body of the view, wherein the timeline navigation control is configured to provide organization segments, the organization segments providing a visual indication of a number of digital media content items in each segment. According to another embodiment of the invention, the timeline navigation control further comprises a handle responsive to a pointer displayed on the computer device, wherein the handle is further responsive to select and drag operations. According to another embodiment of the invention, the act of displaying the user interface includes providing a plurality of views of the plurality of visual representations of computer content, and associating the plurality of visual representations of computer content with at least one of the plurality of views, and wherein the each of the plurality of visual representations is responsive to focus and execution, wherein execution includes selection of the visual representation. According to another embodiment of the invention, the act of providing for transition between the plurality of views in response to selection of an I/O profile includes permitting the user to rotate a display element about a longitudinal axis running along an interface between the display component and a base of the streamlined computing device, wherein rotating the display component about the longitudinal axis up to approximately 180 degrees from the closed mode configures the portable computer into a laptop mode with one of the plurality of views as a default display, and wherein rotating the display component about the longitudinal axis beyond approximately 180 degrees from the closed mode configures the portable computer into an easel mode with another one of the plurality of views as a default display.

According to one aspect of the present invention, a computer-readable medium having computer-readable instructions stored thereon that as a result of being executed by a computer, instruct the computer to perform the method for accessing and managing digital media libraries on a streamlined computing device with a plurality selectable I/O profiles, wherein the method comprises displaying a graphical user interface on a computing device, wherein the graphical user interface comprises at least a plurality of views of digital media content, providing for transition between the plurality of views in response to selection of an I/O profile, providing for transition between the plurality of views in response to activation of a view selector component configured to permit a user to select one of the plurality of views, associating at least one of a plurality of visual representations with digital media content, executing the association with the at least one of the plurality of visual representations with digital media content in response to selection, transitioning a display on the computing device to a view of the digital media content in response to the act of executing the association, and providing for display of user digital media content and referenced digital media content in the view of the digital media content. According to another embodiment of the invention, the method further comprises an act of displaying in the view user digital media content and referenced digital media content in response to the act of executing the association with the at least one of the plurality of visual representations. According to another embodiment of the invention, the act of displaying in the view user digital media content and referenced digital media content includes an act of accessing a reference to remote digital content not controlled by the user in order to display referenced digital content.

According to one embodiment of the present invention, the method further comprises an act of associating the at least one of the plurality of visual representations with a remote service provider. According to another embodiment of the invention, the method further comprises an act storing the association between the at least one visual representation with the remote service provider in at least one of a device profile and a user profile. According to another embodiment of the invention, the method further comprises acts of configuring access to a remote service, and integrating operations provided by the remote service provider into the view of the digital media content. According to another embodiment of the invention, the view comprises at least one of an album view and a timeline view. According to another embodiment of the invention, the method further comprises an act of displaying digital media content in a body portion of the view. According to another embodiment of the invention, the method further comprises an act of displaying a toggle element in a header portion of the view, wherein the toggle element transitions the computing device display between the album view and the timeline view upon selection by a user. According to another embodiment of the invention, the method further comprises acts of displaying emulation controls responsive to selection by the user, and emulating standard computer operations for referenced digital media content displayed in the view, wherein the act of emulating standard computer operations includes an act of determining if the user has authority to perform the standard computer operations, determining the user does not have the authority to perform the standard computer operation on a source of the referenced digital media content, and wherein the act of displaying the emulation controls occurs in response to the determination that the user does not have the authority.

According to one embodiment of the invention, the standard computer operation includes an act of deleting digital media content, and the method further comprises an act of altering the view of the digital media content so the digital media content marked for deletion is not displayed within the view. According to another embodiment of the invention, the method further comprises an act of generating a state entry, associated with at least one of the view and the source of the referenced digital media content. According to another embodiment of the invention, the method further comprises an acts of accessing any state entry for at least one of the view and the source of referenced digital media content, and displaying referenced digital media content according to any state entry requirement. According to another embodiment of the invention, the standard computer operation includes an act of editing referenced digital media content, and the method further comprises an act of generating a state entry reflecting any edits made to the referenced digital media content. According to another embodiment of the invention, the method further comprises acts of providing an aggregation component configured to permit the user to select a plurality of digital media content, displaying the plurality of digital media content in the body of the view, and permitting the user to perform operations on the plurality of digital media content. According to another embodiment of the invention, the act of permitting the user to perform operations on the plurality of digital media content includes at least one of a share operation, a create channel operation, and an order prints operation. According to another embodiment of the invention, the at least one operation is a share operation, and the method further comprises acts of identifying any state entries for the plurality of digital media content, identifying any remote service settings for the plurality of digital media content, and transmitting a visual representation associated with the plurality of digital media content, any state settings, and any remote service settings to another streamlined device user.

According to one embodiment of the present invention, the method further comprises acts of permitting the user to share the at least one visual representation, including any associated digital media content with another user, storing shared information in response to an act of sharing by the user, and updating any associated digital media automatically for the another user, wherein the act of updating any associated digital media includes acts of identifying any changes in shared digital media content, wherein changes include at least one of addition of digital media content associated with the at least one visual representation, deletion of digital media content associated with the at least one visual representation, edits of digital media content associated with the at least one visual representation, and updates of information associated with digital media content associated with the at least one visual representation. According to another embodiment of the invention, the method further comprises acts of permitting the user to share the at least one visual representation, including any associated digital media content with another user, transmitting the at least one visual representation associated with the digital media content, any state settings, and any remote service settings to another streamlined device user. According to another embodiment of the invention, the method further comprises an act of permitting the user to update date information associated with the digital media content. According to another embodiment of the invention, the method further comprises an acts of generating an offset for the updated date information associated with the digital media content, and applying the offset to similar digital media content.

According to one embodiment of the present invention, the view is a time view and the method further comprises displaying a timeline navigation control in the body of the view, wherein the timeline navigation control is configured to provide organization segments, the organization segments providing a visual indication of a number of digital media content items in each segment. According to another embodiment of the invention, the timeline navigation control further comprises a handle responsive to a pointer displayed on the computer device, wherein the handle is further responsive to select and drag operations. According to another embodiment of the invention, the act of displaying the user interface includes providing a plurality of views of the plurality of visual representations of computer content, and associating the plurality of visual representations of computer content with at least one of the plurality of views, and wherein the each of the plurality of visual representations is responsive to focus and execution, wherein execution includes selection of the visual representation. According to another embodiment of the invention, the act of providing for transition between the plurality of views in response to selection of an I/O profile includes permitting the user to rotate a display element about a longitudinal axis running along an interface between the display component and a base of the streamlined computing device wherein rotating the display component about the longitudinal axis up to approximately 180 degrees from the closed mode configures the portable computer into a laptop mode with one of the plurality of views as a default display, and wherein rotating the display component about the longitudinal axis beyond approximately 180 degrees from the closed mode configures the portable computer into an easel mode with another one of the plurality of views as a default display.

According to one aspect of the present invention, a system for accessing and managing digital media libraries with a plurality selectable I/O profiles is provided. The system comprises a display component configured to display a graphical user interface, wherein the graphical user interface comprises at least a plurality of views of digital media content, wherein the plurality of views include at least one of a plurality of visual representations, an execution component configured to transition the graphical user interface between the plurality of views in response to selection of an I/O profile, a view selector component configured to transition between the plurality of views in response to activation, a storage component configured to store an association between at least one of a plurality of visual representations and digital media content, wherein the execution component is further configured to execute the association with the at least one of the plurality of visual representations with digital media content in response to selection and transition the display to a view of the digital media content in response to the act of executing the association, and wherein the display component is configured to display user digital media content and referenced digital media content in the view of the digital media content. According to one embodiment of the present invention, the display component is further configured to display in the view user digital media content and referenced digital media content in response to the act of execution of the association with the at least one of the plurality of visual representations. According to another embodiment of the invention, the execution component is further configured access a reference to remote digital content not controlled by the user in order to permit display of referenced digital content. According to another embodiment of the invention, the storage component further comprises an association between the at least one of the plurality of visual representations and a remote service provider. According to another embodiment of the invention, the storage component includes the association in at least one of a device profile and a user profile. According to another embodiment of the invention, the storage component is further configured to store access information for a remote service and wherein the execution component if further configured to integrate operations provided by the remote service provider into the view of the digital media content.

According to one embodiment of the present invention, the view comprises at least one of an album view and a timeline view. According to another embodiment of the invention, the display component is further configured to display digital media content in a body portion of the view. According to another embodiment of the invention, the display component is further configured to display a toggle element in a header portion of the view, wherein the toggle element transitions the computing device display between the album view and the timeline view upon selection by a user. According to another embodiment of the invention, the execution component is further configured determine if the user has authority to perform a set of standard computer operations, and wherein the displaying component is further configured to display emulation controls configured to emulate the set of standard computer operations upon a determination that the user does not have the authority to perform the set of standard operations. According to another embodiment of the invention, the standard computer operation includes an act of deleting digital media content, and the method further comprises an act of altering the view of the digital media content so the digital media content marked for deletion is not displayed within the view. According to another embodiment of the invention, the storage component is further configured to store a state entry associated with at least one of the view and the source of the referenced digital media content. According to another embodiment of the invention, the execution component is further configured to access any state entry for at least one of the view and the source of referenced digital media content, and wherein the display component is configured to display referenced digital media content according to any state entry requirement. According to another embodiment of the invention, the standard computer operation includes an editing operation for referenced digital media content, and the storage component is further configured to store a state entry reflecting any edits made to the referenced digital media content. According to another embodiment of the invention, the display component is further configured to display an aggregation element configured to permit the user to select a plurality of digital media content, display the plurality of digital media content in the body of the view, and permit the user to perform operations on the plurality of digital media content.

According to one embodiment of the present invention, the display component is further configured to permit at least one of a share operation, a create channel operation, and an order prints operation. According to another embodiment of the invention, the execution component is further configured to identify any state entries for the plurality of digital media content, identifying any remote service settings for the plurality of digital media content, and transmit a visual representation associated with the plurality of digital media content, any state settings, and any remote service settings to another streamlined device user. According to another embodiment of the invention, the system further comprises a share component configured to permit the user to share the at least one visual representation, including any associated digital media content with another user, and an update component update any digital media associated with the shared at least one visual representation automatically for the another user. According to another embodiment of the invention, the execution component is further configured to transmit at least one visual representation associated with the digital media content, any state settings, and any remote service settings to another streamlined device user. According to another embodiment of the invention, the execution component is further configured to permit the user to update date information associated with the digital media content. According to another embodiment of the invention, the execution component is further configured to generate an offset for the updated date information associated with the digital media content, and apply the offset to similar digital media content. According to another embodiment of the invention, the view is a time view and the display component is further configured to display a timeline navigation control in the body of the view, wherein the timeline navigation control is configured to provide organization segments, the organization segments providing a visual indication of a number of digital media content items in each segment. According to another embodiment of the invention, the timeline navigation control further comprises a handle responsive to a pointer displayed on the computer device, wherein the handle is further responsive to select and drag operations.

According to one embodiment of the present invention, the display component is further configured to provide a plurality of views of the plurality of visual representations of computer content and the storage components is configured to store an association between the plurality of visual representations of computer content and at least one of the plurality of views, wherein the each of the plurality of visual representations is responsive to focus and execution, and wherein execution includes selection of the visual representation. According to another embodiment of the invention, the system comprises a portable computer system and the portable computer system further comprises a display component including a display screen, a base, a hinge assembly at least partially housed within the base and configured to pivotably couple the display component to the base, wherein the display component is rotatable about a longitudinal axis running along an interface between the display component and the base, wherein, in the closed mode, the display screen is disposed substantially against the base, wherein rotating the display component about the longitudinal axis up to approximately 180 degrees from the closed mode configures the portable computer into the laptop mode, and wherein rotating the display component about the longitudinal axis beyond approximately 180 degrees from the closed mode configures the portable computer into the easel mode. According to another embodiment of the invention, the single axis is a longitudinal axis running along an interface between the display component and the base; and wherein the display component is rotatable about the longitudinal axis. According to another embodiment of the invention, the system further comprises a display orientation module configured to control an orientation of the content displayed on the display screen, wherein the orientation of the content displayed on the display screen is configurable among a plurality of orientations relative to the longitudinal axis.

According to one embodiment of the present invention, the plurality of orientations comprises a first orientation relative to the longitudinal axis and a second orientation relative to the longitudinal axis, and wherein when display orientation module is configured to automatically display the content in the first orientation when the portable computer is configured into the laptop mode and in the second orientation when the portable computer is configured into the easel mode. According to another embodiment of the invention, the plurality of display modes further comprises a flat mode in which the display component is disposed at an angle of approximately 180 degrees, measured about the longitudinal axis, relative to the base. According to another embodiment of the invention, the plurality of orientations comprises a first orientation relative to the longitudinal axis, a second orientation relative to the longitudinal axis, and a third orientation relative to the longitudinal axis, and wherein, in the flat mode, the orientation of the content displayed on the display screen is configurable among the first, second and third orientations responsive to a user input. According to another embodiment of the invention, the second orientation is 90 degrees relative to the first orientation, and wherein the third orientation is 180 degrees relative to the first orientation. According to another embodiment of the invention, the system further comprises a mode sensor configured to detect a degree of rotation of the display component relative to the base and to provide information representative of the degree of rotation, and wherein the display orientation module is configured to automatically adjust the orientation of the content displayed on the display screen responsive to the information from the mode sensor.

According to one embodiment of the invention, the display orientation module is configured to automatically display the content in a first orientation relative to the longitudinal axis responsive to the information indicating that the degree of rotation of the display component is less than approximately 180 degrees relative to the base, and automatically display the content in a second orientation relative to the longitudinal axis responsive to the information indicating that the degree of rotation of the display component is greater than approximately 180 degrees relative to the base, wherein the second orientation is at approximately 180 degrees relative to the first orientation. According to another embodiment of the invention, the system further comprises a mode sensor configured to detect a current display mode of the portable computer; and wherein the display orientation module selects the orientation of the content displayed on the display screen from one of the plurality of orientations relative to the longitudinal axis responsive to the current display mode detected by the mode sensor. According to another embodiment of the invention, wherein the plurality of display modes further comprises a closed mode, and wherein, in the closed mode, the display screen is disposed substantially against the base. According to another embodiment of the invention, rotating the display component about the longitudinal axis up to approximately 180 degrees from the closed mode configures the portable computer into the laptop model, and wherein rotating the display component about the longitudinal axis beyond approximately 180 degrees from the closed mode configures the portable computer into the easel mode.

According to one embodiment of the present invention, the display component is rotatable about the longitudinal axis up to approximately 320 degrees from the closed mode. According to another embodiment of the present invention, the longitudinal axis comprises multiple parallel axes, and wherein the hinge assembly is configured to permit rotation of the display component about any of the multiple parallel axes to configure the portable computer between the plurality of display modes. According to another embodiment of the present invention, the system further comprises a scroll wheel disposed at least partially within the base and rotatable about the longitudinal axis, the scroll wheel configured to permit a user to control at least one of operating parameters of the portable computer and the content displayed on the display screen. According to another embodiment of the present invention, the system further comprises a first navigation button disposed on one of the base and the display component and configured to permit the user to manipulate selected content displayed on the display screen. According to another embodiment of the present invention, the display screen is configured to display at least one of a plurality of modes of content, and wherein the navigation button is configured to permit the user to select for display one of the plurality of modes of content.

According to one embodiment of the invention, the first navigation button is user-accessible in each of the laptop mode and the easel mode. According to another embodiment of the present invention, the system further comprises a second navigation button, wherein the first navigation button is disposed on a major surface of the base, and wherein the second navigation button is disposed on a minor surface of the base. According to another embodiment of the invention, the scroll wheel is configured to permit the user to select a mode of content for display on the display screen. According to another embodiment of the invention, the scroll wheel is configured to permit the user to control a volume of sound played by the portable computer. According to another embodiment of the invention, the system further comprises a hinge assembly at least partially housed within the base and configured to rotatably couple the display component to the base. According to another embodiment of the invention, the scroll wheel is disposed at least partially within the hinge assembly. According to another embodiment of the invention, the system further comprises a foot disposed along at least a portion of the base and configured to support the portable computer when in the easel mode.

It is realized that the conventional wisdom with respect to such "feature packing" as discussed above suffers from significant flaws. Typical computer users simply can't take advantage of all the functionality offered, either the services and features offered by their own computer, or the services and features offered by online providers. The complexity of the interface (both hardware and software) hampers adoption, as does the volume of features offered. For example, third party service provides often find difficulty in subscribing new users, educating existing users, and providing integration of feature sets for the features they provide as well as those offered by other service providers.

Further complicating the user's interaction with computer devices and provided services is the inflexibility of the devices being used and their accompanying interfaces. It is realized that a device that can provide a user with a flexible portal into electronic content, that is, one that can be configured dynamically improves the user experience. For example, permitting transitions from a "lean back" mode of viewing (imagine, for example, a person watching television from their couch) to a "lean forward" mode of viewing (picture, for example, a laptop user typing away in a word processing application) on a computer device improves the user experience. Further, user interfaces that are responsive to the user's dynamic configurations improve the user's ability to interact with the electronic content, from the machine itself, the internet, and even from both sources.

Accordingly, aspects and embodiments are directed to a graphical user interface that organizes interface elements into modes of content for presentation to a user. Different views of the modes of content are used to present the user with an interface that is responsive to configurations of the device and responsive to activity being performed by the user. Further the elements that comprise the graphical user interface are configured to present a summarized view of available actions and content, in order to simplify user interaction. The different views present different organizations of the interface elements and in some example display only certain ones of the modes of content in order to reduce the number of options a user must navigate to accomplish an objective.

According to one aspect of the present invention, a graphical user interface displayed on a computer system responsive to computer focus and execution is provided. The graphical user interface comprises a first visual representation configured to display digital content, a focus visual representation configured to display the first visual representation in a focused state, an execution component configured to execute a first transformation from the first visual representation into the focus visual representation responsive to computer focus on the first visual representation, and wherein the execution component is further configured to execute a second transformation from the focus visual representation into the first visual representation upon loss of focus on the focus visual representation, a mapping from at least one of the first visual representation and the focus visual representation to a first view including the digital content, and the execution component further configured to execute the mapping in response to execution of at least one of the first and focus visual representation, wherein execution of the one at least one of the first and focus visual representations includes clicking on the at least one of the first and focus visual representations.

According to one embodiment of the present invention, the focused state of includes a highlight of the display of the focus visual representation. According to another embodiment of the invention, the highlight of the display of the focus visual representation includes a display of the focus visual representation in an increased size relative to a display size of the first visual representation. According to another embodiment of the invention, highlight of the display includes at least one of a border display, a background color display, an increase in display size, a change in format, and an alteration in a display color. According to another embodiment of the invention, the graphical user interface further comprises a first animation configured to present to the user through the computer display the increase in size from the first visual representation into the focus visual representation.

According to one embodiment of the present invention, the execution component is further configured to display the first animation in response to focus on the first visual representation. According to another embodiment of the invention, the graphical user interface further comprises a mapping from the focus visual representation to the first view of the digital content. According to another embodiment of the invention, the graphical user interface further comprises a second animation configured to present to the user a decrease in the display size of the focus visual representation to the display size of the first visual representation. According to another embodiment of the invention, the execution component is further configured to display the second animation in response to loss of focus on the focus visual representation. According to another embodiment of the invention, the graphical user interface further comprises a third animation configured to present to the user through the computer display a transition from at least one of the first and focus visual representation to the first view. According to another embodiment of the invention, the execution component is further configured to display the third animation in response to selection of at least one of the first and focus visual representations.

According to another embodiment of the invention, the third animation includes a visual depiction of zooming out on the computer display showing at least one of the first and focus visual representations getting smaller, a visual depiction of motion displayed to the user through the computer display relative to the zoomed out view of the at least one of the first and focus visual representations, a visual depiction of slowing motion arriving at zoomed out display of the first view, and a visual depiction of zooming in on the zoomed out display of the first view.

According to one embodiment of the present invention, the first visual representation and the focus visual representation further comprise a header display. According to another embodiment of the invention, the header display further comprises a title display and an indicator of content origin. According to another embodiment of the invention, the title display does not comprise a url for a source of the mapped digital content.

According to one embodiment of the present invention, the header display further comprises at least one control displayed in the header display, wherein the control is configured to execute computer based functionality in response to execution by the user. According to another embodiment of the invention, the at least one control is mapped to a close function. According to another embodiment of the invention, the at least one control is mapped to an option presentation function. According to another embodiment of the invention, the title is derived from the mapped digital content. According to another embodiment of the invention, the execution component is further configured to cause the display of configuration options for at least one of the first and focus visual representations. According to another embodiment of the invention, the graphical user interface further comprises an option control configured to display a second visual representation comprising options associated with at least one of the first visual representation and focus visual representation, in response to execution. According to another embodiment of the invention, the graphical user interface further comprises a forth animation configured to present to the user through the computer display at least one of the first and focus visual representations rotating to display a back of the at least one of the first and focus visual representations. According to another embodiment of the invention, the execution component is further configured to display the forth animation in response to selection of the options control.

According to one embodiment of the present invention, the second visual representation includes a selectable display. According to another embodiment of the present invention, the selectable display includes a transform function configured to transform the first visual representation from one content mode to another content mode. According to another embodiment of the present invention, the content mode comprises at least one of web content mode and channel content mode, and wherein the other content mode comprises at least one of web content mode and channel content mode. According to another embodiment of the present invention, the selectable display includes an option to display the mapped digital content in a screen saver mode. According to another embodiment of the present invention, the first visual representation and the focus visual representation further comprise a body display. According to another embodiment of the present invention, the body display further comprises a visualization of the mapped digital content. According to another embodiment of the present invention, the visualization further comprises a portion of the digital content.

According to one embodiment of the present invention, the portion of the digital content in a cut out of a full display sized to fit within the body display of the first visual representation. According to another embodiment of the invention, the visualization is mapped to at least one of rss digital content, digital photo content, digital audio content, and digital video content. According to another embodiment of the invention, the visualization is configured to display a plurality of rss items. According to another embodiment of the invention, the plurality of rss items are displayed individually, and the visualization is further configured to display each rss item sequentially. According to another embodiment of the invention, the visualization further comprises restarting a sequence of rss items. According to another embodiment of the invention, the focus visual representation further comprises navigation tools displayed in the body display of the focus visual representation. According to another embodiment of the invention, the first visual representation further comprises navigation tools displayed in the body display of the first visual representation. According to another embodiment of the invention, the navigation tools are configured to be responsive to user selection, and further configured to display a next rss item in response to user selection. According to another embodiment of the invention, the visualization is configured to display a plurality of digital photos.

According to another embodiment of the invention, the visualization is configured to display the plurality of digital photos individually, and the visualization is further configured to display each digital photo sequentially. According to another embodiment of the invention, the visualization further comprises restarting a display of a sequence of digital photos.

According to one embodiment of the present invention, the first view comprises at least one of a web page view, a channel page view, a system page view, a channel full view, and a channel selector view. According to another embodiment of the invention, the first view comprises a header display. According to another embodiment of the invention, the first view comprises a body display. According to another embodiment of the invention, the header display is displayed at an upper portion of the computer system's display screen and the body display occupies a lower portion of the display screen.

According to another embodiment of the invention, the header display and the body display occupy the entirety of the system's display screen. According to another embodiment of the invention, the header display comprises a laterally disposed frame extending from the left of the display screen to the right of the display screen. According to another embodiment of the invention, the header display further comprises a focus view and an unfocused view. According to another embodiment of the invention, the header display is configured to maintain display position in the focus and unfocused view.

According to one embodiment of the present invention, the header display is configured to maintain display size in the focus and unfocused view. According to another embodiment of the invention, at least one of the focus view and unfocused view further comprise a state view. According to another embodiment of the invention, the state view comprises a content status display. According to another embodiment of the invention, the content status display is configured to reflect a computer operation of loading the mapped digital content for the first view. According to another embodiment of the invention, the state view further comprises at least one state responsive control.

According to another embodiment of the invention, the state view further comprises at least one state responsive control. According to another embodiment of the invention, the at least one state responsive control includes a stop control for stopping download of the mapped digital content. According to another embodiment of the invention, the at least one state responsive control includes a go control for initiating download of the mapped digital content. According to another embodiment of the invention, the state responsive control is rendered in response to a first view state. According to another embodiment of the invention, the first view state comprises a load state reflective of downloading digital content, and the state responsive control displays a stop control.

According to one embodiment of the present invention, the first view state comprises a loaded state reflective of a computer system having downloaded the mapped digital content, and in response to the loaded state the state responsive control displays a go control. According to another embodiment of the invention, the header display is responsive to computer focus. According to another embodiment of the invention, the header display displays a focused view in response to computer focus, and an unfocused view when the header display is not in focus. According to another embodiment of the invention, the header display focused view comprises an address display, an indicator of digital content origin, a navigation element, forward and back tools, and additional tools displayed in response to content mode, a search tool, bookmark tool and a close tool. According to another embodiment of the invention, the navigation element comprises a navigation toggle, and in response to execution the navigation element navigates to a home view. According to another embodiment of the invention, the home view further comprises a plurality of first visual representations, and a corresponding navigation element, and in response to selection of the corresponding navigation element the device navigates to a previous view.

According to one embodiment of the present invention, the header display further comprises a share tool. According to another embodiment of the invention, the header display focused view further comprises a share tool. According to another embodiment of the invention, the share tool is configured to permit the user to share the first visual representation with another user. According to another embodiment of the invention, the share tool is further configured to permit the user to share the first visual representation and any associated information with the another user. According to another embodiment of the invention, the graphical user interface further comprises a share interface display configured to display in response to execution of the share tool. According to another embodiment of the invention, the share interface comprises a list of selectable destinations for sharing of the first visual representation. According to another embodiment of the invention, the share interface comprises a recipient entry field configured to permit specification of destination by an e-mail address. According to another embodiment of the invention, the share interface comprises a comments entry field configured to permit association of comments by the user to the first visual representation. According to another embodiment of the invention, the selectable destinations includes a list of other streamlined device users.

According to one embodiment of the present invention, the list of other streamlined device users comprises a group of identified other streamlined device users. According to another embodiment of the invention, the identified other streamlined device users are identified by at least one of the user and information about the user. According to another embodiment of the invention, the additional tools displayed in response to a content mode comprise an add a channel tool. According to another embodiment of the invention, the add a channel tool is displayed in response to a web content mode, and in further response to a determination that the mapped digital content comprises a source with at least one of a rss feed and a customized visualization. According to another embodiment of the invention, the add a channel tool is configured to generate an additional first visual representation. According to another embodiment of the invention, the additional first visual representation is configured to display channel content mode. According to another embodiment of the invention, the address display is configured to display a title of the digital content, and in response to selection of the address display, is configured to transform the address display into a uniform resource locator address for the digital content.

According to one embodiment of the present invention, the additional tools further comprise a bookmark tool, a share tool, and a more tool. According to another embodiment of the invention, the more tool is configured to display a standard toolbar in addition to the header display. According to another embodiment of the invention, the search tool is displayed in an unfocused view. According to another embodiment of the invention, the search unfocused view is displayed in a reduced size relative to a focus view. According to another embodiment of the invention, the search focus view comprises a text box for entry of search terms. According to another embodiment of the invention, the search text box captures display area from other elements displayed in the header display. According to another embodiment of the invention, the graphical user interface further comprises an animation displaying the lateral expansion of the search text box in response to focus. According to another embodiment of the invention, the graphical user interface further comprises an animation displaying the lateral expansion of the search text box in response to execution. According to another embodiment of the invention, the header display unfocused view comprises a title display, an indicator of content origin, and a navigation element. According to another embodiment of the invention, the header display unfocused view further comprises an add a channel tool displayed in response to the first view displaying web content mode, and a determination that the digital content further comprises at least one of an rss source and a source for which a customized visualization is provided.

According to one embodiment of the present invention, the add a channel tool is configured to generate an additional first visual representation. According to another embodiment of the invention, the header display focus and unfocused view further comprise a security status indicator. According to another embodiment of the invention, the header display focus and unfocused view further comprise a parental control status indicator. According to another embodiment of the invention, the header display focus and unfocused view further comprise a security status indicator, and a parental control status indicator, if parental controls are enabled. According to another embodiment of the invention, the body display comprises a web page. According to another embodiment of the invention, the body display comprises a browser view of web based content. According to another embodiment of the invention, the browser based view of web based content is configured using a standard web browser. According to another embodiment of the invention, the first view comprises a scroll bar as necessary.

According to one embodiment of the present invention, the header display further comprises a navigation element, a title, and additional tools. According to another embodiment of the invention, the title is derived from the mapped digital content. According to another embodiment of the invention, the title does not comprise a url for a source of the mapped digital content. According to another embodiment of the invention, the additional tools comprises a share tool and a content navigation tool. According to another embodiment of the invention, the content navigation tool is mapped to a web source for digital content displayed in the body display, and in response to execution of the content navigation tool, the computer system generates an additional first visual representation configured to display a web content mode of the digital content. According to another embodiment of the invention, the body display further comprises a plurality of columns. According to another embodiment of the invention, the plurality of columns comprises a content column and a headline column. According to another embodiment of the invention, the content column displays a series of rss items.

According to one embodiment of the invention, the display of the series of rss items is configured to list all rss items available from a mapped content feed. According to another embodiment of the invention, the mapped content feed comprises a web based source of rss content. According to another embodiment of the invention, the web based source of rss content further comprises a news feed and the rss items comprises headlines. According to another embodiment of the invention, the headline column further comprises a scroll bar for accessing rss items not displayed on a first page, if necessary. According to another embodiment of the invention, the display of a series of rss items is configured to cause the computer system to display in the content column, digital content associated with the rss item, upon execution of an rss item within the display. According to another embodiment of the invention, the content column further comprises a reading view, configured to display digital content associated with the rss item. According to another embodiment of the invention, the graphical user interface further comprises a transition animation, wherein the transition animation is configured to display new digital content associated with an executed rss item moving onto the content column. According to another embodiment of the invention, the content column further comprises a source navigation tool.

According to one embodiment of the present invention, the source navigation tool is mapped to a web based source of the digital content displayed in the content column. According to another embodiment of the invention, the execution component is further configured to execute the mapping to cause the computer system to generate an additional first visual representation configured to display a web base source in a web content mode. According to another embodiment of the invention, the content column further comprises a scroll bar displayed in response to content that does not display fit within a single display screen.

According to another embodiment of the invention, the header display comprises a title, and an indicator of content origin. According to another embodiment of the invention, the digital content includes content from a remote media source. According to another embodiment of the invention, the remote media source includes a remote rss source. According to another embodiment of the invention, the body display includes a rss item display. According to another embodiment of the invention, the rss item display is associated with a plurality of rss items. According to another embodiment of the invention, the plurality of rss items include an association between each rss item and an rss source. According to another embodiment of the invention, the rss source for each rss item comprises a mapping to a new article.

According to one embodiment of the present invention, the rss item display is configured to render individual rss items in sequence. According to another embodiment of the invention, the body display further comprises a content menu, responsive to selection. According to another embodiment of the invention, the content menu is configured for selection in a first system configuration. According to another embodiment of the invention, the first system configuration comprises a first system I/O profile.

According to another embodiment of the invention, the first system I/O profile comprises an integrated scroll wheel and a button selector. According to another embodiment of the invention, the first system I/O profile consists of an integrated scroll wheel and a button selector. According to another embodiment of the invention, the first system configuration comprises a first I/O profile and the first I/O profile consists of an integrated scroll wheel and a button. According to another embodiment of the invention, the execution component is further adapted to cause the system to display the content menu in response to activation of the button. According to another embodiment of the invention, the content menu is displayed in a bottom portion of the body display. According to another embodiment of the invention, the content menu comprises a listing of available rss items from an rss source. According to another embodiment of the invention, the content menu comprises a listing of all available rss items from an rss source.

According to one embodiment of the present invention, the content menu comprises an indicator identifying the rss item displayed in the body display. According to another embodiment of the invention, the content menu is responsive to manipulation of the integrated scroll wheel. According to another embodiment of the invention, the execution component is further configured to cause the system to display the indicator advancing to the next rss item in response to manipulation of the integrated scroll wheel, and the body display to display content associated with the next rss item. According to another embodiment of the invention, the first view is responsive to manipulation of the integrated scroll wheel. According to another embodiment of the invention, the system is configured to display another view in response to manipulation of the integrated scroll wheel. According to another embodiment of the invention, the system is configured to display another view in response to manipulation of the integrated scroll wheel, when the content menu is not displayed. According to another embodiment of the invention, the another view comprises a first view.

According to one embodiment of the present invention, the header display further comprised a navigational element and a title. According to another embodiment of the invention, the title is associated with the computer operations mapped to the first visual representation. According to another embodiment of the invention, the navigational element is configured to cause the system to navigate to a home view upon execution. According to another embodiment of the invention, the body display comprises a plurality of selection options, wherein the plurality of selectable operations are mapped to system configurations. According to another embodiment of the invention, at least one of the selectable operations includes a mapping configured to establish the system's communication settings. According to another embodiment of the invention, at least one of the selectable operations includes a mapping configured to establish the system's settings for additional devices. According to another embodiment of the invention, the additional devices include a digital camera. According to another embodiment of the invention, the body display comprises a plurality of selection options, and wherein the plurality of selectable operations are mapped to online content navigation elements.

According to another embodiment, the graphical user interface discussed above is displayed on a portable computer configurable between a plurality of display modes including a closed mode, a laptop mode and an easel mode. The portable computer further comprises a display component including a display screen, a base, a hinge assembly at least partially housed within the base and configured to pivotably couple the display component to the base, wherein the display component is rotatable about a longitudinal axis running along an interface between the display component and the base, wherein, in the closed mode, the display screen is disposed substantially against the base, wherein rotating the display component about the longitudinal axis up to approximately 180 degrees from the closed mode configures the portable computer into the laptop mode, and wherein rotating the display component about the longitudinal axis beyond approximately 180 degrees from the closed mode configures the portable computer into the easel mode.

According to one aspect of the present invention, a method for presenting a graphical user interface on a computer system display responsive to computer focus and execution is provided. The method comprises the acts of displaying a first visual representation including digital content, displaying a focus visual representation including the first visual representation in a focused state, executing a first transformation from the first visual representation into the focus visual representation in response to computer focus on the first visual representation, executing a second transformation from the focus visual representation into the first visual representation in response to loss of focus on the focus visual representation, storing a mapping from at least one of the first visual representation and the focus visual representation to a first view including the digital content, and displaying the first view in response to execution of the mapping, wherein execution of the mapping includes clicking on the at least one of the first and focus visual representations. According to one aspect of the present invention, the acts of displaying a first visual representation and the focus visual representation include an act of displaying a header display and a body display, wherein the header display further comprises at least one control displayed in the header display, and wherein the control is configured to execute computer based functionality in response to execution by the user. According to another embodiment of the invention, the act of displaying a header display includes acts of displaying a title display and an indicator of content origin, and deriving the title display from the mapped digital content.

According to one embodiment of the present invention, the at least one control is mapped to at least one of a close function and an option presentation function, and wherein the option presentation function is configured to cause the execution component to display configuration options for at least one of the first and focus visual representations, in response to execution. According to another embodiment of the invention, the method further comprises an act of displaying a second visual representation comprising options associated with at least one of the first visual representation and focus visual representation, displayed in response to execution of the an option control, and a user selectable display of the options including a selectable transform function configured to transform the first visual representation from at least one of a web content mode and a channel content mode to another other mode selected from the web content mode and the channel content mode. According to another embodiment of the invention, the body display further comprises a visualization of the mapped digital content, and wherein the visualization is mapped to at least one of digital media content, rss digital content, digital photo content, digital audio content, and digital video content. According to another embodiment of the invention, the visualization is mapped to rss digital content, and wherein the visualization is configured to display a plurality of rss items. According to another embodiment of the invention, the method further comprises an act of displaying the plurality of rss items individually.

According to one embodiment of the present invention, displaying the focus visual representation includes acts of displaying navigation tools in the body display of the focus visual representation, in response to computer focus on the focus visual representation, and displaying a next rss item in response to user selection of the navigation tools. According to another embodiment of the invention, the visualization is configured to display a plurality of digital photos individually, and the visualization is further configured to display a search digital photo sequentially. According to another embodiment of the invention, the act of displaying the first view first includes displaying a header display and a body display, wherein the header display comprises a laterally disposed frame extending from the left of the display screen to the right of the display screen displayed at an upper portion of the computer system's display screen, and the body display occupies a lower portion of the display screen. According to another embodiment of the invention, the method further comprises an act of displaying transition between a header focus view and an unfocused header in response to computer focus on the header display.

According to another embodiment of the invention, the header display is configured to maintain a display position in both the focus and unfocused view, and further configured to maintain a display size in both the focus and unfocused view. According to another embodiment of the invention, the method further comprises an act of displaying a state view, and the state view comprises a content status display responsive to computer operation of loading the mapped digital content for the first view, and at least one state responsive control, including at least one of a stop control for stopping download of the mapped digital content and a go control for initiating download of the mapped digital content.

According to one embodiment of the present invention, the header display focused view comprises an address display, an indicator of digital content origin, a navigation element, forward and back tools, a search tool, a bookmark tool, a close tool, and additional tools displayed in response to content mode. According to another embodiment of the invention, the header display further comprises a share tool. According to another embodiment of the invention, the share tool is configured to permit the user to share the first visual representation with another user. According to another embodiment of the invention, the method further comprises an act of displaying a share interface display configured to display in response to execution of the share tool, wherein the share interface display comprises a list of selectable destinations for sharing of the first visual representation, wherein the list of selectable destinations includes a list of other streamlined device users. According to another embodiment of the invention, the additional tools displayed in response to a content mode comprise an add a channel tool, and the add a channel tools is displayed in response to acts of determining, by a processor, that the computer system is in a web content mode, and determining, by a processor, that the mapped digital content comprises a source with at least one of a rss feed and a customized visualization. According to another embodiment of the invention, the method further comprises an act of generating and additional first visual representation in response to execution of the add a channel tool, wherein the additional first visual representation is configured to display a channel content mode.

According to one embodiment of the present invention, the address display is configured to display a title of the digital content, and the method further comprises an act of transforming the address display into a uniform resource locator address for the digital content, in response to selection of the address display. According to another embodiment of the invention, the method further comprises acts of displaying an unfocused search tool display in the header by default; and displaying a focused search tool view in response to computer focus, wherein the unfocused search view is displayed in a reduced size relative to the focused search tool display, and wherein the focus search tool view comprises a text box for entry of search terms. According to another embodiment of the invention, the header display unfocused view comprises a title display, an indicator of content origin, and a navigation element. According to another embodiment of the invention, the act of displaying the unfocused view further comprises act of displaying an add a channel tool in response to determining the first view is displaying a web content mode and determining that the digital content comprises at least one of an rss source and a source for which a customized visualization is provided. According to another embodiment of the invention, the body display comprises at least one of a web page and a browser view of web based content, wherein the browser based view of web based content is configured using a standard web browser. According to another embodiment of the invention, the header display further comprises a navigation element, a title, and additional tools, wherein the title is derived from the mapped digital content, and wherein the title does not comprise a url for a source of the mapped digital content. According to another embodiment of the invention, the additional tools comprise a share tool and a content navigation tool mapped to a web source for digital content displayed in the body display, and in response to execution of the content navigation tool, the method further comprises an act of generating an additional first visual representation configured to display a web content mode of the digital content.

According to one embodiment of the present invention, the body display further comprises a plurality of columns, wherein the plurality of columns comprises a headline column and a content column, and the method further comprises displaying a series of rss items in the headline column, and displaying content from a selected rss item in the content column. According to another embodiment of the invention, the content column further comprises a reading view, configured to display digital content associated with the rss item and a source navigation tool displayed in the content column, mapped to a web based source of the digital content displayed in the content column, and wherein the execution component is further configured to execute the mapping to cause the computer system to generate an additional first visual representation configured to display a web based source in a web content mode, and the method further comprises displaying the reading view and source navigation tool in the content column. According to another embodiment of the invention, the act of displaying the first view first includes displaying a header display and a body display, wherein the header display comprises a laterally disposed frame extending from the left of the display screen to the right of the display screen displayed at an upper portion of the computer system's display screen, and the body display occupies a lower portion of the display screen. According to another embodiment of the invention, the header display comprises a title, and an indicator of content origin.

According to one embodiment of the present invention, the digital content includes digital content from a remote media source comprising a remote rss source. According to another embodiment of the invention, the body display includes a rss item display associated with a plurality of rss items, wherein the plurality of rss items include an association between each rss item and an rss source, and the rss item display is configured to render individual rss items in sequence. According to another embodiment of the invention, the method further comprises an act of displaying a content menu in a lower portion of the body display, in response to selection of the body display. According to another embodiment of the invention, the method further comprises acts of providing a first system I/O profile, wherein the first system I/O profile includes an integrated scroll wheel and a button selector, and permitting selection by a user through devices of the first system I/O profile. According to another embodiment of the invention, the first system I/O profile consists of the integrated scroll wheel and the button selector. According to another embodiment of the invention, the method further comprises an act of displaying another first view in response to manipulation of the integrated scroll wheel.

According to one embodiment of the present invention, the header display further comprises a navigational element and a title, wherein the title is associated with computer operations mapped to the first visual representation and the body display further comprises a plurality of user selectable options, wherein the plurality of selectable operations are mapped to system configurations. According to another embodiment of the invention, the method further comprises acts of permitting selection of the at least one of the selectable operations includes a mapping configured to establish the system's communication settings, and executing the mapping in response to selection. According to another embodiment of the invention, at least one of the selectable operations includes a mapping configured to establish the system's settings for additional devices.

According to one aspect of the present invention, a computer-readable medium having computer-readable signals stored thereon that define instructions that, as a result of being executed by a computer, instruct the computer to perform the method for presenting a graphical user interface on a computer system display responsive to computer focus and execution as described above.

According to aspect of the present invention, a computer system for presenting streamlined interaction with digital content is provided. The computer system comprising a first user interface component including a first visual representation configured to display digital content, a second user interface component including a focus visual representation configured to display the first visual representation in a focused state, an execution component configured to execute a first transformation from the first visual representation into the focus visual representation responsive to computer focus on the first visual representation, and wherein the execution component is further configured to execute a second transformation from the focus visual representation into the first visual representation upon loss of focus on the focus visual representation, a storage component for storing a mapping from at least one of the first visual representation and the focus visual representation to a third user interface component including a first view of the digital content, and wherein the execution component is further configured to execute the mapping in response to execution of at least one of the first and focus visual representations, wherein execution of the one at least one of the first and focus visual representations includes clicking on the at least one of the first and focus visual representations.

According to one embodiment of the present invention, the first visual representation and the focus visual representation further comprises a header display and a body display, wherein the header display further comprises at least one control displayed in the header display, and wherein the control is configured to execute computer based functionality in response to execution by the user. According to another embodiment of the invention, the header display further comprises a title display and an indicator of content origin, and wherein the title display is derived from the mapped digital content.

According to another embodiment of the invention, the at least one control is mapped to at least one of a close function and an option presentation function, and wherein the option presentation function is configured to cause the execution component to display configuration options for at least one of the first and focus visual representations, in response to execution. According to another embodiment of the invention, the computer system further comprises a second visual representation comprising options associated with at least one of the first visual representation and focus visual representation, displayed in response to execution of the an option control, and a user selectable display of the options including a selectable transform function configured to transform the first visual representation from at least one of a web content mode and a channel content mode to another other mode selected from the web content mode and the channel content mode. According to another embodiment of the invention, the body display further comprises a visualization of the mapped digital content, and wherein the visualization is mapped to at least one of digital media content, rss digital content, digital photo content, digital audio content, and digital video content.

According to one embodiment of the present invention, the visualization is mapped to rss digital content, and wherein the visualization is configured to display a plurality of rss items. According to another embodiment of the invention, the plurality of rss items are displayed individually, and the visualization is further configured to display each rss item sequentially. According to another embodiment of the invention, the focus visual representation displays navigation tools displayed in the body display of the focus visual representation, in response to computer focus on the focus visual representation, and wherein the navigation tools are responsive to user selection, and further configured to display a next rss item in response to user selection. According to another embodiment of the invention, the visualization is configured to display a plurality of digital photos individually, and the visualization is further configured to display each digital photo sequentially.

According to another embodiment of the invention, the third user interface component including the first view comprises a header display and a body display, wherein the header display comprises a laterally disposed frame extending from the left of the display screen to the right of the display screen displayed at an upper portion of the computer system's display screen and the body display occupies a lower portion of the display screen. According to another embodiment of the invention, the header display further comprises a focus view and an unfocused view, and the header is configured to transition between focus and unfocus views in response to computer focus.

According to one embodiment of the present invention, the header display is configured to maintain a display position in both the focus and unfocused view, and further configured to maintain a display size in both the focus and unfocused view. According to another embodiment of the invention, at least one of the focus view and unfocused view further comprises a state view, and the state view comprises a content status display responsive to computer operation of loading the mapped digital content for the third user interface component including the first view, and at least one state responsive control, including at least one of a stop control for stopping download of the mapped digital content and a go control for initiating download of the mapped digital content. According to another embodiment of the invention, the header display focused view comprises an address display, an indicator of digital content origin, a navigation element, forward and back tools, a search tool, a bookmark tool, a close tool, and additional tools displayed in response to content mode. According to another embodiment of the invention, the header display further comprises a share tool. According to another embodiment of the invention, the share tool is configured to permit the user to share the first visual representation with another user. According to another embodiment of the invention, the computer system further comprises a share interface display configured to display in response to execution of the share tool, wherein the share interface display comprises a list of selectable destinations for sharing of the first visual representation, wherein the list of selectable destinations includes a list of other streamlined device users.

According to one embodiment of the present invention, the additional tools displayed in response to a content mode comprise an add a channel tool, and the add a channel tools is displayed in response to a web content mode, and in further response to a determination that the mapped digital content comprises a source with at least one of a rss feed and a customized visualization. According to another embodiment of the invention, the add a channel tool is configured to generate an additional first visual representation, wherein the additional first visual representation is configured to display channel content mode. According to another embodiment of the invention, the address display is configured to display a title of the digital content, and in response to selection of the address display, is further configured to transform the address display into a uniform resource locator address for the digital content. According to another embodiment of the invention, the header further comprises a unfocused search tool displayed by default, and a focused search tool view responsive to computer focus, wherein the unfocused search view is displayed in a reduced size relative to the focused search tool display, and wherein the focus search tool view comprises a text box for entry of search terms. According to another embodiment of the invention, the header display unfocused view comprises a title display, an indicator of content origin, and a navigation element.

According to another embodiment of the invention, the header display unfocused view further comprises an add a channel tool displayed in response to the third user interface component including the first view displaying web content mode, and a determination that the digital content further comprises at least one of an rss source and a source for which a customized visualization is provided.

According to one embodiment of the present invention, the body display comprises at least one of a web page and a browser view of web based content, wherein the browser based view of web based content is configured using a standard web browser. According to another embodiment of the invention, the header display further comprises a navigation element, a title, and additional tools, wherein the title is derived from the mapped digital content, and wherein the title does not comprise a url for a source of the mapped digital content. According to another embodiment of the invention, the additional tools comprises a share tool and a content navigation tool mapped to a web source for digital content displayed in the body display, and in response to execution of the content navigation tool, the computer system generates an additional first visual representation configured to display a web content mode of the digital content. According to another embodiment of the invention, the body display further comprises a plurality of columns, wherein the plurality of columns comprises a headline column configured to display a series of rss items and a content column configured to display content from a selected rss item, wherein the display of the series of rss items is configured to list all rss items available from a mapped content feed comprising a web based source of rss content including a news feed. According to another embodiment of the invention, the content column further comprises a reading view, configured to display digital content associated with the rss item, a source navigation tool displayed in the content column, mapped to a web based source of the digital content displayed in the content column, and wherein the execution component is further configured to execute the mapping to cause the computer system to generate an additional first visual representation configured to display a web based source in a web content mode.

According to one embodiment of the present invention, the header display comprises a title, and an indicator of content origin. According to another embodiment of the invention, the digital content includes digital content from a remote media source comprising a remote rss source. According to another embodiment of the invention, the body display includes a rss item display associated with a plurality of rss items, wherein the plurality of rss items include an association between each rss item and an rss source, and the rss item display is configured to render individual rss items in sequence.

According to another embodiment of the invention, in response to selection the body display is configured to display a content menu in a lower portion of the body display, wherein the content menu is responsive to further selection. According to another embodiment of the invention, the content menu is configured for further selection in a first system configuration comprising a first system I/O profile, wherein the first system I/O profile includes an integrated scroll wheel and a button selector. According to another embodiment of the invention, the first system I/O profile consists of the integrated scroll wheel and the button selector. According to another embodiment of the invention, the third user interface component including the first view is responsive to manipulation of the integrated scroll wheel and in response to manipulation causes the system to display another first view.

According to one embodiment of the present invention, the header display further comprises a navigational element and a title, wherein the title is associated with computer operations mapped to the first visual representation and the body display further comprises a plurality of user selectable options, wherein the plurality of selectable operations are mapped to system configurations. According to another embodiment of the invention, at least one of the selectable operations includes a mapping configured to establish the system's communication settings. According to another embodiment of the invention, at least one of the selectable operations includes a mapping configured to establish the system's settings for additional devices.

According to one aspect of the present invention, a computer implemented method for facilitating streamlined presentation and adoption of computer provided functionality over a computer device with a plurality of user selectable I/O profiles is provided. The method comprising the acts of accepting electronic content over a communication network presenting electronic content to a user through a graphical user display permitting the user to interact with the electronic content using a first set of I/O devices, organizing the graphical user display into a map based user interface, enabling the map based user interface to permit interaction with electronic content through the first set of I/O devices, wherein the first set of I/O devices comprises at least a smallest set of common I/O devices between a plurality of user selectable I/O profiles available to the user on the computer device, selecting, by the user, at least one of the plurality of I/O profiles by physically manipulating the orientation of the computer device, displaying electronic content as a streamlined representation, wherein the streamlined representation further comprises a header, a body, and a mapping to on-line digital content, wherein the body is includes a representation of the mapped on-line digital content. According to one embodiment of the present invention, the computer implemented method further comprises an act of organizing a plurality of streamlined representations into a home view. According to another embodiment of the invention, the computer implemented method further comprises an act of transforming electronic content into a state preserving representation of the electronic content, comprising the first visual representation.

According to one embodiment of the present invention, the computer implemented method further comprises an act of displaying the context sensitive representation to at least one user through a graphical user interface. According to another embodiment of the invention, the streamlined representation comprises a card associated with the mapped online digital content. According to another embodiment of the invention, the method further comprises an act of configuring the card to render selectable options customized to the first set of I/O devices. According to another embodiment of the invention, the computer implemented method further comprises an act of adapting the user interface layer to operate in response to accepted input commands from multiple I/O profiles.

According to another embodiment of the invention, the computer implemented method further comprises acts of permitting a user to change the I/O profile of the system, configuring the user interface layer to recognize the change in I/O profile, and providing a user interface responsive to the change I/O profile.

According to one aspect of the present invention, a computer-readable medium having computer-readable signals stored thereon that define instructions that, as a result of being executed by a computer, instruct the computer to perform the method for facilitating streamlined presentation and adoption of computer provided functionality over a computer device with a plurality of user selectable I/O profiles as described above.

According to one aspect of the present invention, a customized user interface for a computer system with a plurality selectable I/O profiles configured to present computer operations to a user in a format configured to a selected I/O profile, the user interface comprising a map based graphical user interface displayed on the computer system, the map based user interface comprising a plurality of views of a plurality of visual representations of computer content, wherein the computer content includes at least one of selectable digital content, selectable computer operations and passive digital content, and the plurality of visual representations of computer content rendered on the computer display, wherein the plurality of visual representations of computer content include an association to a first view of the plurality of views, the first view including the computer content, and wherein the each of the plurality of visual representations is responsive to focus and execution, wherein execution includes clicking on the visual representation, and an execution component comprising at least one computer hardware element configured to transition the computer system display between the plurality of views, wherein the execution component further comprises a view selector component configured to select one of the plurality of views for display on a computer system in response to a computer system configuration. According to one embodiment of the present invention, the execution component is further configured to transition between the plurality of views in response to execution of at least one of a computer system operation, a visual representation, a computer system configuration, and a change in computer system configuration. According to another embodiment of the invention, the user interface further comprises a plurality of modes of content for the computer content rendered on the computer display.

According to one aspect of the present invention, the plurality of views are configured to organize modes of content into different views. According to another embodiment of the invention, the plurality of modes of content comprise at least one of a web content mode, a channel content mode, a media content mode, an application content mode, a communication content mode, and a passive content mode. According to another embodiment of the invention, the plurality of modes of content include a web content mode, wherein the web content mode is configured to display web based content for proximal viewing by a user. According to another embodiment of the invention, the plurality of modes of content include a channel content mode, wherein the channel content mode is configured to display web based content for non-proximal viewing by a user.

According to another embodiment of the invention, the plurality of modes of content include a media content mode, wherein the media content mode is configured to display media based content for non-proximal viewing by a user mode. According to another embodiment of the invention, the plurality of modes of content include a web content mode, wherein the web content mode is optimized to display web based content for proximal viewing by a user. According to another embodiment of the invention, the plurality of modes of content include a channel content mode, wherein the channel content mode is optimized to display web based content for non-proximal viewing by a user. According to another embodiment of the invention, the plurality of modes of content include a media content mode, wherein the media content mode is optimized to display media based content for non-proximal viewing by a user mode.

According to one embodiment of the present invention, the media based content includes at least one of digital photos, digital audio files, and digital video files. According to another embodiment of the invention, the media based content is accessed through a remote service. According to another embodiment of the invention, the plurality of modes of content include a connect content mode, wherein the connect content mode is configured to display computer configuration operations for viewing by a user. According to another embodiment of the invention, the plurality of modes of content include an application content mode, wherein the application content mode is configured to display computer applications for use by a user. According to another embodiment of the invention, in the plurality of views includes a home view configured to organize a plurality of content modes. According to another embodiment of the invention, the plurality of views includes a channel view configured to organize a single content mode. According to another embodiment of the invention, the plurality of views includes a channel view configured to organize dual content modes. According to another embodiment of the invention, the plurality of modes of content include a passive content mode, wherein the passive content mode is configured to display web based content for non-proximal viewing without user interaction.

According to one embodiment of the present invention, the plurality of modes of content include a passive content mode, wherein the passive content mode is optimized to display web based content for non-proximal viewing without user interaction. According to another embodiment of the invention, the plurality of views includes a screen saver view configured to organize selected content modes for passive viewing. According to another embodiment of the invention, the plurality of views further comprise a first layer, wherein the first layer organizes computer operations, including navigation operations, into groups based on similar functional operation. According to another embodiment of the invention, the first layer maps to groupings of lower level functionality. According to another embodiment of the invention, the first layer include navigation operations maps to a seconding layer comprising computer operations for interacting with computer content.

According to another embodiment of the invention, levels of computer functions are segregated based on proximity of the operation to a source of digital content, higher levels including operations that navigate to lower level operations that permit interaction with computer content.

According to one embodiment of the present invention, the first layer comprises a home view and a channel view, and the first layer is further configured to organize and simplify access to lower level functions. According to another embodiment of the invention, the visual representations comprise a lower layer relative to the first layer and include lower level functions. According to another embodiment of the invention, the plurality of views includes a home view organizing a plurality of visual representations of digital content, wherein the home view is displayed responsive to a computer system configuration. According to another embodiment of the invention, the computer system configuration comprises a physical positioning of the computer system about a longitudinal axis of rotation. According to another embodiment of the invention, the computer system configuration further comprises a physical positioning of a computer system display relative to a base of the computer system. According to another embodiment of the invention, the home view comprises a header display and a body display. According to another embodiment of the invention, the header display comprises a lateral bar extending from the left of the computer display screen to the right of the computer display screen. According to another embodiment of the invention, the user interface further comprises a search tool displayed in the header display, wherein the search tool is configured to accept search terms entered by a user and in response to execution, causes the computer system to navigate to a view of a first visual representation of digital content, wherein the digital content includes a search engine, and the search engine presents results for the search terms.

According to one embodiment of the present invention, the user interface further comprises a storage component configured to retain a previous view state. According to another embodiment of the invention, the execution component is further configured to cause the computer system to transition to a previous view in response to execution of a navigation element by a user. According to another embodiment of the invention, the user interface further comprises a navigation element disposed in the header display.

According to another embodiment of the invention, the body display is rendered below the header display in the display screen of the computer system. According to another embodiment of the invention, the body comprises an organization of the plurality of visual representations of computer content rendered on the computer display. According to another embodiment of the invention, the user interface further comprises a display threshold for a screen rendered in the computer display. According to another embodiment of the invention, the home view is configured into pages based on the display of the computer system and the display threshold. According to another embodiment of the invention, the display threshold establishes a maximum number of visual representations display per page of the home view. According to another embodiment of the invention, the user interface further comprises an indication of visual representations displayed on adjacent pages of the home view, wherein the indication is display within the body of the home view.

According to one embodiment of the present invention, the user interface further comprises a nascent card displayed in the body of the home view, wherein the nascent card is configured to permit generation of additional visual representations of digital content. According to another embodiment of the invention, the execution component is further configured to execute a process for creating a visual representation in response to execution of the nascent card, wherein the process for creating a visual representation includes acts of transitioning to a quick access view, generating a mapping to online digital content, executing the mapping, and displaying a first view of the mapped digital content. According to another embodiment of the invention, the user interface further comprises a quick access view, wherein the quick access view is configured to permit user generation of a mapping between digital content and a visual representation. According to another embodiment of the invention, the quick access view permits a user to select from a display of frequently accessed web content to generate the mapping. According to another embodiment of the invention, the quick access view permits a user to select from a display of stored bookmarks to generate the mapping. According to another embodiment of the invention, the quick access view permits a user to enter a url to generate the mapping.

According to another embodiment of the invention, the plurality of views includes a channel view, and the view selector component is further responsive to an integrated scroll wheel on the computer system. According to another embodiment of the invention, the view selector component is further configured to transition the computer system to the channel view in response to manipulation of the integrated scroll wheel.

According to one embodiment of the present invention, the channel view further comprises a channel selector. According to another embodiment of the invention, the channel selector comprises a display of a sequence of visual representations presenting a channel content mode. According to another embodiment of the invention, the display of the sequence of visual representations is responsive to manipulation of the integrated scroll wheel, and manipulation of the integrated scroll wheel causes the computer system to render a next visual representation in the display of the sequence of visual representations. According to another embodiment of the invention, the visual representations are responsive to execution by a selector, including a button. According to another embodiment of the invention, the button is available in a plurality of computer system configurations. According to another embodiment of the invention, the execution component is further configured to cause the computer system to transition to the first view including the digital content in response to execution of the selector by a user.

According to another embodiment of the invention, the user interface further comprises a storage component configured to retain a current computer system configuration state. According to one embodiment of the present invention, the storage component is further configured to retain a current view state. According to another embodiment of the invention, the execution component is further configured to transition the computer system display between the plurality of views, responsive to at least one of the current computer system configuration state and the current view state. According to another embodiment of the invention, the execution component is configured to transition to a channel view in response to manipulation of an integrated scroll wheel, when the computer system is in a laptop and an easel configuration. According to another embodiment of the invention, the user interface further comprises a scroll wheel threshold configured to require additional manipulations of the integrated scroll in order to cause the transition to the channel view, when the current computer system configuration state indicates the computer system is in a laptop configuration. According to another embodiment of the invention, the execution component is further configured to transition from the first view and a home view to a channel view in response to a change in computer system configuration state from laptop to easel.

According to one aspect of the present invention, a method for presenting a customized user interface for a computer system with a plurality selectable I/O profiles to a user is provided. The method comprises displaying a a map based graphical user interface on the computer system, the act of displaying the map based user interface includes acts of displaying a plurality of views of a plurality of visual representations of computer content, wherein the computer content includes at least one of selectable digital content, selectable computer operations and passive digital content, and displaying the plurality of visual representations of computer content rendered on the computer display, wherein the plurality of visual representations of computer content include an association to a first view of the plurality of views, the first view including the computer content, and wherein the each of the plurality of visual representations is responsive to focus and execution, wherein execution includes clicking on the visual representation, and executing, by a computer processor, a transition in the computer system display between the plurality of views, wherein the act of executing includes an act of selecting one of the plurality of views for display on a computer system in response to a computer system configuration.

According to one embodiment of the present invention, the act of executing occurs in response to an act of permitting execution of at least one of a computer system operation, a visual representation, a computer system configuration, and a change in computer system configuration. According to another embodiment of the invention, the method further comprises an act of displaying a plurality of modes of content for the computer content on the computer display, wherein the plurality of modes of content comprise at least one of a web content mode, a channel content mode, a media content mode, an application content mode, a communication content mode, and a passive content mode.

According to one embodiment of the present invention, the plurality of views are configured to organize modes of content into different views. According to another embodiment of the invention, the web content mode is configured to display web based content for proximal viewing by a user, wherein the channel content mode is configured to display web based content for non-proximal viewing by a user, wherein the media content mode is configured to display media based content for non-proximal viewing by a user mode, wherein the application content mode is configured to display computer applications for use by a user, wherein the communication content mode is configured to display computer configuration operations for viewing by a user, and wherein the passive content mode is configured to display web based content for non-proximal viewing without user interaction. According to another embodiment of the invention, in the plurality of views includes a home view and a channel view, and the method further comprises acts of organizing a plurality of content modes into the home view; and organizing at least one of a single content mode and a two content modes into the channel view. According to another embodiment of the invention, the plurality of views includes a screen saver view, and the method further comprises an act of organizing selected content modes for passive viewing in the screen saver view.

According to one embodiment of the present invention, the plurality of views includes a home view, and the method further comprises organizing a plurality of visual representations of digital content into the home view, wherein the home view is displayed responsive to a computer system configuration, displaying the home view in response to a computer system configuration, wherein the act of displaying the home view includes an act of displaying a header display and a body display in the home view, wherein the header display comprises a lateral frame extending from the left of the computer display screen to the right of the computer display screen, and wherein the body display is rendered below the header display in the display screen of the computer system.

According to another embodiment of the invention, the computer system configuration comprises a physical positioning of the computer system display relative to a base of the computer system about a longitudinal axis of rotation. According to another embodiment of the invention, the method further comprises displaying a search tool in the header display, accepting entry of search terms through an I/O device, navigating to a view of a first visual representation of computer content, wherein the computer content includes a search engine, and the search engine presents results for the search terms, in response to an act of executing the search tool. According to another embodiment of the invention, the method further comprises an act of storing in a computer memory a previous view state.

According to another embodiment of the invention, the method further comprises acts of displaying a navigation element in the header display, permitting execution of the navigation element by a user, and transitioning the computer system display to a previous view, in response to the act of permitting.

According to one embodiment of the present invention, the home view further comprises at least one display page and the method further comprising acts of displaying the plurality of visual representations of computer content rendered on the computer display in the body display, and displaying a maximal number of visual representations in a display page of the home view. According to another embodiment of the invention, the method further comprises displaying an indication of visual representations displayed on adjacent display pages in the home view, wherein the indication is displayed within the body of the home view. According to another embodiment of the invention, the method further comprises acts of displaying a nascent card in the body of the home view, permitting execution functionality associated with the nascent card, and generating an additional visual representations of digital content in response to execution of the functionality associated with the nascent card. According to another embodiment of the invention, the method further comprising act of executing a process for creating a visual representation in response to execution of the functionality associated with nascent card, wherein the process for creating a visual representation includes acts of transitioning to a quick access view, generating a mapping to online digital content, executing the mapping, and displaying a first view of the mapped digital content.

According to one embodiment of the present invention, the method further comprises acts of displaying a quick access view, permitting a user to select a source of digital content in the quick access view, and generating a mapping between the source of digital content and a visual representation in response to an act of selecting a source of digital content. According to another embodiment of the invention, the plurality of views includes a channel view, and the act of executing a transition occurs in response an act of activating an integrated scroll wheel on the computer system. According to another embodiment of the invention, the method further comprises an act of displaying a channel selector including an act of displaying a sequence of visual representations. According to another embodiment of the invention, the act of displaying the sequence of visual representations is responsive to manipulation of the integrated scroll wheel, and the method further comprises and act of displaying a next visual representation from the sequence of visual representations, in response to manipulation of the integrated scroll wheel. According to another embodiment of the invention, the method further comprises an act of storing in a computer memory a current computer system configuration state and a current view state. According to another embodiment of the invention, the act of executing, by a computer processor, a transition in the computer system display the execution component, includes an act of transitioning the computer system display between the plurality of views, responsive to at least one of the current computer system configuration state and the current view state.

According to one embodiment of the present invention, the transition occurs to a channel view in response to manipulation of an integrated scroll wheel, when the computer system is in a laptop and an easel configuration. According to another embodiment of the invention, the transition occurs from at least one of the first view and a home view to a channel view in response to a change in computer system configuration state from laptop to easel.

According to one aspect of the present invention, a computer-readable medium having computer-readable signals stored thereon that define instructions that, as a result of being executed by a computer, instruct the computer to perform the method for presenting a customized user interface for a computer system with a plurality selectable I/O profiles to a user as described above.

According to one aspect of the present invention, a system for presenting a customized user interface for a system with a plurality selectable I/O profiles is provided. The system comprises a first user interface component configured to display a plurality of views of a plurality of visual representations of computer content, wherein the computer content includes at least one of selectable digital content, selectable computer operations and passive digital content, a second user interface component configured to display the plurality of visual representations of computer content on the computer display, wherein the plurality of visual representations of computer content include an association to a first view of the plurality of views, the first view including the computer content, and wherein the each of the plurality of visual representations is responsive to focus and execution, wherein execution includes clicking on the visual representation, and an execution component configured to execute a transition in the computer system display between the plurality of views, wherein the execution component further comprises a view selector component act configured to select one of the plurality of views for display on a computer system in response to a computer system configuration. According to one embodiment of the present invention, the execution component is further configured to transition between the plurality of views in response to execution of at least one of a computer system operation, a visual representation, a computer system configuration, and a change in computer system configuration. According to another embodiment of the invention, the second user interface component is further configured to display a plurality of modes of content for the computer content rendered on the computer display, wherein the plurality of modes of content comprise at least one of a web content mode, a channel content mode, a media content mode, an application content mode, a communication content mode, and a passive content mode. According to another embodiment of the invention, the plurality of views are configured to organize modes of content into different views. According to another embodiment of the invention, the web content mode is configured to display web based content for proximal viewing by a user, wherein the channel content mode is configured to display web based content for non-proximal viewing by a user, wherein the media content mode is configured to display media based content for non-proximal viewing by a user mode, wherein the application content mode is configured to display computer applications for use by a user, wherein the communication content mode is configured to display computer configuration operations for viewing by a user, and wherein the passive content mode is configured to display web based content for non-proximal viewing without user interaction.

According to one embodiment of the present invention, the first user interface component is further configured to display a home view configured to organize a plurality of content modes, and a channel view configured to organize at least one of a single content mode and two content modes. According to another embodiment of the invention, the plurality of views includes a screen saver view configured to organize selected content modes for passive viewing. According to another embodiment of the invention, the first user interface component is further configured to display a home view organizing a plurality of visual representations of digital content, wherein the home view comprises a header display and a body display, and wherein the header display comprises a lateral frame extending from the left of the computer display screen to the right of the computer display screen, wherein the body display is rendered below the header display in the display screen of the computer system. According to another embodiment of the invention, the system is configured to permit selection of a computer system configuration, and the computer system configuration comprises a physical positioning of the computer system display relative to a base of the computer system about a longitudinal axis of rotation. According to another embodiment of the invention, the first user interface component is further configured to display a search tool in the header display, wherein the search tool is configured to accept search terms entered by a user, and wherein the execution component is further configured to causes the computer system to navigate to a view of a first visual representation of digital content, wherein the digital content includes a search engine, and the search engine presents results for the search terms in response to execution of the search tool.

According to one embodiment of the present invention, the system further comprises a storage component configured to retain a previous view state. According to another embodiment of the invention, the execution component is further configured to cause the computer system to transition to a previous view in response to execution of a navigation element by a user. According to another embodiment of the invention, the first user interface component further comprises a display of the navigation element in the header display. According to another embodiment of the invention, the body display comprises an organization of the plurality of visual representations of computer content rendered on the computer display, and the home view further comprises display pages in response to a display threshold establishing a maximal number of visual representations displayed per display page. According to another embodiment of the invention, the home view further comprises an indication of visual representations displayed on adjacent display pages of the home view, wherein the indication is displayed within the body of the home view. According to another embodiment of the invention, the second user interface component further comprises a nascent card displayed in the body of the home view, wherein the nascent card is configured to permit generation of additional visual representations of digital content. According to another embodiment of the invention, the execution component is further configured to execute a process for creating a visual representation in response to execution of the nascent card, wherein the process for creating a visual representation includes acts of transitioning to a quick access view, generating a mapping to online digital content, executing the mapping, and displaying a first view of the mapped digital content.

According to one embodiment of the present invention, the first user interface component further comprises a quick access view, wherein the quick access view is configured to permit user generation of a mapping between digital content and a visual representation. According to another embodiment of the invention, the plurality of views includes a channel view, and the view selector component is further responsive to an integrated scroll wheel on the computer system. According to another embodiment of the invention, the view selector component is further configured to transition the computer system to the channel view in response to manipulation of the integrated scroll wheel.

According to another embodiment of the invention, the channel view further comprises a channel selector comprising a display of a sequence of visual representations presenting a channel content mode. According to another embodiment of the invention, the display of the sequence of visual representations is responsive to manipulation of the integrated scroll wheel, and manipulation of the integrated scroll wheel causes the computer system to render a next visual representation in the display of the sequence of visual representations. According to another embodiment of the invention, the system further comprises a storage component configured to retain a current computer system configuration state and a current view state. According to another embodiment of the invention, the execution component is further configured to transition the computer system display between the plurality of views, responsive to at least one of the current computer system configuration state and the current view state. According to another embodiment of the invention, the execution component is configured to transition to a channel view in response to manipulation of an integrated scroll wheel, when the computer system is in a laptop and an easel configuration. According to another embodiment of the invention, the execution component is further configured to transition from the first view and a home view to a channel view in response to a change in computer system configuration state from laptop to easel.

According to one aspect of the present invention, a computer implemented method for interpreting on-line executable operations into streamlined operations is provided. The method comprises the acts of receiving electronic content through a communication interface, presenting electronic content to a user through a graphical user interface, permitting selection of at least one executable operation provided within the electronic content through the graphical user interface, identifying at least one executable operation that performs a local access operation, transforming the at least one executable operation into a remote access operation, in response to identification of the at least one executable operation. According to one embodiment of the present invention, the local access operation is configured to request local storage of electronic content. According to another embodiment of the invention, the local access operation is further configured to request storage to a local mass media storage device. According to another embodiment of the invention, the local access operation includes executable instructions that cause a computer system to download electronic content to local memory.

According to one embodiment of the present invention, the executable instructions cause a computer system to download electronic content to a mass media storage device. According to another embodiment of the invention, transforming the at least one executable operation into a remote access operation includes redirecting the executable operation into a request for access to remote storage. According to another embodiment of the invention, the method further comprises an act of identifying a remote service. According to another embodiment of the invention, the method further comprises an act of providing at least one of a device profile and a user profile. According to another embodiment of the invention, the method further comprises an act of configuring access to a remote service.

According to one embodiment of the present invention, the act of configuring access to a remote service includes an act of establishing an account name and password for the remote service. According to another embodiment of the invention, the method further comprises an act of storing the account name and password for the remote service as part of at least one of a device profile and a user profile. According to another embodiment of the invention, the remote service includes at least one of a computer based content storage service, a photo management service, a document management service, an audio file management service, a video management service, a web development service, an email service, a code storage service, social networking service, and an online service which includes remote storage capabilities. According to another embodiment of the invention, the method further comprises an act of identifying a type of electronic content that is the object of the local access operation. According to another embodiment of the invention, the method further comprises an act of selecting a remote service based at least in part on the identification of the electronic content.

According to one embodiment of the present invention, the method further comprises an act of providing a remote service profile. According to another embodiment of the invention, the method further comprises an act of identifying a file type associated with the remote service. According to another embodiment of the invention, an act of providing a default remote service profile. According to another embodiment of the invention, the default remote service profile is associated with all file content types, and is further associated with a data storage capability. According to another embodiment of the invention, the method further comprises an act of associating a computer based operation with a remote service.

According to one embodiment of the present invention, the computer based operation includes at least one of file storage, photo management, photo distribution, document management, document distribution, social networking communication, social networking management, social networking display, audio file management, audio distribution, audio file display, audio file playback, video management, video display, video playback, video distribution, web development, web page display, web page communication, email management, email distribution, email reading, email communication, code management, code storage, code maintenance, and an online operation which includes remote storage. According to another embodiment of the invention, the method further comprises an act of associating a remote service profile with at least one of a device profile and a user profile. According to another embodiment of the invention, transforming the at least one executable operation into a remote access operation, in response to identification of the at least one executable operation includes the acts of accessing at least one of the device profile and the user profile, and identifying at least one remote service based on at least one of the requested at least one executable operation and a file type referenced by the executable operation.

According to one embodiment of the present invention, the method further comprises acts of selecting at least one remote service, redirecting the at least one executable operation to the remote service. According to another embodiment of the invention, the act of selecting at least one remote service includes acts of displaying the at least one remote service to the user, and permitting selection of the at least one remote service by the user. According to another embodiment of the invention, the method further comprises an act of accessing a size threshold for the at least one executable operation that performs a local access operation. According to another embodiment of the invention, accessing the size threshold for the at least one executable operation that performs a local access operation includes an act of accessing at least one of a user profile, a device profile, a remote service profile, and a default profile. According to another embodiment of the invention, the at least one of a user profile, a device profile, a remote service profile, and a default profile specifies a file size limitation. According to another embodiment of the invention, the method further comprises an act of determining compliance with the size threshold.

According to one embodiment of the present invention, the act of transforming the at least one executable operation into a remote access operation includes creating a navigational link to content associated with the at least one executable operation, and transmitting the navigational link through an electronic message instead of performing the at least one executable operation, in response to a determination that the size threshold has been exceeded. According to another embodiment of the invention, the at least one executable operation includes at least one of a download operation and a print operation. According to another embodiment of the invention, the method further comprises an act of displaying an interface to a user in response to selection of at least one executable operation. According to another embodiment of the invention, selection of the at least one executable operation includes resolving computer focus on the at least one executable operation and hovering over a visual indicator of the at least one executable operation.

According to one embodiment of the present invention, the method further comprises an act of permitting the user to select a remote service to receive content associated with the at least one executable operation. According to another embodiment of the invention, the method further comprises an act of accessing at least one of a device profile, a user profile, a remote service profile, and a default profile to populate the interface with a plurality of remote services available to the user. According to another embodiment of the invention, the method further comprises an act of ordering the plurality of remote services based on at least one of a file type and computer operation associated with the remote service.

According to one aspect of the present invention, a computer-readable medium having computer-readable signals stored thereon that define instructions that, as a result of being executed by a computer, instruct the computer to perform the computer implemented method for interpreting on-line executable operations into streamlined operations as described above. According to one aspect of the present invention, a streamlined computer device is provided. The device comprises a communication component configured to receive electronic content, a display component configured to render electronic content to a user, an I/O component configured to permit selection, by the user, of at least one executable operation provided within the electronic content through the graphical user interface, wherein the at least one the executable operation includes at least one of a download operation, a save operation, and a print operation, a transformation component, including at least one software module and at least one hardware element, configured to identify at least one executable operation that performs a local access operation, wherein the transformation component is further adapted to redirect the at least one executable operation into to a remote service, in response to identification of the at least one executable operation. According to one embodiment of the present invention, the local access operation is configured to request local storage of electronic content. According to another embodiment of the invention, the local access operation is further configured to request storage to a local mass media storage device. According to another embodiment of the invention, the local access operation includes executable instructions that cause a computer system to download electronic content to local memory including a mass storage device.

According to one embodiment of the present invention, transformation component is further configured to transform the at least one executable operation into a remote access operation, and redirect the executable operation into a request for access to remote storage. According to another embodiment of the invention, the streamlined computer device further comprises an identification component configured to identify a remote service stored in at least one of a device profile and a user profile. According to another embodiment of the invention, the streamlined computer device further comprises a configuration component configured to store an account name and password for the remote service as part of at least one of a device profile and a user profile. According to another embodiment of the invention, the remote service includes at least one of a computer based content storage service, a photo management service, a document management service, an audio file management service, a video management service, a web development service, an email service, a code storage service, social networking service, and an online service which includes remote storage capabilities.

According to one embodiment of the present invention, the streamlined computer device further comprises an interpreter component configured to identify type of electronic content that is the object of the local access operation; and select a remote service based at least in part on the identification of the electronic content. According to another embodiment of the invention, transformation component is further configured to access a remote service profile including a file type associated with the remote service. According to another embodiment of the invention, the default remote service profile is associated with all file content types, and is further associated with a data storage capability.

According to another embodiment of the invention, the transformation component is further configured to associate a computer based operation with a remote service, wherein the computer based operation includes at least one operation of file storage, photo management, photo distribution, document management, document distribution, social networking communication, social networking management, social networking display, audio file management, audio distribution, audio file display, audio file playback, video management, video display, video playback, video distribution, web development, web page display, web page communication, email management, email distribution, email reading, email communication, code management, code storage, code maintenance, and an online operation which includes remote storage.

According to one embodiment of the invention, the transformation component is further configured to access at least one of a device profile, a remote profile, and a user profile; and identify at least one remote service based on at least one of the requested at least one executable operation and a file type referenced by the executable operation. According to another embodiment of the invention, the transformation component is configured to select at least one remote service, and redirect the at least one executable operation to the remote service. According to another embodiment of the invention, the streamlined computer device further comprises a display component configured to display the at least one remote service to the user in an interface and permit selection of the at least one remote service by the user through the interface.

According to one aspect of the present invention, a method for streamlining user interaction with electronic content is provided. The method comprises the acts of identifying multiple user accounts associated with an online service, displaying the multiple user accounts to a user in a selectable interface rendered in a computer display, providing for a default selection of a user account, submitting the selected account information to the online service automatically, in response to selection of a user account. According to one embodiment of the present invention, the method further comprises an act of resolving computer focus on the selectable interface. According to another embodiment of the invention, the method further comprises an act of removing the selectable interface from the display in response to loss of computer focus. According to another embodiment of the invention, the method further comprises an act of selecting the default user account in response to the closing the selectable interface occurring with out an account selection. According to another embodiment of the invention, the default user account does not contain any user account information. According to another embodiment of the invention, the method further comprises an online service profile associated with an online service provider.

According to one embodiment of the present invention, the method further comprises an act of storing account information as part of the online service profile. According to another embodiment of the invention, the act of identifying multiple user accounts associated with an online service includes an act of accessing an online service profile. According to another embodiment of the invention, the method further comprises an act of permitting selection of at least one of the multiple user accounts responsive to manipulation of a scroll wheel and button.

According to one aspect of the present invention, a computer-readable medium having computer-readable signals stored thereon that define instructions that, as a result of being executed by a computer, instruct the computer to perform the method for streamlining user interaction with electronic content as described above.

According to one aspect of the present invention, a computer system for streamlining user interaction with electronic content is provided. The system comprises a remote communication interface configured to access online content, a storage component configured to store access information for online content sources, a selection component configured to display to a user selection options for the online content source based on stored access information, and a submission component for submitting stored access information to the online content source. According to another embodiment of the invention, the storage component is configured to store a plurality content sources and a plurality of access information associated with each content source.

According to one aspect of the present invention, a method for pre-configuring a streamlined device is provided. The method comprises permitting submission of an order for a streamlined device, requesting a data mining operation be perform on a computer system of the recipient of the streamlined device, executing, automatically, a data mining operation on the recipient's computer system, in response to permission, configuring the streamlined device, according to information obtained from the data mining operation.

According to one embodiment of the present invention, the method further comprises an act of identifying a home computer for an intended recipient of the streamlined device. According to another embodiment of the invention, the method further comprises an act of communication, over a computer based communication network, an executable file configured to perform the data mining operation. According to another embodiment of the invention, the executable file is communicated to a home computer of an intended recipient of the streamlined device. According to another embodiment of the invention, the act of requesting a data mining operation be performed on a computer system of the purchaser, includes an act of obtaining at least one of browsing history on a home computer, web page bookmark information, system configuration, system communication, accessed online service providers, and account information for service providers.

According to one embodiment of the present invention, the act of configuring the streamlined device, according to information obtained from the data mining operation, includes an act of generating a visual representation of electronic content with mappings to at least one of the web locations indicated by mined information. According to another embodiment of the invention, the act of configuring the streamlined device, according to information obtained from the data mining operation, includes an act of generating at least one visual representation of electronic content with mappings to web content selected based on demographic information indicated by the mined data. According to another embodiment of the invention, the act of configuring the streamlined device, according to information obtained from the data mining operation, includes an act of generating at least one of a web card, channel card, and system card associated with at least one of a web bookmark location, a frequently accessed web site, and a recently accessed web site.

According to another embodiment of the invention, the act of configuring the streamlined device, according to information obtained from the data mining operation, includes an act of configuring the streamlined device with network settings obtained from the recipient's computer system. According to another embodiment of the invention, the network settings include information associated with a wireless network configured on the recipient's computer system.

According to one embodiment of the present invention, the method further comprises an act of evaluating data received in response to the data mining operation. According to another embodiment of the invention, evaluating includes analysis of referenced web content, and a determining of a visual representation appropriate to map to the referenced web content. According to another embodiment of the invention, the visual representation comprises at least one of a web card and channel card. According to another embodiment of the invention, the evaluating includes an act of identifying web services accessed from the recipient's computer, and configuration includes generation of visual representations that map to the identified web service, and storing the visual representations on the streamlined device. According to another embodiment of the invention, configuration further includes an act of storing information associated with access to the identified web service.

According to one aspect of the present invention, a computer-readable medium having computer-readable signals stored thereon that define instructions that, as a result of being executed by a computer, instruct the computer to perform the method for configuring a streamlined device for out of the box operation as described above.

According to one aspect of the present invention, a system for pre-configuring a streamlined device is provided. The method comprises an order component configured to accept submission of an order for a streamlined device, a communication component configured to transmit an executable file to a computer system of a recipient of the streamlined device, wherein the executable file is configured to accumulate configuration data, wherein the communication component is further configured to accept the accumulated configuration data, and a configuration component configured to customize the streamlined device according to accumulated configuration data, wherein the configuration component is further configured to generate a visual representation of digital content mapped to an online source identified in the accumulated configuration data.

According to one embodiment of the present invention, the accumulated configuration data includes at least one of browsing history, web page bookmark information, system configuration, system communication, accessed online service providers, and account information for service providers. According to another embodiment of the invention, the configuration component is further configured to generating a visual representation of electronic content with mappings to at least one of a web location identified in the accumulated configuration data. According to another embodiment of the invention, the visual representation comprises at least one of a web card and channel card.

According to one embodiment of the present invention, the configuration component is further configured to customize the streamlined device with network settings obtained from the recipient's computer system, wherein the network settings include information associated with a configured wireless network.

According to one embodiment, a portable computer is configurable between various modes, including a closed mode, a laptop mode, an easel mode, a flat mode and a frame mode. The portable computer may comprise a display component including a display screen, a base, and a hinge assembly at least partially housed within the base and configured to pivotably couple the display component to the base. The display component may be rotatable about a longitudinal axis running along an interface between the display component and the base. In the closed mode, the display screen may be disposed substantially against the base, and rotating the display component about the longitudinal axis up to approximately 180 degrees from the closed mode may configure the portable computer into the laptop mode. Rotating the display component about the longitudinal axis beyond approximately 180 degrees axis from the closed mode may configure the portable computer into the easel mode.

In one example of the portable computer, the display component is rotatable about the longitudinal axis up to approximately 320 degrees from the closed mode. In another example, the portable computer comprises a display orientation module that displays content on the display screen in one of a plurality of orientations relative to the longitudinal axis. The orientation of the displayed content may be dependent on the current display mode of the portable computer, or may be configurable responsive to a user input. The portable computer may further comprise a mode sensor which detects a current display mode of the portable computer, and the display orientation module may display content on the display screen in an orientation dependent on the current display mode detected by the mode sensor. Depending on the hinge assembly used, the longitudinal axis may comprises multiple parallel axes, and the hinge assembly may be configured to permit rotation of the display component about any of the multiple parallel axes to configure the portable computer between the plurality of display modes.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 20A is a block diagram of one example of a view of digital media content including an example content control, according to aspects of the invention;

FIG. 32A-C are screen shots illustrating examples of a graphical user interface showing web page views, according to aspects of the invention;

FIG. 35A-B are screen shots illustrating examples of a graphical user interface showing a web page view, according to aspects of the invention;

FIG. 43A-B are flow diagrams of example processes for generating a user interface element, according to aspects of the invention;

DETAILED DESCRIPTION

Figure 1:
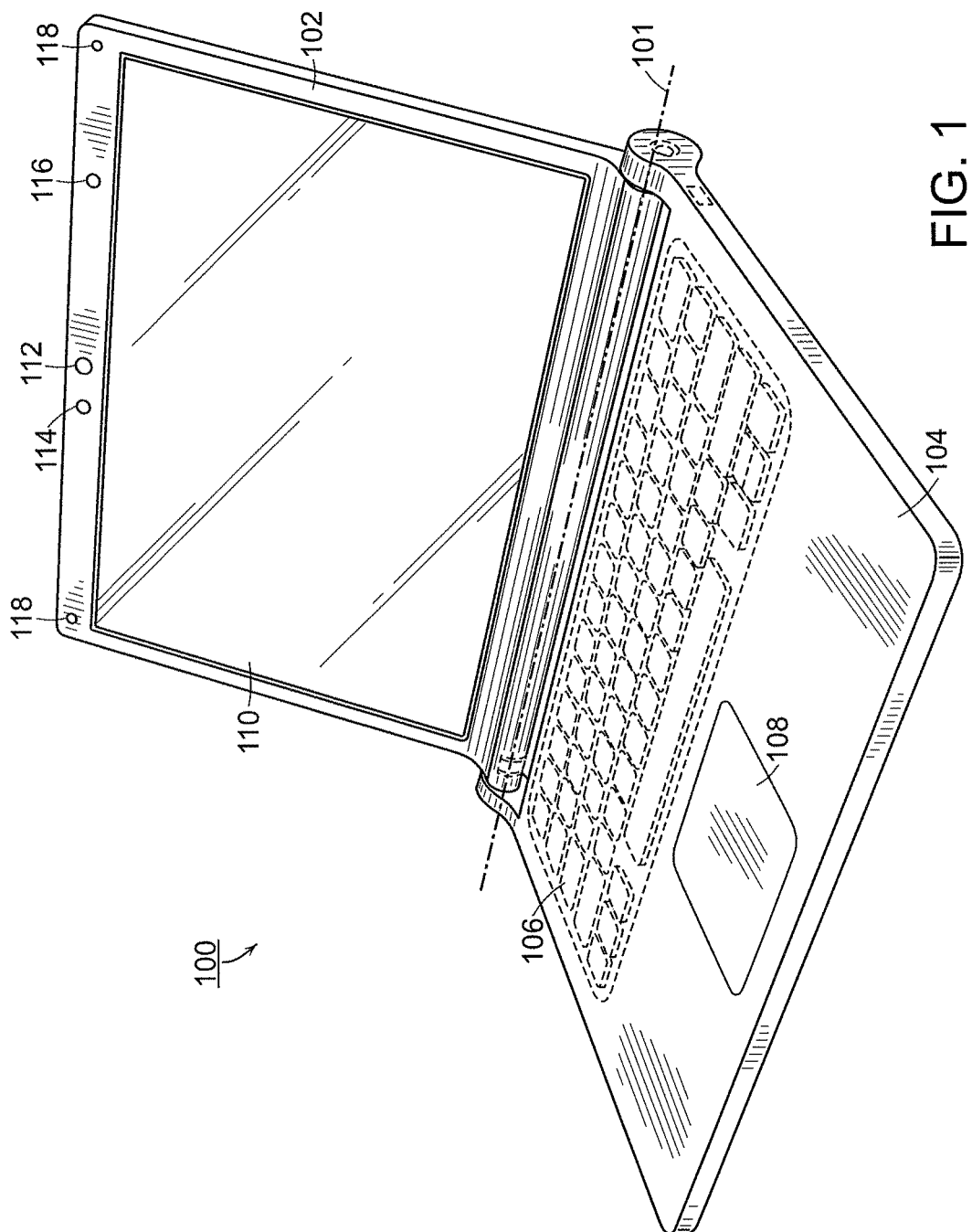
FIG. 1 is an illustration of one example of a portable computer, according to aspects of the invention, in a "laptop" configuration.

Synergy between services providers can be found and exploited by even the most novice user through streamlined computer systems and user interface presentation. According to one aspect, the interplay between various third party services and computer features can be readily appreciated by even a novice user because the various functionality and features sets are easily accessible through the streamlined access controls and consistent user interfaces. In particular, methods and apparatus are provided to facilitate users leveraging online digital media services offered by third party service providers, as discussed in detail below. For example, aspects and embodiments may allow users to create and manage a digital photography library by providing tools to upload content to an Internet "cloud" and to consume aggregated content from the cloud on their computing device, as discussed further below.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

According to one embodiment, methods and apparatus are provided for creating and managing digital media libraries and, in particular, online digital media libraries. The digital media libraries may include, for example, digital photograph collections, digital video collections, digital music collections, etc. The tools and capability for creating and managing these digital media libraries are provided via a computing device, for example, a streamlined device, having a graphical user interface, as discussed below. For example, various aspects may be implemented as specialized software executing in one or more computer systems. In one embodiment, the digital media content (e.g., the photographs, videos and/or audio files) are stored online, and the graphical user interface provides the user with access to services, including online storage of digital media, and features offered by third party service providers, as discussed below.

One example of a streamlined device includes a portable computer that is configurable between a laptop mode (in which the portable computer has a conventional laptop appearance) and an easel mode in which the base of the computer and its display component stand upright forming an inverted "V," as discussed further herein. Certain aspects and embodiments are directed to a portable computer that is configurable between different operating modes, including a laptop mode (in which the portable computer has a conventional laptop appearance), a flat mode, a frame mode, and an easel mode in which the base of the computer and its display component stand vertically forming an inverted "V," as discussed further herein. Reference to modes of the computer, modes of the device and intended to include the physical configuration of the portable computer/device. The portable computer is capable of different display formats and functionality in the different modes, and includes a graphical user interface that may work seamlessly with the computer hardware to provide a unified, comfortable, holistic user experience.

Referring to FIG. 1, there is illustrated one example of a portable computer according to aspects of the invention upon and using which methods and apparatus for managing digital media content may be implemented. In FIG. 1, the portable computer 100 is illustrated in the "laptop" mode, with the display component 102 inclined at a viewing angle from the base 104. The display component 102 is pivotably coupled to the base 104 by a hinge assembly (not shown) that allows the display component to be rotated with respect to the base. The hinge assembly may include a single or multiple hinges, which may be any of a variety of hinge types, including, but not limited, to single-axis hinges, multiple-axis hinges, geared hinges, etc. In one example, the hinge assembly allows the display component 102 to be rotated (or tilted) about a longitudinal axis 101 running along an interface between the display component 102 and the base 104, as illustrated in FIG. 1 and discussed further below. The base 104 includes a keyboard 106 and internal electronic components (not shown), such as a central processing unit, memory, and other components necessary to operate the portable computer, as known to those skilled in the art. In some embodiments, the base 104 may also include a touch pad 108 or trackball (not shown) for receiving user commands, as known to those skilled in the art.

In one embodiment, the display component 102 includes a display screen 110, and may also include a camera 112, microphone 114, and infrared receiver 116, as discussed further below. It is to be appreciated that the locations of the camera 112, microphone 114 and infrared receiver 114 are not limited to the example illustrated in FIG. 1, and may be placed in other locations on the display component 102 and/or base 104, as would be recognized by those skilled in the art. The display component 102 may also include cushions 118 that provide soft contact points between the base 104 and the display component 102 when the portable computer is closed. In one example, the cushions 118 are made of rubber. However, it is to be appreciated that the invention is not so limited, and the cushions 118 may comprise materials other than rubber, including, for example, a polymer, felt, or other suitable materials as would be recognized by those skilled in the art.

Figure 2:
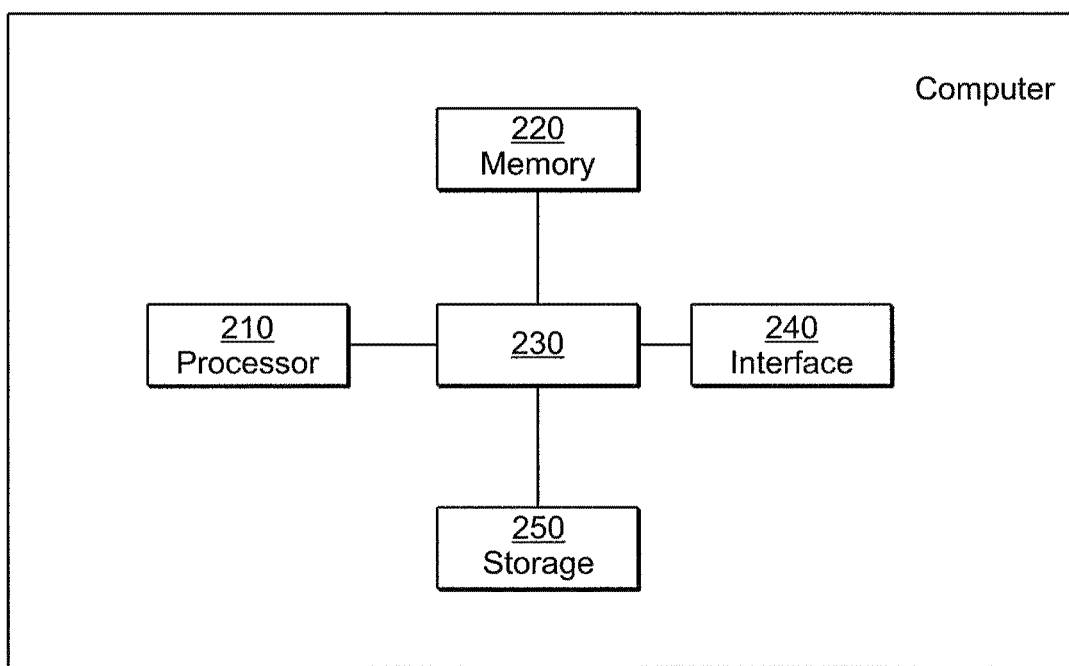
FIG. 2 is a block diagram of one example of a computer system.

FIG. 2 illustrates a block diagram of some components of an example of the portable computer 100, in which various aspects of the present invention may be practiced. For example, various aspects of the invention may be implemented as specialized software executing in one or more computer systems including multiple computer systems communicating over network. As depicted in FIG. 2, the computer 100 includes a processor 210, a memory 220, an interface 240 and a storage system 250. Components of the portable computer 100 may be coupled by an interconnection element 230. The interconnection mechanism 230 enables communications (e.g., data, instructions) to be exchanged between system components of the computer system 100. The interconnection mechanism 230 may include one or more physical busses (for example, busses between components that are integrated within a same machine), or may include any communication coupling between system elements including specialized or standard computing bus technologies such as IDE, SCSI, PCI and InfiniBand. In one example, computer system 100 is implemented without hard drive devices.

The processor 210, which may include one or more microprocessors or other types of controllers, can perform a series of instructions that result in manipulated data. The processor 210 may be a commercially available processor such as an Intel PENTIUM, Motorola PowerPC, SGI MIPS, Sun UltraSPARC, or Hewlett-Packard PA-RISC processor, but may be any type of processor or controller as many other processors and controllers are available. The processor may also execute an operating system that manages at least a portion of the hardware elements included in computer 100. The operating system may be, among others, a Windows-based operating system (for example, Windows NT, Windows 2000 (Windows ME), Windows XP, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system. As shown, the processor 210 is connected to other system elements, including a memory 220, by the interconnection mechanism 230.

The memory 220 may be used for storing programs and data during operation of the computer system 200. Thus, the memory 220 may be a relatively high performance, volatile, random access memory such as a dynamic random access memory (DRAM) static memory (SRAM), or Flash memory; however, the memory 220 may include any device for storing data, including a non-volatile storage device. Various embodiments in accord with the present invention can organize the memory 220 into particularized and, in some cases, unique structures to perform the aspects and functions disclosed herein.

Still referring to FIG. 2, the computer 100 also includes one or more interface devices 240 such as input devices, output devices and combination input/output devices. The interface devices 240 may receive input and/or provide output. More particularly, output devices may render information for external presentation. Input devices may accept information from external sources. Examples of interface devices include, among others, the keyboard 106, mouse devices, trackballs, microphone 114, touch screens, printing devices, display screen 110, speakers, network interface cards, etc. The interface devices 240 allow the computer system 200 to exchange information and communicate with external entities, such as users and other systems.

The storage system 250 may include a computer readable and writeable nonvolatile storage medium in which instructions are stored that define a program to be executed by the processor. The storage system 250 also may include information that is recorded, on or in, the medium, and this information may be processed by the program. The instructions may be persistently stored as encoded signals, and the instructions may cause a processor to perform any of the functions described herein. The medium may, for example, be a flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage 250 as shown, or in memory system 220. The processor 210 generally manipulates the data within the memory 220, and then copies the data to the medium associated with storage 250 after processing is completed. A variety of mechanisms are known for managing data movement between the medium and integrated circuit memory element and the invention is not limited thereto. The invention is not limited to a particular memory system or storage system.

In one embodiment, the computer system does not incorporate mass storage (i.e. a hard drives), instead the system is configured to employ RAM and Flash memory storage. The capacity of the flash memory may be significantly less than traditional mass storage options. Thus in some embodiments, traditional features such a download, have been configured to operate differently for the computer 100. According to another aspect, various operations provides on conventional systems are adapted for streamlined processing. In on example, operations that require large amounts of computer storage are transformed into remote storage requests. In one embodiment, a streamlined device is configured to identify local storage request and transform them into a storage request to an on-line service provider identified in a user and/or device profile. In another embodiment, the system prompts a user to identify a service provider in response to a local request. Various operations may be transformed, including download and print operations, among others.

The computer system may include specially-programmed, special-purpose hardware, for example, an application-specific integrated circuit (ASIC). Aspects of the invention may be implemented in software executing on hardware, hardware or firmware, or any combination thereof. Further, such methods, acts, systems, system elements and components thereof may be implemented as part of the computer system described above or as an independent component.

Although the portable computer 100 is shown by way of example as one type of computer system upon which various aspects and functions may be practiced, aspects of the invention are not limited to being implemented on the computer system as shown in FIGS. 1 and 2. Various aspects and functions in accord with the present invention may be practiced on one or more computers having a different architectures or components than those shown in FIG. 2.

Computer system 100 may programmable using a high-level computer programming language. Computer system 100 may be also implemented using specially programmed, special purpose hardware. The processor 210 and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. In one embodiment, an Internet cloud is maintained on server systems accessible from a plurality of devices. These components may be executable, intermediate (e.g., IL) or interpreted (e.g., Java) code which communicate over a communication network (e.g., the Internet) using a communication protocol (e.g., TCP/IP). It should be appreciated that the invention is not limited to executing on any particular system or group of systems. Also, it should be appreciated that the invention is not limited to any particular distributed architecture, network, or communication protocol.

According to one embodiment, streamlining user interactions with the computer system/device includes representing computer based content in visual representations that render computer operations/behavior in a consistent manner. These visual representations may be rendered as cards, as discussed in more detail below. Different types of cards may be employed to render different types of available content. For example, web based content, may be rendered as a web card that is associated with a mapping to web content. Some web cards map directly to web pages and in response to selection of the web card the computer device executes the mapping and displays a web view of the content. Other cards may be used to provide interactive displays selectable by a user. In another example, system operations are displayed as system cards, which are associated with mappings to system operations, for example communications configurations, and may comprise a settings card, among other system options. Another type of card includes a channel card configured to stream web based content in a manner that allows for summarization of content, while still providing the ability to fully appreciate the summarized content.

Using channel cards according to aspects and embodiments, summarized content may be presented in a manner that permits appreciation and interaction with the summarized content itself. In another example, channel card are configured to present a streamlined view that cannot only be appreciated and interacted, but may be transitioned from one mode of viewing to another without loss of the ability to appreciate and interact with the streamlined view. A more detailed discussion of embodiments and examples of a card-based system for rendering computer based content in visual representations is discussed in U.S. patent application Ser. No. 12/416,479, filed on Apr. 1, 2009 and entitled "SYSTEM AND METHOD FOR STREAMLINING USER INTERACTION WITH ELECTRONIC CONTENT," which is incorporated herein by reference in its entirety.

As discussed above, according to one embodiment, methods and apparatus are provided for managing digital media libraries via, for example, the computer 100. In one example, the computer 100 includes a streamlined graphical user interface that provides access to the digital media libraries. According to another embodiment, there is a community aspect to the digital media libraries, which includes sharing of digital content, configurations and customizations between users. In particular, sharing may involve the transmission of user interface elements to other users. In one example, a user may share a card and any of its configurations with another user. Access to the shared user interface elements, in some embodiments, facilitates communal computer usage. Content and context retention by user interface elements that can be shared provides unique advantages to the users of the streamlined devices, as discussed further below.

Figure 3:
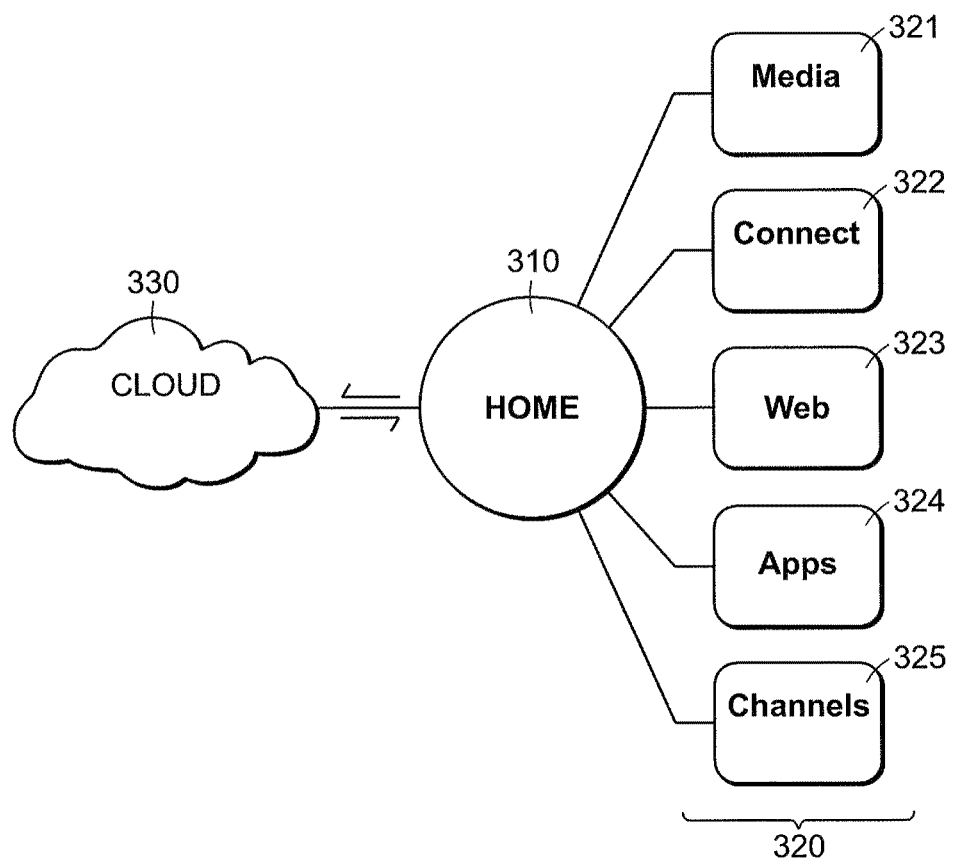
FIG. 3 is a block diagram of one example of a computer user interface architecture, according to aspects of the invention.

Referring to FIG. 3, there is illustrated a block diagram of one example of an architecture of the portable computer 100 including a streamlined user interface. The user interface includes a "home" screen 310 that displays a plurality of modes of content 320. In the illustrated example, the home screen 310 contains five modes of content 320; however, it is to be appreciated that the home screen may include more or fewer than five modes of content and that the modes of content may differ from the examples discussed below. According to one example, the modes of content 320 accessible via the home screen 310 may include "media" 321, "connect" 322, "web" 323, "applications" 324, and "channels" 325. Using the streamlined user interface, also referred to as a "map" interface, information, programs, features and applications may be grouped into the various modes of content 320. By selecting any mode of content 320, the user may access the content organized within that mode. For example, the media mode 321 may provide access to a media player to play, view, search and organize digital media such as music, video, photos, etc. The web mode 323 may provide access to internet browsing and searching. The channels mode 325 may provide access to different functionality of the portable computer, with the different functions or features defined as different channels. For example, a channel may include a "photo frame" channel in which the portable computer may be configured to display a preselected image or set of images, etc. from a digital media library. Some or all of the modes of content 320 may access, retrieve and/or store information on an Internet cloud 330.

From the home screen 310, the user may navigate among the different modes of content 320 and, once a particular mode of content is selected, may navigate within that mode of content. In one example, the home view 310 is comprised of various cards, each card providing access to computer based content. According to one aspect, cards can be thought of as the building blocks of the user interface, providing access to a plurality of views and/or content. Indeed, cards as elements of the graphical user interface, are configured to be shared across users and across other streamlined devices. The ability to employ the features and functions of card based elements may be limited to streamlined devices, although cards and settings may be shared with traditional devices.

Figure 4:
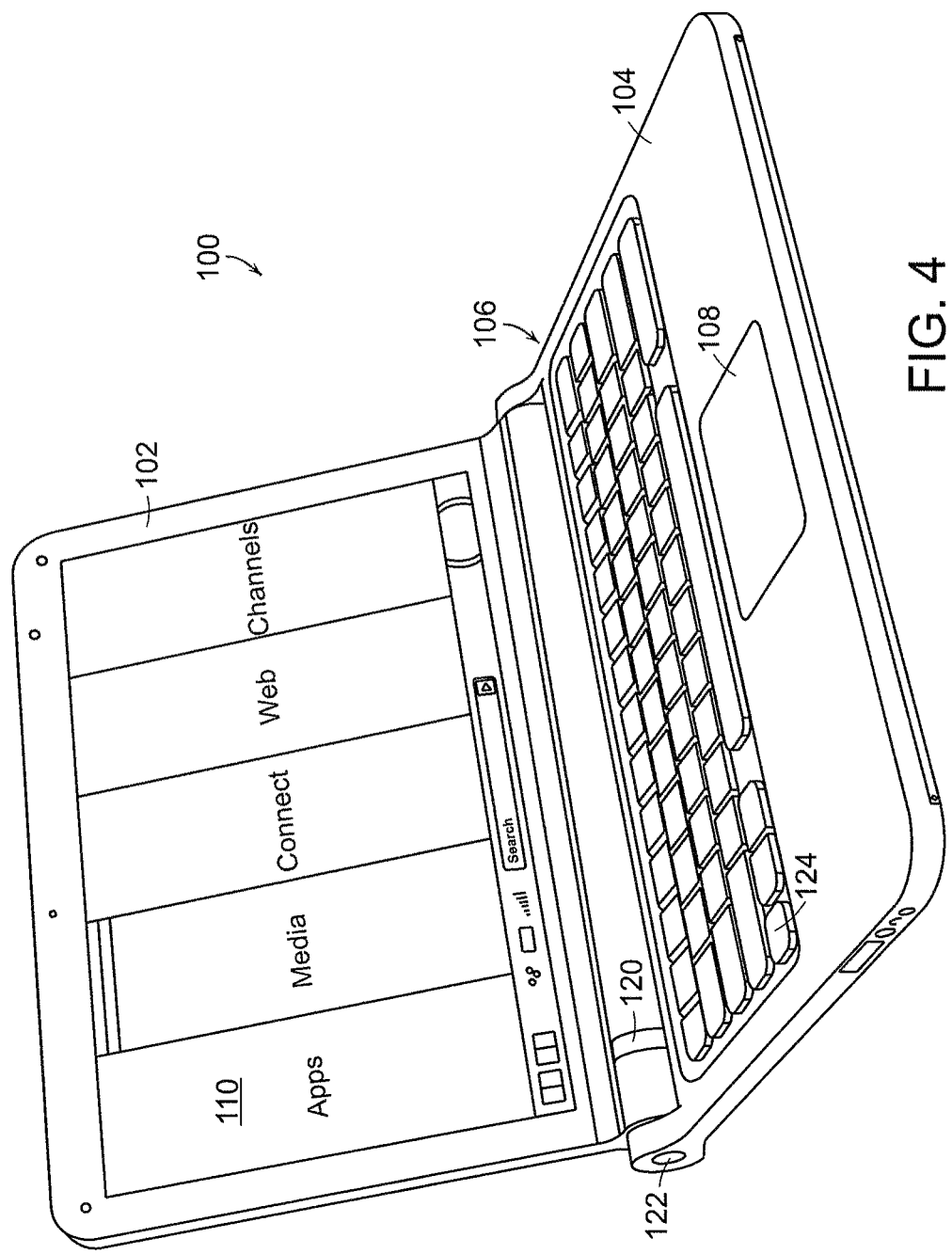
FIG. 4 is an illustration of another example of a portable computer, according to aspects of the invention.

Navigation from the home view in and among different modes of content may be accomplished using traditional interfaces, such as the keyboard 106, touchpad 108, a mouse, trackball, joystick, or other interface device. In one embodiment, the portable computer 100 may include additional navigation devices, including a scroll wheel and one or more navigation buttons, as shown, for example, in FIG. 4. In the example illustrated in FIG. 4, the portable computer 100 includes a scroll wheel 120 and two navigation buttons 122, 124. In one example, the scroll wheel 120 is positioned, as shown in FIG. 4, such that it is rotatable about the longitudinal axis 101 (see FIG. 1) running along the interface between the display component 102 and the base 104. According to one embodiment, the portable computer 100 is configurable into various different configuration modes including the laptop mode shown in FIGS. 1 and 4, and an "easel" mode in which the base 104 and the display component 102 stand upright forming an inverted "V," as discussed further below. Accordingly, positioning the scroll wheel 120 on the longitudinal axis 101 may have certain advantages, including providing accessibility to the scroll wheel in the different configuration modes of the portable computer; however, it is to be appreciated that the scroll wheel may be placed in any convenient or suitable location on the portable computer, not limited to the position shown in FIG. 4. Similarly, positioning the navigation button 122 on the side of the base 104, as shown in FIG. 4, may also provide accessibility in the different configuration modes of the portable computer 100; however it is to be appreciated that the navigation button 122 may be placed in a variety of locations, not limited to the location illustrated in FIG. 4.

As discussed above, in one example, the media mode of content 321 may provide access to a media player to play, view, search and organize digital media such as music, video, photos, etc. Thus, a user may use the media mode of content 321 to create and manage digital media libraries including, for example, collections of digital photographs. According to one embodiment, methods, tools and interfaces are provided to allow users to store, organize, edit, view and share digital photograph collections, as well as video and/or audio collections. These collections may be presented to the user as if stored on local storage associated with the portable computer 100; however, as discussed above, in at least some examples, the digital media content is stored remotely in the cloud 330 (see FIG. 3). Therefore, the portable computer software may include the ability to interact with third party online service providers, as discussed further below. In addition, as discussed above, in one example, the portable computer 100 includes a camera 112 and therefore, methods, tools and interfaces may be provided to allow the user to take and manage photographs and/or video using the camera 112. The portable computer 100 may also be configured to allow an external digital camera (not shown) to be connected to the computer, such that the user may extract photographs and/or videos from the external camera, to store, manage and share using the computer, as discussed further below.

According to one embodiment, the computer 100 is integrated with remote content storage and/or access in the cloud 330. The integration may be provided through third party service providers, in one example photo service FLICKR is integrated with various aspects of the device and/or the device's user interface to provide seamless access to photo content stored by the third party provider. Thus, digital content items, such as photographs, videos, etc. may be displayed on the portable computer, as discussed below, but stored remotely. The integration with remote storage services permits reduced storage capacity on the user device, for example, a portable computer. Reducing and/or eliminating the need for non volatile memory in the computer system is advantageous in that the device itself may be reduced in complexity and any associated cost. In some embodiments, a streamlined device do not incorporate a hard disk drive for storage, providing for any local storage requirement through RAM and Flash memory.

Content may be added to the user's digital medial library in a variety of different ways. For example, digital content items added to the user's account with any online hosting service (e.g., FLICKR, SHUTTERFLY, etc.) the user has registered with the portable computer 100 may be automatically added to the user's digital media library. If a person shares an album with the user via a registered online hosting service, and subsequently updates the shared album to include new items, the new items may be automatically added to the user's digital media library. The user may add content items, such as photographs, directly from web pages using, for example, a "save image" control in the web browser toolbar. In one example, clicking and holding on a particular image on a web page opens a contextual menu providing options for the user to save one or more photographs. For example, clicking a "save multiple photos" option in the contextual menu may prompt the user to click on all displayed images that he/she wishes to save and then click a "done" or "save" control to complete the action. The user may similarly save photographs from an email. As discussed above, in one embodiment, the portable computer 100 does not include local mass storage; instead the digital media content items are stored by an online hosting service. Accordingly, saving of photos from a web page or email may be implemented through the hosting service. The user may also add content items by uploading them from a camera, card reader or USB device, as discussed further below. In one example, the portable computer 100 may be pre-loaded with a selection of stock images that automatically appear in the user's digital media library. The user may delete these stock images; however, if the user's digital media library eve becomes empty, the stock images may be automatically re-added to the library.

According to one embodiment, collections of digital content items, including photographs and videos, may be displayed in any of a plurality of different views. These views may include a time view, an album view, a page view, an intermediate view, and a lens view, each of which is discussed further below. Each view may offer the user particular interaction options, features and benefits, as also discussed below. In the time view, an entire digital media library may be displayed with content items arranged chronologically, regardless of whether or not the content items (e.g., individual photographs or videos) have been assigned to an album. In the album view, individual albums of content items may be displayed. In the album view, those content items not assigned to an album are not displayed. The time view and the album view may be considered the "workhorses" of the digital media aspect of the portable computer 100, allowing a user to quickly and easily locate individual content items and perform actions, such as, share content with others, create channels, and order photograph prints from online service providers. The lens view may offer the user a variety of interactions with the digital media content, as discussed further below. In one example, for some photograph editing functions, such as correcting red-eye, cropping, adjusting contrast, etc., interfaces to online service providers may be supplied, allowing the user to leverage existing features of their online photograph service provider.

Figure 5:
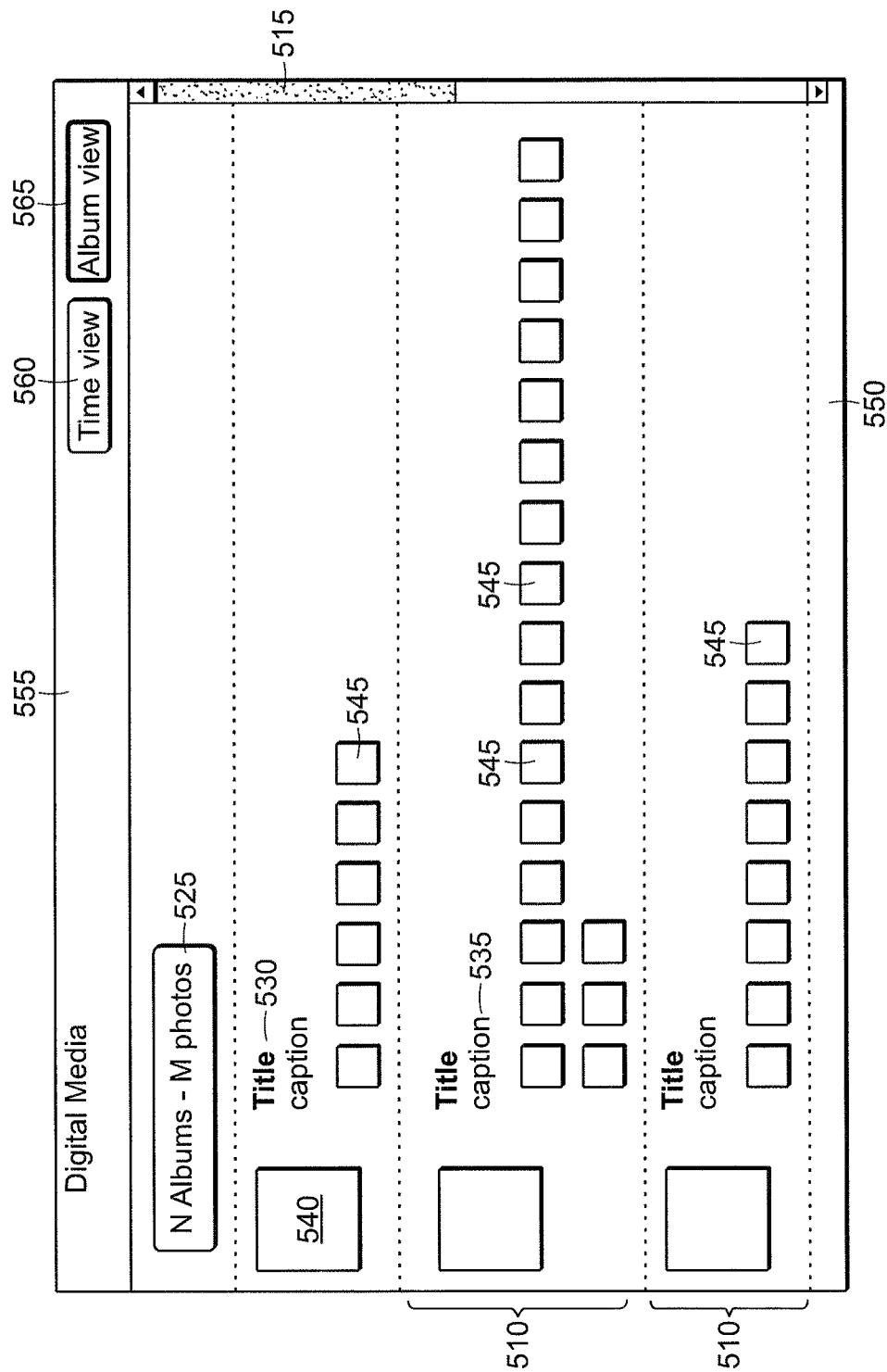
FIG. 5 is a block diagram of one example of a view of digital media content, according to aspects of the invention.

Referring to FIG. 5, there is illustrated a block diagram of one example of an album view. In the album view, the screen may include a body portion 550 in which the albums are displayed, and a header 555. In the illustrated example, in the album view, the albums 510 are displayed as a list in the body portion 550, with a scroll bar 515 that allows the user to scroll down to see additional albums that do not fit within the page view. In one example, the list of albums may be sorted by earliest photograph creation date, with the newest on top; however, it will be readily appreciated that numerous other organizations of the albums 510 are possible. A header caption 525 identifies the number of albums present and the total number of photographs contained within the albums. In one example, each album 510 includes a title 530 that identifies the album. The title 530 may be created by the user and may be descriptive of the photographs contained within the album. Each album 510 may also include a caption 535 that identifies information about the album. For example, the caption 535 may indicate the number of photographs in the album as well as the date range of the photographs in the album. For each album 510 there may be displayed a preview photograph 540, which may be, for example, a photograph selected by the user (e.g., a representative or favorite photograph), or a default selected photograph, for example, the first photograph in the album. Each photograph in the album may be displayed as a thumbnail 545. In the header 555, there may be displayed user-selectable "buttons" 560, 565 which allow the user to select between the time view and the album view, for example, by clicking (e.g., using a mouse, the touchpad, the scroll wheel, or a navigation button) on the button corresponding to the desired view.

According to one embodiment, the album view allows the user to access and view albums of their own photographs, as well as albums shared with them by other users, for example, through an online photo-sharing service. As discussed above, in one embodiment, only photographs (or other digital content items) that have been assigned an album by the user will be displayed in the album view. The computer 100 may include software that automatically creates a default album for any unsorted/unassigned photographs found on the computer. In one example, this default album is not displayed in the album view. Many online photo hosting services require the use of albums and do not allow a photo to be saved to the service without being assigned to an album. However, this requirement may not be meaningful to users who are used to having many photographs in the real world which are not associated with an album. Accordingly, the digital media system may automatically create the default album to store otherwise unsorted content items.

Still referring to FIG. 5, the thumbnails 545 provide the user with a preview of the individual photographs contained in the album. In one embodiment, when the user "hovers" over a particular thumbnail 545, the preview photograph 540 changes to display that thumbnail. The thumbnail may also increase slightly. Hover indicates the movement of a pointer, typically represented by a white arrow on the computer system display, over a particular item on the display screen, such as a thumbnail 545.

Figure 6:
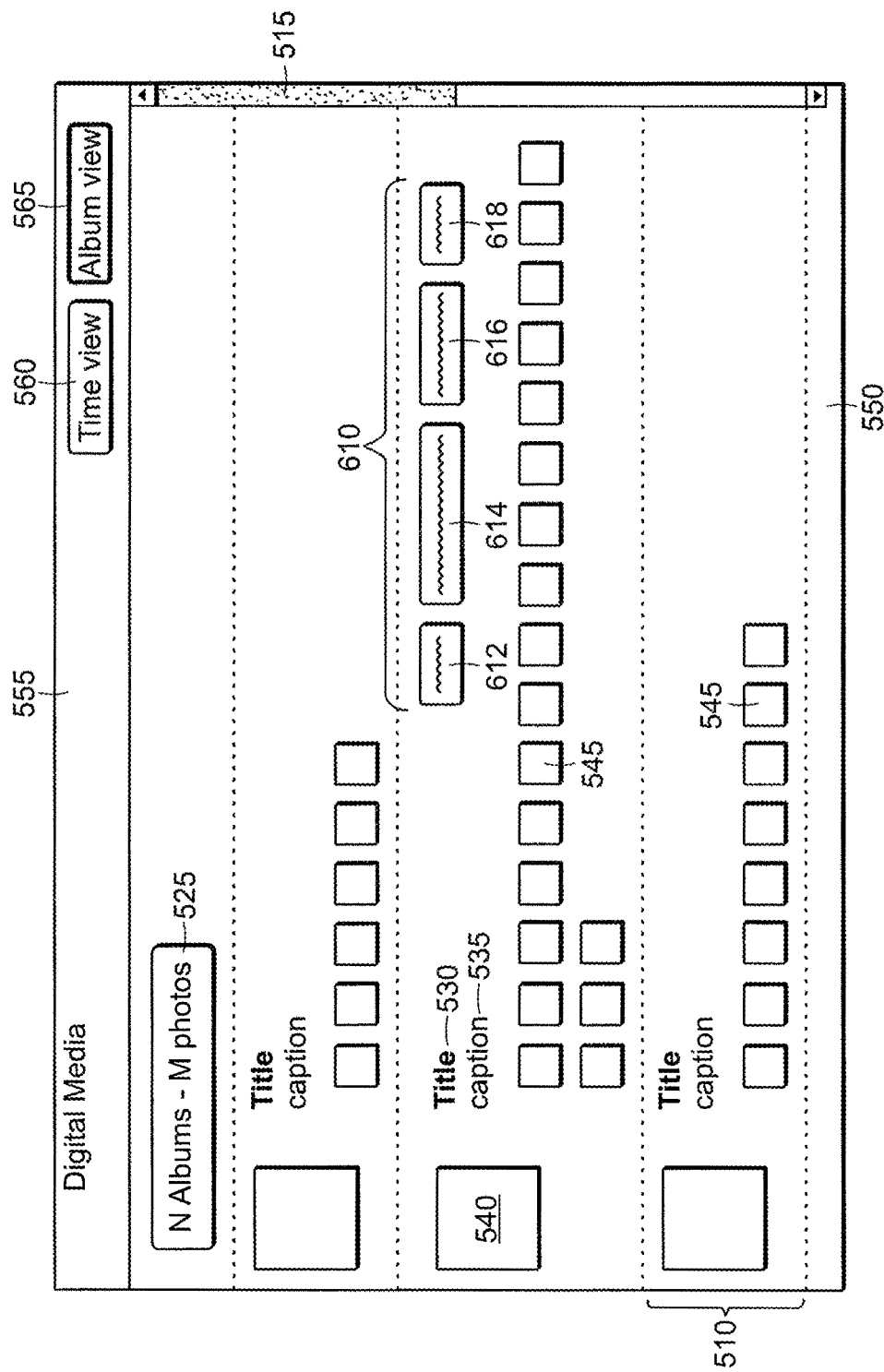
FIG. 6 is a block diagram of another example view of digital media content with responsive controls, according to aspects of the invention.

In one example, when the user hovers over a thumbnail, album controls may appear, as shown in FIG. 6. Referring to FIG. 6, the album controls 610 may include options to share an album (e.g., control 612), and to edit the album using a third party service provider (e.g., control 614). In one example, albums that are shared from within the album view may be shared as channel cards, but may also appear in the recipient's album view. As discussed above, in one example in which the photographs are stored on the cloud 330 (see FIG. 3), using a third party service provider website (for example, FLICKR; SHUTTERFLY; SNAPFISH, etc.), the control 614 for editing the album may automatically display the name of the service provider. If selected (e.g., clicked on) by the user, the edit control 614 may automatically open a web card to the album on the service where it is stored. In one example, the edit control 614 may only appear for albums of the users own photographs, and not for albums that have been shared with the user by another user, for which the user may not have editing privileges. The album controls 610 may also include a control 616 for "dissolving" the album and a control 618 for deleting the album. Selecting the dissolve control 616 may remove the album, but retain the album contents in the user's digital media library. If the user selects the delete album control 618, the album and its contents may be deleted from the user's digital media library, after a warning/confirmation message is displayed to the user. In one example, if the user selects the share control 612 to share an album with another person, any changes the user has made to the album (e.g., removing a content item) are retained when the other person views the shared album.

Figure 7A:
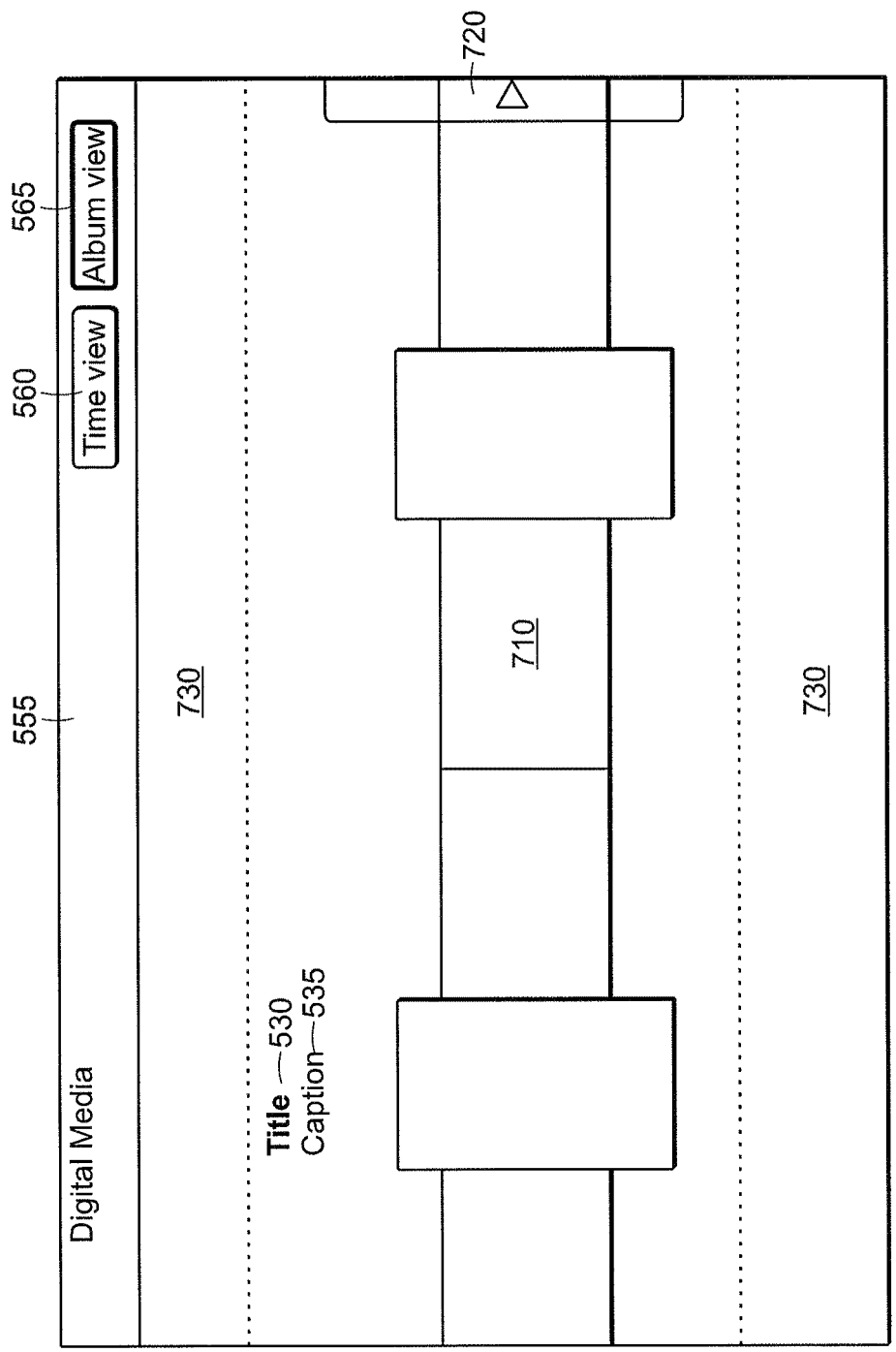
FIGS. 7A-B are block diagrams of examples of single album views of digital media content, according to aspects of the invention.
Figure 7B:
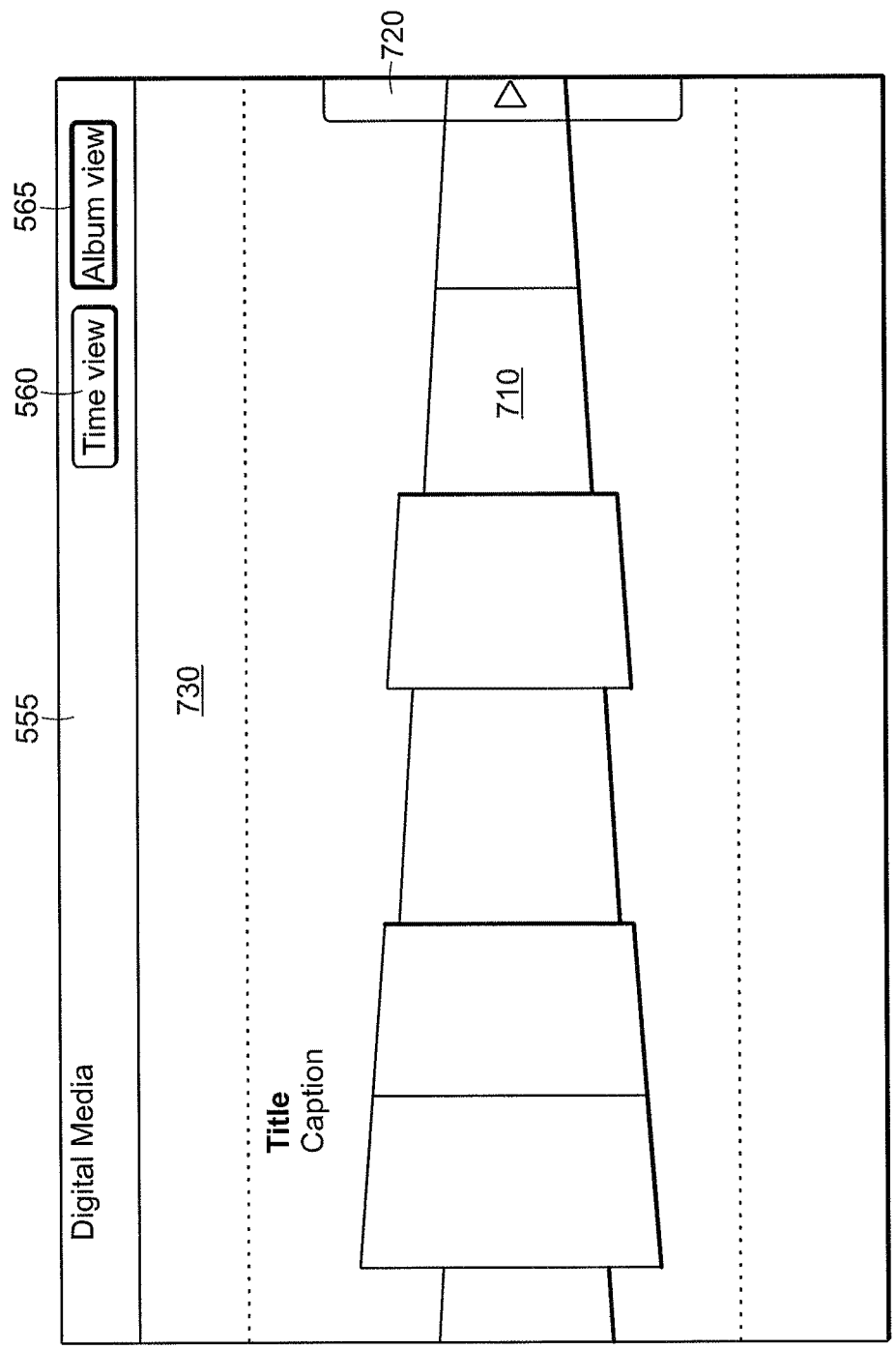

According to one embodiment, when the user clicks on (or otherwise selects) an individual photograph thumbnail 545, or on the preview photograph 540 in a particular album 510, a single album view may be displayed. In one example of the single album view, the album thumbnails 545 in the selected album 510 grow larger and arrange themselves in a horizontal list, as shown in FIG. 7A. In the single album view illustrated in FIG. 7A, the user sees larger previews 710 of the photographs in the selected album. The user may navigate back and forth among the items in the album by hovering over the left or right edges of the list, optionally over a scroll indicator 720, to scroll the list of preview images 710. In one example, the speed of the scrolling depends on where the cursor is in the active area. For example, the closer the cursor is to the edge of the screen, the faster the scroll. In one embodiment, when the user is scrolling left or right through the album, the horizontal list of previews 710 tilts to show perspective, as shown in FIG. 7B. In one example, in the tilted view, the images scroll automatically and the speed of the scrolling action corresponds to the maximum scrolling speed that would be available manually, e.g., if the cursor were as close to the edge of the screen as possible. In another example, the degree of tilt corresponds to the scrolling speed. For example, the more tilted the view, the faster the scroll. A scroll indicator 720 may indicate the direction of the scroll. Clicking on an individual item in the single album view may zoom that item into an intermediate view, as discussed further below. In the intermediate view, the user may still see hints of the other images in the album in the background, thus providing context for the zoomed-in item. Clicking on the item in the intermediate view may enlarge the item into a full screen view, as discussed further below.

In one embodiment, clicking on the background 730 returns the user to the album view shown in FIG. 5. In one example, the background 730 includes the users other albums. Thus, clicking on the background may mean clicking on another album; however, even in this case, clicking on the other album in the background 730 may still return the user to the album view, rather than to a single album view of the clicked-on album in the background. This may simply navigation for the user, particularly where the majority of the background belongs to other albums, such that if clicking on one of the background albums jumped to that album, the user would find it difficult to return to the overall album view of FIG. 5.

Figure 8:
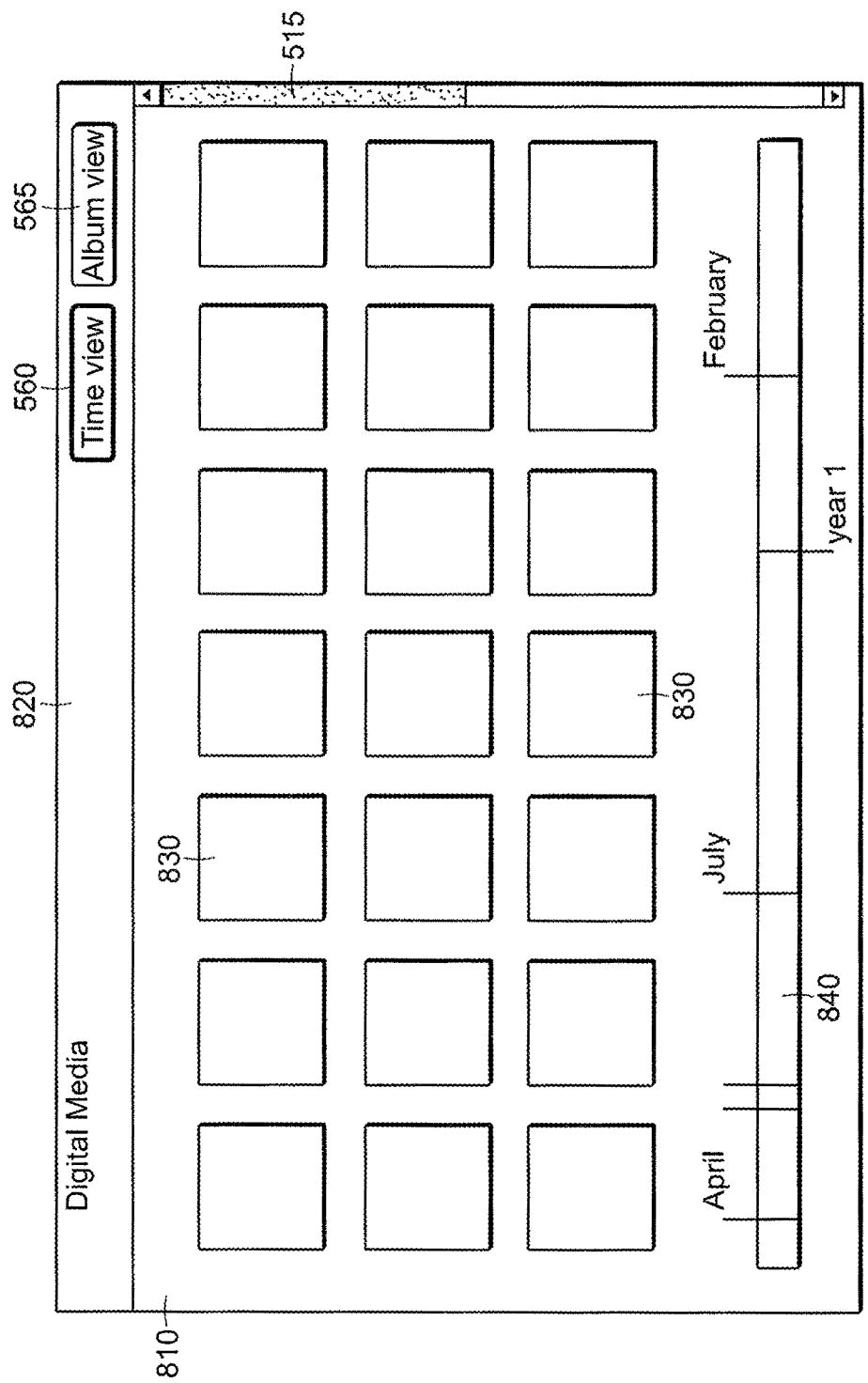
FIG. 8 is a block diagram of one example of a view of digital media content, according to aspects of the invention.

As discussed above, an alternative to the album view is the time view. According to one embodiment, in the time view, the entire contents of the user's digital media library is displayed, even if items are not organized into albums. The digital content items in the digital media library may be arranged chronologically (e.g., in the order they were taken for photos and videos) in columns from top to bottom, left to right, or in rows from left to right, top to bottom. It is to be appreciated that other arrangements of the digital content items may also be implemented. An example of the time view is illustrated in FIG. 8. Similar to the album view, the time view may comprise a body portion 810 and a header 820. As shown in FIG. 8, in the body portion 810 of the time view, preview images 830 of each item in the digital media library is displayed. As discussed above, the preview images are arranged in columns and rows. A timeline 840 may supply a navigation control that allows the user quick access to the content in the digital media library and a visual indication of the number of items in the library. In one embodiment, the digital content items in the user's digital media library are stored, using a service offered by a third party service provider (e.g., FLICKR, SHUTTERFLY, SNAPFISH, etc.) in the cloud 330 (see FIG. 3). Thus, the preview images displayed in the time view may be visual representations of remotely stored content.

Figure 9:
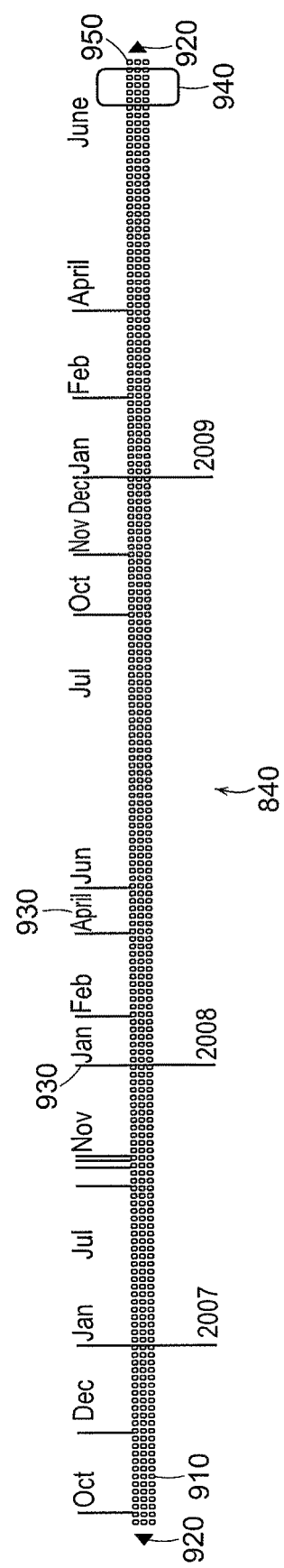
FIG. 9 is an illustration of an example component of a view of digital media content, according to aspects of the present invention.

Referring to FIG. 9, there is illustrated an example of the timeline 840 that may be displayed in the time view. In the illustrated example, the timeline includes three rows of tick marks 910 that correspond to the three rows of preview images 830 displayed in the body portion 810 of the time view illustrated in FIG. 8. It is to be appreciated, however, that the preview images 830 may be displayed in any number of rows, not limited to three rows, and therefore, the timeline 840 may include any corresponding number of rows of tick marks 910, not limited to three rows. Scroll controls 920 may be provided to allow the user to scroll through the timeline using a cursor. In one example, superimposed over the timeline 840 are markers 930 for individual months and years, as shown in FIG. 9. In addition, the timeline may include a "handle" 940 which indicates the section of timeline that corresponds to the preview images 830 displayed in the body portion 810. In one example, clicking anywhere on the timeline 840 moves the handle 940 to that point in time and changes the display of preview images 830 accordingly. According to one embodiment, the timeline 840 is not linear. Instead, the length between tick marks 910 on the timeline corresponds to the number of digital content items in the digital media library for that period of time. Thus, the spacing between markers 930 for different months or years may provide a visual indication of the number of content items in that month or year. For example, if the media library contains 300 content items (e.g. photographs and/or videos) for March 2007 and 100 content items for April 2007, the space allocated to March 2007 on the timeline 840 may be three times greater than the space allocated to April 2007.

The timeline 840 may also provide a visual indication of new content recently added to the digital media library. For example, when another person shares an album with the user, or when the user uploads new photographs and/or videos from a camera, a new content indicator 950 may be displayed in the timeline 840. In one example, the new content indicator 950 includes highlighting or changing the color of the tick marks 910 corresponding to the newly added content items. The new content indicator 950 may persist for a predetermined time period, or until the user acknowledges the new content. For example, when an album is shared with the user, the new content indicator 950 may persist until the user acknowledges the shared card notification, as discussed further below. In another example, when the user uploads new content to the library, the new content indicator 950 may persist until the user closes/cancels an "upload complete" notification, as also discussed further below.

There may be multiple ways in which a user can navigate in the time view. For example, if the user hovers over the left or right edge of the timeline 840, the timeline may scroll to reveal more of the timeline. In one example, if this scrolling causes the handle 940 to bump against the edge of the visible timeline, the handle remains on the edge and the content in the body 810 displayed changes accordingly. In this manner, the handle 940 is always visible. As discussed above, clicking on the timeline 840 may bring the user directly to the corresponding time frame. In one example, if the user clicks on the timeline 840, thereby jumping to a new point in time, a brief animation, such as the "wall" of preview images 830 in the body 810 tilting and scrolling, may be displayed. The user may also click on and drag the handle 940 to scroll through the preview images 830. In one example, clicking and dragging the handle 940 will similarly cause the wall of preview images 830 to tilt and scroll. As discussed above with reference to the album view, the degree of tilt may correspond to the speed of the scroll, and the direction of the tilt may correspond to the direction of the scroll.

Figure 10:
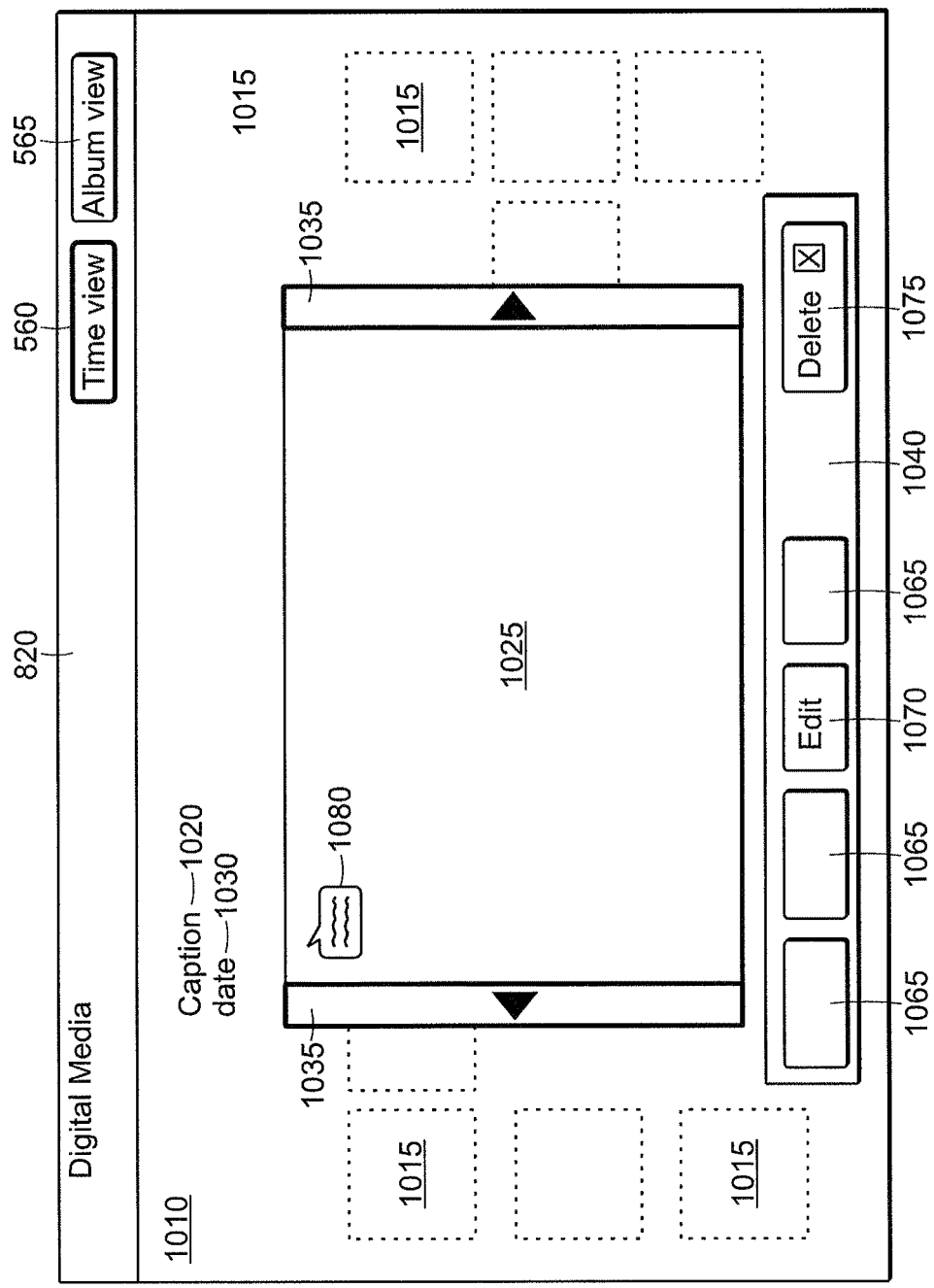
FIG. 10 is a block diagram of one example of a view of digital media content, according to aspects of the invention.

As discussed above with reference to the single album view, clicking on a particular preview image 710 or 830 may cause the display to navigate to the intermediate view. In one example, in the intermediate view, the selected image is enlarged and comes to the foreground of the screen, while the remaining preview images 710, 830, recede into the background. Referring to FIG. 10, in one example, the unselected preview images slide left and right so that a few may be seen at the edges of the screen, providing context for the selected image, as discussed above. The enlarging of the selected image and receding of the remaining images may be animated, providing the user with a visual experience as the view changes to the intermediate view. To return to the previous view, i.e., either time view or single album view, the user may click anywhere on the background 1010, even on one of the receded images 1015.

Referring to FIG. 10, in one example, the intermediate view includes a caption area that displays a caption 1020 for the item 1025. The caption 1020 may be editable if the item 1025 belongs to the user. If the user has not yet entered a caption for the item, a message, such as "click here to enter a caption for this photo/video," may be displayed in the caption area. If the item belongs to another person, i.e., is in an album that has been shared with the user, the caption 1020 may be set by the other person and therefore may not be editable by the user. The date the item was taken may also be displayed in a date area 1030. The intermediate view may include navigation controls 1035 which allow the user to step through items in the digital media library or album, for example, depending on whether the user entered the intermediate view from the time view or single album view, while remaining in the intermediate view. The intermediate view may also include a toolbar 1040 that provides access to a number of actions that may be performed on the item 1025. In one example, the contents of the toolbar 1040 depends on whether the item belongs to the user or is an item that has been shared with the user, and on the type of item (e.g., whether the item is a photograph or video).

In one embodiment, clicking on the item 1025 in the intermediate view further zooms into the image, presenting it a full-screen view. If the item 1025 is a video, the video may start playing automatically. Moving the cursor may cause a control bar to be displayed, as discussed above, to allow the user to stop and start the video, and to navigate forwards and backwards within the video. The control bar may disappear if the cursor remains still for a predetermined period of time, for example, a few seconds. In one example, in the full screen view, only the image (photo or video) is shown; that is, the view does not include a header or other information which may distract the user from the image itself. If the item 1025 is a photograph, by default, the full screen view may include no controls, and no indication whether comments are available. In one example, if the user moves the pointer (e.g., using a mouse) to the edge of the screen, the left/right navigation control indicators appear as in other views. The user may also use the arrow keys or other keyboard keys or other input devices to cycle through images in the full screen view. In one example, clicking anywhere on the photo or video (or using another input mechanism, for example, pressing the Escape key) will return to the intermediate view.

Figure 11:
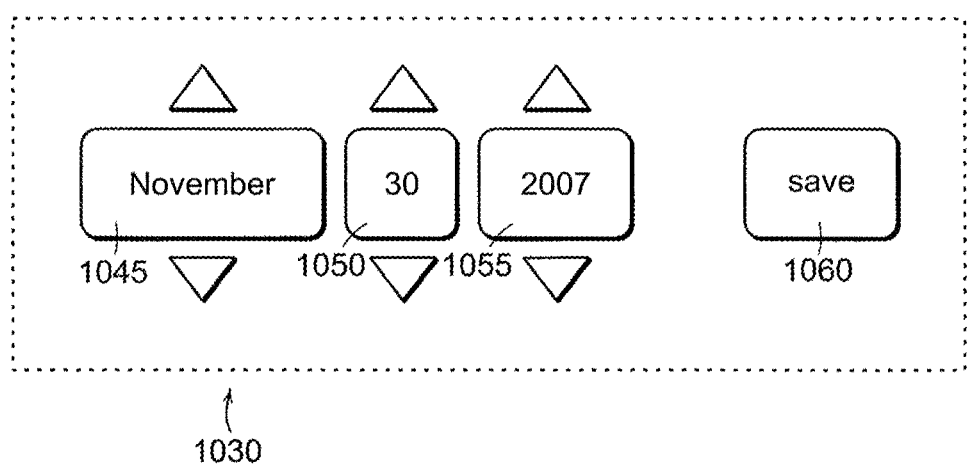
FIG. 11 is an illustration of an example responsive component of a view of digital media content, according to aspects of the present invention.

Historically and to present, the interface on digital cameras can be difficult to set or change and thus it is not uncommon for the date stamp of photographs and/or videos taken with the camera to appear incorrectly in the user's digital media library. Correct dates, however, may be critical to the success of time view and potentially also to many features of the digital media functionality of the portable computer 100. Therefore, in one example, the date setting may be adjustable for items in the digital media library. In one example, if the user hovers over the date area 1030 for an item in the intermediate view, an indication may be provided that the date is editable. For example, the color of the date may change, and/or the date area may be highlighted. Clicking the date may cause controls for editing the date to become available. For example, as shown in FIG. 11, the date area may display scrollable fields for the month (1045), day (1050), and year (1055), along with a save button 1060. The user may change the date by clicking the scroll arrows for each field, selecting a desired date for the item 1025. According to one embodiment, once the user makes the correction, the user may be prompted to adjust the dates for all items that were taken with the same camera and uploaded in the same session. Thus, the digital media program may identify all the items that are likely to have dates offset by the same amount as the item just corrected, and offer to correct the date(s) of these item(s) by the same offset. For example, a prompt to the user may read: "I have identified [#] other items taken with the same camera and saved at the same time as this [photo/video]. Would you like me to correct the date for these items as well?" with the options "Yes, please" and "No, thanks" for the user to select. In one example, "No, thanks" is the default.

According to one embodiment, for content items that belong to the user, date corrections may propagate throughout their computer network. Thus, if the user corrects the date on a content item that has previously been shared with another user, the corrected date is reflected on the other user's display. This propagation of corrections may be effected because the digital content items, and associated data, such as date, caption, etc., may be stored in the cloud 330, as discussed above. Thus, when the other user views the shared content item, they are viewing a visual representation of digital content stored in the cloud, rather than a locally stored digital content item. Some online digital photograph and/or video services do not permit editing of dates associated with the stored photographs and/or videos. In addition, a user may wish to edit the date associated with a shared item, for which they may not have editing privileges. Thus, although in some instances it may be preferable to save date corrections to the hosting photo/video service, if this is not possible, date corrections may be locally stored on the portable computer 100 for display purposes. In this instance, date corrections will be reflected when the user views the digital content item on the portable computer 100, but will not propagate to other users viewing shared items.

Referring again to FIG. 10, as discussed above, the intermediate view includes a toolbar 1040 that includes one or more controls 1065 that may be used to manipulate the item 1025. In one embodiment, the toolbar 1040 contains controls 1065 including "add to pick list," "add/view comments," and "rotate." The "add to pick list" and "add/view comments" controls are discussed below. The rotate control rotates the item 1025 90 degrees, either clockwise or anti-clockwise. The direction of rotation may be pre-set (i.e., rotation is always in the same direction) or may be user-selectable. If possible, the rotation may be stored with the item 1025 on the appropriate online photo/video hosting service, bur if not, the change may be stored locally and affects only the user's view of the item 1025. If the item 1025 belongs to the user, the toolbar may further include an edit control 1070 and a delete control 1075.

In general, photo editing can be grouped into two broad categories, namely editing that alters the content of an image (such as cropping, red-eye, removal, and adjusting the contrast), and editing that alters the display of an image (such as rotation, creation date, and view/hide). In one embodiment, the digital media aspect of the portable computer 100 may encourage users to leverage existing services (offered by their online photo hosting service) for the former, via the edit control 1070, while supplying tools for the latter. In one example, the edit control 1070 may display a message similar to "edit on [service]," where the [service] is the name of the third party hosting service that stores the user's digital media library in the cloud 330 (for example, FLICKR). Clicking on the edit control 1070 may open a web card for the item 1025 on the user's hosting service, allowing the user to edit the item, as discussed further below. In some instances, the user will not have the appropriate access to perform either type of editing operations on many of the images in their media library, either because the particular image does not belong to the user, or because the photo hosting service does not support the particular editing action. According to one embodiment, the digital media aspect of the portable computer 100 allows the user to perform display edits on any digital content item in their digital media library regardless of whether or not that edit function is available via the library hosting service. For example, the user may rotate any photo or video in their digital media library, using the rotate control discussed above, even if this rotation is only available on the user's display on the portable computer 100 and does not affect the underlying data stored in the cloud 330.

Similarly, the function of the delete control 1075 may vary depending on various factors. If the item 1025 belongs to the user, the delete control 1075 may allow the user to delete the item from their digital media library. If the item 1025 does not belong to the user, the delete control 1075 may be replaced in the toolbar 1040 by a "remove" control (not shown). The remove control allows the user to remove items from their digital media library that do not belong to them, without affecting the underlying data in the cloud. Thus, the underlying data may remain in the cloud, since the user does not have permission to actually delete the item), but the item is removed from the user's view on the portable computer 100. Thus, the user may make local changes to their own data that are not reflected on the underlying media library hosting service, thus allowing the user to customize and enhance their own viewing experience.

Still referring to FIG. 10, if the item 1025 is a video, the toolbar 1040 may include additional video controls (not shown), such as "play" and "stop" or "pause." The video controls may also include a video play timeline with a click-and-drag "scrubber" that identifies the current playpoint in the video in relation to the length of the view, and also allows the user to navigate through the video.

As discussed above, in one embodiment, one of the controls 1065 in the toolbar 1040 is a "comments" control, that allows the user to add and/or view comments associated with the item 1025. If comments are available for the item 1025, a comments icon 1080 may be displayed on the item, for example, in an upper corner of the item. In one example, in the intermediate view, the comments icon 1080 shows the number of comments available for the item 1025. If the user clicks the comments control in the toolbar 1040 of the intermediate view, the item 1025 turns over to reveal a "back side" showing existing comments and allowing the user to add/edit comments. In one example, an animation of the item 1025 turning over is provided.

Figure 12:
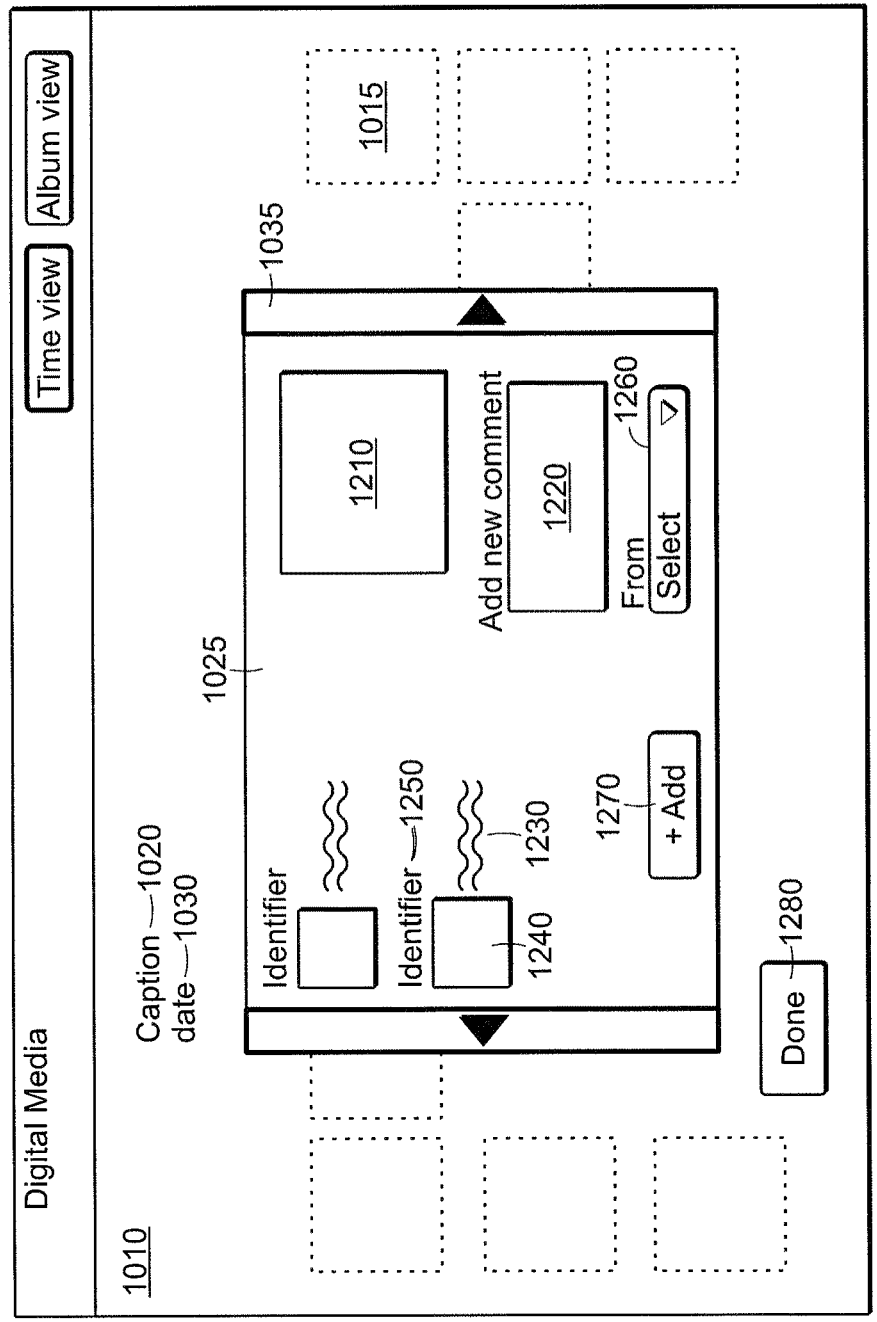
FIG. 12 is a block diagram of one example of a view of digital media content, according to aspects of the invention.

Referring to FIG. 12 there is illustrated one example, of a "back view" of the item 1025. The back view includes a preview image 1210 of the item 1025, along with an "add comments" area 1220 where the user can type a new comment. Comments may also be added by persons with whom the user (or someone else) has shared the item 1025. Thus, existing comments 1230 may be displayed, along with a user image 1240 selected by the person leaving the comment and an identifier 1250 which provides identifying information for the comment, such as the name of the person who left the comment and the date and time the comment was left. In one example, the back view includes a "from" selector 1260 which allows the user to select to display only comments from a particular person or group of persons. If the user types a comment into the add comments area 1220, an "add comment" button 1270 may be displayed. Clicking the add comment button 1270 may add the user's comment to the item 1025. Clicking a "done" button 1280 may turn the item 1025 back over, returning the user to the intermediate view. In one example, the navigation controls 1035 remain available in the back side view, allowing the user to navigate backwards and forwards through the digital medial library, displaying the back side (comments) view for each item. In one example, clicking in the background 1010 turns the item 1025 back over and then exits the intermediate view, returning the user to either the single album view or time view. An animation of these steps occurring may be displayed during the transition from the comments view, through the intermediate view, to the single album or time view.

In one example, a small comments icon 1080 is also displayed in the corner of those preview images 710 (in the single album view) or 810 (in the time view) for which comments are available. Clicking on the comments icon 1080 may bring up the comments view for the associated content item. In one example, clicking on the comments icon 1080 in one of these views causes an animation to be displayed, the animation including zooming into the intermediate view for the selected preview image 710, 810, and turning the item 1025 over, as discussed above.

Figure 13A:
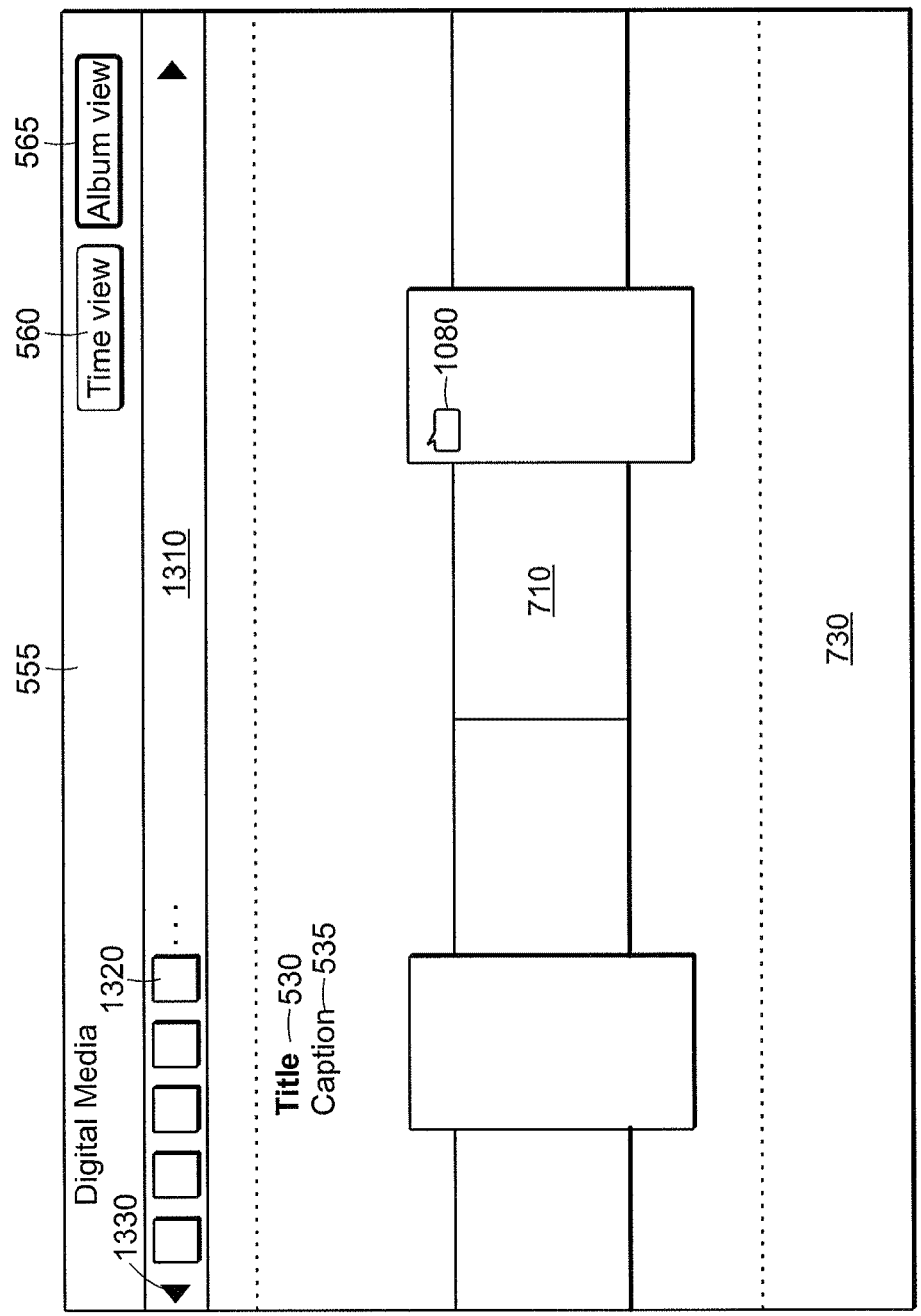
FIGS. 13A-C are illustrations of examples of a control element displayed in embodiments of views of digital media content, according to aspects of the invention.
Figure 13B:
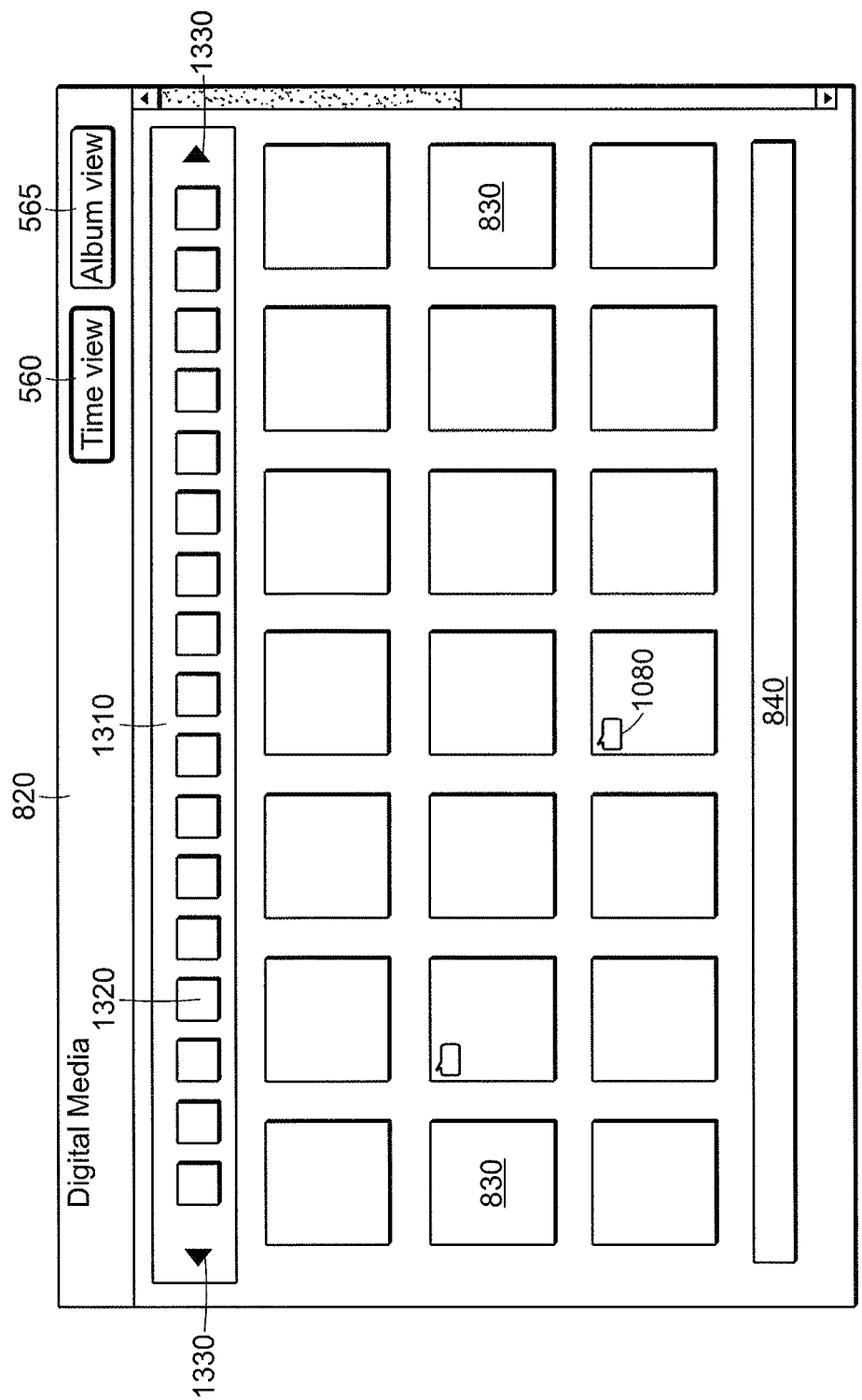

As discussed above, in one embodiment, one of the controls 1065 in the toolbar 1040 is an "add to pick list" control. The pick list is an organization tool that allows the user to gather together a group of digital content items for a particular action. For example, in the pick list, the user may collect content items to be shared with another user, used to create a custom channel, as discussed further below, or for which the user wishes to buy prints or access some other service provided by the online library hosting service. According to one embodiment, the pick list appears when the user adds a content item to the pick list, and may remain visible until the user clears the list. For example, FIG. 13A illustrates an example of the single album view, with the pick list 1310 displayed across the top of the view. Similarly, FIG. 13B illustrates an example of the time view displaying the pick list 1310. It is to be appreciated that although the pick list 1310 is shown in FIGS. 13A and 13B located near the top of the screen, below the header 555, 820, its location is not limited to the illustrated example, and the pick list may be displayed elsewhere on the screen, for example, along the bottom of the screen, or vertically along one side of the screen.

Figure 13C:
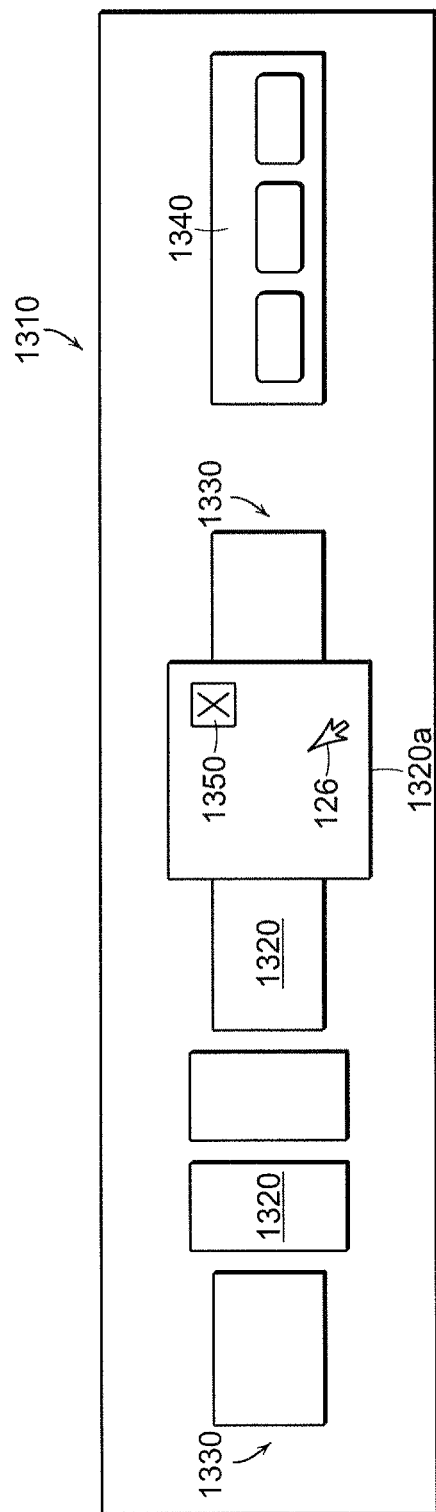

According to one embodiment, the pick list 1310 comprises one or more thumbnails 1320 corresponding to the content items added to the pick list, as shown in FIGS. 13A and 13B. The thumbnails 1320 may be arranged in the order in which the content items were added to the pick list 1310. In one example, the thumbnails 1320 cannot be re-ordered by the user. Navigation controls 1330 allow the user to scroll through the pick list 1310. Referring to FIG. 13C, there is illustrated one example of a pick list 1310 including pick list controls 1340. The pick list controls 1340 may allow the user to perform any of a number of actions on the pick list 1310 and on the content items contained in the pick list. For example, the pick list controls 1340 may include options to order prints, to share the items in the pick list, to add a channel, and/or to clear and close the pick list. In one example, selecting the clear and close control empties the pick list 1310 and removes it from display; however, the content items in the pick list may not be deleted from the digital content library. Hovering over a particular thumbnail 1320a (as indicated by pointer 126) may increase the size of that thumbnail, as shown in FIG. 13C, and reveal a delete icon 1350. In one example, hovering on the delete item causes a tip to be displayed, indicating that clicking the delete icon 1350 will cause the content item to be deleted from the pick list. In one example, clicking on the delete icon 1350 deletes the content item from the pick list 1310, but not from the user's digital media library. Clicking elsewhere (i.e., not on the delete icon 1350) on the thumbnail 1320a may cause the associated content item to open in the intermediate view. If the user was in the time view (FIG. 13B), the timeline 840 may scroll in the background and the handle 940 moves as appropriate. If the user was in the album view and clicks a thumbnail 1320 in the pick list 1310, the background of the intermediate view may reflect the appropriate album. In one example, if the user is in the album view and clicks on a thumbnail 1320 in the pick list 1310 that happens to be unsorted (i.e., not associated with an album), the display may switch to the time view.

Figure 14:
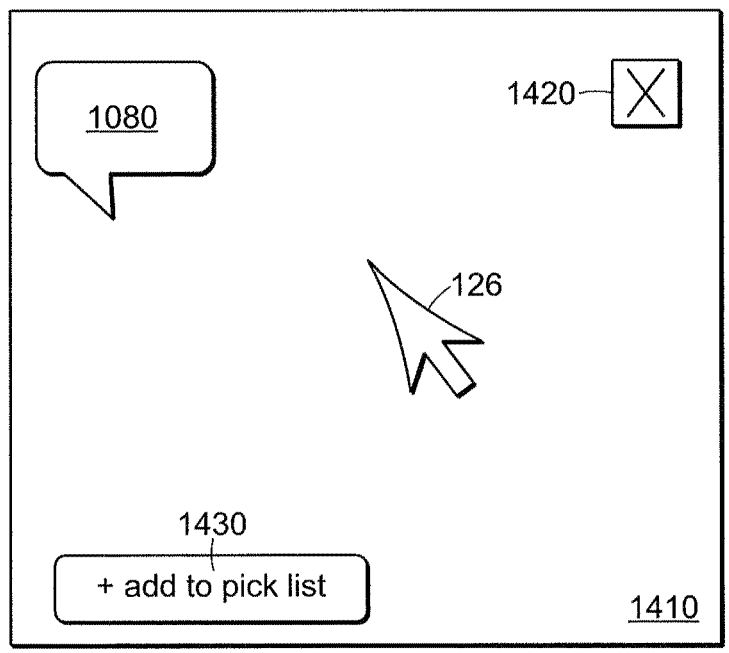
FIG. 14 is an illustration of an example responsive component of a view of digital media content, according to aspects of the present invention.

According to one embodiment, hovering on a preview image 710 (in the single album view) or 830 (in the time view) will cause the preview image to enlarge slightly and two controls to appear, as shown in FIG. 14. The pointer 126 indicates the user hovering on the preview image 1410. These controls may include a delete icon 1420 and an "add to pick list" button 1430. If comments are available for the content item associated with the preview image 1410, the comments icon 1080 may also be displayed. Clicking on the "add to pick list" button 1430 adds the content item to the user's pick list 1310. Clicking on the delete icon 1420 deletes the content item from the user's digital media library. In one example, clicking the delete icon 1420 also causes an informational "bubble" (not shown) to appear, letting the user know that the content item has been deleted. The bubble may remain on the screen for certain time period, for example, a few seconds, and may include an undelete button, giving the user the ability to undo the deletion of the content item. Conventional "undo" actions, such as pressing "CTRL-z" may also undo the deletion of the content item. The effect of deleting a content item on the underlying data in the cloud 330 may depend on whether the content item belongs to the user, or is an item that has been shared with the user by someone else. For example, if the content item belongs to the user, then deleting it may also delete the content item from the library stored by the online hosting service. If the content item belongs to someone else, deleting it in the user's digital medial library may remove the "map" or reference to that item, such that it is no longer displayed in the user's media library, but does not affect the underlying data in the cloud 330.

Figure 15:
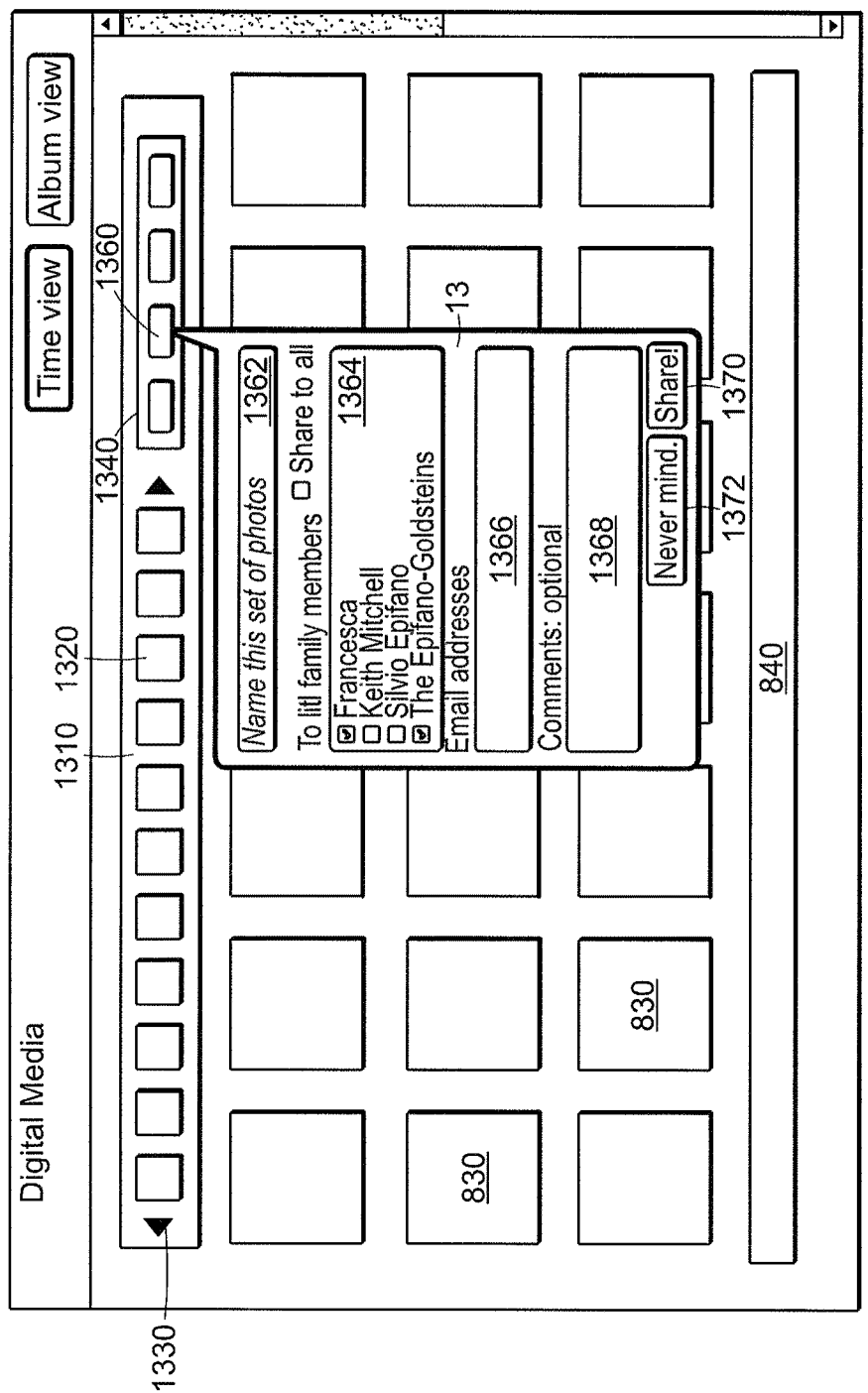
FIG. 15 is an illustration of an example of a control element displayed in an embodiment of a view of digital media content, according to aspects of the invention.

Referring again to FIG. 13C, in one example, clicking a "share" button in the pick list controls 1340 Clicking the Share button in the Pick List launches a share bubble 1360, as shown in FIG. 15. The share bubble 1360 may include several fields, including a name field 1362 where the user may name the content item or group of content items to be shared, and fields where the user may either select from the pre-set list of persons (field 1364) those persons with whom the user wishes to share the items, or enter one or email addresses (field 1366) of persons with whom the items are to be shared. The share bubble 1360 may also include a comments field 1368 where the user may enter comments about the items being shared or a message to the person(s) with whom the content items are being shared. Clicking the "share" button 1370 may complete the share action. A "cancel" button 1372 may be provided to cancel the share action; alternatively, simply clicking anywhere not on the share bubble 1360 may also cancel the share action. A similar share bubble may also appear when the user selects the share album control 612 in the album view discussed above.

The pick list controls 1340 may also include an "order prints" button to allow the user to order prints of the photographs in the pick list 1310. According to one embodiment, clicking "order prints" button from the pick list 1310 shows the user options for ordering (such as print size, number of prints, etc.), and then places the order using information previously collected from the user, for example, during initial configuration of the portable computer 100. According to another embodiment, clicking the "order prints" button from the pick list 1310 opens an ordering panel that provides the user with options for ordering prints from any of a variety of online photo service providers. The ordering panel may include weblinks that allow the user to navigate to the websites of the online photo service providers. The ordering panel may also include a "stop" or "cancel" button. In another embodiment, clicking the "order prints" button from the pick list 1310 automatically opens a webpage of the online photo hosting service where the user's digital media library is stored. Thus, the user may order the desired prints (or other merchandise) directly from the hosting service on which they are stored. In one example, using the "order prints" control does not clear the content items from the pick list 1310 in case the user wishes to perform another action with the items.

According to one embodiment, the pick list controls 1340 may also include a control to create or add a channel. In one example, selecting the create a channel control in the pick list 1310 creates a channel card containing the content items in the pick list. As discussed above, according to one aspect, streamlining the presentation and integration of features and services available through the portable computer 100 includes developing consistent visual representations of available content (whether on the computer 100 or from third party service providers). In one embodiment, system features and web features are consistently presented as cards for the user to interact with to achieve their computer objectives. In some embodiments, cards comprise part of an interface layer between a computer user and a user's computer based objective and/or computer operation. Thus, the cards form a part of the structure of the graphical user interface between a computer system and the user to provide access to a plurality of views and/or content. In various embodiments, cards are configured to be context and/or content sensitive. Thus, the cards are selectable visual representations that are mapped either to computer functions or available computer content. Some examples of cards include web cards that map to views of web content including web pages, channel cards that map to customized views of content including web based content and picture and video content, and system cards that map to system functionality. In one example, system cards are configured to represent activities that have been specifically designed such as for example, a digital media card.

Figure 16:
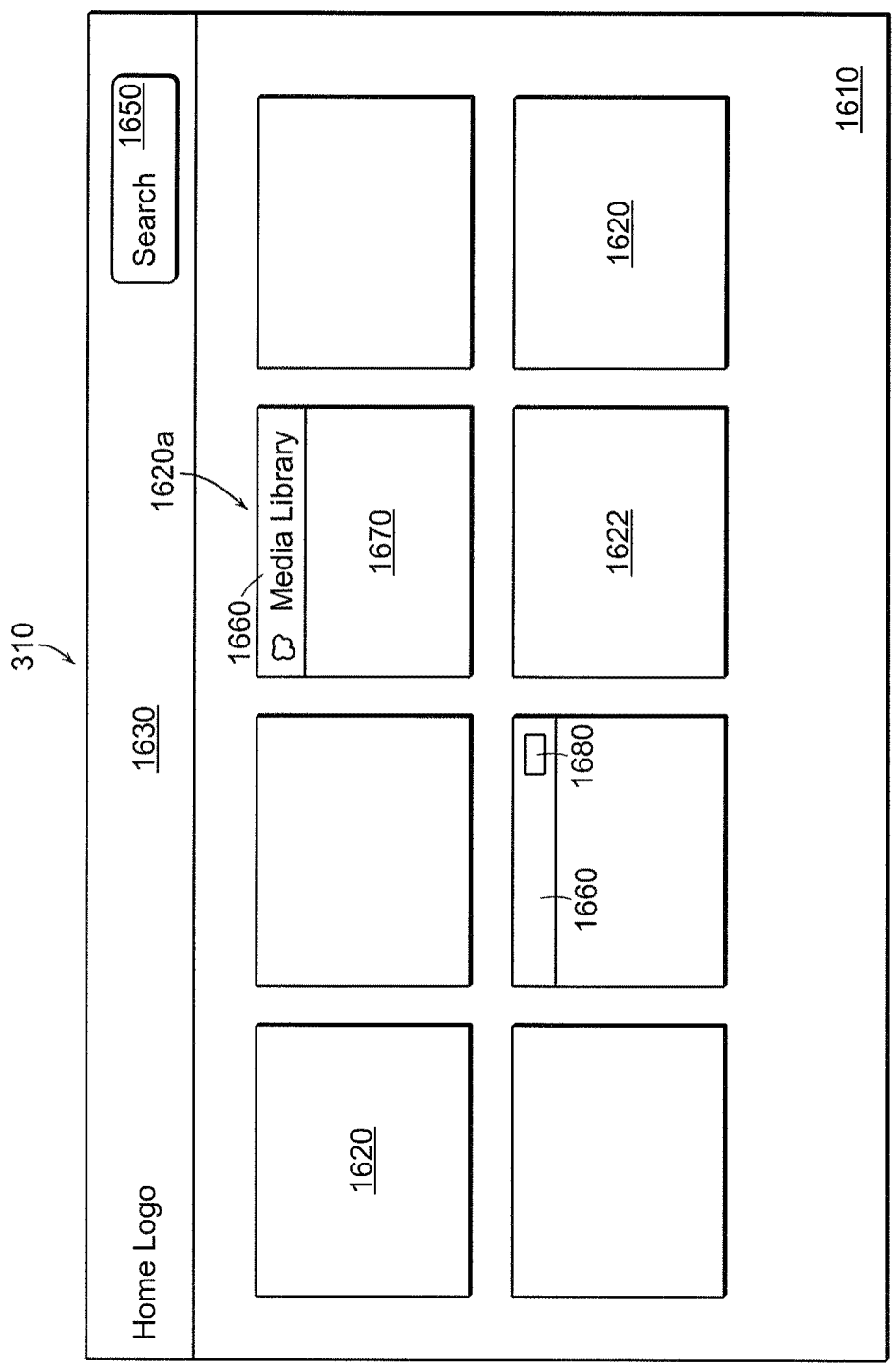
FIG. 16 is a block diagram of one example of a view including cards associated with digital media content, according to aspects of the invention.

Referring to FIG. 16, in one embodiment, the home view 310 (see FIG. 3) is configured to manage and organize cards. Thus, in one example, the home view 310 includes a body 1610 in which a plurality of cards 1620 are arranged. The home view 310 may also include a header 1630 which displays a home indicator 1640, letting the user know that they are in the home view, 1640, and optionally includes a web search bar 1650, providing the user direct access to searching on the Internet. The home view 310 provides a simple and convenient mode of navigating through the features and content accessible through the device by organizing and managing cards. In some embodiments, channel cards provide additional features that enable a user to better interact with web based content, and in another example, channel cards provide interactive views by utilizing different content presentations provided by a web source. Thus, consistent user interfaces are used to access web based content, even content and applications provided by third parties.

According to one aspect, cards may have common features to promote user acceptance and improve adoption of different cards, while providing familiar a form. In one example, most cards are configured with a similar anatomy, and may comprise certain common elements described with reference to illustrated examples. According to one aspect, different cards types displayed in the home view are clearly defined by color scheme and appearance, while at the same time maintaining a similar format. For example the similar format includes header placement and sizing, display of tools, title and frame size. In one embodiment, a color scheme configured to differentiate card types provides for web cards with white headers with the content displayed on the web card showing as a thumbnail of the current state of the page. Channel cards may be configured with black headers, and the content presented in the channel card may comprise a simplified representation of the associated media or web content. System cards may be shown either with blue headers or grey headers.

According to one embodiment, the digital media aspect of the streamlined device is presented as and accessed through a system card 1620*a*. The digital media system card 1620 comprises a header 1660 running along the top of the card which identifies it as the digital media card, and a body 1670 which displays an image of one of the digital content items in the user's digital media library. In one example, the image displayed in the body 1670 is selected at random from the user's digital media library and may change periodically, for example, every few seconds or minutes. From the home view 310, selecting (e.g., by clicking) the digital media card 1620 navigates to either the time view or the album view of the user's digital media library. The default view may be set in the card options, as discussed further below.

As discussed above, when the user selects the "create a channel" control in the pick list 1310, a channel card is created containing the content items in the pick list. The channel creation process may be animated. In one example, when the user clicks the control button, the system zooms out of the digital media library view to the home view 310, scrolls to the end of the displayed cards 1620 (if necessary), and shows the new channel card appearing, then scrolls back (if necessary) to where the digital media card 1620*a* is displayed in the home view, and zooms back into digital media view from which the user clicked on the control in the pick list 1310. The whole animation may take a brief time; short enough to not be too annoying to the user, but long enough not to cause the user any vertigo.

According to one embodiment, the user may also create channel from online photo services (such as SMUGMUG or KODAK GALLERY). In one example, when the user creates a channel from one of these services, the option may be given to save the photographs to the user's digital media library. If the user decides to add the photographs to the digital media library, new photographs subsequently added to the feed from the online service may also be added to the digital media library. This automatic updating stops (i.e., no more photographs are added) if the user deletes the channel card or transforms it into a web card. Similarly, the user may transform a web card of an online photo service (such as FLICKR or SHUTTERFLY) into a channel card using the card options discussed below. In one example, when the user creates a channel card from one of these photo services, the option is again given to add the contents of the channel card to the user's digital media library. This allows the user to get the benefit of an aggregated media library on the portable computer, but without automatically cluttering it up with unwanted images. Content subsequently added to the channel may also be added to user's digital media library. If the user deletes the channel card or transforms it back into a web card, new content is no longer added to the digital media library, but the existing content may not be removed.

Figure 17A:
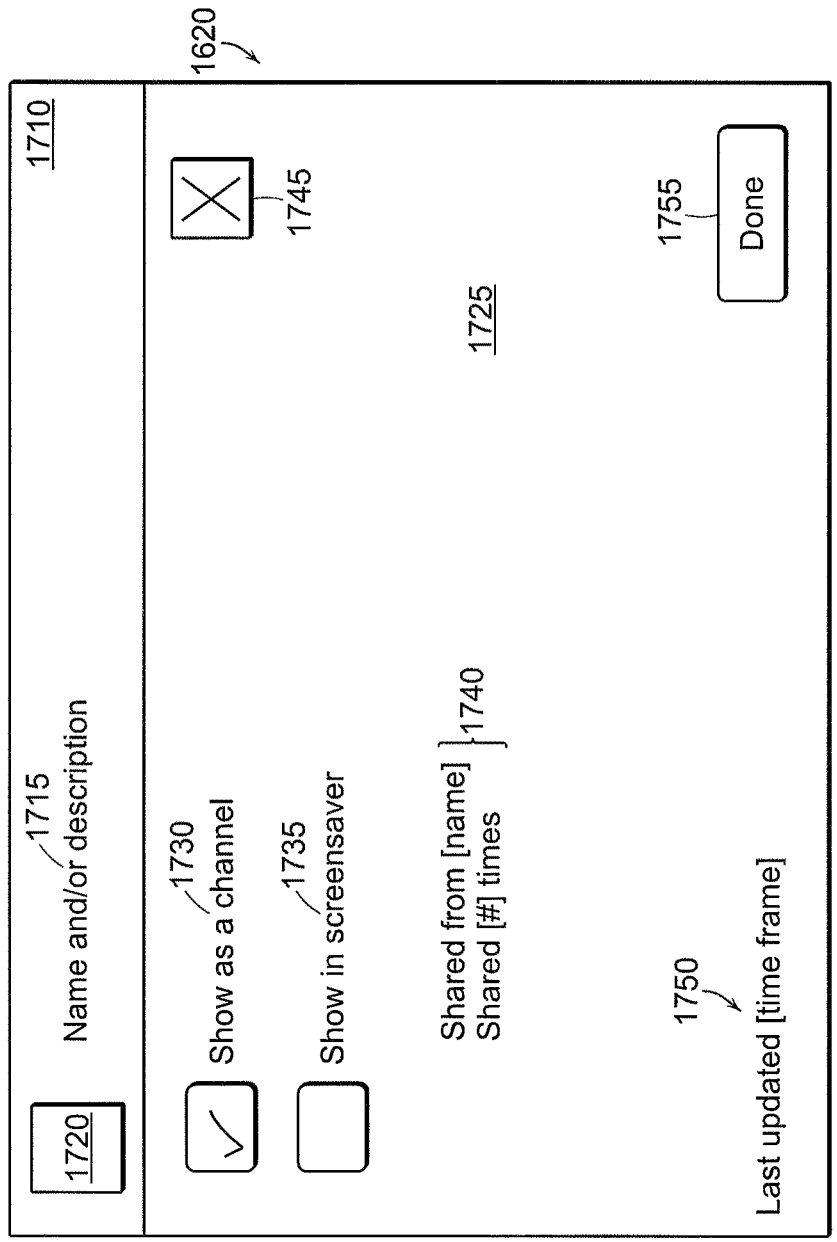
FIGS. 17A-B are illustrations of examples of views of the back side of a card and associated controls, according to aspects of the invention.

Referring again to FIG. 16, the cards 1620 may include an "options" icon 1680 in the header 1660. In one embodiment, when card configurations and/or card options are selected by a user (if available), e.g., by clicking the card options icon 1680, a consistent animation is presented to the user. For example, selection of a card's options may cause an animation displaying the flipping of the card and the revelation of user selectable options. In one example, if the user clicks the card options icon 1680, there is presented a visualization of the card turning over, similar to the animation/visualization of the item 1025 turning over to display the comments view discussed above. On the "back side" of the card 1620 the user may see various options which may differ depending on the type of card. Referring to FIG. 17A, there is illustrated one example of the back side of a card 1620. In the illustrated example, the card 1620 includes a header 1710 that displays an identifying field 1715 and optionally a logo or image 1720, to identify the card to the user. In an example of a web card, the identifying field 1715 may include the name of the associated website and optionally some description of the card. For example, a web card for an online news service may display the name of the news service along with a description such as "local news" or "news headlines" that identifies the card for the user. The available options for the card 1620 are shown in the body 1725 of the card.

Figure 17B:
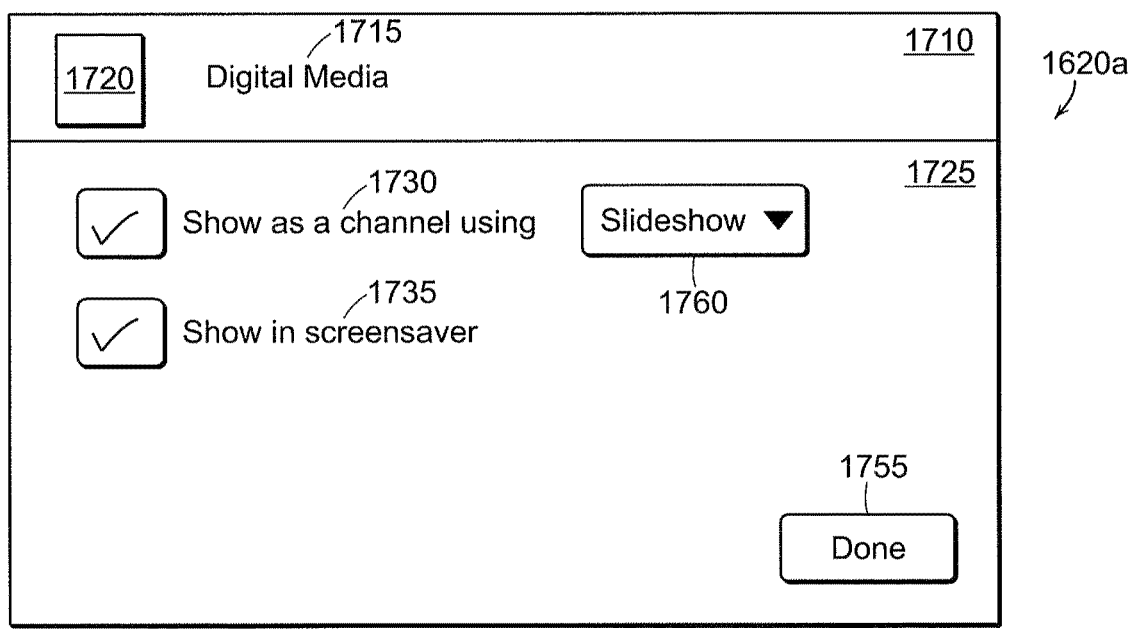

In the illustrated example, the body 1725 of the back side of the web card 1620*b* shows an option 1730 for transforming the card into a channel card, and vice-versa. In the example of a web card, if the user checks the option 1730, the web card is recast into a channel card. Unchecking the option 1730 transforms the channel card back into a web card. The option 1730 may be displayed permanently checked for cards that are always available as channel cards (e.g., the digital media card 1620*a*, as shown in FIG. 17B), and may be missing for cards that are not available as channels, for example, some system cards. In the example of the digital media card 1620*a*, the option 1730 may include an option to show the card as a channel using a particular lens. Thus, for the digital media card 1620*a*, the control 1730 may read "Show as channel using [lens], as shown in FIG. 17B." A lens is a customized visualization for computer content, as discussed further below.

Still referring to FIG. 17A, channel cards may include an option 1735 to show the card in a screensaver. Typically the screensaver option 1735 is not an available option for other card types; however, the digital media system card 1620*a* does permit its content to be displayed in the screensaver. In one example, the digital media card 1620*a* is added to the screensaver mode by default. In the channel view (discussed below) and screensaver mode, the digital media system selects photographs randomly from the user's digital media library. This allows the portable computer 100 to function like a smart digital picture frame by default when the device is idle. According to one example, new channel cards are configured to not display in screensaver mode by default and therefore, the option 1735 is not checked for new channel cards.

The card options may also include share information/controls 1740. The shared information 1740 may include a "shared to/from" line which provides information on the user or device from which or with which the card was shared. Hovering over the "shared from" line causes the device to display an informational bubble with a list of people to whom the card was shared. Other options may be employed for displaying shared from information. Other options may include linking to a display list for share from information, and in some embodiments may include displaying the shared entities on the back of the card without selecting the "shared from" line. In such embodiments a maximum number of shared entities may be displayed before requiring selection of a more control. The more control expands on the list of shared entities to provide for listings that do not fit within the space provided on the back of a card. A "shared to" line may provide information about whether and to whom the card has been shared. According to one embodiment, system cards can not be shared, thus no shared to information is displayed. By default the "shared to" line does not display until a card has been shared. In one example, hovering over the shared to line causes the device to display an informational bubble with the list of people to whom the card has been shared. Other options may be employed for displaying shared to information. Other options may include linking to a display list for share to information, and in some embodiments may include displaying the shared entities on the back of the card without selecting the "shared to" line. In such embodiments a maximum number of shared entities may be displayed before requiring selection of a more control (not shown). The more control expands on the list of shared entities to provide for listings that do not fit within the space provided on the back of a card. Optionally the more control may cause the device to display an information bubble containing the remaining shared entities and/or all the shared entities. The share information 1740 may also display the number of times the card has been shared. As discussed above, the user may share content items from the pick list 1310 with other users. In one example, sharing items from the pick list operates similar to sharing a channel card that contains only photographs and videos. The recipient receives a channel card on their streamlined device (or an email with a link to the channel card on a website if the recipient does not have a streamlined device).

Still referring to FIG. 17A, for some cards the card options may further include a delete control 1745 which removes the card 1620 from the home view 310. The delete control 1745 is typically not available for system cards, which typically can not be deleted by the user. The card 1620 may also show a "last updated" field 1750 that displays update information. For example, for a web card that streams news or other online content, the update field 1750 may display the last time the feed was updated, for example, "last updated 3 minutes ago" or "last updated at [date/time]." A "done" button 1755 may be provided that allows the user to turn the card 1620 back over to the front side view when the user is finished viewing/changing the card options. In one example, clicking the "done" button 1755 causes the system to display an animation of the card 1620 flipping over to show front side and zooming back out to the home view 310.

As discussed above, another view of the digital media library which may be offered to the user is the lens view. The lens view is a group of visualizations, or "lenses," that the user can choose from and which offer the user different ways in which to experience and interact with their digital media libraries. The content displayed and the interactions available may depend on the individual lens. In one example, all or at least some of the lenses allow the user to add a particular picture to the pick list 1310. The pick list may or may not be displayed in the lens view. In one example, lenses support passive viewing, i.e., they do not require user interaction to be effective since they can be applied to the channel view and screensaver mode.

According to one embodiment, by default, channel cards are displayed in the channel page view according to a pre-determined visualization. For channels that comprise photographs and videos, including the digital media card 1620*a*, and channels created from online photo services such as FLICKR or SHUTTERFLY, lenses are also available to modify the visualization of the channel. According to one embodiment, the channel page view is the zoomed-in computer implemented expression of a channel card. The channel page view may be invoked by clicking on the channel card. A channel page view may present a unique view into content made available through a website. The channel page view employs visualizations similar to corresponding visualization on channel cards but the large format of the view allows for a better display of content, and provides for increased interaction with users. The channel page view also comprises a mapping from the display content to the source from which the content is derived. The channel page view comprises a number of elements that are maintained across the channel page views of different content, although in some examples additional features may be provided to address unique aspects of the content being viewed. An example of a channel page view is the album view illustrated in FIG. 5.

Figure 18A:
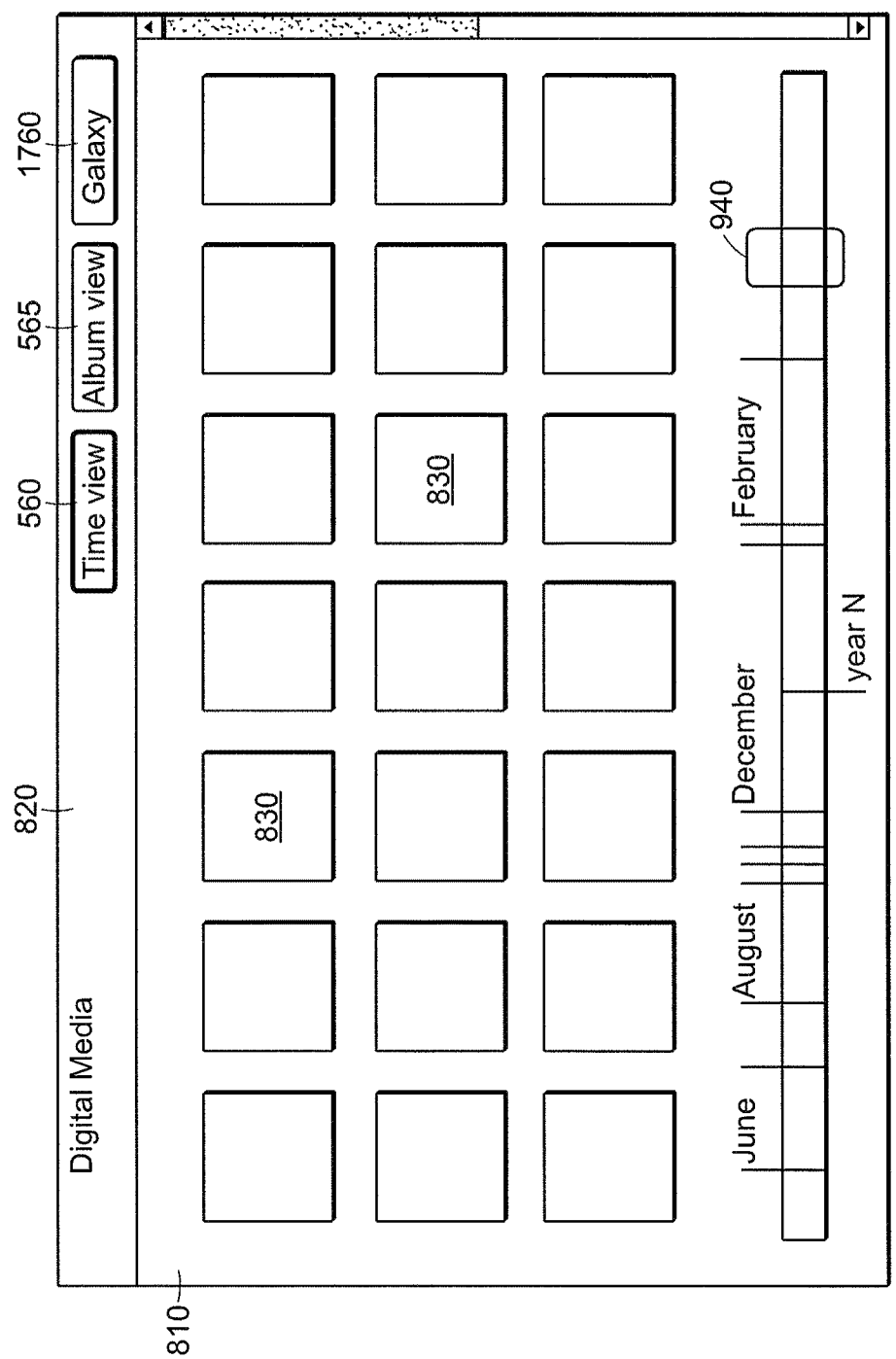
FIG. 18A is a block diagram of one example view of digital media content including a lens control, according to aspects of the invention.
Figure 18B:
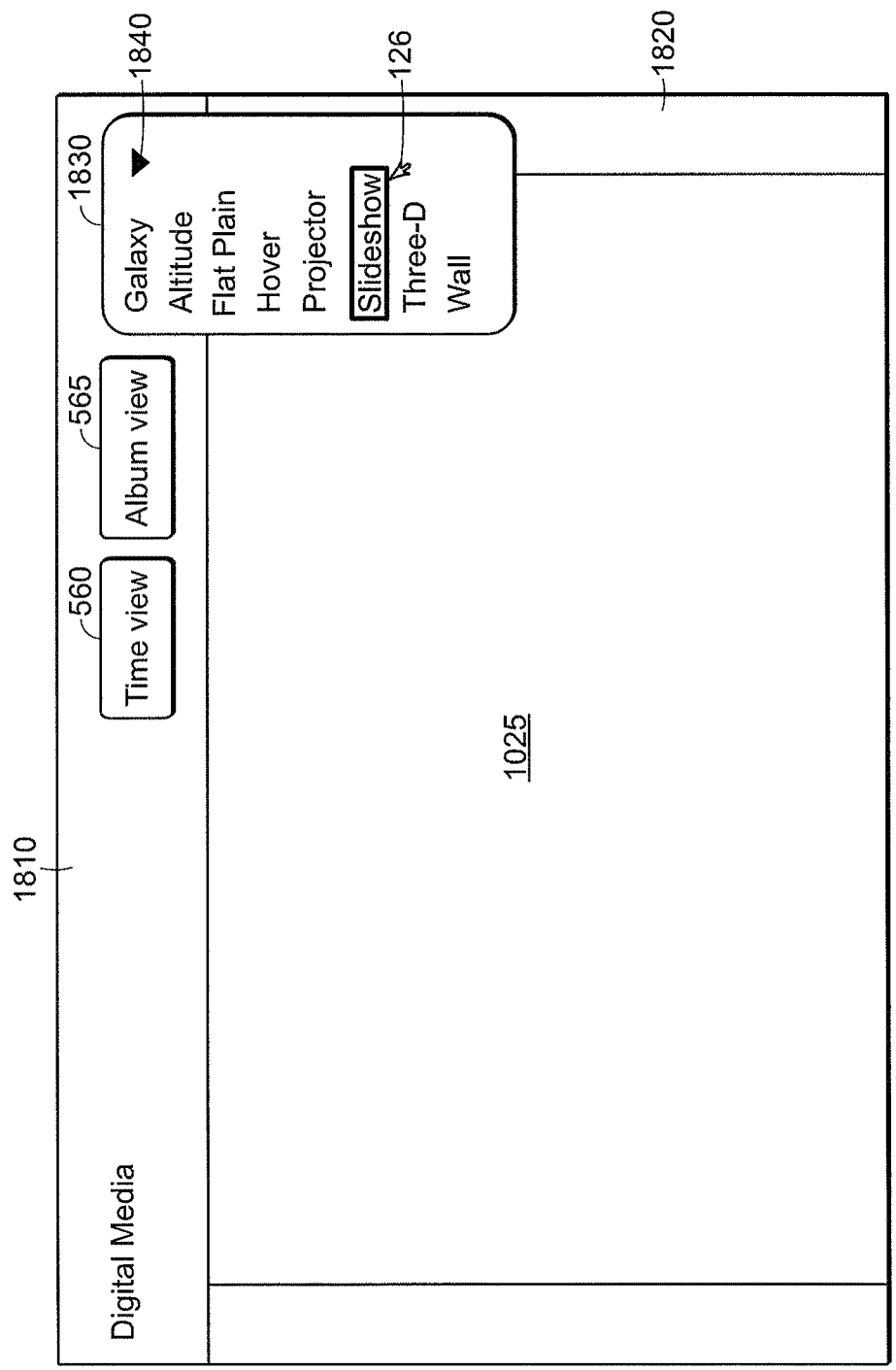
FIG. 18B is a block diagram of one example view of digital media content including an example lens selection control, according to aspects of the invention.

As discussed above, and referring to FIG. 17B, for the digital media card, the channel control may read: "Show as channel using [lens]" to allow the user to select a particular lens. The lens button 1760 may display the name of the currently selected lens. Clicking the lens button 1760 reveals controls, for example, a drop-down menu, for selecting a lens. In one example, when the user clicks on the drop-down menu to select a lens, the card 1620*a* and drop-down menu remain visible, but the rest of the home view 310 becomes obscured by a preview of the selected lens. Lenses may also be selected from any of the time view, album view, intermediate view, or lens view of the user's digital media library. For example, referring to FIG. 18A, there is illustrated an example of the time view showing the lens button 1760. The lens button 1760 displays the name of the currently selected lens. In one example, clicking on the lens button 1760 will switch to the lens view and show the current lens. Referring to FIG. 18B, there is illustrated an example of a lens view. The lens view includes a header 1810 and a body 1820 in which an image 1025 of the content item is displayed. The lens button is shown as a drop-down menu 1830, as discussed above, revealing a list of available lenses. The drop-down menu may be displayed responsive to the user clicking the arrow 1840 on the lens button. As the user moves through the list, an instant preview of the highlighted lens may appear in the body 1820 of the screen. Selecting a new lens from the list makes it the current lens, and changes the text on the lens button 1760 (see FIG. 18A) to match.

Figure 19:
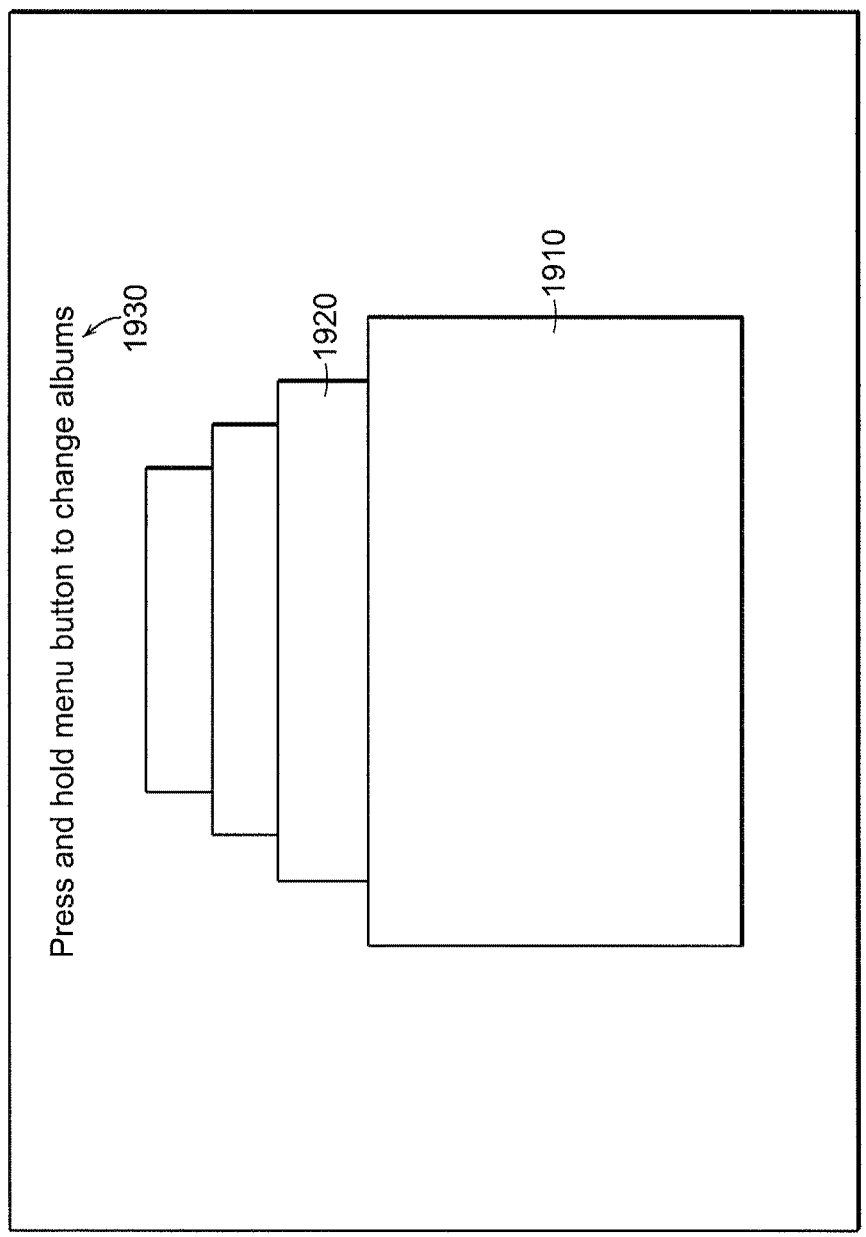
FIG. 19 is a block diagram of one example of a view of digital media content, according to aspects of the invention.

One example of a lens is the slideshow lens. In one embodiment, in a channel page view, the slideshow lens automatically shows random images from the user's digital media library in the full screen view. Each image may be displayed for a predetermined period of time, for example, a few seconds. In another example, the images are shown as a forward moving series, as shown in FIG. 19. In the example in FIG. 19, the front image 1910 is shown for a few seconds, then replaced with the next image 1920 and the series "shifts forward" with a new image being added at the back of the line. In one example, the images displayed are selected from a particular album, and the system automatically scans through all the images in the album, randomly or in sequence. The photo display restarts again at the beginning when the end of the photo content is reached. From the slideshow, the user may navigate to any image in the digital media library.

Figure 21A:
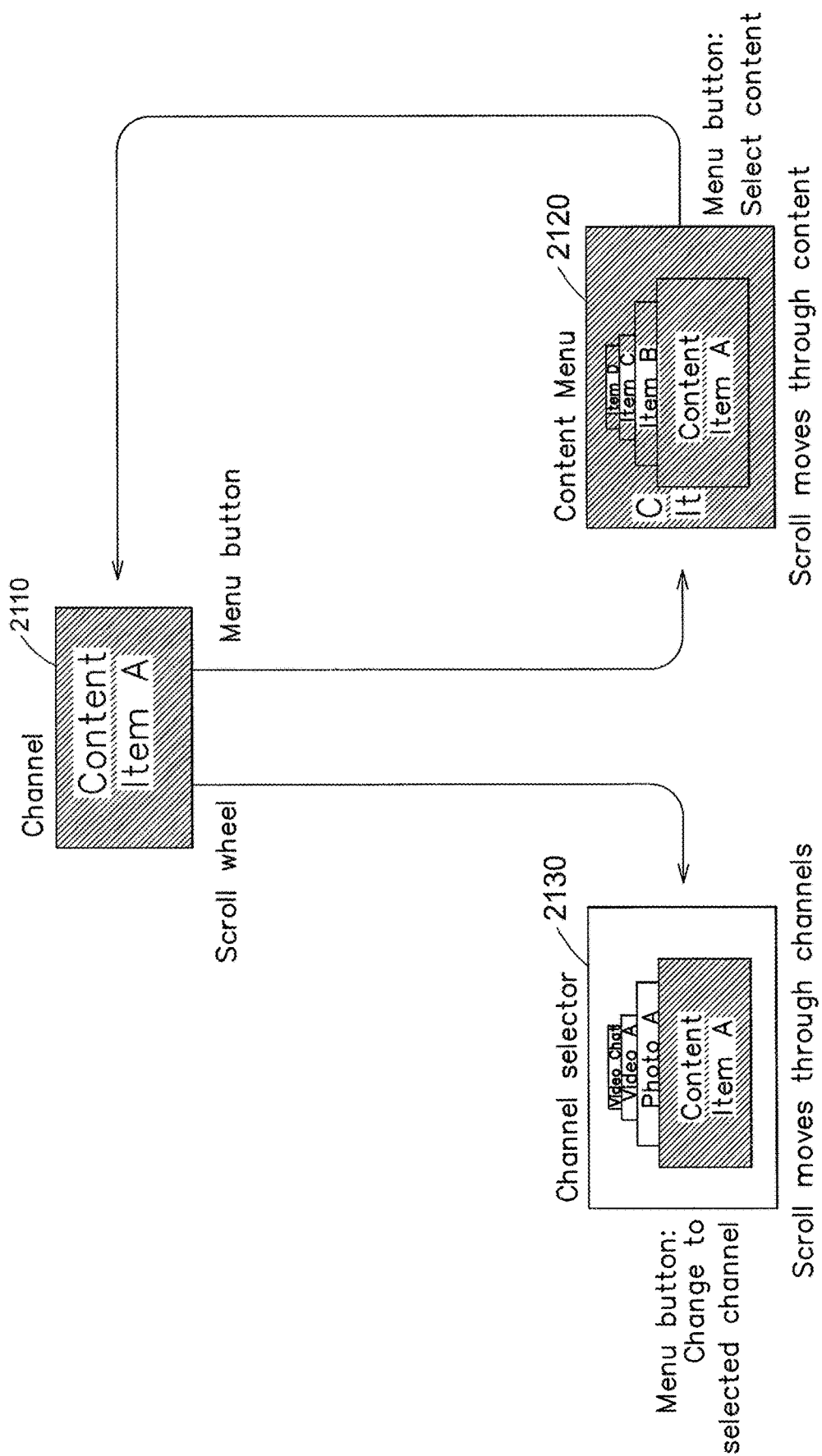
FIGS. 21A-B are examples of logical diagrams of the behavior for an example view of digital media content, according to aspects of the invention.

FIG. 21A, illustrates an example logical diagram of the behavior for the slideshow lens in the channel view. From channel page view 2110, selection of a menu button causes the device to display a content menu 2120, over the present channel page view. Selection of the menu button from the content menu, causes the device to display the selected content item in a channel page view 2502. The menu button may be a clickable button displayed on the screen (not shown in FIG. 19) or may be a hardware button, such as a button on the keyboard 106 (see FIG. 1) or one of the navigation buttons 122, 124 discussed above. In one example, from the channel page view 2110, operation of the scroll wheel 120 (see FIG. 4), causes the device to display a channel selector view 2130. The channel selector may allow the user to select different albums or different channels for display. It is to be appreciated that the navigations discussed in reference to examples of navigating through photo content in the channel page view and slideshow lens may be similarly applied to channel page views of cards other than the digital media card, optionally using lenses other than the slideshow lens.

In one embodiment, if the user presses the menu button while looking at a particular item, a content menu for the album to which that item belongs is displayed, as shown in FIG. 20A. In one example, the content menu 2010 is configured to be responsive to manipulation of the embedded scroll wheel 120 discussed above. Manipulation of the scroll wheel 120 progress through the displayed content menu 2010, and in response the system displays the selected content in the full view with preview text appearing below. Manipulation of the scroll wheel 120 causes the system to scroll through the photos in the current album. In one embodiment, the content menu 2010 transitions between selections by rendering the apparent movement of the entire content menu either to the left of the right depending upon the orientation of the manipulation of the scroll wheel 120. Alternatively, the content menu is also responsive to arrow keys on the keyboard 106. Depressing an arrow key causes the system to display the apparent movement of the content menu 2010 to the next item. In one example, if the image 1025 belongs to more than one album, the system shows the content menu for the first album. If the item does not belong to any album, the system may show the content menu for unsorted images. In another example, pressing and holding the menu button may cause a content menu to be displayed, allowing the user to scroll through and select a particular album. A prompt 1930 may be displayed, as shown in FIG. 19, providing the user with instructions for changing the album.

Figure 20B:
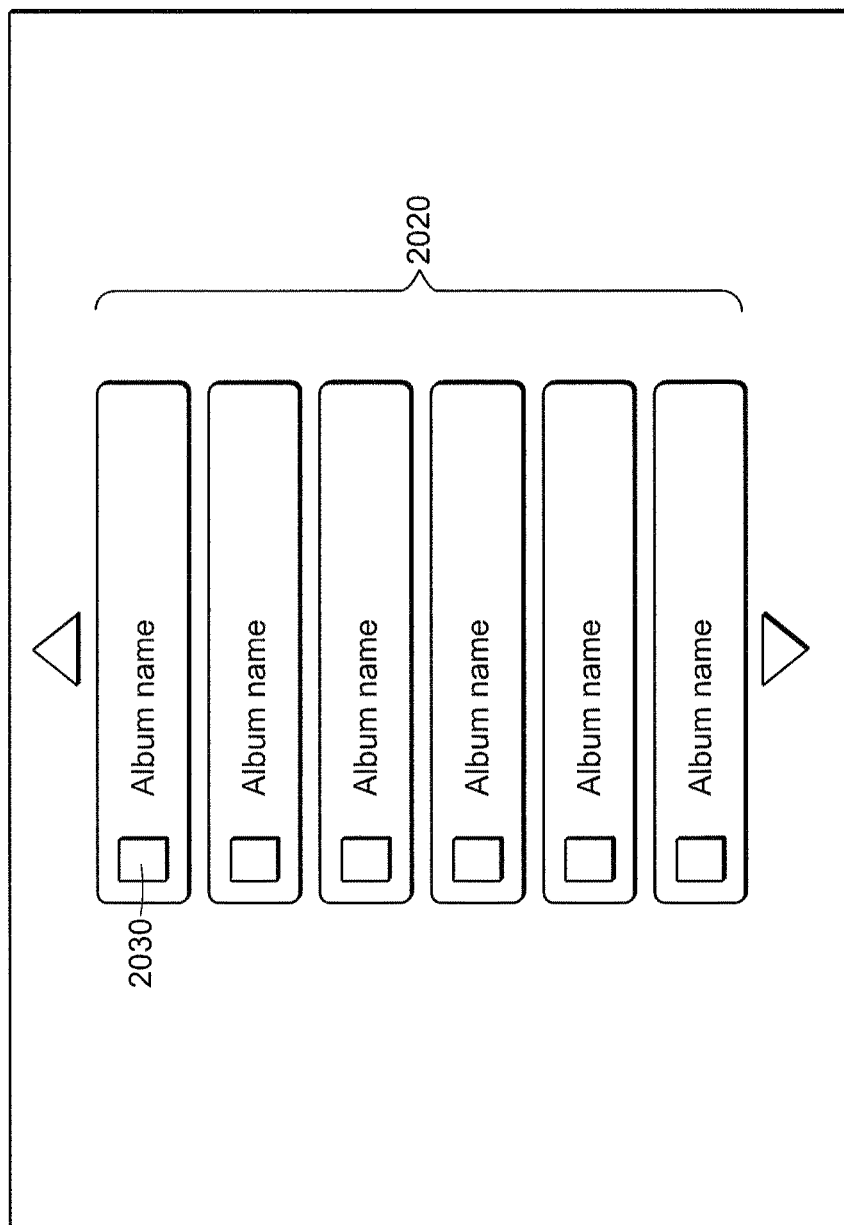
FIG. 20B is a block diagram of one example of a view of digital media content including a contextual control, according to aspects of the invention.

According to one embodiment, if the user presses and holds the menu button, a contextual menu 2020 of all of the albums in the digital media library appears, as shown in FIG. 20B. The user may then use the scroll wheel 120 to navigate to any of the albums. The contextual menu 2020 may display the title of the albums, along with a representative, first or random thumbnail 2030 of a content item in the album. In one example, pressing the menu button opens the selected album, showing the first image in full screen and proceeding to show the rest as usual.

Figure 21B:
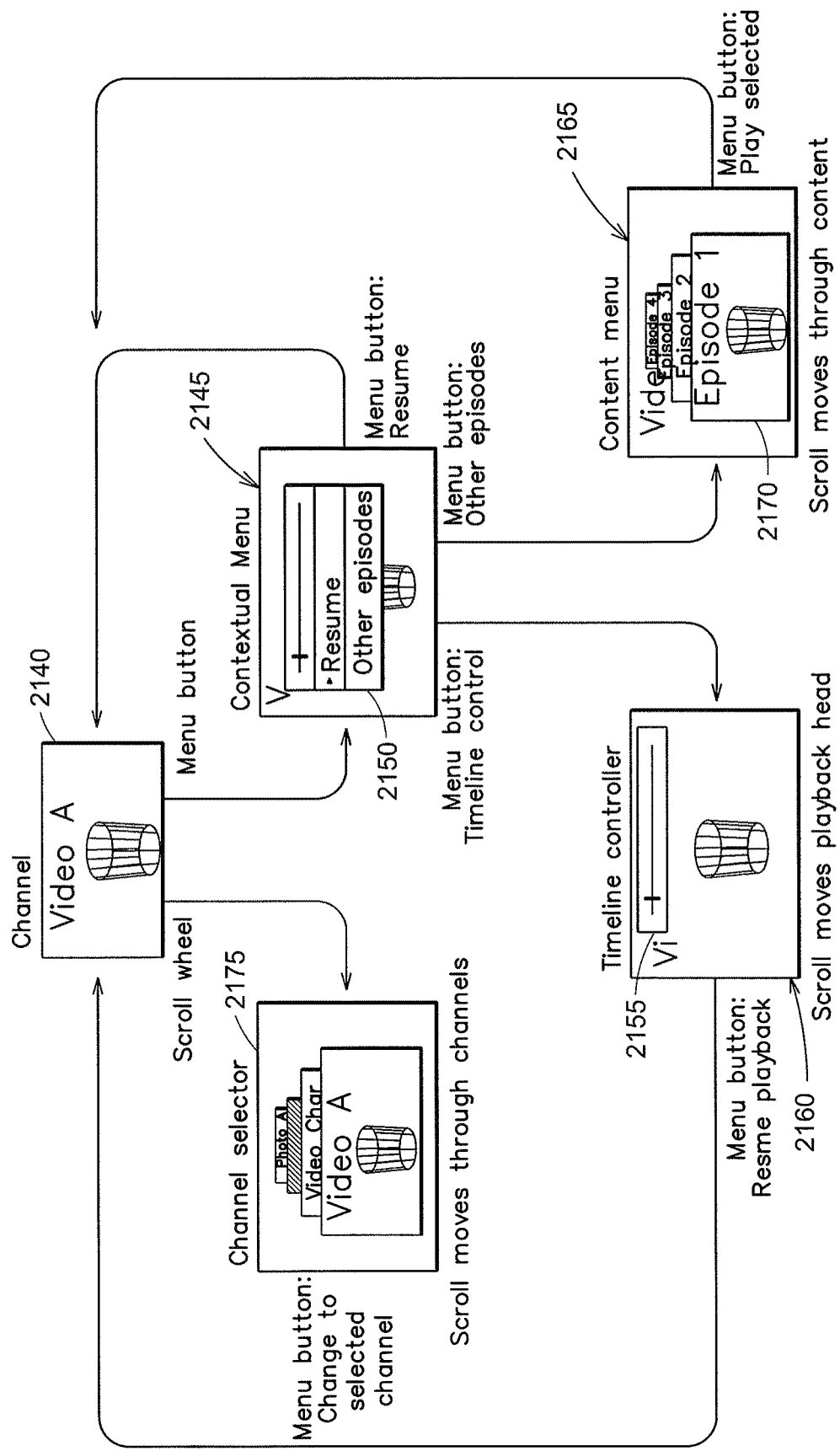

According to one embodiment, channels for displaying video content and/or audio content operate with a different logical flow. In one example, additional interactivity is required to allow a user to, for example, stop a video, start a video from the middle, among other options. According to one embodiment, the streamlined device must be able to accommodate routine operations through manipulation of only a scroll wheel and a mouse, for example when the device is in an easel mode. It is to be appreciated that in other configurations the logical flow for the behavior of the channel view may be different, and may take advantage of addition input/output devices available in other device modes. Shown in FIG. 21B, is an example of a logical flow for device/UI functionality, during the normal operation of a channel view of video content. At 2140 shown is a channel page view of video content. Select of button (e.g. one of the navigation buttons 122, 124), causes the device to display a contextual menu 2145. The Contextual menu 2145 may include a visual representation of selectable options 2150. The selectable options 2150 rendered may include at least a rewind/fast forward selector, resume selection, other episodes, etc. Selection of the rewind/fast forward selector invokes a timeline controller 2155 shown in the content page view 2160. In one example, the time line controller 2155 is responsive to rotation of the scroll wheel 120, providing fast forward in one direction and rewind in the other. From 2160, selection of a navigation button causes the device to return the view to channel page view 2140. Selection of "resume" from the options 2150 also causes the device to return the view to channel page view 2140. Selection of other episodes from 2150 causes the device to invoke a content menu 2165, which provides a selector view of available content for the channel. Selection of content 2170 from the selector view 2165 causes the system to play the selected content in channel page view 2140. From channel page view 2140, the device displays a channel selector 2175, in response to operation of the scroll wheel 120. The logical flow illustrated may be used for interactions with audio content as well, for example, to control playing of .mp3 or other audio files.

As discussed above, in one embodiment, the portable computer is configurable into different modes, including a laptop mode (in which the portable computer has a conventional laptop appearance), a flat mode, a frame mode, and an easel mode in which the base of the computer and its display component stand vertically forming an inverted "V," as discussed above. It is be appreciated that different user interface architectures may be invoked in response to different device modes. For example, a portable computer in laptop mode may display a home view 310 as discussed with respect to FIG. 16, whereas when configured in Easel mode, user may be presented with a channel page view, for example, the slideshow view discussed above.

Figure 22:
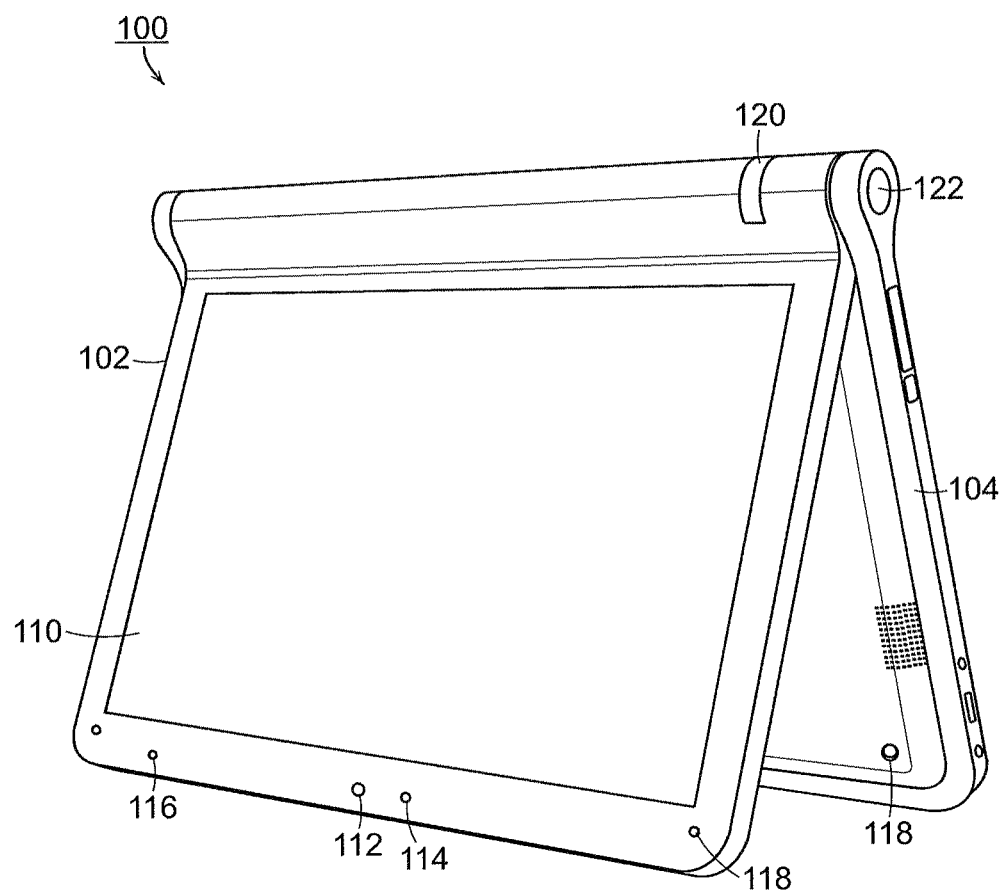
FIG. 22 is a perspective view of the portable computer of FIG. 1 in the easel mode, according to aspects of the invention.

Referring to FIG. 22, there is illustrated an example of the portable computer 100 configured into the easel mode. To convert the portable computer 100 from the laptop mode (or closed position) into the easel mode, the display component 102 may be folded away from the base 104, in the same direction as to open the computer (i.e., to configure the computer from the closed position into the laptop mode) such that the base 104 and the display component 102 form an inverted "V" shape with the bottom of the base and the back of the display component face another, as illustrated in FIG. 22. In the easel mode, the display screen 110 is visible and accessible on one side of the portable computer 100 and the keyboard 106 (not shown in FIG. 22) is visible and accessible on the other side. Having the portable computer 100 be configurable between different modes supports the presentation of computer content using visual representation optimized for different viewing modes. In particular, ones of the visual representations are configured to display in a "lean forward" user viewing mode and a "lean backward" viewing mode. In one example, a lean forward user viewing mode includes a user typing at a keyboard of a laptop computer. In another example, a lean backward user viewing mode includes a user viewing a television from a distance. One should appreciate that the examples provided are illustrative and are not intended to be limiting. The configurable portable computer 100 permits a user to select a device configuration most suited to a particular user viewing mode. According to one embodiment, the easel mode of the device permits improved "lean back" interactions with computer content. In other words, the easel mode makes it easier to view the streamlined device's display from distances greater than conventionally used with laptop computers.

According to one embodiment, the function or display content and/or display orientation of the portable computer may vary when the portable computer is configured from the laptop mode into the easel mode, or vice versa. Thus, selection of a lean backward user viewing mode at triggers the portable computer 100 to transition to a content display that improves user interaction in that mode. For example, in response to configuring the device into the easel mode, the computer system display may transition to a channel viewing mode. The channel viewing mode is configured to present computer content, in large footprint displays, and further is designed to streamline user interaction with the streamlined device by permitting access through a first I/O profile associated with the streamlined device in easel mode. The first I/O profile in easel mode may consist of a scroll wheel and a selector button. In some embodiments, the first I/O profile may include a volume control. In another example, for at least some activities within at least some modes of content (e.g., viewing a photograph or video), when the portable computer 100 is configured into the easel mode, the display may automatically adjust to "full screen view" (i.e., the displayed image or video is displayed on the full screen size, rather than in a window) to allow for comfortable viewing.

In addition, in one embodiment, when the portable computer 100 is configured into the easel mode, the visual display on the display screen 110 is automatically rotated 180 degrees such that the information appears "right-way-up," even through the display screen is upside-down compared to when the portable computer is in the laptop mode. Thus, a user may simply "flip" the portable computer 100 into the easel mode and immediately be able to comfortably view information on the display screen 110, without having to access display screen controls to adjust the orientation of the visual display. The ability to configure the portable computer 100 into either the laptop mode or the easel mode provides enhanced functionality. For example, when the portable computer 100 is not being actively used, the user may configure the portable computer into the easel mode, and program the portable computer to act as a digital photo frame, displaying one or more photos of the user's choice. In the easel mode, the portable computer 100 may occupy a smaller footprint on a surface than in the laptop or closed modes because the base 104 and display component 102 are upright, as illustrated in FIG. 22. In addition, because the portable computer can act as a passive information and/or entertainment device, such as a photo frame, as discussed above, the portable computer may provide a useful function even when not being actively used by the user, and may do so (in the easel mode) without taking up much surface area.

Figure 23:
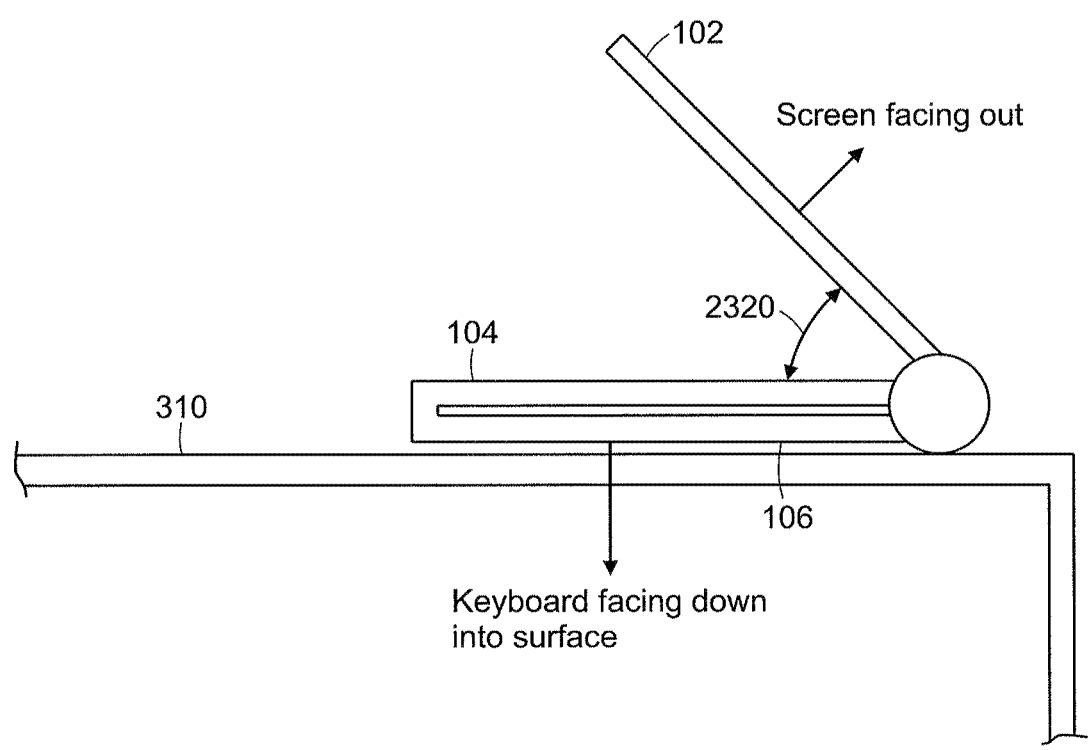
FIG. 23 is an illustration of the portable computer configured into a "frame" mode, according to aspects of the invention.

In another example, the portable computer 100 may be configured into a "frame" mode, as illustrated in FIG. 23, in which the portable computer is placed on a surface 2310 with the keyboard 106 "face down" on the surface 2310 and the display 110 facing upward. In the frame mode, the display component 102 may be at a similar orientation, and angle 2320, with respect to the base component 104 as in the easel mode. However, rather than the base component 104 and display component 102 being oriented vertically with respect to the surface 2310, as in the easel mode (in which the portable computer forms an inverted "V" as discussed above), in the frame mode, the base component 104 may lie flat on the surface 2310, as shown in FIG. 23. In one example, software and/or hardware protection may be provided for the keyboard to prevent keys from being pressed (or to prevent the portable computer from responding to pressed keys) when the portable computer is in the frame mode.

According to some embodiments, the streamlined computer system/device includes a plurality of I/O devices that a user needs to operate and transitions between modes (e.g. frame and easel) triggers the presentation of different I/O profiles to the computer user. One should appreciate that the various I/O profiles can be selected through physical configuration of the device. By providing the user the ability to change from a first I/O profile to another, at will, improves the user experience and permits the user to dynamically select a preferred I/O profile best suited to the user's present need. According to one embodiment, user selection of I/O profile includes transitioning from a lean back mode to a lean forward mode and vice versa. In one embodiment, the user's computer device is configured to have multiple I/O profiles that can be selected by physically manipulating the orientation of the computer device itself.

According to one aspect, streamlining user interactions with the computer system/device includes representing computer based content in visual representations that render computer operations/behavior in a consistent manner. The visual representations are adapted to permit easy user interaction even upon selection of a first I/O profile or the change in selection of an I/O profile. According to one embodiment, the visual representations are rendered as cards. Different types of cards may be employed to render different types of available content. For example, web based content, may be rendered as a web card that associated with a mapping to web content. Some web cards map directly to web pages and in response to selection of the web card the computer device executes the mapping and displays a web view of the content. Other cards may be used to provide interactive displays selectable by a user. In another example, system operations are displayed as system cards, which are associated with mappings to system operations, for example communications configurations, and may comprise a settings card, among other system options. Another type of card includes a channel card configured to stream web based content in a manner that allows for summarization of content, while still providing the ability to fully appreciate the summarized content.

In one example, a streamlined hardware device provides for (in comparison to typical desktop and laptop systems) a reduced user input platform as a first I/O profile, comprising in one configuration a scroll wheel and a button interface. Other I/O profiles are available for user selection by manipulation of the device itself. In one embodiment, an easel mode presents the user with the first I/O profile and by rotating the computer device about a longitudinal axis; the user may select a second I/O profile, including a keyboard (e.g. laptop mode). The transition from one I/O profile to another may also cause the computer device to alter its display. In one example, the user interface provided to the user is responsive to selection of device mode and/or selection of I/O profile.

It is to be appreciated that reducing the number of I/O device achieves simplicity of design and ease of operation by the user, and at the same time may increase the complexity of the graphical user interfaces needed to support interaction with systems and third parties that anticipate, rely on, or expect additional I/O devices. Streamlining device operation by the user is balanced against sophistication of user the interface required to enable user interaction with the same features used with additional I/O devices. According to one embodiment, the user interface layer provides simplified accessibility based on the device's I/O platform, and for some embodiments, the user interface layer is responsive to device configurations that change the device's I/O capabilities. In other embodiments, the user interface is responsive to changes in the device's mode. In some examples, changes in device mode and changes I/O profile will occur together, however, in other examples a change in mode or a change in I/O profile will not require a corresponding change in profile or mode respectively.

Figure 30:
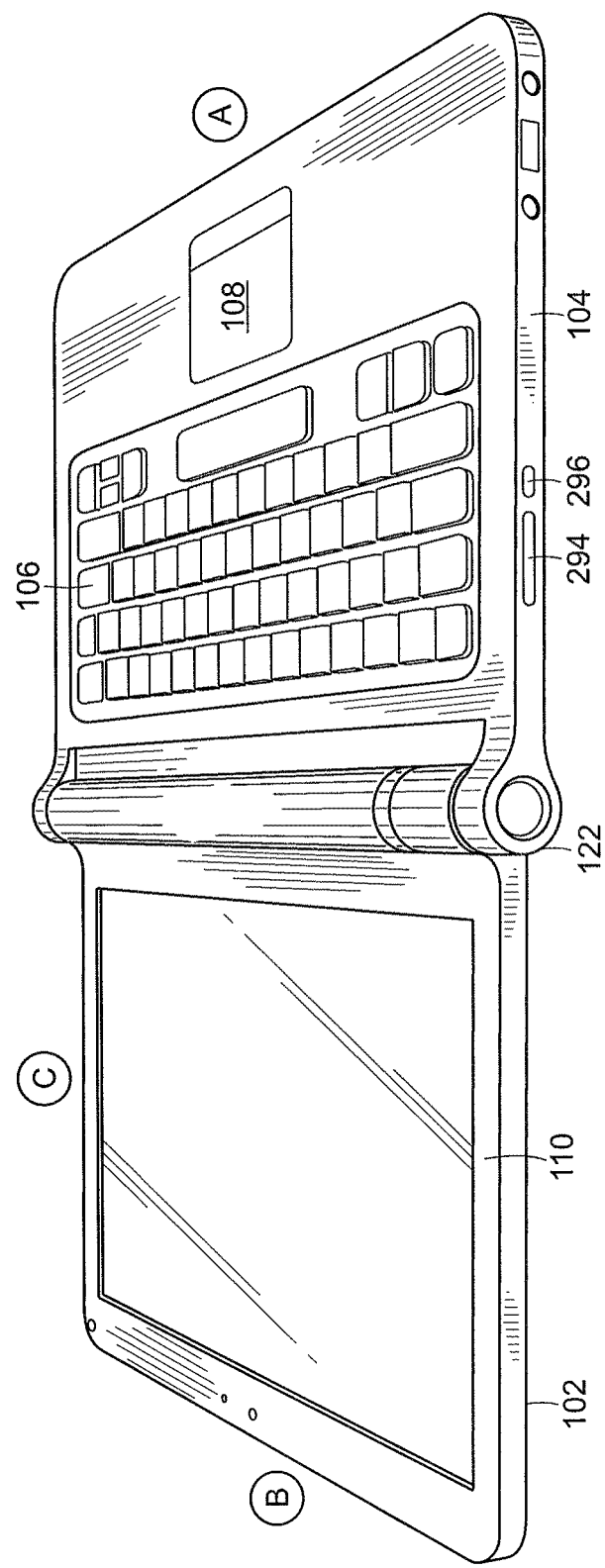
FIG. 30 is an illustration of the portable computer configured into a "flat" mode, according to aspects of the invention.

Referring to FIG. 30, there is illustrated another configuration of the portable computer 100, referring to as the "flat" mode. In the flat mode, the display component 102 may be rotated (or opened) to approximately 180 degrees with respect to the base component 104, such that the base component and display component lay flat on a surface, with the keyboard 106 and display screen 110 exposed, as shown in FIG. 30. Unlike the easel and frame modes, in which the keyboard may be concealed and not easily accessible, in the flat mode, the keyboard is accessible and usable. In addition, as discussed above, the visual display on the display screen 110 may be automatically rotated to accommodate comfortable viewing of information by persons located in different positions relative to the base component 104 or display component 102. The visual display on the display screen 110 may also be manually adjusted by a user using, for example, the keyboard 106, touch pad 108 or mouse (not shown), scroll wheel 122 or navigation buttons (not shown). For example, if a user (located at position A) wishes to display information for a person located opposite the user (at position B), the visual display may be rotated (automatically or manually) 180 degrees such that the information appears "right-way-up," to the person at location B, even through the display screen 110 is upside-down for that person. Similarly, in another example, the visual display may be rotated (automatically or manually) 90 degrees such that the information appears "right-way-up," for a person at location C. In one example, a user can "toggle" the visual display among various orientations. For example, a user at location A may have the visual display facing themselves while using the keyboard 106 or other controls to change or access information on the display, then toggle the display orientation 180 or 90 degrees to display the information for persons at locations B or C.

According to another aspect, system and interface streamlining may be employed with devices of multiple configurations. In some embodiments, multiple configurations include a traditional configuration, for example, a configuration similar to a laptop device, and also include new configurations, for example, an easel mode. Some examples of streamlined devices have the ability to change between traditional configurations and other configurations. The change between configurations may change the I/O profile of the device and hence impact the user's interaction with the device itself and any content displayed on the device. In one embodiment, the user interface is responsive to changes in configuration. In another embodiment, the user interface is responsive to changes in I/O profile.

According to another aspect, the streamlining of the user's multi-media experience incorporates the device the user uses to interact with multi-media sources, whether the sources are on-line or provided by the device itself. Streamlining of the device includes developing consistent user interfaces for the user to access all features presented. The device's graphical user interface layer is customized to the I/O interfaces provided. In one example a device is provided in the form of a portable computer configurable between a laptop mode (in which the portable computer has a conventional laptop appearance) and an easel mode in which the base of the computer and its display component stand upright forming an inverted "V," a closed mode, a laptop mode, an easel mode, a flat mode and a frame mode. According to one embodiment, each of the display modes may employ different I/O profiles.

In some embodiments, multiple configurations include a traditional configuration, for example, a configuration similar to a laptop device, and also include new configurations, for example, an easel mode. Some examples of streamlined devices have the ability to change between traditional configurations and other configurations. The change between configurations may change the I/O profile of the device and hence impact the user's interaction with the device itself and any content displayed on the device. In one embodiment, the user interface is responsive to changes in configuration. In another embodiment, the user interface is responsive to changes in I/O profile.

Referring again to FIG. 16, the computer system may include various system cards that map to computer functionality. Functionality mapped to by system cards may include, for example, a communications card, for configuring wireless access of the device, bookmarks for presenting conventional styled web page bookmarks, and a camera card for providing for configuration and operation of a camera, either embedded in the device upon construction, or incorporated through for example a USB port. According to one embodiment, a camera system card 1622 may provide a user with an easy way to get digital photographs and/or videos off their digital camera and stored safely in the cloud 330 with their online hosting service. The camera card may provide information and support during each stage of the process: before, during and after a digital camera is connected to the portable computer 100 and the content items uploaded to the cloud 330.

Digital cameras typically present themselves to computers as storage devices. In many cases, the portable computer 100 may not be able to distinguish between a digital camera, a memory card reader, a USB drive, or other attached storage devices. Therefore, according to one embodiment, the camera card treats all such devices in the same way. Thus, the camera card may support the upload of images and videos regardless of the type of devices on which they are stored. Accordingly, although the following discussion may refer primarily to a camera, the term "camera" is intended to be synonymous with digital camera, card reader, USB drive, or other attachable storage device.

According to one embodiment, when a camera is attached to the portable computer 100, the camera card becomes available in a channel view, where it displays images on the card using the slideshow lens. However, it will be appreciated that the camera card may also become available in the home view or another view, and may display the images using a lens and/or view other than the slideshow lens. When no camera is attached to the portable computer, the camera card may nonetheless be visible in the home view 310. Selecting the camera card may "open" the card into a "page view" (i.e., the card is viewed full screen) and may display instructions/information about connecting a camera to the portable computer 100. When a camera is first attached to the portable computer 100, the system may zoom into the camera card and present the user with several options. For example, the user may be able to upload all the images from the camera to the online photo hosting service, allowing the system to create default albums. Alternatively, the user can customize the upload by adjusting albums and selecting from multiple online services, as discussed further below. In another example, the user can simply view the images that are on the camera, without necessarily initiating an upload. In one embodiment, while photos and/or videos are being uploaded to the cloud 330, the user can continue to review images on the camera card. As discussed further below, the user may also see the upload progress both in the camera card and in the digital media card 1620a. The presence of a camera attached to the portable computer need not constrain the user's access to the rest of the system. The user may simply navigate away from the camera card to interact normally with the portable computer and use its other functions.

Figure 24:
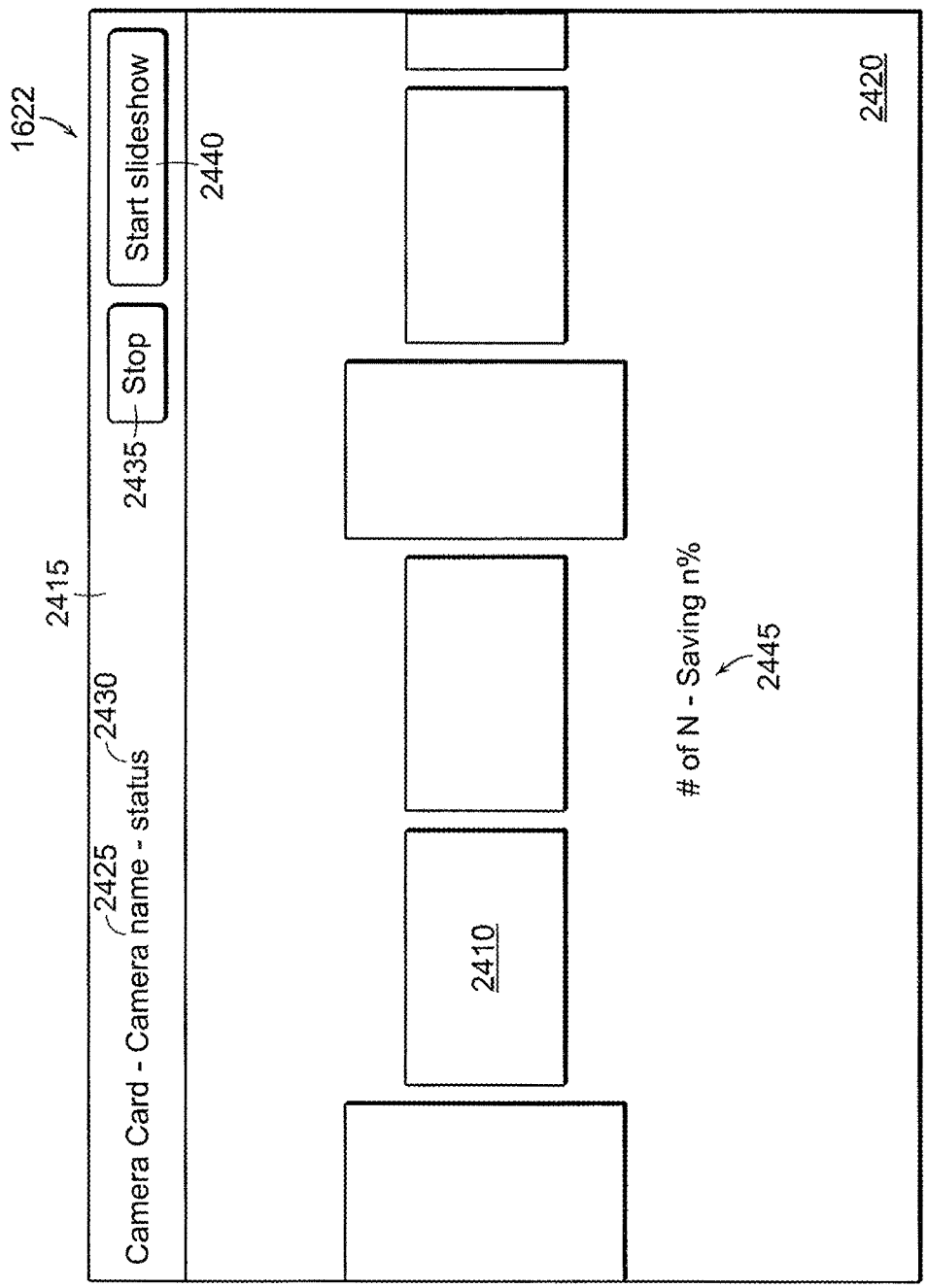
FIG. 24 is a block diagram of an example of a page view of a camera card including a progress indicator of an upload in progress, according to aspects of the invention.

Referring to FIG. 24, there is illustrated an example of a page view of a camera card 1622 showing an upload of images 2410 in progress. The camera card 1622 includes a header 2415 and a body 2420 in which the images 2410 are displayed. The header may include information that identifies the card 1622 as the camera card and, when a camera is connected to the portable computer 100, information 2425 that identifies the connected camera (e.g., a make/model of the camera). The header may also include status information 2430 that tells the user the current activity being performed by the camera card, for example, "saving new photos and/or videos." The header may also include a "stop" control 2435 that allows the user to stop the saving/upload process, as well as a display control 2440 that allows the user to, for example, cause the camera card to display the images 2410 using the slideshow lens. In the body 2420, a status indicator 2445 may inform the user of the progress of the save/upload process. For example, the status indicator 2445 may tell the user that 34 of 70 content items have been processed and the save is 50% complete.

Figure 25:
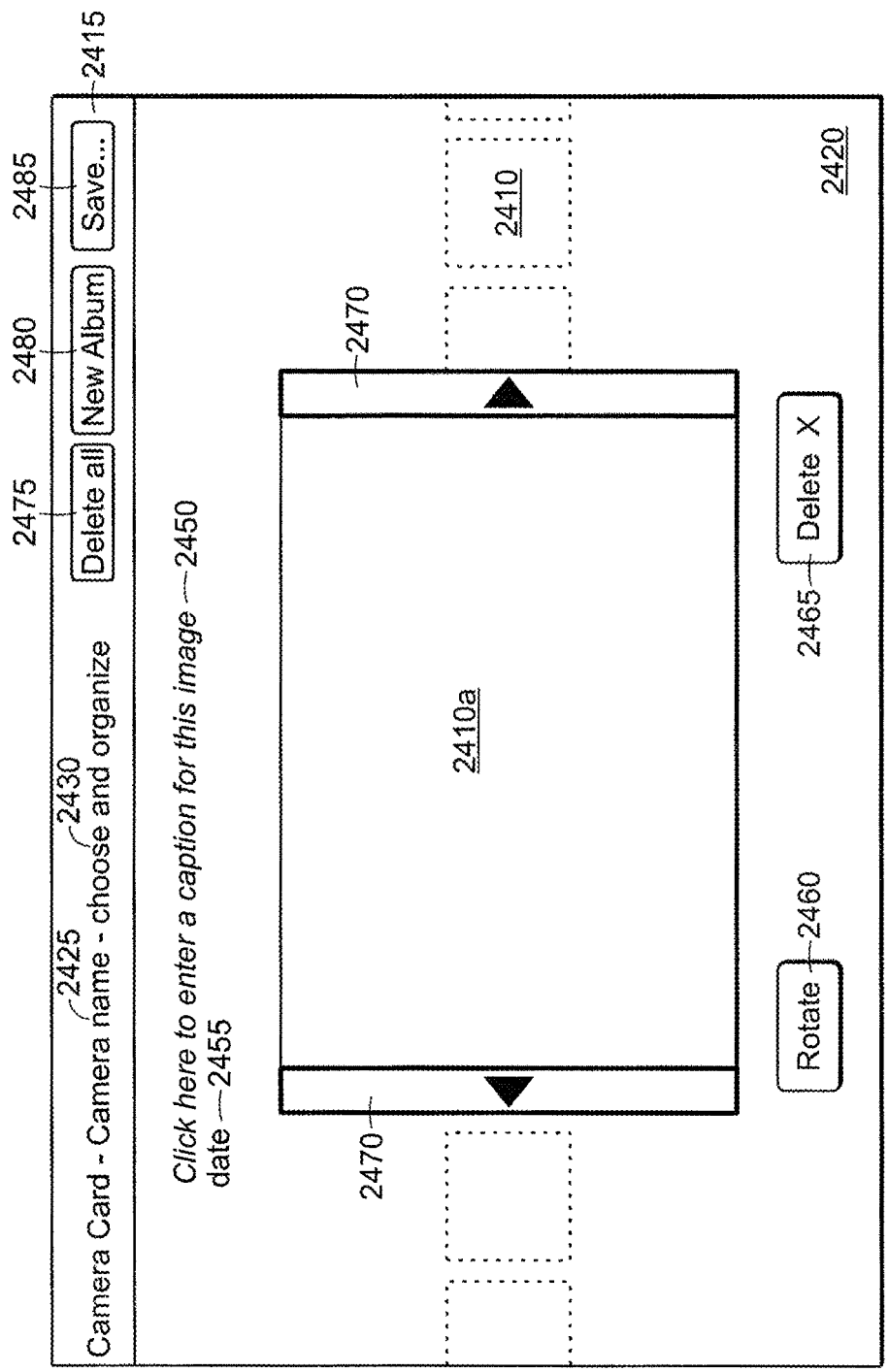
FIG. 25 is a block diagram of an example an intermediate view of a camera card, according to aspects of the invention.

In one embodiment, clicking on an individual image 2410 on the camera card 1622, regardless of the stage of the upload process, may bring the user to the intermediate view, as shown in FIG. 25. The other images re-arrange themselves to form a horizontal line of images sorted by the date the items were taken with older items to the left. The intermediate view for the camera card 1622 is similar to the intermediate view for the digital media card 1620a discussed above. In one example, in the intermediate view for the camera card 1622, the user options may include the ability to edit a caption for the selected image 2410a by typing into the caption field 2450. The date field 2455 displays the date of the image underneath the caption area. In one example, if the user clicks on the date field 2455, it becomes editable, allowing the user to correct the date in case the camera does not have the correct date, as discussed above. If the user corrects the date and saves the changes, the system may then prompt the user to see whether it should change the dates for the rest of the contents of the camera by the same offset. The intermediate view of the camera card 1622 may also include a rotate option 2460 which may allow the user to rotate the image 2410, as also discussed above. In one example, each click on the rotate button 2460 rotates the image (either clockwise or anti-clockwise) by 90 degrees, and the user may thus click as many times as necessary to rotate the image by the desired amount. A delete option 2465 deletes the item from the camera card, after prompting the user to confirm the delete. As in intermediate view in the digital media application, the user can navigate between photos and videos by clicking on the left or right navigation bars 2470, or by using the arrow keys or other controls as would be recognized by those skilled in the art. In one example, clicking anywhere on the image 2410 shows the image full-screen. The header 2415 may also include controls for deleting items (control 2475), creating a new album (control 2480) and saving (control 2485), each of which is discussed further below.

When no camera is connected to the portable computer 100, or when the system does not see a camera, it may be in one of two states: normal or interrupted upload (discussed below). According to one embodiment, in the normal state, the camera card 1622 on the home view 310 displays a generic camera image, and selecting the camera card may display some helpful information about how to connect a camera to the portable computer, as discussed above. By placing the camera card on the home view 310, even when no camera is connected, the capabilities of the camera card application are highlighted. For example, a user, upon seeing the camera card, may be reminded to connect a camera to the portable computer, making it more likely that the user will use the portable computer for managing digital media content items.

According to one embodiment, when a user attaches a camera to the portable computer 100, the user sees an animation of the system going to the home view 310, scrolling as necessary to the page containing the camera card 1622 (which may show thumbnails of the content of the camera), then zooming into the camera card. In one example, if the user has already selected the camera card and is viewing the camera card in the page view prior to connecting the camera, this animation may not show. Once in the page view for the camera card, the user can see the contents of the attached camera, and may be given options for what can be done with the content on the camera. These options may be displayed, for example, in a bubble that appears over the line of images 2410. In one example, the options include a simple save and an advanced save. The simple save option may save the contents of the camera card to the user's online photo hosting service with automatically created albums. If the user has registered more than one online hosting service, the user may select the desired service from a drop-down menu. The advanced save option provides the user with the opportunity to manipulate the automatically saved sets, delete photos, and/or save photos to multiple online hosting services, as discussed further below.

Figure 26:
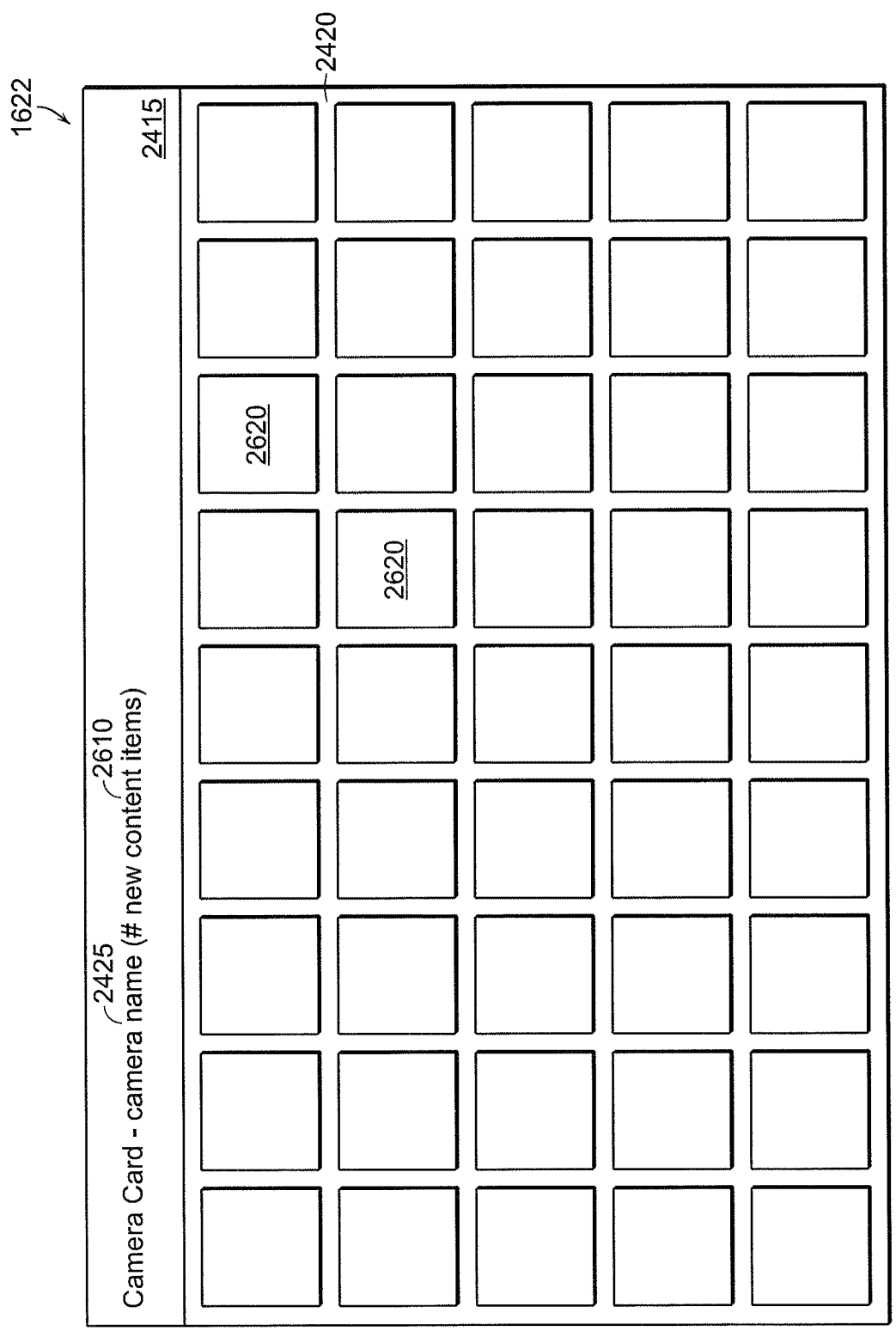
FIG. 26 is a block diagram of a thumbnail view of a camera card, according to aspects of the invention.

In the page view, as shown for example in FIG. 24, the user can interact with the images on the camera. This interaction may be similar to interacting with digital content items in the time view or album view discussed above. As discussed above, the user is free to interact normally with the entire system even when a camera is attached, and is not required to first complete any action associated with the camera card. For example, if the user returns to the home view 310 without initiating an upload of images, the camera card 1622 shows thumbnails 2620 of the images on the attached camera, as shown for example in FIG. 26. The header 2415 of the camera card may also display the number 2610 of new content items on the camera.

According to one embodiment, once a user has connected a camera to the portable computer 100 and is brought to the camera card, the user may rely on the system to create albums by selecting the simple save option. The upload process then begins, as discussed further below, using automatically-generated albums and saving images to the user's registered online photo hosting service. If there is more than one photo hosting service associated with the portable computer, the simple save option may default to the service that was used during the last upload. Some existing photo hosting services do not support video content. Accordingly, the portable computer may provide video storage services, either locally or through the cloud 330. Accordingly, users may have more than one service associated with the portable computer 100; however, the difference between the photo hosting service and the video hosting service may be seamlessly transparent to the user. In one example, in the simple save mode, by default, "delete items from the camera when they are safe" is checked. If a user prefers to leave the images on the camera, the user can uncheck this box before initiating the simple save option.

As discussed above, in one embodiment, the system may save the user time and effort by automatically organizing digital content items, including photos and videos, into albums. In one example, albums are created by date, with photos and videos taken on the same day going into a single album. If a set of photos are close in time (e.g., are taken within 90 minutes or so of each other) but span two days, the album may span those two days as well. For example, it may not be uncommon to see images taken just before and just after midnight on New Year's Day, and these images may be grouped into a single album. In one example, automatically generated albums may not contain fewer than a predetermined number of images, for example, five images. In the case that fewer than five photos for a single date are on the camera (or if there are fewer than 5 photos total on the camera), the photos may appear in the unsorted photos area discussed below. In one example, the default name of the automatically generated album is the date (or date range) on which the content items were taken.

Figure 27:
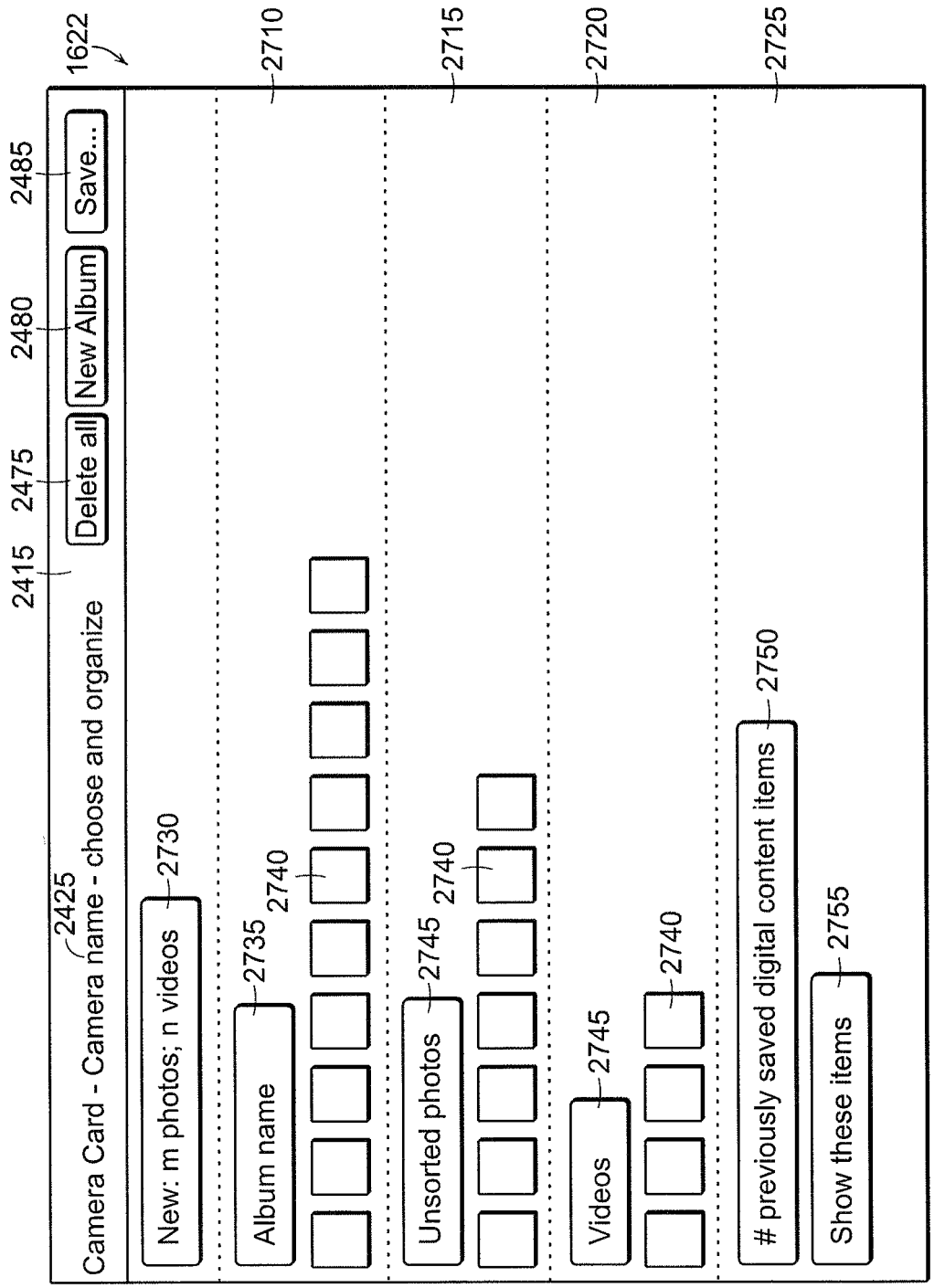
FIG. 27 is a block diagram of a organizational view of digital media content, according to aspects of the invention.

As discussed above, an alternative to the simple save option is the advanced save option. Selecting the advanced save option may bring the user to a "choose & organize" screen, an example of which is illustrated in FIG. 27. From the "choose & organize" screen, the user may organize digital content items before uploading them. Referring to FIG. 27, in one example, the "choose & organize" screen has four main areas, namely, albums 2710 which may appear at the top of the list and comprise automatically generated albums and/or albums that the user creates manually; unsorted photos 2715, videos 2720; and previously uploaded content 2725 which may appears at the end of the list. The "choose & organize" screen may also display a new content indicator 2730 which tells the user the number of new photos and videos on the camera. In one embodiment, automatically generated albums (discussed further below) are arranged in chronological order starting with the newest album at top. It is to be appreciated that although only one album 2710 is shown in FIG. 27, the "choose & organize" screen may display any number of albums. A scroll bar (not shown) may be used to scroll up and down the page if there are more albums than can be displayed at one time on the screen. In one example, if the user corrects the date of items in an automatically generated album, the album date may update to reflect the change, and the order of the albums in the list may be automatically updated. Each album 2710 includes an album title 2735 and thumbnails 2740 of the content items included in the album. When the user hovers over any part of an album 2710, that album may become active. When an album 2710 is active, the album title 2735 becomes an editable field, and a "dissolve album" button (not shown) is revealed. In one example, clicking the "dissolve album" button causes all the photos from that album to be placed into the unsorted photos area 2715.

According to one embodiment, "unsorted photos" (i.e., those not associated with an album) are displayed in the unsorted photos area 2715. The unsorted photos area 2715 includes a header 2745 identifying the area to the user, and also includes thumbnails 2740 of all items included in the unsorted photos area. In one example, when the camera is first attached, the unsorted photos area 2715 may be empty. A user can drag individual photos out of albums 2710 into the unsorted photos area 2715. As discussed above, a user can also click the "dissolve album" button (not shown) on an album 2710, thereby sending all the photos in that album to the unsorted photos area 2715. The user can also drag photos from the unsorted photos area 2715 into an album 2710. The videos area 2720 may similarly include a header 2745 identifying the area to a user, and thumbnails 2740 of an image of each video.

In one embodiment, if a user clicks the "new album" control button 2480 in the header 2415, a new album is added to the top of the list, pushing other albums down. When the new album appears, the title 2735 of the album may be pre-populated with "new album," but this title may also be selected/active so that the user can simply start typing to replace it. The user can then drag individual photos from other albums or from the unsorted photos area 2715 into the new album. The new album control 2480 may also be selected from the intermediate view, as shown in FIG. 25.

From the "choose & organize" screen a user may also delete items, such as, for example, out-of-focus or unflattering photos. In one example, the camera card supports batch deletion. This process may also provide the user with a safety net, making it more difficult to delete a content item by accident. In one example, when the user hovers over an individual thumbnail 2740, a check box labeled "delete" (or similar language) appears, and once the user checks the box, the image dims. The check box (without the "delete" label) may remain visible after it is checked, even if the user moves the cursor away from the item, making it very visually clear how to reverse the action. Un-checking the box may return the item to full saturation. When the user marks one or more items for deletion, the control buttons 2480 and 2485 in the header 2415 may be replaced with an "unmark all" option. The "delete all" control 2475 may remain or be replaced with "delete marked items." If user selects the "unmark all" control, all the items marked for deletion are unmarked. Selecting the delete control 2475 deletes the marked items and the thumbnails 2740 are removed from view. The remaining thumbnails 2740 may then rearrange themselves appropriately. The user can also delete items from the intermediate view shown in FIG. 24. In some cases, the camera (or other media device) that the user connects to the portable computer 100 may be locked or otherwise write-protected, making deletion impossible. In this case, the delete buttons (in the header 2415 and overlayed onto the thumbnails 2740) are dimmed, and information may be included in the header 2415 that indicates that the camera is locked. In this state, if the user hovers over the dimmed "delete all" button 2475 in the header 2415, a message may be displayed, such as "no deletion possible because the memory card is locked."

Still referring to FIG. 27, the user may move digital content items among different albums 2710 and to and from the unsorted photos area 2715. For example, the user can drag photos between albums 2710, from albums 2710 to the unsorted photos area 2715, or from the unsorted photos area into albums. When the user drags a photo, other thumbnails 2740 on the screen rearrange themselves to accommodate the added/removed item. In one example, because videos are saved separately from photos, the user may not be able to drag videos from the video area 2720 into albums 2710. Similarly, the user may not drag a photo into the video area 2720. In one example, if the user attempts to drags a photo to an unavailable location (such as the videos area 2720 or previously uploaded items area 2725), the photo snaps back to its original location.

In one embodiment, if the user has previously uploaded items from a camera, but elected not to delete them, they appear in the "previously saved" area 2725. If there are no items that have been previously uploaded from the user's camera, the previously saved area 2725 may not appear. The previously saved area 2725 includes a header 2750 which identifies the area to the user, and may also display the number of previously uploaded content items that are on the camera. The previously saved area 2725 may initially not display thumbnails of the items, but instead display a "show items" button 2755. Clicking the "show items" button 2755 may reveal thumbnails of the previously uploaded items. The user may then select individual items to delete, or may drag photos from this area into albums 2710 or drag videos to the videos area 2720. If the user drags an item to an album 2710, the underlying behavior of the system on upload depends on the associated online photo hosting service. For services that use an "image stream" concept and therefore allow individual images to appear in multiple albums (e.g., FLICKR), the image may be added to the album using the camera card interface, but not uploaded again. For other services, the image may be uploaded again into the new album.

Figure 28:
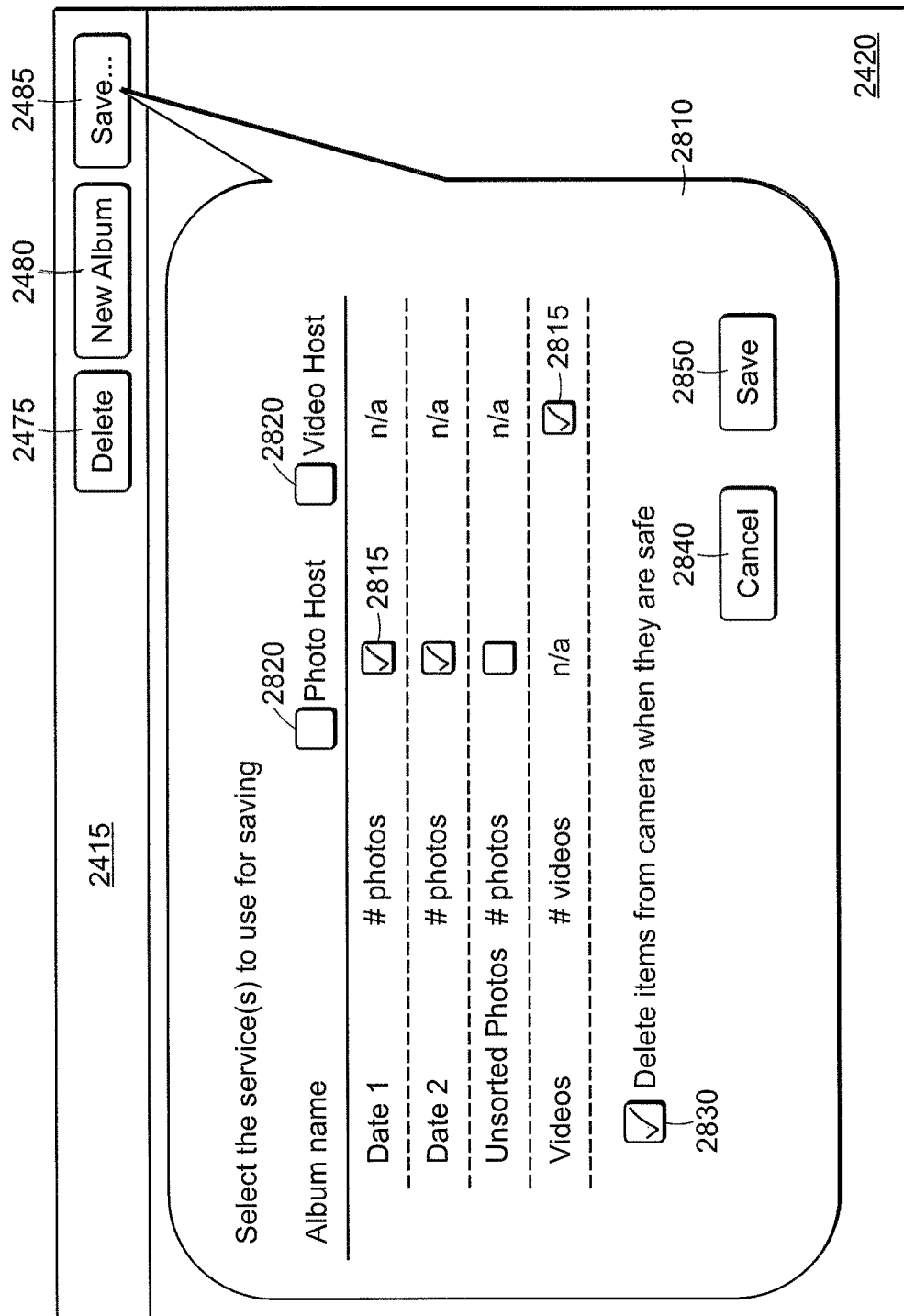
FIG. 28 is an illustration of an example view of user controls for digital media content, according to aspects of the invention.

According to one embodiment, clicking on a thumbnail 2740 brings the user to the intermediate view, shown, for example, in FIG. 25. Clicking anywhere in the background may return the user to the standard view of the "choose & organize" screen. When the user has organized the digital content items to his/her satisfaction, the user may click the "save . . . " control 2485 in the header 2415. In one example, clicking the save control 2485 causes a modal page bubble 2810 to appear, providing the user with options for saving, as shown in FIG. 28. The user may elect to save or not save each individual album, as well as unsorted photos and videos using the check boxes 2815. In the illustrated example, a check box is included with each column header to allow the user to quickly select all items in that column. If the user has registered more than one photo or video host service, a column may be provided for each service, identified by name. The user may then elect to save each individual album to one, all, or none of the services, using the appropriate check boxes. In one example, the system warns the user about potential restrictions a photo host service may place on videos (e.g., size, format, etc.), allowing the user to use that information in selecting where the videos are to be saved. A check box 2830 may be provided to given the user the option of whether or not the system will delete items from the attached camera after the items have been safely uploaded. In one example, deleting the items upon success-ful upload is selected by default. If the user does not select a service for a set of items (e.g., one or more albums, unsorted photos, or videos), the system will leave those items—they will not be uploaded, but they will also not be deleted from the camera. In this case, the information about the album (e.g., its contents and title) may be retained until the camera is disconnected from the portable computer. Thus, once the upload process for the rest of the items is complete and the user returns to the "choose & organize" screen, the album is still as the user arranged it. The bubble 2810 may further include a "cancel" button 2840 to allow the user the cancel the upload and return to the "choose & organize" screen, and a "save" button 2850 to initiate the upload process.

According to one embodiment, once the user initiates the upload process, by selecting either the simple save or advanced save option, the portable computer 100 begins uploading the digital content items to the cloud 330. As discussed above, the user may see the progress of the upload on the camera card. The user may also upload digital content items from within the digital media card 1620a. For example, the user may use the time view or album view to locate content items to upload, for example, to a social networking site or another online hosting service. In one example, the upload may be initiated from the user's pick list discussed above. Whether the upload is initiated from the camera card or the digital media card, the user may see information regarding the status of the upload, for example, whether each content item has been saved, how much progress has been made on the upload, which online hosting service the content item is being uploaded to, etc. In one example, during upload, the camera card displays the images being uploaded, with the current image shown enlarged. In one example, the user can interact with the images during the upload process. This interaction may behave similarly to the single album view in the digital media application discussed above.

In one example, all content uploaded on the user's behalf may be marked as "private" or the equivalent on their photo hosting service. This default behavior protects the user's privacy and keeps others from viewing the user's content without the user's permission. It is to be appreciated; however, that other default options may be implemented, and the user may be prompted to identify content as private or public, or equivalents thereof.

According to one embodiment, if the user has elected to have images deleted from the camera after upload, then each content item is deleted as soon as it is uploaded into the cloud 330. In one example, the user can still see the content items in the context of the camera card, however, until the camera is disconnected from the portable computer 100. Referring to FIG. 24, in one example, if the user clicks the "Stop saving" button 2435 in the header 2415, the upload stops and the system then returns the user to the initial screen as though the camera had just been attached. In this instance, content items that have already been uploaded and deleted from the camera are no longer included. The content item that was in process when the user clicked the "Stop saving" button 2435 will not have been deleted from the camera yet and may therefore appear. In another example, if the user had elected not to delete content items from the camera (e.g., by unchecking box 2830, content items that have already been uploaded may appear in the previously saved area 2725.

Once the upload is complete (i.e. the digital content items are safely stored in the cloud 330), the system may display an informational bubble letting the user know it is safe to remove the camera. The user may then be returned to the camera card page view (if the simple save option was used) or to the "choose & organize" screen if the advanced save option was used. In either case, the system recognizes that the content items have been uploaded. If the content items have been deleted from the camera, they no longer appear in "choose & organize" screen, and if they have been left on the camera they appear in the previously saved area 2725. Once the camera is disconnected, or the user navigates away from the camera card after an upload, the newly uploaded content items may become indistinguishable from previously stored items in the digital media library.

In some instances, the upload process may be interrupted before it is complete. For example, the camera may run out of power, the portable computer may lose its connection to the cloud, or the user may disconnect the camera before the upload is complete. In one example, in the event of an interrupted upload, the camera card displays a warning and information about the state of the upload and/or camera. From the page view of the camera card, the user may elect to stop the upload or cancel the message, retuning the system to the "no camera connected" state. In one example, if the user elected to stop the upload and subsequently reconnects the camera, the camera card will behave as though it were the first time that camera is being connected. Alternatively, if the user elected instead to cancel the "saving interrupted" message, the camera card may resume uploading the digital content items the next time the user connects the camera. If the user has taken some new photos during the time when the camera was disconnected and then reconnected, the new photos may be automatically uploaded when the camera is reconnected. Alternatively, the use may be given the option to upload the new photos or not, or may navigate to the "choose & organize" screen to select certain photos for upload. Any digital content items not uploaded may remain on the camera and be treated as new photos the next time the camera is connected to the portable computer.

Figure 29:
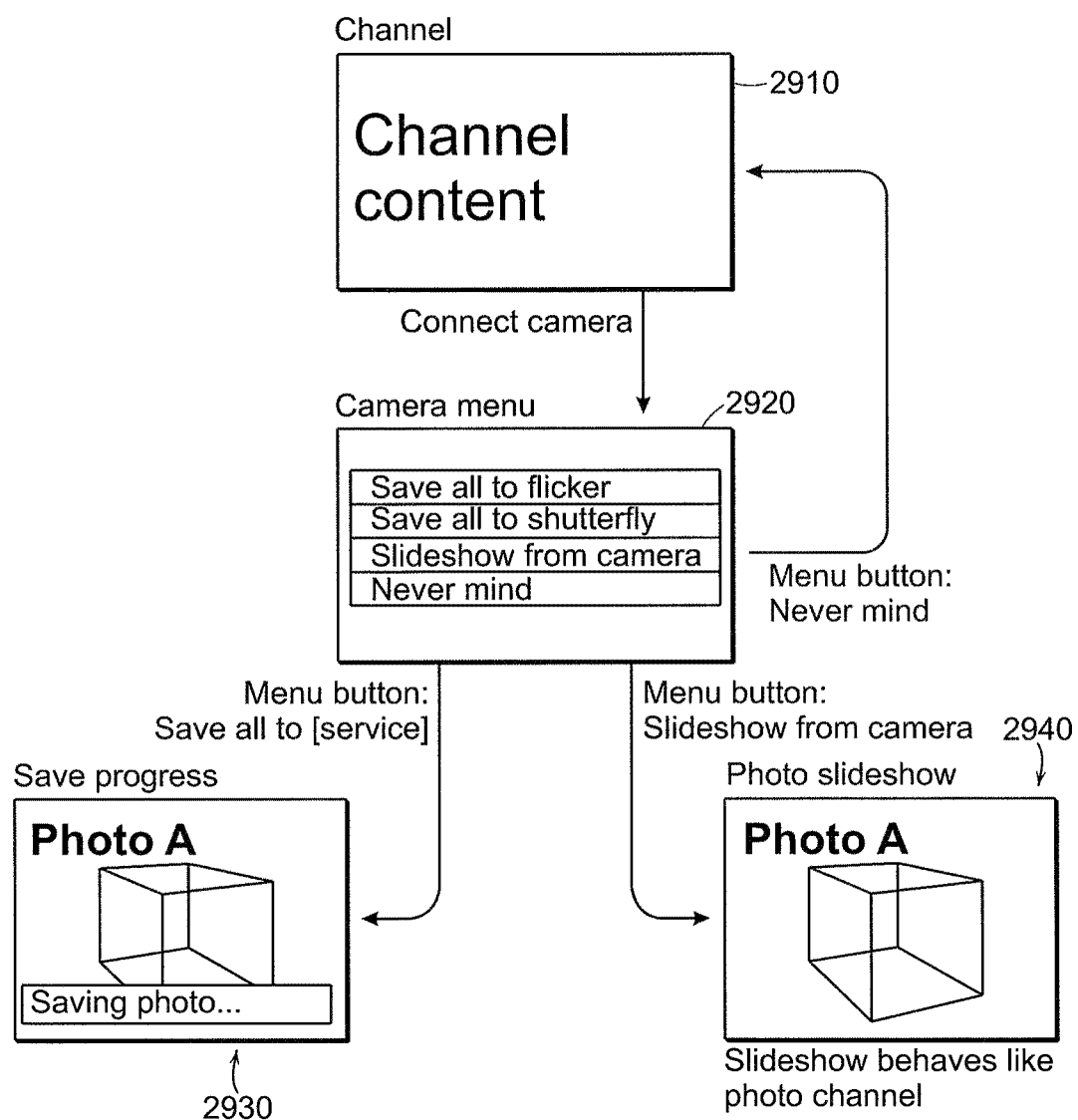
FIG. 29 is an example of a logical diagram of the behavior for an example view of digital media content, according to aspects of the invention.

As discussed above, in one embodiment the portable computer 100 is configurable into an easel mode. One example of the camera card behavior when a camera is connected to the portable computer in the easel mode is shown in diagrammatic form in FIG. 29. In this example, the camera card becomes the current channel 2910 and a camera menu 2920 is displayed to give the user the opportunity to save the contents of the camera (2930) or view the contents as a slideshow (2940). In one example, the save behavior is similar to the simple save behavior discussed above in that the system may save new items using automatically generated albums. In another example, if the user elects to save the contents of the camera, the upload begins. In one example, each content item is shown in full screen as it uploads, with an indication of its progress. In one example, the portable computer will not enter the screensaver mode during an upload. As in other examples discussed above, the user may continue to interact with the system during the upload. For example, the user may view other channels, and can navigate back to the camera card channel to view the progress of the upload. Once the upload is complete, a notification may be displayed to the effect that it is safe to disconnect the camera. In one example, this notification remains as long as the camera is still attached to the portable computer, but may be displayed in a corner or other unobtrusive location. In one example, when the user disconnects the camera, the camera card is no longer available as a channel. According to one embodiment, if an upload has been interrupted and the user reconnects the camera to the portable computer in the easel mode, the upload resumes in the background without notification. If there are no new images on the camera, the user may only be given the option to see a slideshow of the images on the camera.

Examples of User Experience

In one example, some typical user interactions with electronic content are illustrated. The user interactions occur in accordance with various aspects of the systems and methods for streamlining user interaction with electronic content. In some embodiments, the streamlined device is adapted to accommodate multiple users. In one embodiment, the user identifies him/herself to the device by entering a user name and password. Once the user name and password is accepted the user may begin interacting with the device, and if desired through the device to other content. According to another embodiment, the device may display a "users" screen, incorporating a visual representation for each user. In response to selection by the user of the visual representation the user is identified. Identification may optionally include a password challenge/response after selection of the visual representation. In some embodiments, a camera is available through the user device, and the user's visual representation may be generated by taking a snapshot of the user.

In one embodiment, that act of identifying includes access to remote storage associated with the device and/or the user. Remote storage is accessed to retrieve any global profiles that may exist for the user, and more specifically, any changes that may have been made to the user's global profile. In some embodiments, a local copy of any profile is stored on the device, and the remotely stored profile is used to identify any changes. Changes to profiles may be copied to the remote location or changes in the profile may be retrieved from the remote location. In one example, the local and remote profiles are associated with a revision date. The most recently revised profile may be used as the most up to date profile, with a different version receiving modification as necessary to correspond.

In one alternative, a remote profile may be maintained for the device itself. In another, the device profile may contain information on a number of users. In some embodiments, remote access is used to retrieve configurations and/or settings maintained for any of the device, the user, and groups of users, alone or in combination. According to one aspect, remote storage and/or remote access to user configuration comprises one element of an example system for streamlining user interaction with electronic content.

Once a user is identified (identification may occur by default if only one user has accessed a particular device) the graphical user interface presents a default view of the electronic content available on the device. In one embodiment, the view presented is responsive to the configuration of the device. According to some embodiments, device configurations may be determined using a sensor embedded in the device. In one example, a sensor is used to provide a signal and from the signal the device's orientation is determined. Alternative methodologies are employed in other embodiments for detecting and determining a device's configuration. In one alternative example, I/O devices may be enabled/disabled based on the physical configuration of the device. For example, during a transition from laptop mode to easel mode, various I/O devices that become inaccessible may be deactivated. Determining what I/O devices are still active and/or available permits identification of the device's configuration. In other embodiments, an accelerometer may be used to detect a device configuration. In one example, a device may be a portable laptop computer. The portable laptop computer may have multiple configurations, including a laptop mode, an easel mode, a frame mode, a flat mode and a closed mode.

In the illustrated example, FIG. 1, the user device is configured in a laptop mode, and has an I/O profile (a set of I/O devices) that one would normally associate with a laptop computer. In this example, the I/O profile includes, in some embodiments, a keyboard, a touch pad, buttons, web can, and a scroll wheel. The graphical user interface is configured to present a default view that provides the user with contextual options. In this example the present context for the user includes "lean forward" viewing and the computer operations one would typically associate with user of a laptop. Other contexts arise based on configuration of the device (for example in Easel mode) and the computer tasks the user wishes to perform. For an identified context a default is provided for the user eliminating the requirement of making configuration choices, however, the user is still permitted to accesses the configuration directly to customize it.

Figure 31:
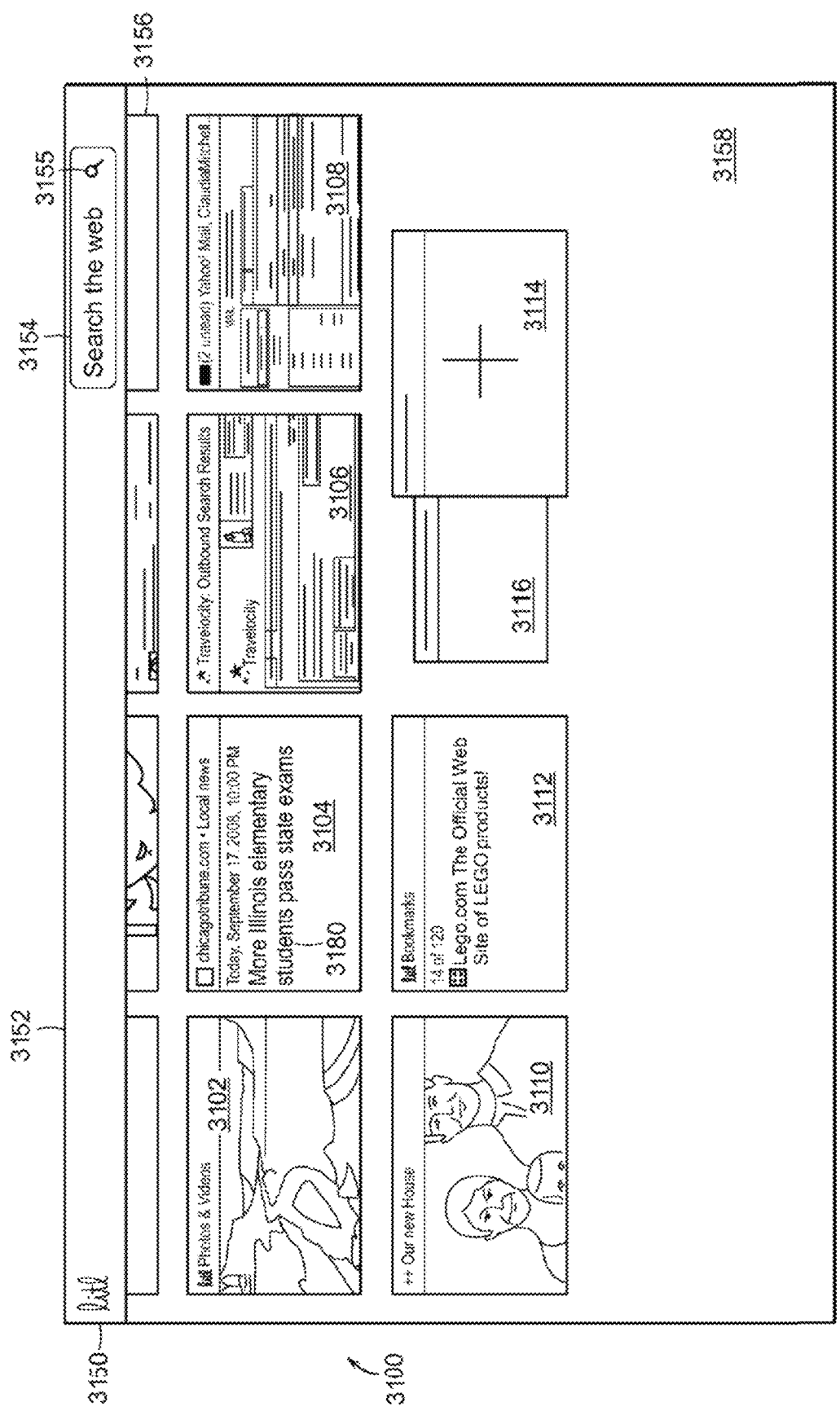
FIG. 31 is a screen shot illustrating one example of a graphical user interface showing a home view, according to aspects of the invention.

Shown in FIG. 31, is an example of a page of the device's home view (3100). The home view organizes user interface elements into a mapped based presentation and separates the presentation into logical units based on a single displayed screen, i.e. a page. One function provided by the home view is to serve as an organization of interface elements and/or navigation tools that maps visual representations of available content into a plurality of views of the available content. The home view is also configured to present summarized views of information to the user, so as to reduce the volume of information that a user needs to process in order to access content. In some embodiments, the mapped based interface is also configured to group like computer operations into a section of the map. Typically, grouped selectable computer content includes mappings to other groupings of lower level functionality. For example, high level navigation options are, typically, first presented to the user. The high level navigation options provide a summarized view of the available content, making content based selections easy to appreciate and accomplish. A user selects a high level navigation operation to navigate to more detailed operations. In some embodiments, the more detailed operations are grouped based on a mode of content. Modes of content may include for example, media, channel, connection, application, and web, among other options.

According to one embodiment, high level functions and low level functions are segregated based on proximity to displays of sources of digital content. For example, a visual representation that maps to the source of digital content is included in a lower level of functionality than the view that organizes the presentation of the visual representation. A view that presents the digital content source itself, is grouped at a lower level than the visual representation that maps to the digital content source. In another embodiment, interfaces that provide navigation operations to digital content form a layer of the graphical user interface, and interfaces that provide interaction options to digital content form a lower layer. In one embodiment, the home view includes maximal display thresholds configured to improve the ability of the user to absorb the information presented. In some embodiments, a maximal number of visual representations per screen is set. In one example, the maximal number of visual representations is used to define a GUI page. In another example, the maximal number of visual representations is associated with a maximal number of full view visual representations, and the page is configured to include portions of views of other visual representations available on adjacent pages. A computer operation that would cause the computer device to exceed the maximal number results in the creation of a new display page. The home view is organized into as many pages are required in order to maintain the maximal threshold of display items.

Typically, the home view is configurable by the user. New items may be added, existing items may be moved and/or removed based on user selection. The home view further comprises some visual representations that cannot be removed. Commonly requested system operations have visual representation displayed on the home view that cannot be deleted. According to one embodiment, a user may reorganize the display but not remove system operations. For example, visual representations that map to system operations (e.g. communication configuration and hardware configuration) cannot be remove from the home view. Additionally, some system operations will always be displayed through the home view regardless of frequency of use. Positioning of visual representation is also organized and managed in the home view. Preferably, organization and/or management occurs automatically based on default settings selected for the user. Alternatively, organization and/or management may occur dynamically. For example, a user may make changes to organization and/or management settings on the fly. In another embodiment, default settings control organization and/or management, and an interface is provided to permits a user to makes any changes to the default settings. And in another embodiment, a user may be queried on preferences, the responses are used to establish defaults for operation.

In some embodiments, frequency of use of the visual representations is used to sort the presentation of visual representations on the home view. More frequently accessed visual representations are displayed at a higher position on a page and less frequently accessed representations are displayed at a lower position on the page, and may cause the computer device to display the visual representation on another page.

In a typically configuration, visual representations are organized based upon creation time, although certain visual representations take precedence in the display. According to one aspect, display precedence is established from left to right and from top to bottom. In one embodiment, the visual representation displayed in the upper left portion of the display screen is associated with the highest precedence. Precedence in the display may be influenced and even ignored with respect to certain system operations and the visual representations that map to them. For example, a visual representation mapping to display for a user's bookmarks may appear in the upper left corner. According to one embodiment, the positioning of the familiar option relating to bookmarks as the visual representation of the highest precedence provides users with an option familiar to traditional use of computer systems. Although presented as a streamlined interface element, the bookmark visual representation is configured to evoke familiarity in the typical computer user.

According to another embodiment, the visual representation that maps to the computer functionality for creating interacting with a new web page is the only representation that has a fixed position, relative to the display precedence. In one example, the element for triggering interaction with a new web page is always display in the bottom right corner. The other visual representation may be reshuffled based on frequency of use, and in other embodiments a user may also reshuffle the visual representation by drag and drop procedures, however the element for triggering interaction with a new web page remains in the bottom right corner, and in one example, will move to a new page in response to a request to display an new web page element when the element is already displayed in the bottom right corner of a page. Drag and drop operations may be associated with a drag threshold. In one example, a drag threshold is applied to require a small movement of the identified card before the device executes the drag operation. The drag threshold may be measure on the order of pixels, and may be any number of pixels that prevent accidental dragging in response to the user attempting to click on a card. In one embodiment, the drag threshold is set to 5 pixels. Other thresholds may be used, 2, 3, 4, 6, . . . pixels as examples.

Other display precedence may be employed. For example, display precedence may be configured based on user location and language convention for the user location. The written English language is read from left to right and from top to bottom; however, other languages are not. According to some embodiments, display precedence and any corresponding animations are configured to correspond with the conventions of the local language, for example displaying from right to left.

Referring again to FIG. 31, shown is an example of a page of the home view, with user interface elements organized to present the user with summary information of available content. Shown in FIG. 31, at 3102, is a representation of picture and video content available to the user. At 3104, a visual representation of customized content is available. The customized content (discussed further herein) comprises rss items from a web location distributing via an rss feed. In example shown, 3104, comprises a channel card. The channel card is configured to allow easy interaction with a plurality of rss items, and further configured to be responsive to both lean forward interactions and lean backward modes of interaction. The other user interface elements include, for example, visual representations of web based content, specialized user interface elements for providing customized interaction with web based content in the form of channels, and system elements.

A typical activity for any user includes reading his/her email. The user may observe an e-mail from for example, the user's credit card company, Chase. The home view (3100) is the default vehicle through which a user interacts with the device and with electronic content displayed on the device. The home view presents an organization of other interactive elements (3102-3116). Accessing e-mail occurs in response to selecting the visual representation (3108) that maps to YAHOO! MAIL content. Upon selecting (3108) the device executes a mapping from the visual representation to the content and in response the device presents a first view of the mapped content. According to one embodiment, in response to selection of a visual representation mapping to content of web page a web page view is displayed. The web page view is a zoomed in expression of the web based content mapped by the visual representation.

Figure 32A:
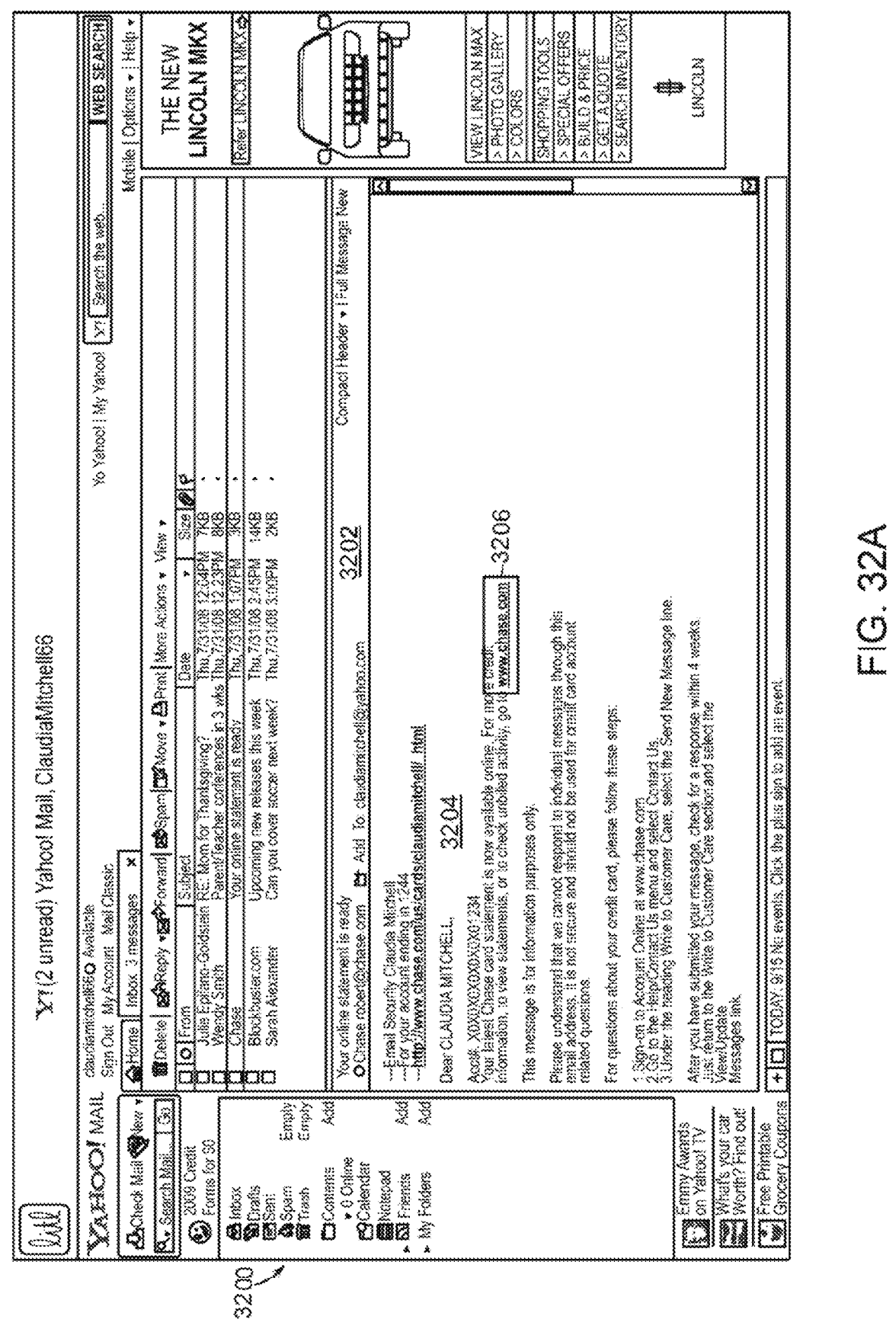
Figure 32B:
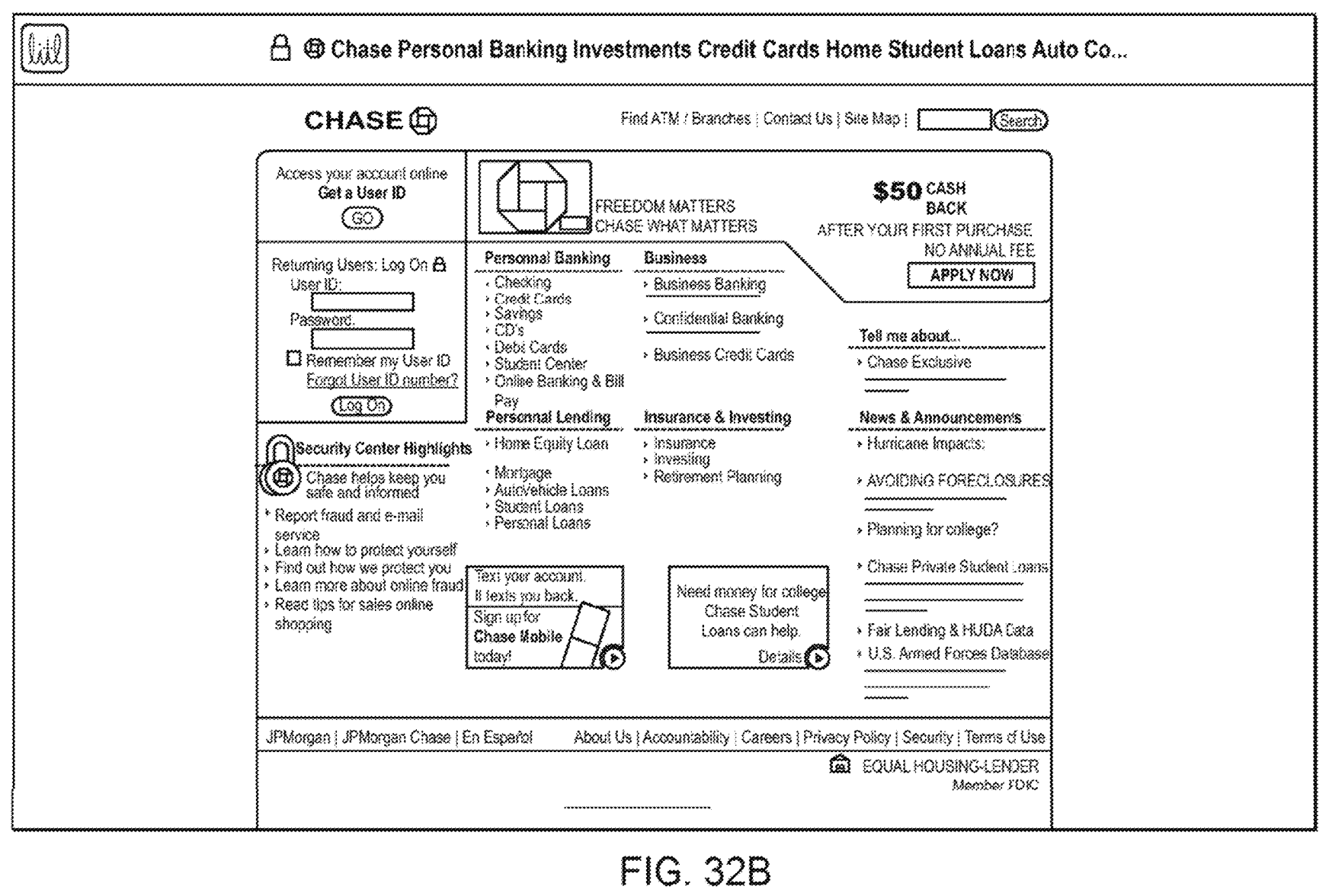

Once a user reaches the web page view (3200) FIG. 32A, the user may interact with the content shown. Although it is to be appreciated that other representations may mapped to different views, and different view may be used to map to further views. (3202) shows an e-mail being reviewed by the user, and more specifically an e-mail from Chase Bank indicating that the user's credit card statement has issued. The body of the e-mail (3204) includes a link (3206) for accessing Chase's website. Selecting the link invokes an open new page view operation by default, and in response to selection of (3206) the user sees an animation returning the user to the home view (3100). The visual representation for "Browse the web" (3114) reveals the creation of a new visual representation for accessing web content (3116) by sliding away from a new visual representation the takes the former place of (3114). The computer system displays an animation that shows the computer display zooming into the page view (3200) of element (3114), shown in FIG. 32B. The user logs in and reviews his/her balance, shown in FIG. 32C at (350). The web page view further comprises navigation element (3252). The user selects (3252) to return the home view (3100), selects (3116) to access a new web page and in response a new web content visual representation is created, further the device shows the display zooming into the new content.

Figure 33:
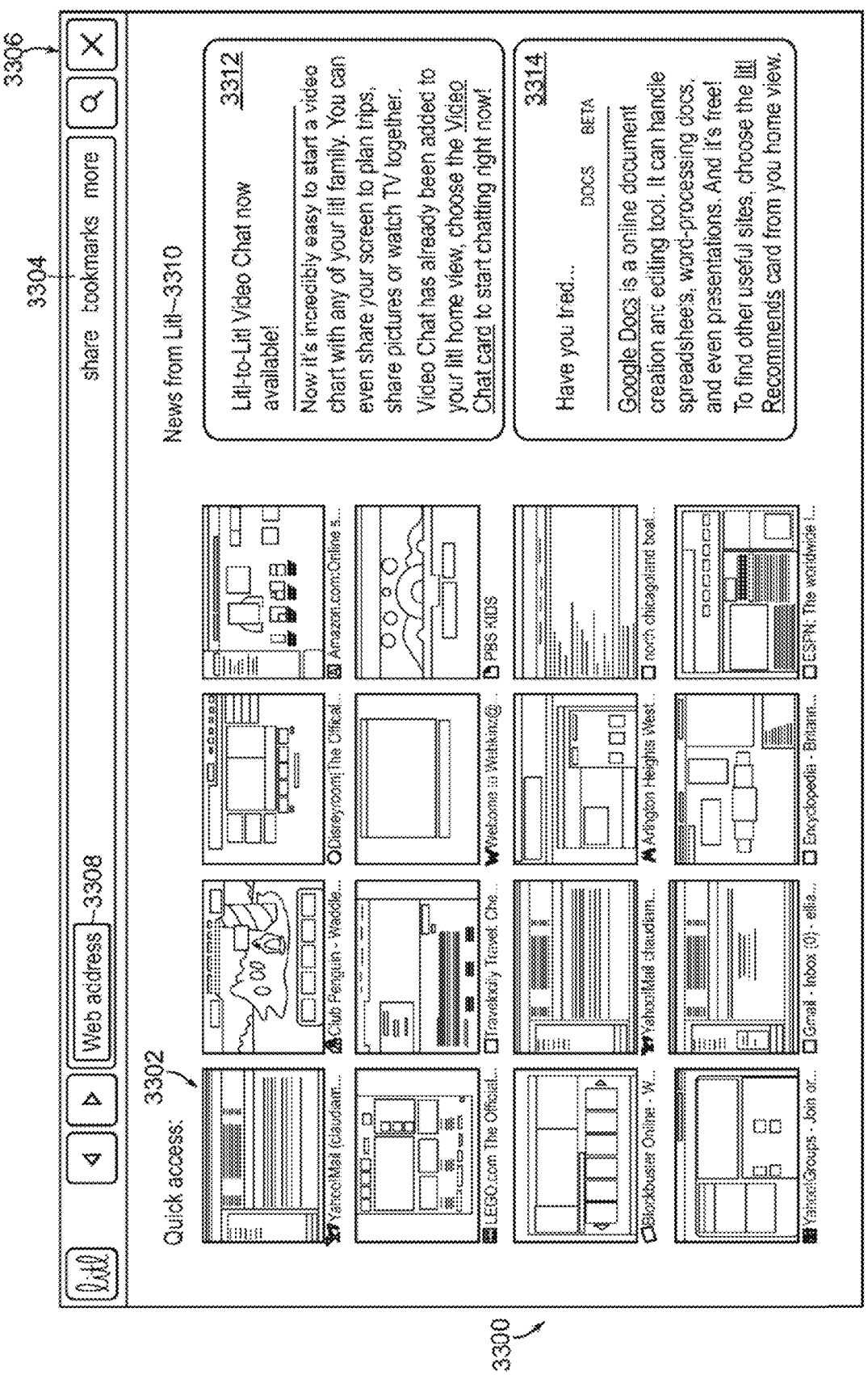
FIG. 33 is a screen shot illustrating one example of a graphical user interface showing a quick access view, according to aspects of the invention.

FIG. 33 displays a quick access view (3300). As the new card has not yet been mapped to content, the device displays content options in order to generate a mapping. In one example, the content options may be based on frequency of access. Shown at (3302) are visual representations generated from the most frequently visited content. Selecting any of the visual representations in the body (3302) causes the device to associate the mapping with the new card and zoom into the selected content display. At (3304) provided as an element of the view's header (3306) is a bookmarks control. Through (3304) bookmarks control a user may access content not display in the frequency list (although a user may also enter a uniform resource identifier at (3308).

Figure 34:
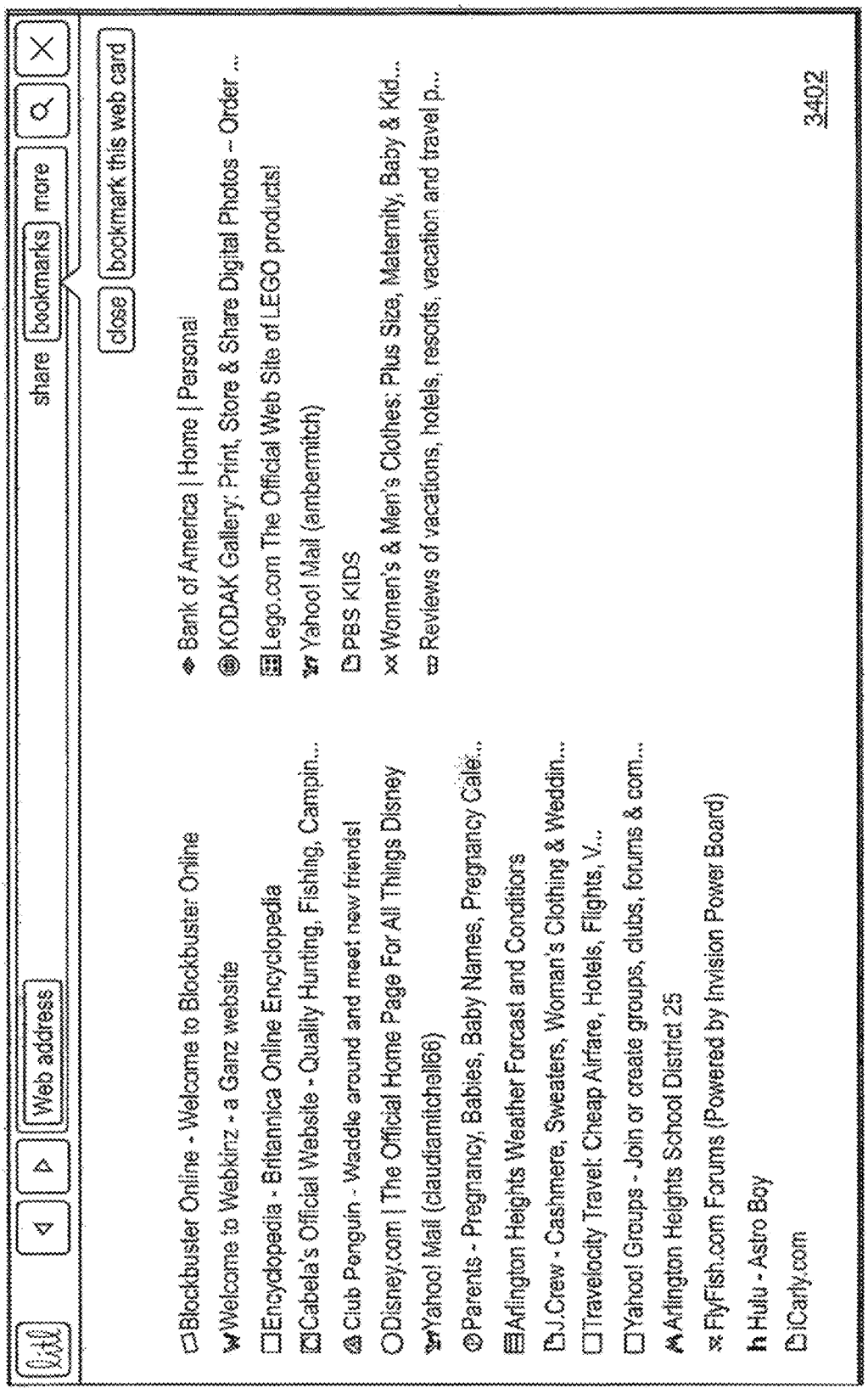
FIG. 34 is a screen shot illustrating one example of a graphical user interface showing a bookmark view, according to aspects of the invention.
Figure 35A:
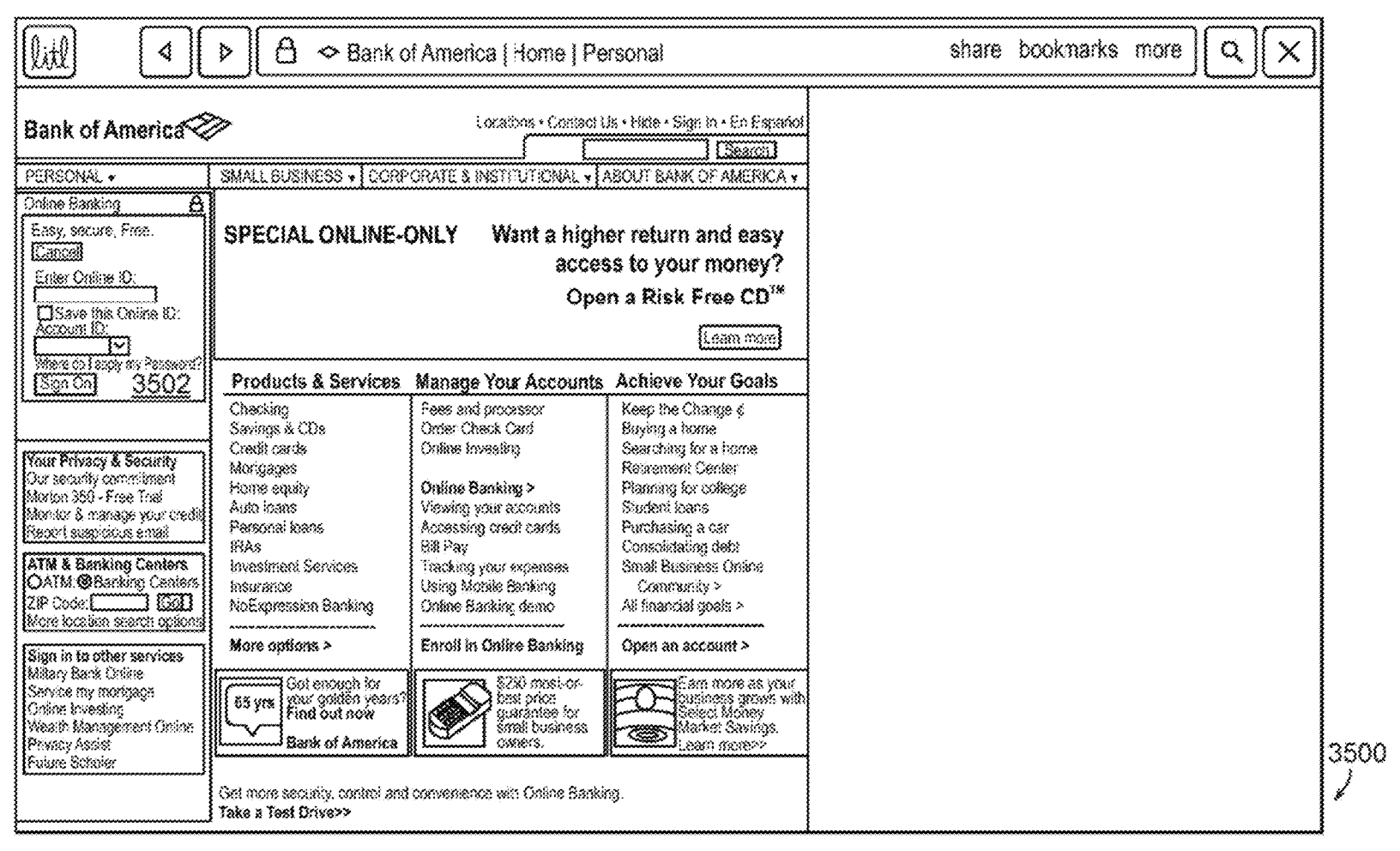
Figure 35B:
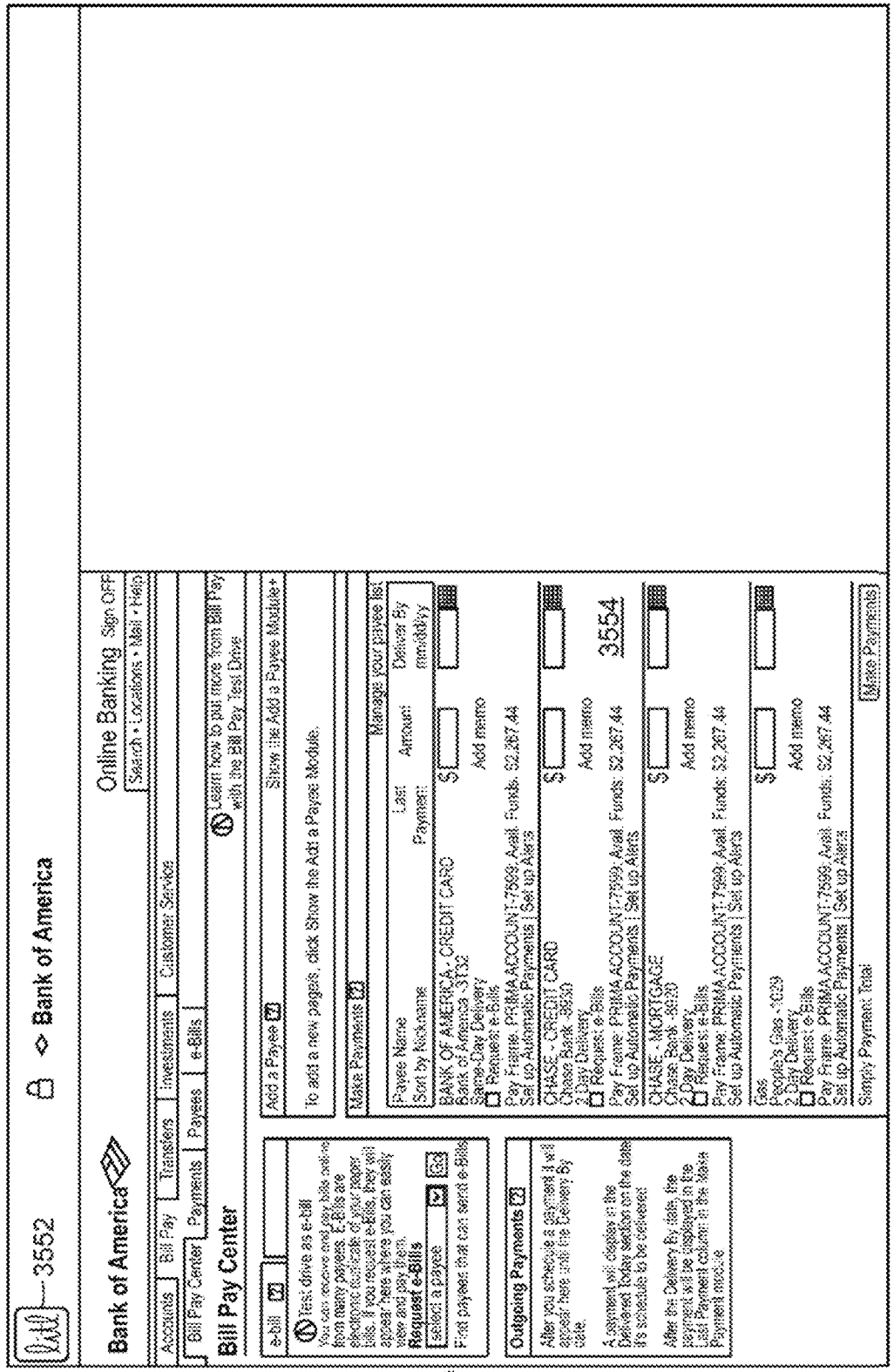
Figure 36:
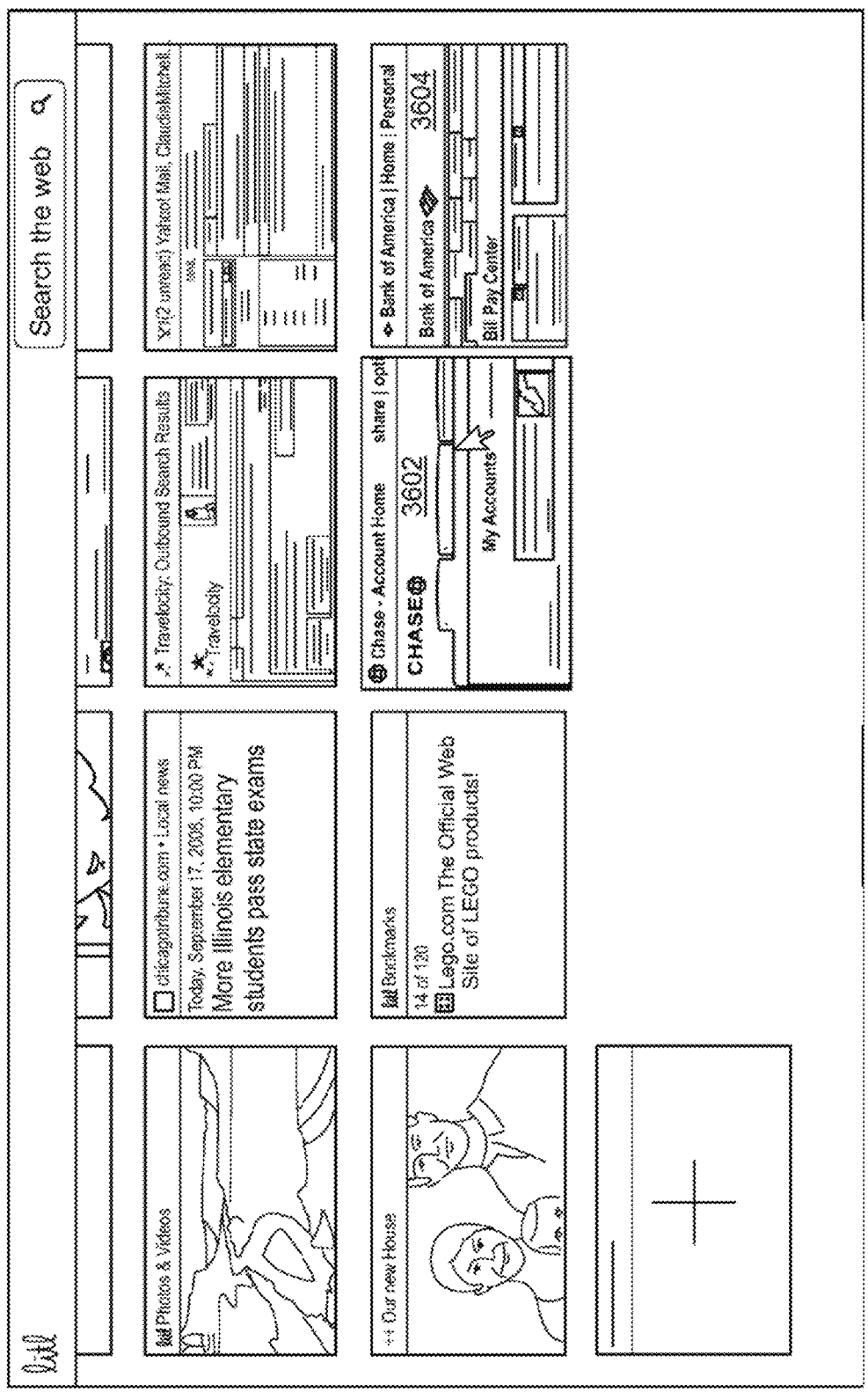
FIG. 36 is a screen shot illustrating one example of a graphical user interface showing a home view, according to aspects of the invention.

In response to the selection of bookmarks a list of bookmarked content is displayed for selection, FIG. 34, 3400. Upon selecting (3402) a mapping to the bookmarked content is associated with the new visual representation. In one alternative, a user may enter a url for an online source to associated with a new visual representation. The computer zooms into the selected content and in this example, displays the web page view for (3402), Bank of America's (BOA) web site, shown in FIG. 35A at (3500). The user logs in at (3502) and is able to pay the Chase bill just reviewed, shown at FIG. 35B, (3500). Having visual representations mapped to content available, improves the user's ability to transition between content views. By selecting the navigation element (3552) the user is returned to the home view, FIG. 36, (3600), showing the visual representation (3602) mapped to Chase's web page content and the newly created visual representation (3604) mapped to Bank of America's web site content. Selecting (3602) returns the user to the Chase content with the user's state preserved from the last visit, FIG. 32C, (3250). The user is able to immediately review the statement balance, and by selecting navigation element (3252) return to the home view (3600) select (3604) and enter the amount due for the Chase credit card at (3554).

It is to be appreciated that visual representations mapped to computer content facilitate transitions between content, and further by providing state preserving representations a user is able to quickly retrieve and employ information learned from content.

According to another aspect, the selection of a new visual representation is configured to employ a timer. According to some embodiments, the timer is configurable based on user selection, so that the animation may take longer, shorter, and in some embodiments the user is permitted to disable the animation entirely—in one example this is accomplished by setting the timer to allow 0 seconds for the animation, in another example the animation is simply disabled. In some embodiments, the timer is configurable by the system. Over the course of use, the allotted time may be reduced by the system automatically. Once a user has reached a certain time on the streamlined device, the animation may be automatically disabled by the system. For some embodiments where the timer may be configured based on tune of use, different timers may be employed for different user profiles. Thus an experienced user may no longer see the animation, whereas a novice user on the same device would see an extended version of the animation.

Graphical User Interface

Referring again to FIG. 3, there is illustrated a block diagram of one example of an architecture of the portable computer including a map user interface. The user interface "home" screen 310 that displays a plurality of modes of content 320. In the illustrated example, the home screen 310 contains five modes of content 320; however, it is to be appreciated that the home screen may include more or fewer than five modes of content and that the modes of content may differ from the examples discussed. It should also be appreciated that different architectures may be invoked in response to different device modes. For example, a portable computer in laptop mode may display a home view as discussed with respect to FIG. 3, when configured in Easel mode, user is presented with a Channel View.

According to another aspect, streamlining the presentation and integration of features and services includes simplifying the I/O devices that a user needs to operate in order to access features of the computer system and the features of any available service. According to another aspect, streamlining includes developing consistent visual representations of available content (whether on the computer system itself or from service providers). In another aspect, the organization of interactive elements and responsiveness of the organization to navigation options, device configurations, and user preferences improves the user's ability to interact with the computer system and its content. In one embodiment, system features and web features are consistently presented as cards for the user to interact with to achieve their computer objectives. In some embodiments, cards comprise part of an interface layer between a computer user and a user's computer based objective and/or computer operation. In some embodiments, the number and type of cards are presented in as few as three classes and/or types. Each card for example may be similar in aspect to the other, but each performing a different class of function on the computer system.

Figure 37:
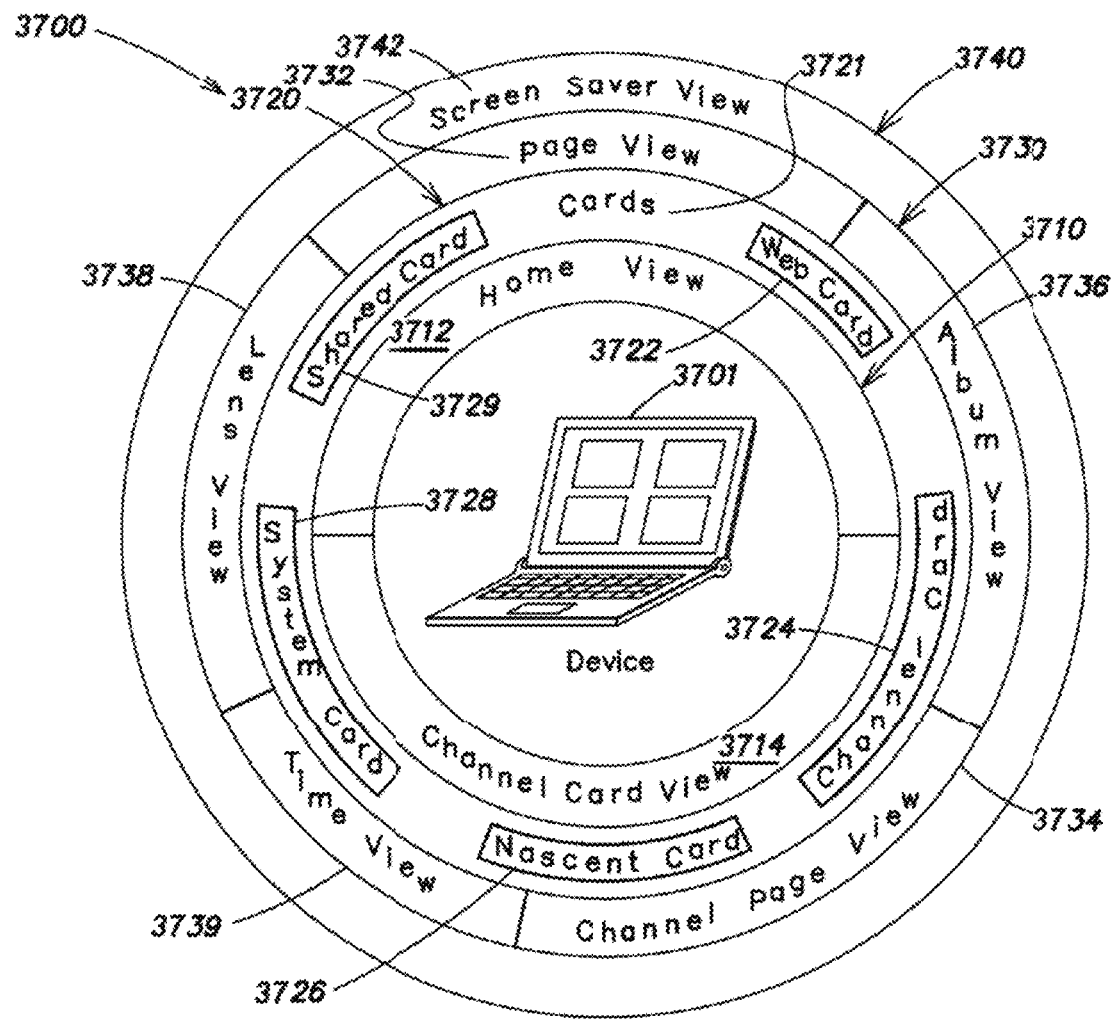
FIG. 37 is an illustration of an example conceptual model of a graphical user interface, according to aspects of the invention.

Referring to FIG. 37, shown is a conceptual model 3700 of an example graphical user interface. As shown, in FIG. 37, through a streamlined device 3701 a user will interact will a number of views of computer based content. In example model 3700, depending on the device's configuration a user will be presented a home view 3712 or a channel card view 3714. Conceptually 3710 forms a layer of the mapped based user interface, wherein the layer is configured to organize, manage and display streamlined views to the device's user. Layer 3710 organizes, manages and displays objects of layer 3720. Layer 3720, according to some embodiments includes cards 3721 which are selectable visual representations that are mapped either to computer functions or available computer content. Cards further comprise web cards 3722, that map to views of web content including web pages; channel cards 3724 that map to customized views of content including web based content and picture and video content; nascent cards 3726 that map to system functionality; system cards 3728 that map to system functionality; and shared cards 3729 that can be any of the former discussed cards shared from another user and/or streamlined device. The card layer 3720 maps either to computer functionality executed upon selection or additional views to provide interactive displays to the device' user, for example, the views illustrated in layer 3730. Page view 3732, according to one example, is a zoomed in expression of a web page. At 3740 shown is another layer which includes a screen saver view, 3742. In one embodiment, the screen saver view is a passive view. In one example, the screen saver view may be activated by the computer system remaining idle for a period of time. In one embodiment, the screen saver view displays content from channel cards designated by a user in an options menu. In another embodiment, the screen saver view displays content from a pictures and video card. In another embodiment, the screen saver view displays content from a shared card.

According to one embodiment, channel card view 3714 comprises a view of the channel cards that are available to a user, and in another embodiment includes a channel selector (not shown). The channel selector is a selectable display configured to be responsive to manipulation of a scroll wheel. In one example, the channel selector is configured to display a rolodex of available channel cards and manipulation of a scroll wheel flips through the visual rolodex. Selection of one of the channel cards invokes any of a channel page view 3734, content menu, and a channel card full view, depending upon the device's configuration, and in some examples the result is responsive to where on the card a selection was made. Various cards, depending on the content mapped to, may also provide other views for rendering and providing for user interaction with content, for example, time, 3739, album, 3736, and lens, 3738 views. It is to be appreciated that the conceptual model illustrated in FIG. 37 is only one example of a conceptual model of the graphical user interface for streamlining user interaction with electronic content. Other conceptual models may be employed, for example only some of the layers may be employed, additional layers may be used, and different segmentations of the layers may be provided.

Figure 38:
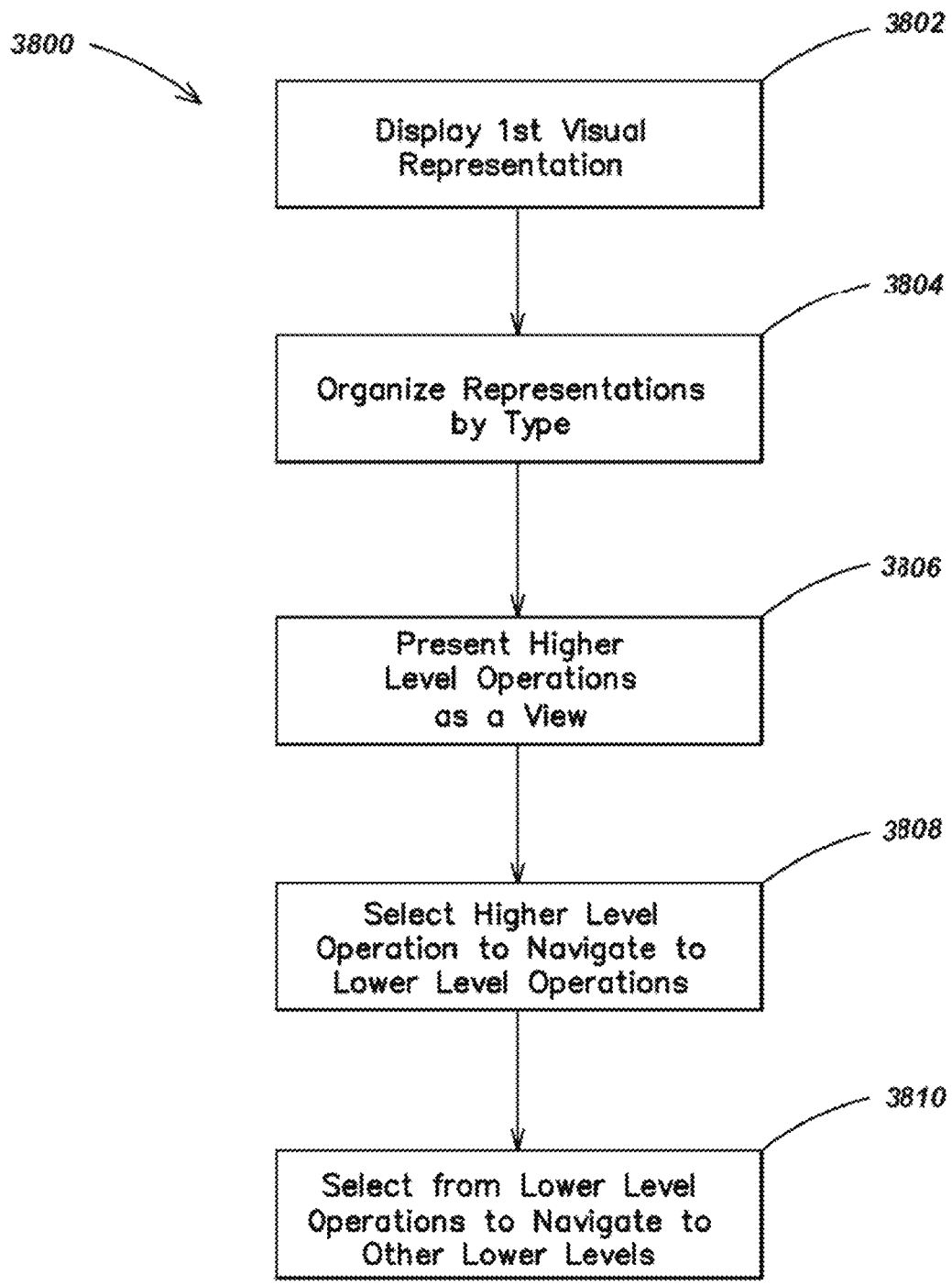
FIG. 38 is a flow diagram of one example process for organizing a plurality of views and GUI elements into a consistent presentation, according to aspects of the invention.

According to one embodiment, a method of presenting a streamlined graphical user interface for a streamlined device includes an example process 3800, FIG. 38. Process 3800 provides for organizing a plurality of views and GUI elements into a consistent presentation for user interaction. At 3802 provided is a first visual representation for displaying multiple content modes mapped to a view of computer content. At 3804, a plurality of visual representations are organized by type of computer operation. At 3806, the graphical user interface presents higher level operations to users as a view including a group of visual representations. AT 3808, a user is permitted to select from the group of visual representations to navigate to lower level functions provided by different views of computer content. At optional step 3810, a user may be permitted to select from within different groups of visual representations to navigate to further lower level views of computer content.

According to another aspect, layers of the conceptual model are configured to respond to device configurations by defaulting and/or transitioning to different views based on device configuration. Typically a device configured in a laptop mode displays a home view, 3712, to a user as the default view. In response to a transition in mode between laptop and easel the computer transitions the computer display from the home view, 3712, to the channel view, 3714, as the default. A user may elect to change the default view, for example by selecting a navigation button that executes a return to the home view. In one example, 124, FIG. 4, is configured to return a user to a home view in response to selection of 124, when the computer display is not on the home view. In the home view, a user may invoke a channel card view, 3714, by manipulating scroll wheel, 120.

Home View Embodiments

Referring again to FIG. 31, shown is an example page of a home view, 3100. Home views according to various embodiments are configured to render consistent organization of elements of the graphical user interface. Each page rendered in home view comprises a home navigation tool 3150, a header 3152, and a web search box 3154. For home views which include multiple pages, a hint or cut out of adjacent displays are rendered at 3156, for example. Hint or cut outs of adjacent displays may also occur at the bottom of the display screen, the top of the display screen, and both top and bottom, where multiple adjacent pages are present. 3150, home navigation tool is responsive to the context in which it is executed. For example, the home navigation tool, 3150, when selected causes the computer to display the last accessed view before the computer displayed the home view. Where a user navigates to the home view, 3100, from a web page view, the selection of the home navigation tool 3150 caused the computer to display the previous web page view. In other examples, the home navigation tool permits, toggling between other views and the home view, as illustrated in FIG. 37, at 3732-3739 and/or 3714.

Figure 32C:
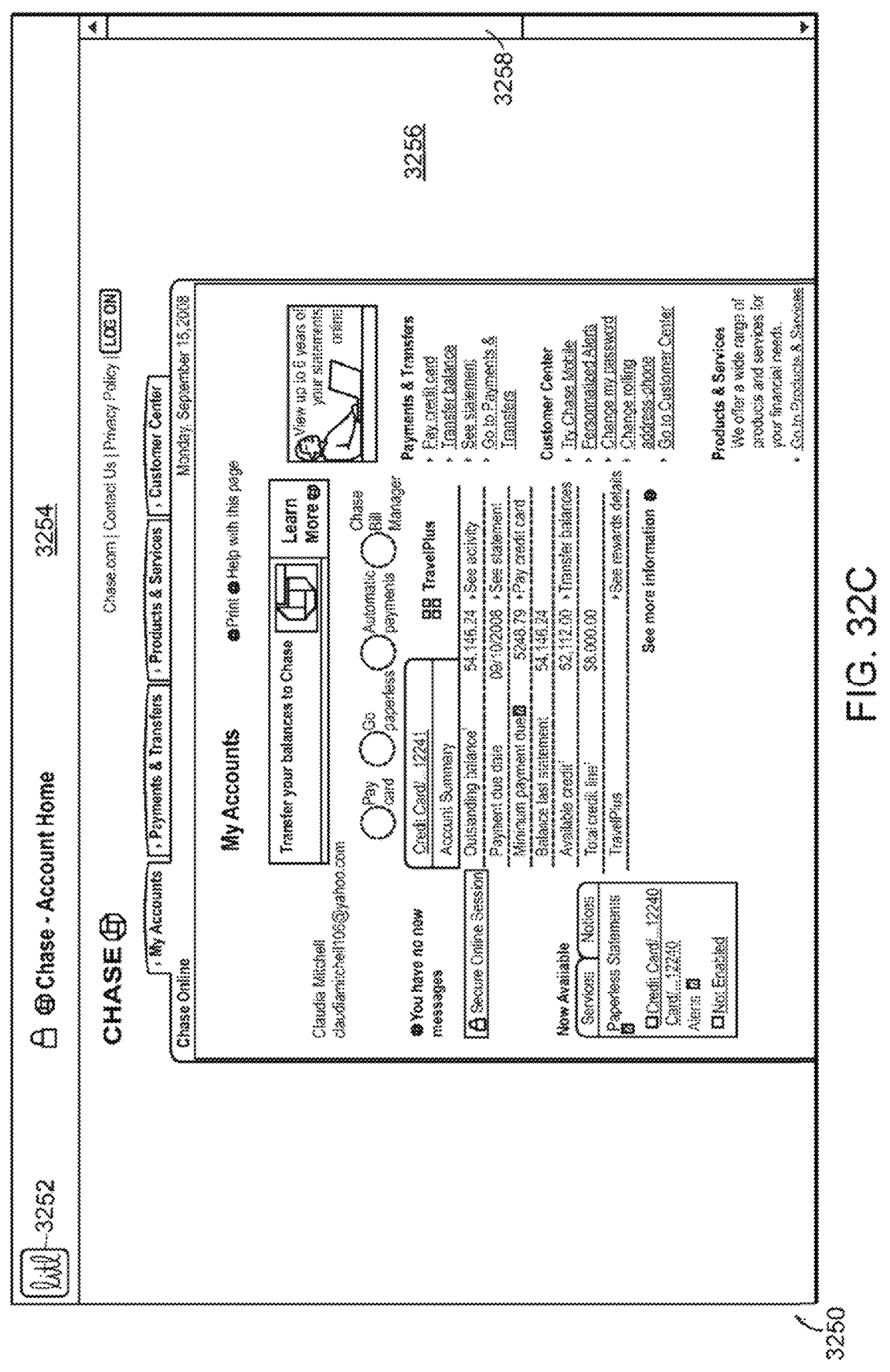

According to some embodiments, the web page view includes a navigation tool, 3250, FIG. 32C, and in response to selection, causes the computer to display the home view, 3100. Other elements included in the home view, for example, header 3152 are configured to provide consistency in the home view across pages and in some embodiments across the user interface. Each page of the home view, 3100, further comprises a body, 3158, in which cards 3102-3116 are displayed. The body is associated with a maximal display threshold. The maximal display threshold governs the number of GUI elements displayed per home view page. In one embodiment, the displayed elements may comprise cards, and the maximal display threshold is set to display twelve cards. In addition to the maximal number of displayed elements, the home view may also comprise indicators of adjacent content at 3156. The device generates a new page display for the home view in response to exceeding the maximal display threshold.

Home view 3100 is the default view in laptop mode, and may be implemented as the default view in other device modes (e.g. frame, easel, flat modes). According to some embodiments, the home view is the primary mechanism for permitting users to access cards and navigation through content viewed on the device. In the home view a user can access open web sessions, view and manage their channels, initiate new web sessions, and launch other activities.

Cards, e.g. 3102-3116, form comprises a plurality of types. Some card types are organized by function, some by content. The home view is comprised of various cards, each card providing access to computer based content. According to one aspect, cards can be thought of as the building blocks of the user interface, providing access to a plurality of views and/or content. Indeed, cards as elements of the GUI, are configured to be shared across users and across other streamlined devices. The ability to employ the features and functions of card based elements may be limited to streamlined devices, although cards and settings may be shared with traditional devices.

Figure 39:
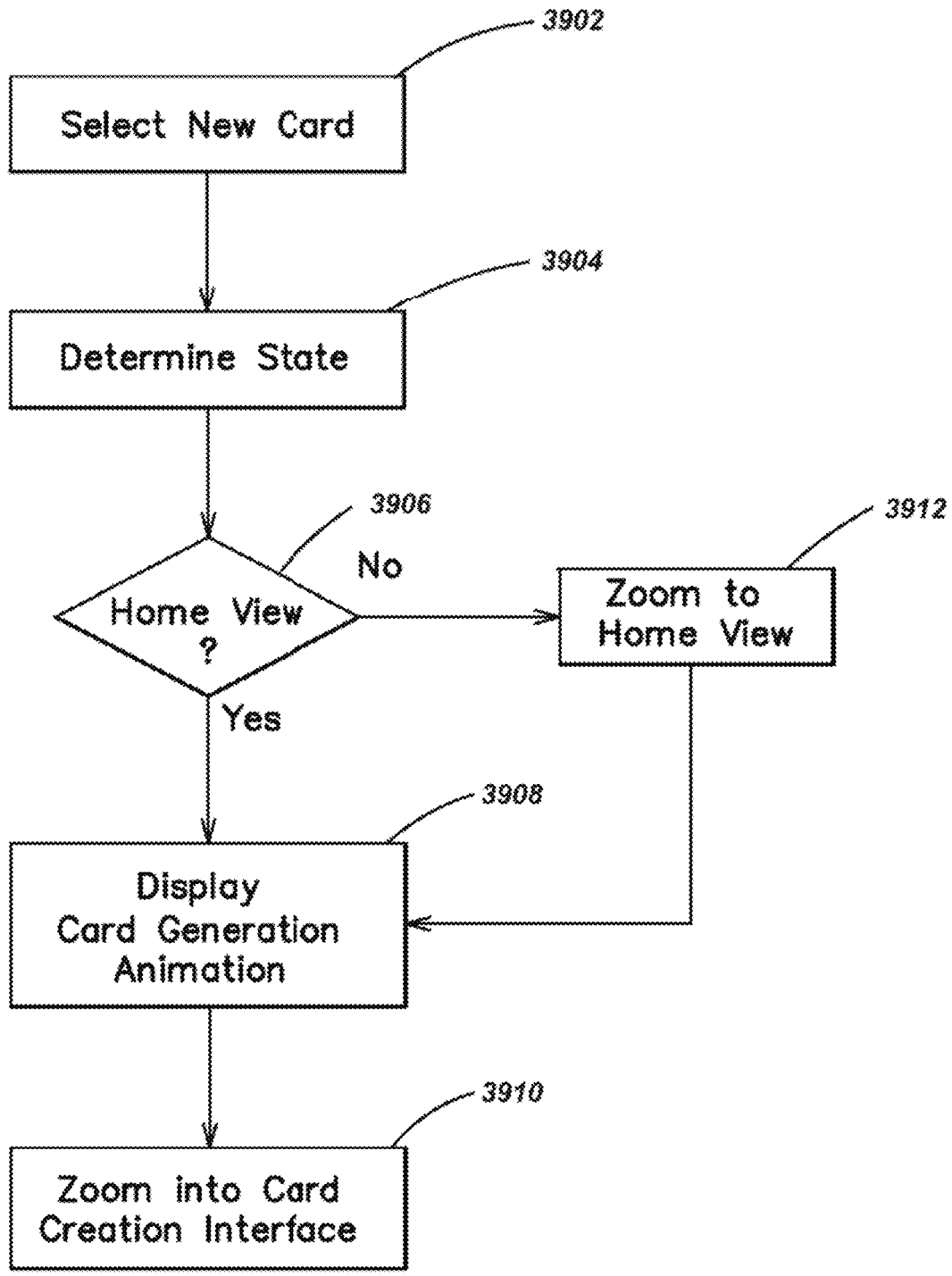
FIG. 39 illustrates an example process for generating a visual representation of computer content, according to aspects of the invention.

Shown in home view 3100, are web cards 3106, 3108, and 3116, channel cards 3104, and 3110, further shown in home view 3100 are special system cards that map to content and system operations, for example bookmark card 3112. The bookmark card 3112 is configured to provide traditional computer operations associated with conventional systems and browsing methods. The bookmark card serves as learning tool, to provide features with which user are familiar in a new format that encourages further integration of card based interactions. According to one aspect, card interfaces are generated by a user for each web based interaction, eliminating the need for convention navigation in the form of bookmarks. Another example of a system card appears at 3114. 3114 maps to functionality that when selected causes the computer system to execute a web card generation process. FIG. 39 illustrates an example generation process, 3900. Example processes, 3900, begins at 3902, in response to selection of a card or embedded web link (e.g. 3114 of FIG. 31) that is associated with a mapping to functionality that generates a new web card. For example process 3900, may be initiated from a page view of a web card in response to selection of link. According to one embodiment, the behavior of the streamlined device depends on instruction embedded within a selected link. In particular, the device in response to selection of a navigation link navigates to the identified location in the same page view. If the link encodes an instruction for open in new window and/or open in new tab, the device in response to selection generates a new card and displays the page view of the new card. Alternatively, defaults may be established for link handling, including a default for selection of a link contained inside an e-mail, which may default to a "new card" mapping, whereas in some embodiments, links directed to the same domain as the current view default to navigation functionality within the same window. In other words, in response to a selection of a link within a certain web-page, directing navigation to another location with in the same web page, the default functionality executed, caused the device to navigate to the selected location within the same window.

According to another embodiment, handling of web links may also be governed entirely by the settings contained in the selected link. For example, the device may execute process 3900 in response to execution of a link including the instruction to open in new window. The device may also execute process 3900 in response to execution of a link including an instruction to open in a new tab. In one embodiment, links without such references are processed by the web page view navigating to the linked location without invoking process 3900, for example.

At 3902, the mapping is executed and the computer device determines its state at 3904. The state determination is configured to identify a current view setting for the device. Current view setting may be limited to an indication that the device is current showing the home view. At 3906 Yes, the device is currently showing the home view, and the device executes a card generation animation, at 3908. In one example, the animation causes the device to display a browse the web card 3114, FIG. 31, sliding away from a new visual representation the takes the former place of 3114. One the new card image is shown the computer display renders an animation the causes the user to perceive zooming into the newly created card at 3910. Alternatively, it is determined that the device's current display is not the home view at 3906 NO. At 3912, apparent motion relative to the user is rendered by the device to provide the appearing of zooming to the home display. Other animations may be employed to establish for the user the perception of motion to the home view. Once at the home view, process 3900, proceeds as before.

According to one embodiment, the home view, FIG. 31. 3100, is configured to manage and organize cards. The home view provides a simple and convenient mode of navigating through the features and content accessible through the device by organizing and managing cards.

Card Examples

According to some embodiments of systems and methods for streamlining user interaction with electronic content, visual representation that render computer operation and/or content in a consistent manner further comprise cards. According to one embodiment, cards may further comprise types, including web cards, which map to active web pages. In some embodiments, device configuration sensitive displays are provided through a graphical user interface. In some embodiments the device configuration sensitive displays include cards. Cards may come in a number of forms. In some embodiments cards may be classified according to the functionality that they provide to a particular user. For example, system cards provide and display computer system functionality that maybe frequently accessed during ordinary computer user and/or may be required for computer use. In some embodiments, web cards provide a user interface for web based content and/or web based activity. In some embodiments, channel cards provide additional features that enable a user to better interact with web based content, and in another example, channel cards provide interactive views by utilizing different content presentations provided by a web source. Consistent user interfaces provide an access layer to system and web based content. Consistent user interfaces are used to access web based content, and even content and applications provided by third parties.

Figure 40:
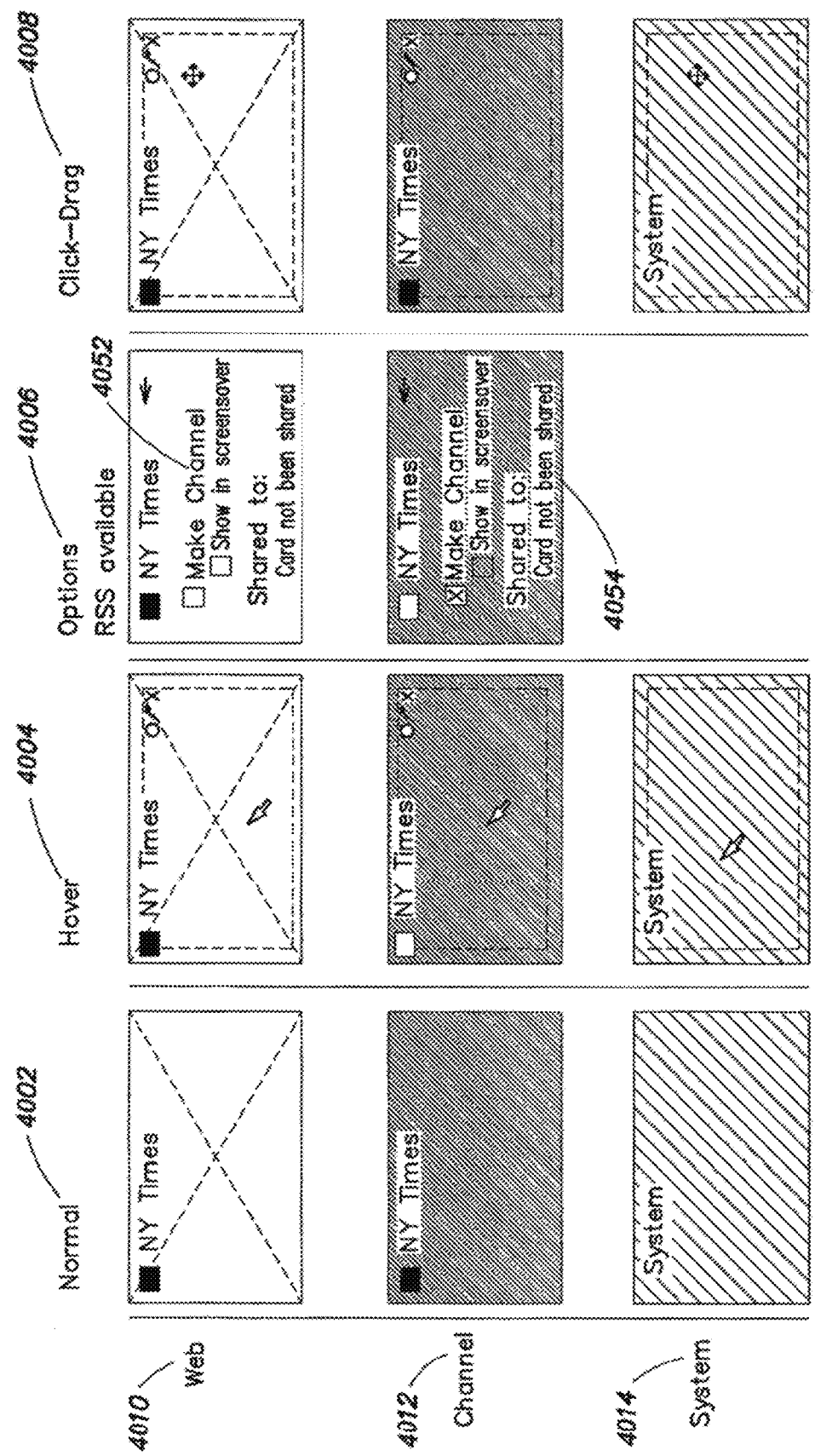
FIG. 40 illustrates an example of a behavior model for display of cards responsive to computer focus, according to aspects of the invention.

In one example, a web card presents a thumbnail view of the current state of the web page. In another example, the web page card presents a cut out view of the web page based on computer focus within the page at the time the web page view was exited. FIG. 40 illustrates, according to one embodiment, the behavior and rendered display of certain cards responsive to computer focus and selection by a user. A card may be in a number of states based on computer focus. One example of computer focus would include "hover" 4004—hover indicates the movement of a pointer, typically represented by a white arrow on the computer system display, over a card. A card may be in a normal state 4002 when not in focus.

Focus is intended to include any identification by the computer system of the card, short of execution of the mapping associated with it. For example, focus should include identification by tabbing through available cards, identification by using hotkeys, among other options that result in computer focus resolving on the card. The terms computer focus and focus should be read to include hovering over a screen element, tool, or other visual representation displayed on a computer system display. In one example, focus follows a displayed pointer, and movement of the pointer with, for example, a mouse causes the computer system to resolve computer focus on the visual object under the pointer display. Selection by a user or a computer system may include focus and visual objects displayed on a computer system display may be selected by moving a displayed pointer. In some embodiments, selection may be accomplished by clicking on a visual object using a pointer displayed on the computer screen. A second "click" may then cause the computer system to execute functionality associated with the visual object. Execution should be read to include initiating an operation associated with a visual object, in one example execution will include clicking on a visual object (single or multiple "clicks"), by positioning a pointer display over the visual object and depressing a button to initiate the operation.

Focus may be resolved on a computer system by analyzing content intended to be displayed before its display on the computer system, additionally focus may be responsive to actions taken on the display through for example pointing devices.

According to one embodiment, when a web card or channel card appears is in a hover state 4004, additional options are display in the card header, for example at 4050. The additional tools displayed in the card header permit a user to select the options associated with the card. The options view for a card 4006, displays available selections contained in the options. For a web card 4010, the options include make a channel 4052. The selection of make a channel at 4052 causes the device to execute functionality that transforms the web card into a channel card. The transformation from web card to channel card includes transforming the display image of the card element on any corresponding view.

Typically the transformation may only be made for a web card that references a content including a rss feed. The items in the rss feed are configured into a customized presentation—as for example a channel card 4012 (discussed further herein). For a channel card 4012, additional options are include show in screensaver, for example. Other states may impact the display of web card including a drag and drop state. Upon focus, the additional tools will resolve in the header section of the card, the additional tools may be displayed as icons, as shown in FIG. 40, and may also be rendered as selectable text options include "bookmark," "share," "options," and "close." If a user depresses the button control and does not release, the user may user drag and drop the card within the home view. The card may be dragged across pages of the home view, and the user may reorder the presentation of cards in the home view using multiple drag and drop operations. According to one embodiment, as a card is dragged across the home view, all displaced cards will appear to move into new places.

According to another aspect, computer content and interactive functionality is recast into cards. In one embodiment, the card comprises a visual representation of web content that simplify the user's interaction with even the most sophistication on-line tools. Cards are configured to present a summarized view of available content and/or present a visual indication of available functions. According to one embodiment, cards form a part of the structure of the graphical user interface between the system and the user. In various embodiments, cards are configured to be context and/or content sensitive. Some cards are configured to be persistent. Persistent card may be removed by an affirmative act of the user With cards, content can be easily and visually absorbed by a user. In some embodiments, cards serve to maintain a current state of the user's activity. And in some embodiments, cards also serve to focus the displayed content on contextual information. Cards may be configurable by the users. Configurations options are presented to the user consistently. In some examples, this includes displaying consistent animations designed to draw the user's focus to the particular activity and to provide comfort level for the activity being displayed.

Figure 41:
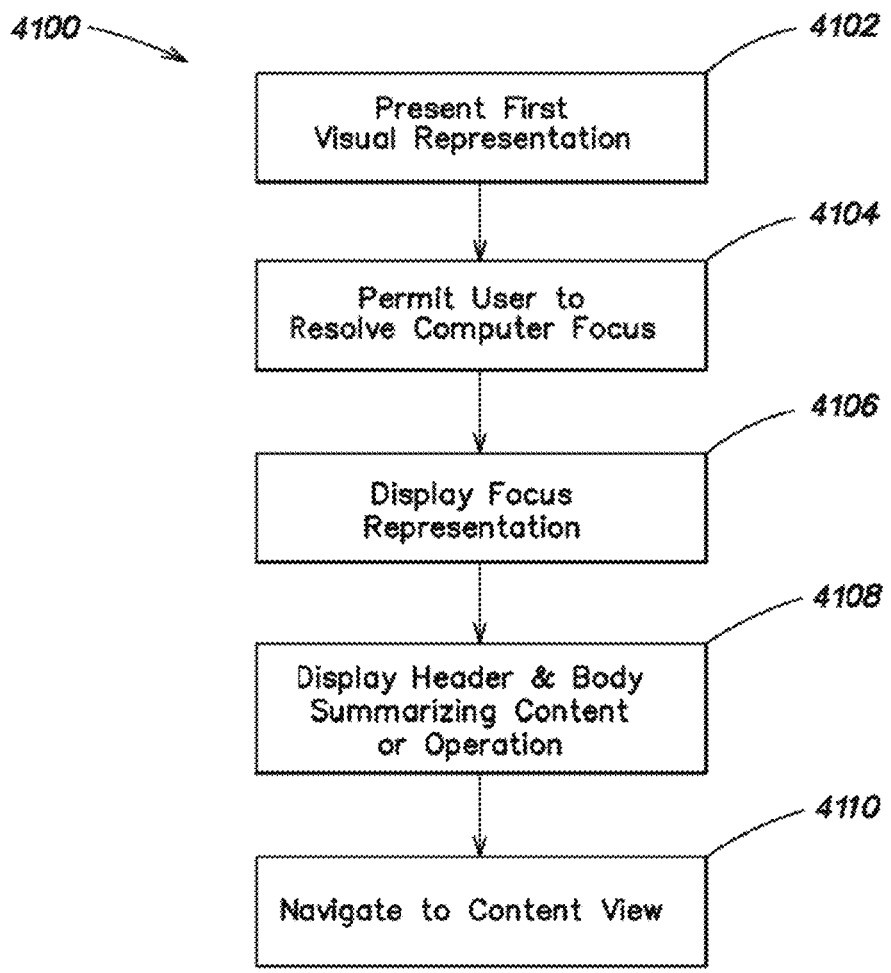
FIG. 41 is a flow diagram of one example process for streamlining user interactions with computer content, according to aspects of the invention.

Shown in FIG. 41 is an example process 4100 for streamlining user interactions with computer content. The process includes presenting a consistent look and feel for user access to computer operations and computer content for user interface elements that also provide for a reduction in decision making requirements imposed on a user during conventional computer use. At 4102, a user is presented with a first visual representation in a computer display, the visual representation is responsive to computer focus and at 4104, and the user is permitted to resolve computer focus by selecting the visual representation. Selection and focus can be thought of in terms of a visual pointer display on the computer system display, by moving the pointer over an object displayed on the computer display, computer focus may be resolved on the visual object. Alternatively, a user may have to indicate a selection of the object by clicking on a mouse button for example.

According to one embodiment clicking is not required. In another embodiment, the pointer being displayed above a visual object activates a "hover" state. In response to hovering, computer focus is resolved on the visual object. At 4106, a focus visual representation is displayed to the user. According to one embodiment, the visual representation and the focus representation are configured to have common elements, and in particular, a header and body display for rendering computer content associated with the visual representations. The focus visual representation including a header and body display summarizing at least one of computer content and computer operations are shown at 4108. The visual representations present a multitude of computer content in a streamlined form, in other words, the visual representation forms an indirection layer of functionality that provides a window into digital content, and/or computer operations linked to the visual representation. In particular, a visual representation mapped to a web page for example, provides a view of the web page in the body of the visual representation and provides additional information about the web page in the header display. The header display may also include tools for providing easy access to computer functionality associated with the web page and/or its content. In one example the header display only display the tools in the focus visual representation so the initial view of the content is not cluttered with tools that are not needed. Further, in one embodiment, the tools only display in response to focus, in other words, only when a user indicates they are necessary by moving a display pointer over the visual representation. Further computer logic may be embodied in process 4100, responsive to a display position of a pointer displayed on the computer screen. In response to the display position of the pointer occupying the same location as another visual object, computer focus is resolved on that object, causing the computer system to determine functionality associated with the object.

In one example, the object is a visual representation, and in response to moving the pointer over the visual representation, the computer is caused to display a focus visual representation associated with the visual representation. In one example, computer focus remains with the focus representation and functionality associated with the focus representation is made available for execution. Other operations including display of a header responsive to focus may be executed. At 4110, a mapping associated with at least one of the focus visual representation and the visual representation is executed causing the computer system to navigate to a content view. The content view may include a display of computer operations. In one alternative, the content view provides an interactive view of computer content. In one example the computer content, comprises online content viewed through a web browser. In another example, the content view is presented in a similar format as the visual representation used to navigate to the content. In one particular example, the content view includes a header display and a body display, and the content is displayed in the body portion. The header portion provides additional information on the content, for example a title, and may further provide additional tools that are responsive to focus. Again providing tools that resolve when needed and disappear when not reduces the amount of information a computer user need to assimilate in order to use a computer system.

All computer content and operations can be configured to display in visual representations and respective focus visual representations, providing a user with a streamlined presentation of computer content and operations. According to another example, different content types are presented through visual representation of a similar format. In one embodiment, the visual representations comprise cards as discussed herein.

Figure 42:
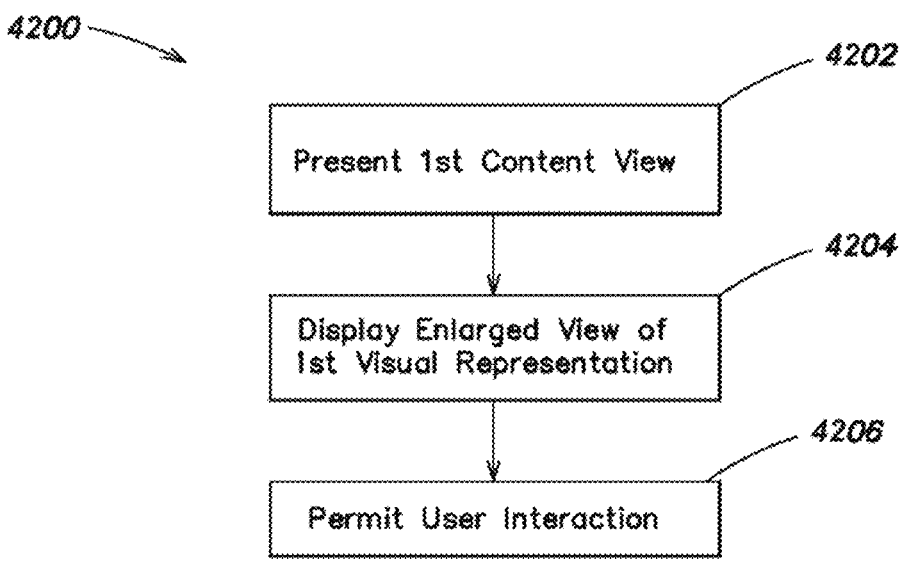
FIG. 42 is a flow diagram of one example process for permitting a user to interact with computer content, according to aspects of the invention.

A process 4200 may be invoked by streamlined computer system as part of process 4100. Additionally, process 4200 may operate independently or be called from other processes. Shown in FIG. 42 is a process 4200, for permitting a user to interact with computer content. At 4202, a computer system displays a first content view. The first content view is configured to display in a similar format as a visual representation selected by the user to navigate to the content view. In one embodiment, the first content view includes a header and body display. In another embodiment the content view is a zoomed in view of the visual representation used to navigate to the content view. At 4204, an enlarged view of the first visual representation is displayed. In one example, the content view comprises a web browser view of a web page displayed in the body of the content view. The visual representation used to navigate to the content view displays a portion of the web browser in the body of the visual representation. At 4206, a user is permitted to interact with the content displayed in the body of the content view. The user is further permitting to access options associated with the content through the header display. Optionally, further computer logic may be included in process 4200 for presenting focus and unfocused views of the header in the content view.

According to another aspect, cards types should be clearly defined by color scheme and appearance, while at the same time maintaining a similar format. For example the similar format should include header placement and sizing, display of tools, title and frame size. In one embodiment, a color scheme configured to differentiate card types provides for web cards with white headers with the content displayed on the web card showing as a thumbnail of the current state of the page. Channel cards are configured with black headers, and the content presented in the channel card comprises a simplified representation of web content based on RSS feeds or custom visualizations of some non-RSS websites. Customized visualizations may be pre-loaded on the device for specific websites, or may be provided as part of a remotely stored device profile and/or global profile. Updates to the device profile and/or a global profile would include development of customized visualizations of non-RSS websites, and access to remote storage trigger delivery of the customized visualizations. According to one embodiment, only sites for which RSS or custom visualizations are available can be displayed as channel cards.

System cards are shown either with blue headers or grey headers. System cards may be further classified to include nascent cards. "Browse the Web" card, FIG. 31, 3114 is an example of a nascent card. The nascent card may be configured so it position is not configurable, nor is a user able to remove the card from the home view, or any view. The nascent card maps to functionality necessary to operation of the streamlined device, and thus no option to close and/or remove it is available. Other system cards are configured to represent activities that have been specifically designed such as for example, photos & video card(s). The other system cards map to functionality also regarded as necessary so that the other system cards can not be deleted, however, the other system cards can be reorganized in for example the home view. Functionality mapped to by the other system cards include communications card, for configuring wireless access of the device, bookmarks for presenting conventional styled web page bookmarks, camera for providing for configuration and operation of a camera, either embedded in the device upon construction, or incorporated through for example a USB port.

In one embodiment, a system card is mapped to functionality to provide a user with streamlined access to web bookmarks. In one example, a bookmark card is provided that is always accessible from the home view. As with other system cards, the bookmark card comprises a header and a body. According to one embodiment, the body display for the bookmark card is unique to the bookmark card. Bookmarks are retrieved and displayed in the bookmark card one at a time. In one example, the bookmark card indicates in the body display the number of the bookmark in the list and the total number of bookmarks available.

According to some embodiments, the interactivity of individual cards is limited to navigation to a page view. For example, a user cannot change the content of a card by interacting only with the card. In other embodiments, channel cards, for example, provide a user with the option of interacting directly with the card. Upon hover, channel cards presenting news feeds may resolve navigation tools configured to step through individual rss items displayed in the channel card. Additionally, selection within a channel card presenting a news feed causes the device to execute different mappings depending on what part of the channel card was selected for execution. Clicking directly on an rss feed headline for example, caused the device to execute a mapping to the web page view for that article. Selecting the body of the channel card causes the device to execute a mapping to the channel full view. Selection within the channel full view causes the device to display a content menu, responsive to manipulation of a scroll wheel.

In an embodiment employing a three card presentation, the cards that are presented provide the user with the ability to interact with system specific features. System features may be invoked and display using consistent presentation and/or animation. Consistent presentation of like features may engender a comfort level in the user for new features that appear using the same and/or similar presentation. Additionally, where a user invokes features in a similar or consistent manner, access of new features is facilitated and user comfort level may be increased. For example, a nascent card, is a system card that provides for consistent implementation of user activity and/or a computer objective desired by the user. In one embodiment, the "new card" card is a visual representation of a system placeholder for generation and presentation of new card that a user may created during the course of ordinary activity. By selecting the new card (for example, creating a web card used to interact with web content) a consistent animation may be employed to display to the user the creation of the new web card utilizing the nascent "new card" card. Other system features may be presented through system cards. Typically, system cards will represent functionality used most frequently and/or functionality that should always be available and not subject to removal by a user. Other card types, include web cards that are used to present web content, and channel cards that are used to provide to a user easy and/or consistent access to additional features.

According to another aspect, features of cards may include consistent navigation tools, consistent content display—including limiting the ability to alter content of a card through user interaction with the card, state representative images of content, state and context representative images of content, customized visualization of content, and in some examples customized visualizations include information derived from rss content. In one embodiment, user interactions with cards are also streamlined. In another embodiment, when card configurations and/or card options are selected by a user (if available) a consistent animation is presented to the user. For example, selection of a card's options may cause an animation displaying the flipping of the card and the revelation of user selectable options. Options, for example, may include permitting the content reflected in the card to be displayed as a screen saver. Certain features may only be available for certain cards types. In one embodiment for example only channel cards (discussed in greater detail herein) may be displayed in the screensaver mode, thus only channel cards will display the option to permit display in screensaver. In another embodiment, certain card types may be converted through user selection. In one embodiment, web cards may be converted into channel cards. It is realized that the segregation of functions between the card types may improve user interaction and adoption of the different feature sets available to each.

According to another embodiment, systems and methods for streamlining user interaction with electronic content may include a process for generating new visual representations mapped to computer content. Shown in FIG. 43A is an example process 4300, for generating a user interface element. At 4302, a visual representation associated with a computer operation for creating a new visual representation is displayed on a computer system display. The visual representation may comprise a nascent card. Nascent cards are configured to always be available to a user, that is, they are configured so a user can not remove them. In some embodiments, the position of the display of nascent cards cannot be changed by the user. In one embodiment, the nascent card is always displayed in a home view, at the bottom right corner of a home view page. For a new page this may include the nascent card appearing in the upper left corner of the page, when no other cards are displayed on the same page. At 4304, execution of the functionality associated with the visual representation occurs. At 4306, a first animation is displayed to the computer system user showing the visual representation sliding away from its present location to reveal a new visual representation. At 4308, a second animation is displayed to a user showing the computer system zoom into the new visual representation to present a quick access view at 4310.

The quick access view is configured to permit a user to select computer content to associate with the new visual representation. In one example, this includes presenting a display of frequently accessed web content (e.g. web pages) to the user in the quick access display. It is likely that the user will intend to return to a page frequently accessed, in which case, the display will meet the users needs, however, the quick access view is further configured to permit entry of a uniform resource indicator (e.g. a url), and further configured to allow a user to request display of bookmarked locations. At 4312, a user is permitted to select computer content to associate with the new visual representation, and in response to selection of the computer content, the computer system displays an animation to the user depicting the computer system zooming into a first view of the selected content at 4314.

In one alternative, new visual representation may be generated without selecting a nascent card, in process 4350, FIG. 43B. For example, a web card may include a hyperlink directing a computer system to display the linked web page in a new window. At 4352, a user selects an open in new window link. In one alternative, the link may include instruction to open an new tab. In response to a request to display a web page in a new window, a new visual representation is generated and associated with a mapping to the web page. The computer system displays a transition from the current web card view to the home view, 4354, displaying the nascent card. In an optional step, the process zooms out the home view so that the nascent card is rendered on one page. The system presents an animation to the user, 4356, similar to step 4306, showing the nascent card sliding away from its position, revealing a new visual representation. The system then zooms in on the new representation, 4358, displaying a first view of the mapped content, 4360.

Common Card Configurations

According to one aspect, cards should have common features to promote user acceptance and improve adoption of different cards, while providing familiar a form. According to some embodiments, most cards are configured with a similar anatomy. According to some embodiments, cards comprise certain common elements described with reference to illustrated examples.

Figure 44A:
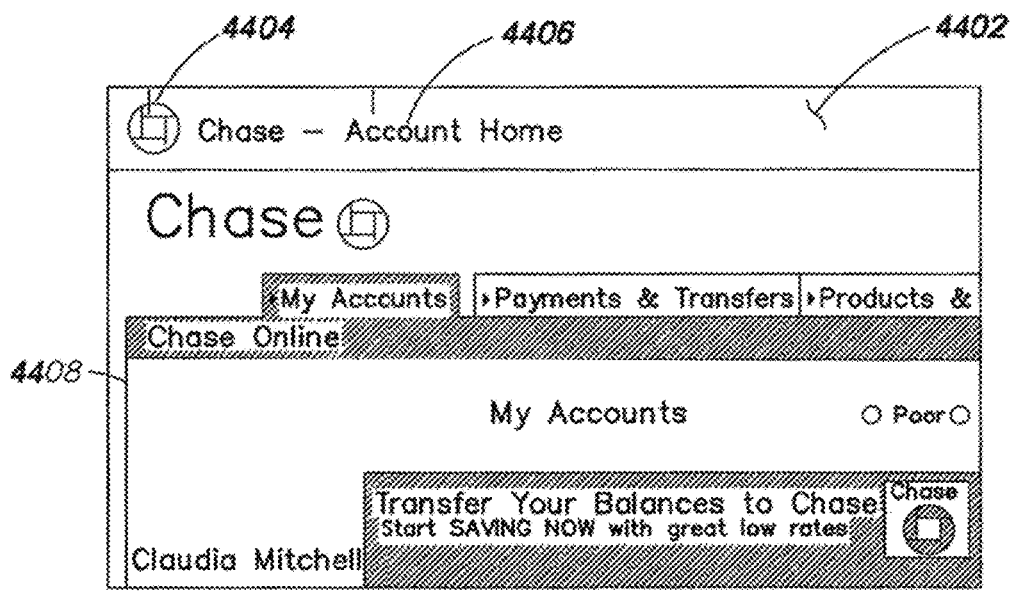
FIG. 44A is a screen shot of an example web card in a non-hover state, according to aspects of the invention.
Figure 44B:
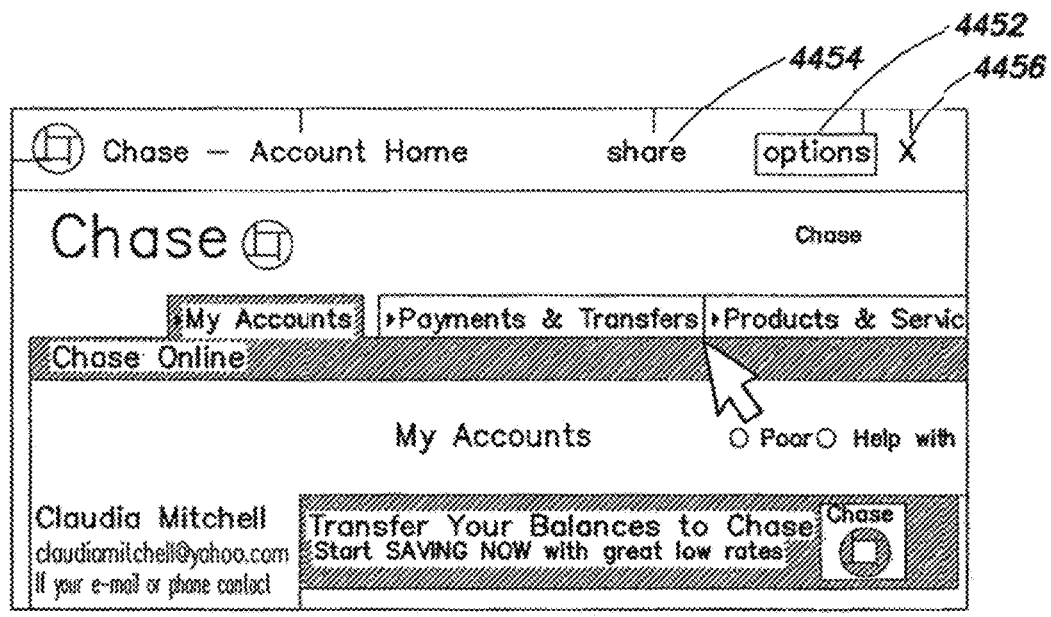
FIG. 44B is a screen shot of an example web card in a hover state, according to aspects of the invention.

With reference to FIG. 44A shown is an example of a web card when not in focus, however, the common features among the cards are discussed in greater detail. Header 4402 run along the top of the card. The color depends on the color scheme employed to differentiation the type of card: in one example white is used for web cards, black for channel cards, and blue and grey for system cards. Optionally the header includes a favicon 4404 (the favicon may be retrieved from the site being view in the case of web and channel cards and a custom favicon is employed for system cards). The header further comprises a title 4406 for the site or activity conducted, and a body 4408. In response to focus on a card the display of the card becomes a little larger relative to its display when out of focus and the card controls 4452-4456, FIG. 44B, are revealed on the header, when in a focused state.

Card options 4452, reveals the card options, and may in some embodiments invoke an animation of the card flipping to reveal selectable options. Share, 4454, is configured to permit a user to share the card with other user. Delete, 4456, removes the card from the home view. Card controls, such as 4452-4456 are typically not available for system cards, which typically can not be shared or deleted. According to one embodiment, the photos & video system card is configured to display the card options (in one example the photo & video system card permits selection of "Show in screensaver"). 4408, FIG. 44A, card body varies by the type of card displayed. In one embodiment, a web card body 4408 comprises a thumbnail of the current state of the web page. The current state thumbnail may be updated. Updates may occur in conjunction with a timer. Typically the timer is set for default operation, and is not configurable by a user, although in some embodiments a user may access and modify an update interval for web cards through system configurations.

The body of a channel card (not shown) comprises a visualization of the rss feed from the web site source. Sites that do not have rss feeds, typically, will not be able to be displayed as channel cards. However, customized visualizations for some static sites are preloaded and for the preloaded static sites an rss feed is not used to display the web site content in a channel card. System card body (not shown) comprises a custom image configured to represent the system activity mapped to by the system card.

Options and Information Associated with Various Card Embodiments

Figure 45:
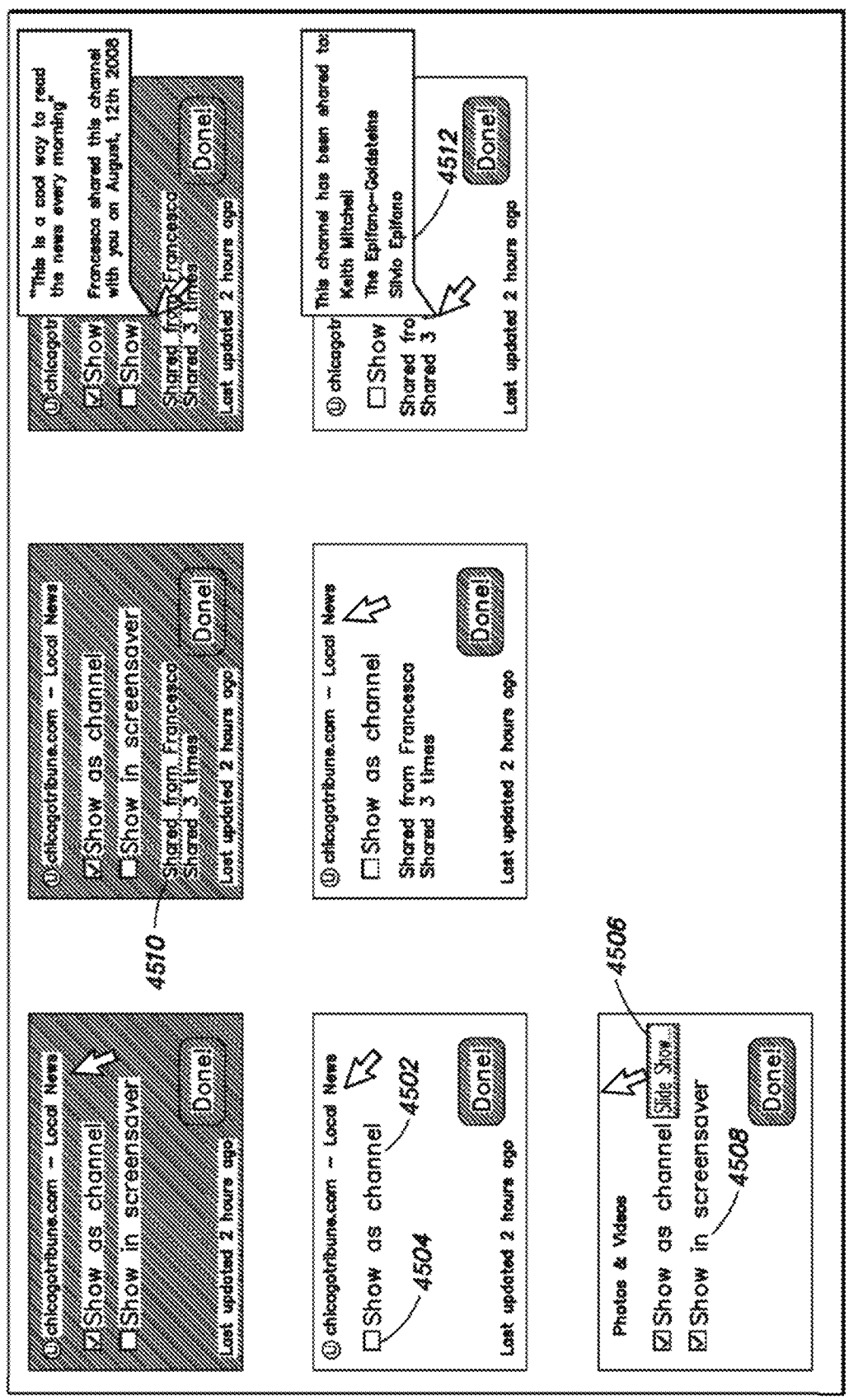
FIG. 45 is a screen shot of examples of option views of cards, according to aspects of the invention.

According to one embodiment, selection of the card options icon causes the device to display a visualization of the card turning over. The "back side" of the card, FIG. 45 (showing a plurality of examples of the backs of various card types) comprises the following options: Show as channel 4502, which transforms a web card into a channel card, and vice-versa, based either upon checking or unchecking box 4504. If the channel is a photo and video channel, this control reads "Show as channel using [lens]." A lens is a customized visualization for computer content. Shown in FIG. 45 is an example lens "Slideshow" at 4506.

According to another embodiment, the option for show as channel is either shown as permanently checked for system cards that are always available as a channel (e.g. the photos and video card), or as absent for system cards that are not available as a channel (e.g. a system settings card or communications card). Show in screensaver, 4508, is an available option for channel cards. Typically 4508 is not an available option for other card types, however, the photo and video system card does permit its content to be displayed in the screensaver. According to one example, new channel cards are configured to not display in screensaver mode by default and this option is not checked for new channel cards. Shared from, 4510, provides information on the user or device from which the card was shared. According to one embodiment, system cards cannot be shared, and do not display "shared from" information. Additionally, shared from 4510, does not display for card generated by a present user. In one example, shared from 4510 is responsive to computer focus (e.g. hover). Hovering over the Shared From line, 4510, causes the device to display an informational bubble with a list of people to whom the card was shared.

Other options may be employed for displaying shared from information. Other options may include linking to a display list for share from information, and in some embodiments may include displaying the shared entities on the back of the card without selecting 4510, Shared From. In such embodiments a maximum number of shared entities may be displayed before requiring selection of a more control. The more control expands on the list of shared entities to provide for listings that do not fit within the space provided on the back of a card.

Shared to, 4512, provides information about whether and to whom the card has been shared. According to one embodiment, system cards can not be shared, thus no shared to information is displayed. By default shared to, 4512, does not display until a card has been shared. According to some embodiments, the "shared to" field is responsive to focus. In one example, hovering over the shared to line causes the device to display an informational bubble with the list of people to whom the card has been shared. Other options may be employed for displaying shared to information. Other options may include linking to a display list for share to information, and in some embodiments may include displaying the shared entities on the back of the card without selecting 4512, shared to. In such embodiments a maximum number of shared entities may be displayed before requiring selection of a more control (not shown). The more control expands on the list of shared entities to provide for listings that do not fit within the space provided on the back of a card. Optionally the more control may cause the device to display an information bubble containing the remaining shared entities and/or all the shared entities.

Organization of the Home View

Typically, the home view is configurable by the user. New items may be added, existing items may be moved and/or removed based on user selection. The home view further comprises some visual representations that can not be removed. Commonly requested system operations have visual representation displayed on the home view that can not be deleted. According to one embodiment, a user may reorganize the display but not remove representations for system operations. For example, visual representations that map to system operations (e.g. a communication card and a camera card) cannot be remove from the home view. Nascent cards, for example, the Browse the web card, cannot be removed from the home view. According to some embodiments, the Browse the web card is further limited in configurability, in that, the positioning of the card will not change relative to the other cards. For example, the Browse the web card will always be displayed last. In other examples, nascent cards may have other positions that do not change, first to be displayed, last displayed on first page of the home view, etc. In some embodiments, even nascent cards may be reorganized in the home view display.

The user interface may include default settings for organization. For example, a default organization for the home view comprises an arrangement roughly based on order of creation, from left to right, top to bottom. Other organization may be employed right to left, top to bottom. In one example, the user of the streamline device is located in China, and the default organization is presented from right to left.

One example default setting for the home view establishes a number of cards to display per page of the home view. In one example the default caused the computer to render twelve cards on a page. In another example, the display of the twelve cards further comprises the tops of the cards on the next page or the bottoms of the cards on the previous page, as appropriate. In one embodiment, the home view includes maximal display thresholds configured to improve the ability of the user to absorb the information presented. In some embodiments, a maximal number of visual representations per screen is set. In one example, the maximal number of visual representations is used to define a GUI page. In another example, the maximal number of visual representations is associated with a maximal number of full view visual representations, and the page is configured to include portions of views of other visual representations available on adjacent pages. A computer operation that would cause the computer device to exceed the maximal number results in the creation of a new display page. The home view is organized into as many pages are required in order to maintain the maximal threshold of display items.

It is to be appreciated the different organization options may be employed for the home view. In one alternative, frequency of use may be employed to organize the cards displayed in a home view. The most frequently accessed content may be display first with the least frequently accessed content being display last. Another option includes the use of last accessed information associated with a particular card. The most recently accessed card may be displayed first and the card with oldest use would be displayed last.

Creating New Cards

An example process 3940, FIG. 39B may be executed to generate a new card. Process 3940 is executed in response to a user clicking the Browse the Web card on the home view at step 3942. In response to the execution of the Browse the Web card, the devices displays the card sliding to the right (or down to the far left on the next row if it is already on the far right) as a new web card is created in its place at 3944. At 3946 the system renders apparent motion in the display, showing the system zooming into the new web card. At 3948, the system displays a quick access view configured to generate a mapping between the new card and web based content. According to some embodiments, newly added cards (whether created by the user or received as a shared card from another user) always appear at the bottom of the home view next to the Browse the Web card. In other embodiments, the Browser the Web card may display a different title, for example, "New Card." It is to be appreciated that the title is not particularly relevant to the nascent card, but rather, the functionality for generating new card is.

New cards may also be created on the fly during a browsing session as part of process 3980, FIG. 39C. Process 3980 begins at 3982 in response to either a user clicking an "open in new window" link on a web page, or in response to a user executing a keyboard shortcut (e.g. Shift-click) to perform the same function. Additionally links that contain computer instructions to open link in new tab will invoke the same functionality at 3982. In these cases, the system shows an animation zooming out of the current card to the home view at 3984, optional step 3986 cause the system to display movement to the last page of the home view (if not there already), at 3988 the Browse the Web card slides out of the way, revealing the new card in its place at 3990, and finally zooming into the new card, 3992. Process 3980, may be implement in association with a timer to govern the overall execution time of process 3980. In one example, the process and animations should take no more than about half a second.

According to one embodiment, selection of the Browse the Web system card causes the system to execute a process for generating a new web card. As part of the process for generating a new card, the system presents a quick access view to the user. Referring again to FIG. 33, shown is an example of a quick access view. As discussed earlier, the body 3302 of the quick access view may display a frequently accessed list of content. A user may select from the displayed content to generate a mapping for the new cards, and enter the web page view for that content. Additional at 3310, the quick access view presents news from, for example, the device manufacturer. At 3310, news regarding operation of a streamlined device may be shared with the streamlined device user community. Advice on new features may be provided, 3312. And awareness drawn to new features. Hints and suggestions may also be displayed, for example, 3314, referring users to GOOGLE DOCS, and on-line word processing/office suite solution.

According to another embodiment, creation of a channel card is available for sites with rss feeds or sites for which customized visualizations are available. From the home view any web card with rss feeds or with customized visualizations can be used to generate a channel card. From a web page view, hovering over the option add channel caused the system to display a preview of the channel card. In one embodiment a channel card includes features not observed in web or system card. For example, channel card 3104, includes a display, 3180, for an individual rss item received from the online source. In this case the rss item is a headline that permits direct access to an article (typically through a web card). Channel card, 3104, will display a plurality of rss items one at a time through the channel card, thus the content in a channel card periodically changes, until al content items have been displayed. At that time the channel cards starts again from the beginning displaying each one of the plurality of source items.

Removing Cards

According to one embodiment, the home view may be configured by a user. A user may remove visual representations from the home view. In a card example, a user may access card option by providing focus on the card. As discussed above, card options are revealed in response to focus. Options may comprise a delete option. In one example, a delete option is display as an "X" in the upper right corner of a hover view of a card. To delete a card from the home view, a user executes the delete option by clicking on the "X." In response to removal of a card from the home the view, the remaining cards on the home view are reordered by the device. In one example, the reordering comprises shifting of the displayed cards to rearrange them into the organizational schemes discussed above. In order to ensure a close/delete selection was intended and to provide the user with the ability to change their mind, an information display bubble may be generated in response to the delete execution. The information display bubble maps to functionality that causes the device to undo the delete operation in response to selection by the user.

According to one embodiment, a dialog bubble is displayed off of the header of the home view. The dialogue bubble displays a message confirming the delete operation and further comprising a mapping to functionality provided, the causes the device to undo the delete operation in response to selection. According to another embodiment, hot-key functionality is provided that cause the device to undo that last activity performed by the device. In one example, ctrl-z, is mapped to functionality that permits the last activity to be undone.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method, comprising:
    displaying a graphical user interface on a computing device having a single display screen, wherein the graphical user interface comprises at least a plurality of views of digital media content, wherein the plurality of views comprise a full screen view that does not include a header;
    providing for transition between the plurality of views in response to selection of an I/O profile, wherein the act of providing is responsive to a change in orientation of the computing device and includes transitioning from a first I/O profile to a second I/O profile responsive to detecting a rotation of a display component of the computing device by at least 180 degrees, the display component including the single display screen;
    providing for transition between the plurality of views in response to activation of a view selector component configured to permit a user to select one of the plurality of views;
    associating at least one of a plurality of visual representations with digital media content;
    executing the association with the at least one of the plurality of visual representations with digital media content in response to selection;
    transitioning a display on the computing device to a view of the digital media content in response to the act of executing the association; and
    providing for display of user digital media content and referenced digital media content in the view of the digital media content.

2. The method according to claim 1, further comprising an act of displaying in the view user digital media content and referenced digital media content in response to the act of executing the association with the at least one of the plurality of visual representations.

3. The method according to claim 2, wherein the act of displaying in the view user digital media content and referenced digital media content includes an act of accessing a reference to remote digital content not controlled by the user in order to display referenced digital content.

4. The method according to claim 1, further comprising an act of associating the at least one of the plurality of visual representations with a remote service provider.

5. The method according to claim 4, further comprising an act of storing the association between the at least one visual representation with the remote service provider in at least one of a device profile and a user profile.

6. The method according to claim 1, further comprising acts of:
    configuring access to a remote service; and
    integrating operations provided by the remote service provider into the view of the digital media content.

7. The method according to claim 1, further comprising, in response to one or more signals received from an input device, scrolling through items displayed in the view of the digital media content.

8. The method according to claim 7, wherein the input device comprises a touchscreen.

9. The method according to claim 7, wherein the input device comprises a navigation button.

10. The method according to claim 7, wherein the input device comprises a scroll wheel.

11. The method according to claim 1, further comprising acts of:
   permitting the user to share the at least one visual representation, including any associated digital media content with another user;
   storing shared information in response to an act of sharing by the user; and
   updating any associated digital media automatically for the another user, wherein the act of updating any associated digital media includes acts of:
      identifying any changes in shared digital media content, wherein changes include at least one of addition of digital media content associated with the at least one visual representation, deletion of digital media content associated with the at least one visual representation, edits of digital media content associated with the at least one visual representation, and updates of information associated with digital media content associated with the at least one visual representation.

12. The method according to claim 1, further comprising acts of:
   permitting the user to share the at least one visual representation, including any associated digital media content with another user;
   transmitting the at least one visual representation associated with the digital media content, any state settings, and any remote service settings to another streamlined device user.

13. The method according to claim 1, further comprising an act of permitting the user to update date information associated with the digital media content.

14. The method according to claim 13, further comprising an acts of:
   generating an offset for the updated date information associated with the digital media content; and
   applying the offset to similar digital media content.

15. The method according to claim 1, wherein the act of displaying the user interface includes:
   providing a plurality of views of the plurality of visual representations of computer content; and
   associating the plurality of visual representations of computer content with at least one of the plurality of views, and wherein the each of the plurality of visual representations is responsive to focus and execution, wherein execution includes selection of the visual representation.

16. The method according to claim 1, wherein the full screen view extends from a first edge to a second edge of the single display screen in a vertical dimension, and the full screen view further extends from a third edge to a fourth edge of the single display screen in a horizontal dimension perpendicular to the vertical dimension.

17. The method according to claim 1, wherein:
   the first I/O profile includes a keyboard of the computing device; and
   the second I/O profile does not include the keyboard of the computing device.

18. The method according to claim 17, further comprising preventing the computing device from responding to pressed keys of the keyboard in accordance with the second I/O profile.

19. The method according to claim 1, further comprising physically manipulating the orientation of the computing device to trigger the transition between the plurality of views.

20. The method according to claim 1, wherein the rotation of the display component is about an axis parallel to one of a height dimension and a length dimension of the single display screen.

21. The method according to claim 1, wherein the rotation of the display component is about an axis perpendicular to the single display screen.

22. The method according to claim 1, wherein the act of providing for transition between the plurality of views responsive to selection of an I/O profile includes:
   selecting the first I/O profile responsive to detecting a positioning of the display component at an angle less than or equal to 180 degrees relative to a keyboard of the computing device about a longitudinal axis running along an interface between the display component and the keyboard; and
   selecting the second I/O profile responsive to detecting a positioning of the display component at an angle greater than 180 degrees relative to the keyboard about the longitudinal axis.

23. The method according to claim 22, wherein the act of providing for transition between the plurality of views in response to selection of an I/O profile includes:
   permitting the user to rotate the display component about the longitudinal axis, wherein the longitudinal axis runs along an interface between the display component and a base of the computing device that includes the keyboard;
   wherein rotating the display component about the longitudinal axis up to approximately 180 degrees from a closed mode configures the portable computer into a laptop mode with one of the plurality of views as a default display; and
   wherein rotating the display component about the longitudinal axis beyond approximately 180 degrees from the closed mode configures the portable computer into an easel mode with another one of the plurality of views as a default display.

24. The method according to claim 1, wherein the computing device further comprises a base having the keyboard integrated therein.

25. A computer-readable medium having computer-readable instructions stored thereon that as a result of being executed by a computer, instruct the computer to perform a method, the method comprising:
   displaying a graphical user interface on a computing device having a single display screen, wherein the graphical user interface comprises at least a plurality of views of digital media content, wherein the plurality of views comprise a full screen view that does not include a header;
   providing for transition between the plurality of views in response to selection of an I/O profile, wherein the act of providing is responsive to a change in orientation of the computing device and includes transitioning from a first I/O profile to a second I/O profile responsive to detecting a rotation of a display component of the computing device by at least 180 degrees, the display component including the single display screen;
   providing for transition between the plurality of views in response to activation of a view selector component configured to permit a user to select one of the plurality of views;

associating at least one of a plurality of visual representations with digital media content;

executing the association with the at least one of the plurality of visual representations with digital media content in response to selection;

transitioning a display on the computing device to a view of the digital media content in response to the act of executing the association; and providing for display of user digital media content and referenced digital media content in the view of the digital media content.

26. A system, comprising:

a display component having a single display screen configured to display a graphical user interface, wherein the graphical user interface comprises at least a plurality of views of digital media content, wherein the plurality of views include at least one of a plurality of visual representations, and wherein the plurality of views comprise a full screen view that does not include a header;

at least one processor configured to:

transition the graphical user interface between the plurality of views in response to selection of an I/O profile, wherein the transition is responsive to a change in orientation of the display component; and includes transition from a first I/O profile to a second I/O profile responsive to detecting a rotation of the display component by at least 180 degrees; and transition between the plurality of views in response to activation; and a storage component configured to store an association between at least one of a plurality of visual representations and digital media content;

wherein the at least one processor is further configured to execute the association with the at least one of the plurality of visual representations with digital media content in response to selection and transition the display to a view of the digital media content in response to the act of executing the association; and wherein the display component is configured to display user digital media content and referenced digital media content in the view of the digital media content.

27. The system according to claim 26, wherein the at least one processor is further configured to display in the view user digital media content and referenced digital media content in response to the act of executing the association with the at least one of the plurality of visual representations.

28. The system according to claim 27, wherein the at least one processor is further configured to access a reference to remote digital content not controlled by the user in order to display referenced digital content.

29. The system according to claim 26, wherein the at least one processor is further configured to associate the at least one of the plurality of visual representations with a remote service provider.

30. The system according to claim 29, wherein the at least one processor is further configured to store the association between the at least one visual representation with the remote service provider in at least one of a device profile and a user profile.

31. The system according to claim 26, wherein the at least one processor is further configured to:

configure access to a remote service; and integrate operations provided by a remote service provider of the remote service into the view of the digital media content.

32. The system according to claim 26, wherein the at least one processor is further configured to:

permit the user to share the at least one visual representation, including any associated digital media content, with another user;

store shared information in response to an act of sharing by the user; and update any associated digital media automatically for the another user at least in part by:

identifying any changes in shared digital media content, wherein changes include at least one of:

addition of digital media content associated with the at least one visual representation;

deletion of digital media content associated with the at least one visual representation;

edits of digital media content associated with the at least one visual representation; and updates of information associated with digital media content associated with the at least one visual representation.

33. The system according to claim 26, wherein the at least one processor is further configured to:

permit the user to share the at least one visual representation, including any associated digital media content, with another user; and transmit the at least one visual representation associated with the digital media content, any state settings, and any remote service setting to another computing device user.

34. The system according to claim 26, wherein the at least one processor is further configured to permit the user to update date information associated with the digital media content.

35. The system according to claim 34, wherein the at least one processor is further configured to:

generate an offset for the updated date information associated with the digital media content; and apply the offset to similar digital media content.

36. The system according to claim 26, wherein the at least one processor is further configured to select the I/O profile in response to a physical manipulation of the orientation of the computing device.

37. The system according to claim 26, wherein the full screen view extends from a first edge to a second edge of the single display screen in a vertical dimension, and the full screen view further extends from a third edge to a fourth edge of the single display screen in a horizontal dimension perpendicular to the vertical dimension.

38. The system according to claim 37, wherein:

the first I/O profile includes a keyboard that is coupled to the display component; and the second I/O profile does not include the keyboard.

39. The system according to claim 26, wherein the rotation of the display component is about an axis parallel to one of a height dimension and a length dimension of the single display screen.

40. The system according to claim 26, wherein the rotation of the display component is about an axis perpendicular to the single display screen.

41. The system according to claim 26, wherein the at least one processor is configured to:

select the first I/O profile responsive to detecting a positioning of the display component at an angle less than or equal to 180 degrees relative to a keyboard of the computing device about a longitudinal axis running along an interface between the display component and the keyboard; and select the second I/O profile responsive to detecting a positioning of the display component at an angle greater than 180 degrees relative to the keyboard about the longitudinal axis.

42. The system according to claim 26, wherein the display component is coupled to a base having the keyboard integrated therein.

* * * * *